United States Patent
Okamura et al.

(10) Patent No.: US 6,266,162 B1
(45) Date of Patent: *Jul. 24, 2001

(54) IMAGE COMMUNICATION APPARATUS FOR SELECTIVELY CONTROLLING OUTPUT OF COMMUNICATION MANAGEMENT INFORMATION

(75) Inventors: Koji Okamura, Yokohama; Yasuhide Ueno; Nobuyuki Hirai, both of Tokyo; Takashi Imai, Yokohama; Atsushi Ikeda, Tokorozawa, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/556,542

(22) Filed: Nov. 13, 1995

(30) Foreign Application Priority Data

Nov. 14, 1994 (JP) ..................................... 6-279500

(51) Int. Cl.⁷ .............................. H04N 1/32; H04N 1/21
(52) U.S. Cl. ......................... 358/468; 358/442; 358/444
(58) Field of Search .................................... 358/404, 444, 358/402, 403, 407, 434, 435, 436, 438, 439, 440, 468

(56) References Cited

U.S. PATENT DOCUMENTS

| 4,494,149 | * | 1/1985 | Furukawa | 358/404 |
|---|---|---|---|---|
| 4,727,435 | * | 2/1988 | Otani et al. | 358/468 |
| 4,947,345 | * | 8/1990 | Paradise et al. | 358/442 |
| 5,155,602 | * | 10/1992 | Terajima | 358/440 |
| 5,377,016 | * | 12/1994 | Kashiwagi et al. | 358/468 |
| 5,461,488 | * | 10/1995 | Witek | 358/444 |
| 5,552,901 | * | 9/1996 | Kikuchi et al. | 358/468 |

FOREIGN PATENT DOCUMENTS

| 4367153 | 12/1992 | (JP) | H04N/1/00 |
|---|---|---|---|

* cited by examiner

*Primary Examiner*—Scott A. Rogers
(74) *Attorney, Agent, or Firm*—Fitzpatrick, Cella, Harper & Scinto

(57) ABSTRACT

A facsimile apparatus that can be conveniently controlled from an external information processing terminal is disclosed. The facsimile apparatus comprises a line controller for effecting transmission and reception of image data through a telephone line, an interface for effecting transmission and reception of information with an information processing terminal, a first instruction accepting unit for accepting an instruction for transmission or reception from the information processing terminal, an operation panel for entering a manual instruction, a second instruction accepting unit for accepting the instruction for transmission or reception from the operation panel, a memory for storing communication management information relating to image communication, and a controller for at least controlling the first instruction accepting unit, the second instruction accepting unit and the memory, wherein the controller is adapted to separately store the instruction accepted by the first instruction accepting unit and that accepted by the second instruction accepting unit in the memory.

39 Claims, 76 Drawing Sheets

```
*******************************************
**** COMMUNICATION MANAGEMENT REPORT ****
*******************************************
```

| COMMUNICATION KIND, PROTOCOL, COMMUNICATION MANAGEMENT REPORT OUTPUT HISTORY | PARTNER'S TEL NO. | PARTNER'S ABBREVIATION NAME | COMMUNICATION START TIME | COMMUNICATION PERIOD OF TIME | PAGES | COMMUNICATION RESULT |
|---|---|---|---|---|---|---|
| *TRANSMISSION | 110 | POLICE | 10/07 11:16 | 00'00 | 0 | NG |
| *TRANSMISSION | 177 | WEATHER | 10/07 11:18 | 00'11 | 1 | OK |
| *RECEPTION | 104 | GUIDANCE | 10/07 11:20 | 00'20 | 2 | OK |
| *MANUAL TRANSMISSION | 110 | POLICE | 10/18 11:20 | 00'18 | 1 | OK |
| TRANSMISSION ECM | 177 | WEATHER | 10/18 11:22 | 00'22 | 1 | OK |
| TRANSMISSION | 104 | GUIDANCE | 10/18 11:24 | 00'00 | 0 | NG |

48-1

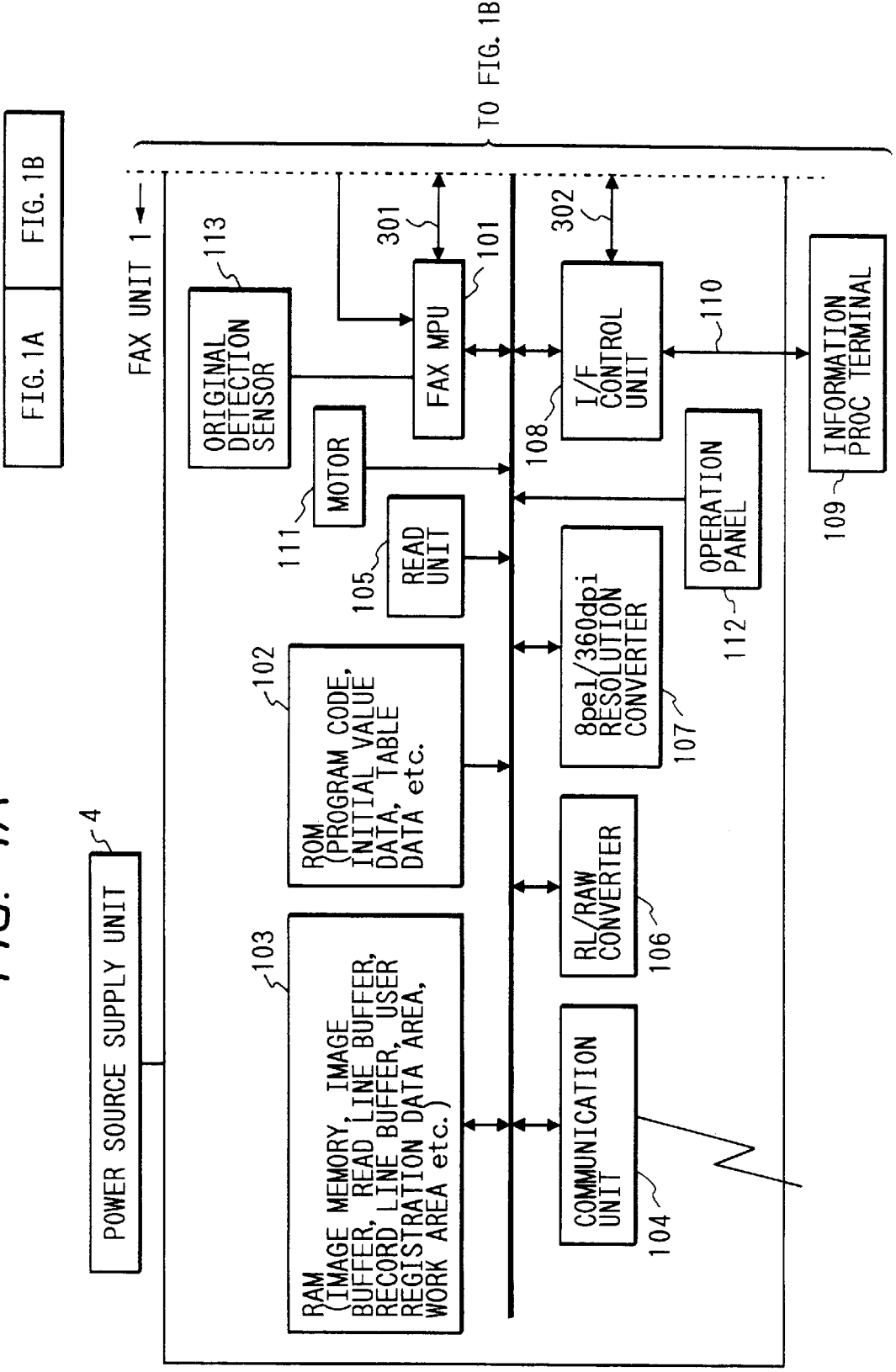

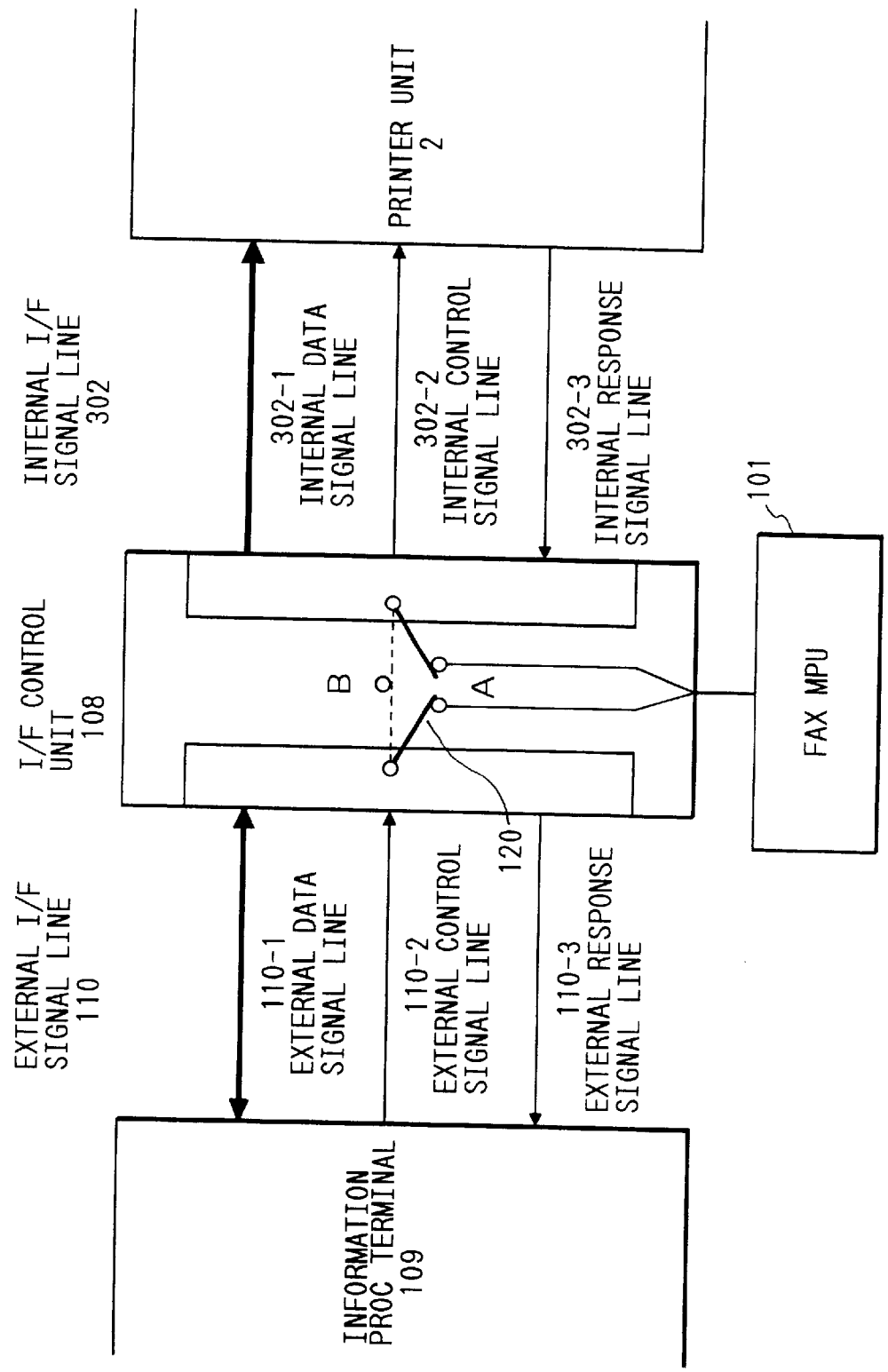

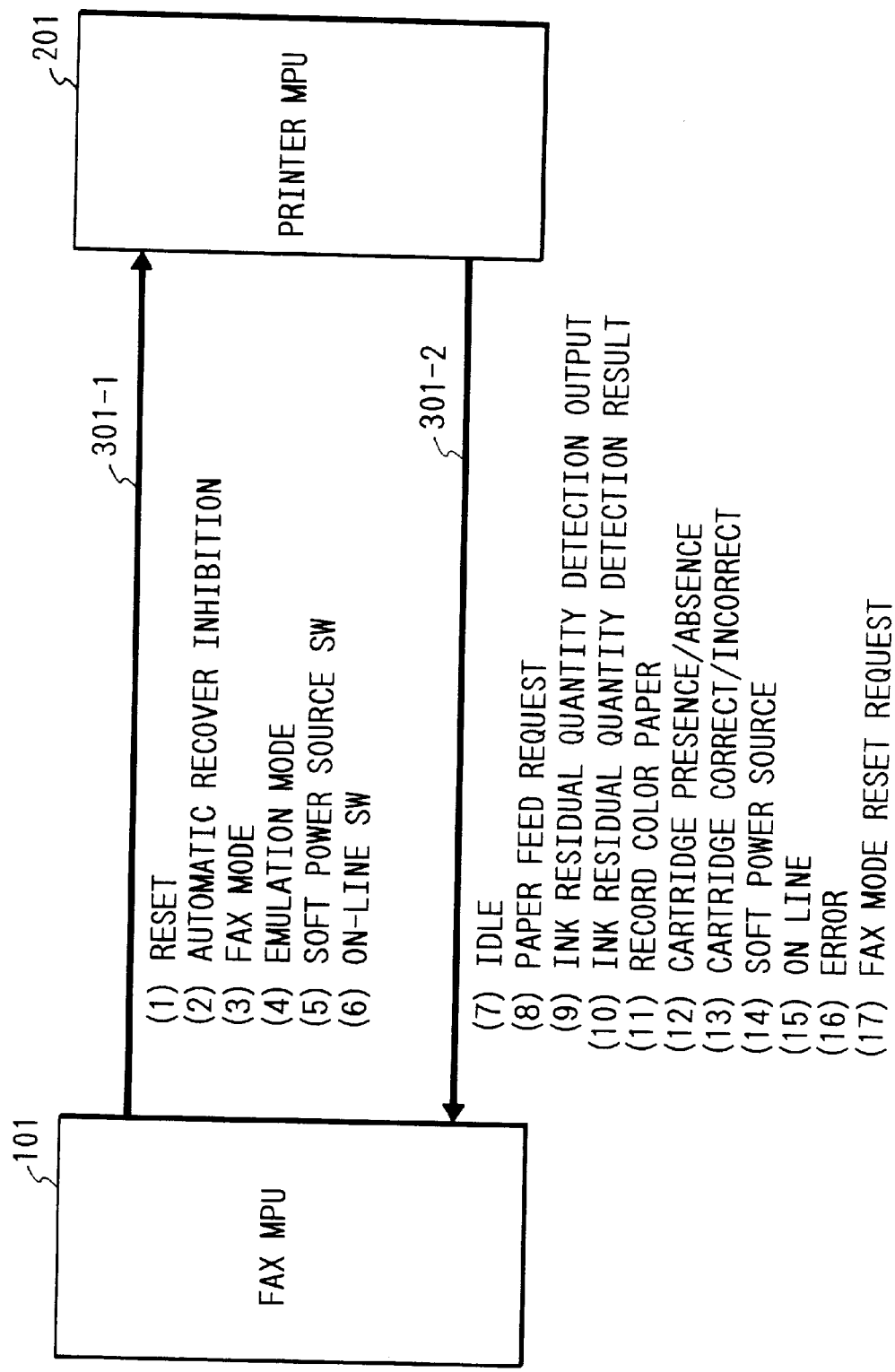

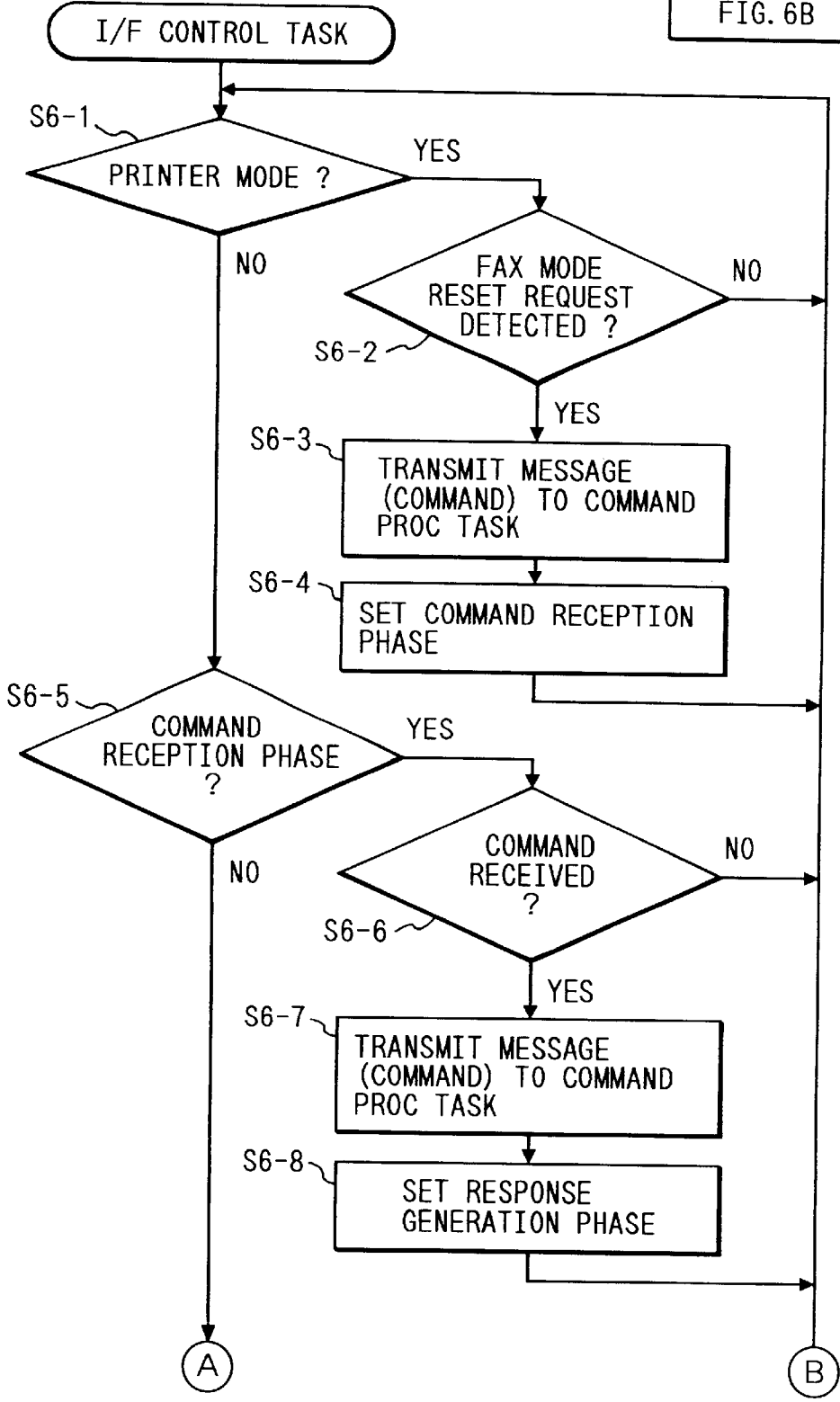

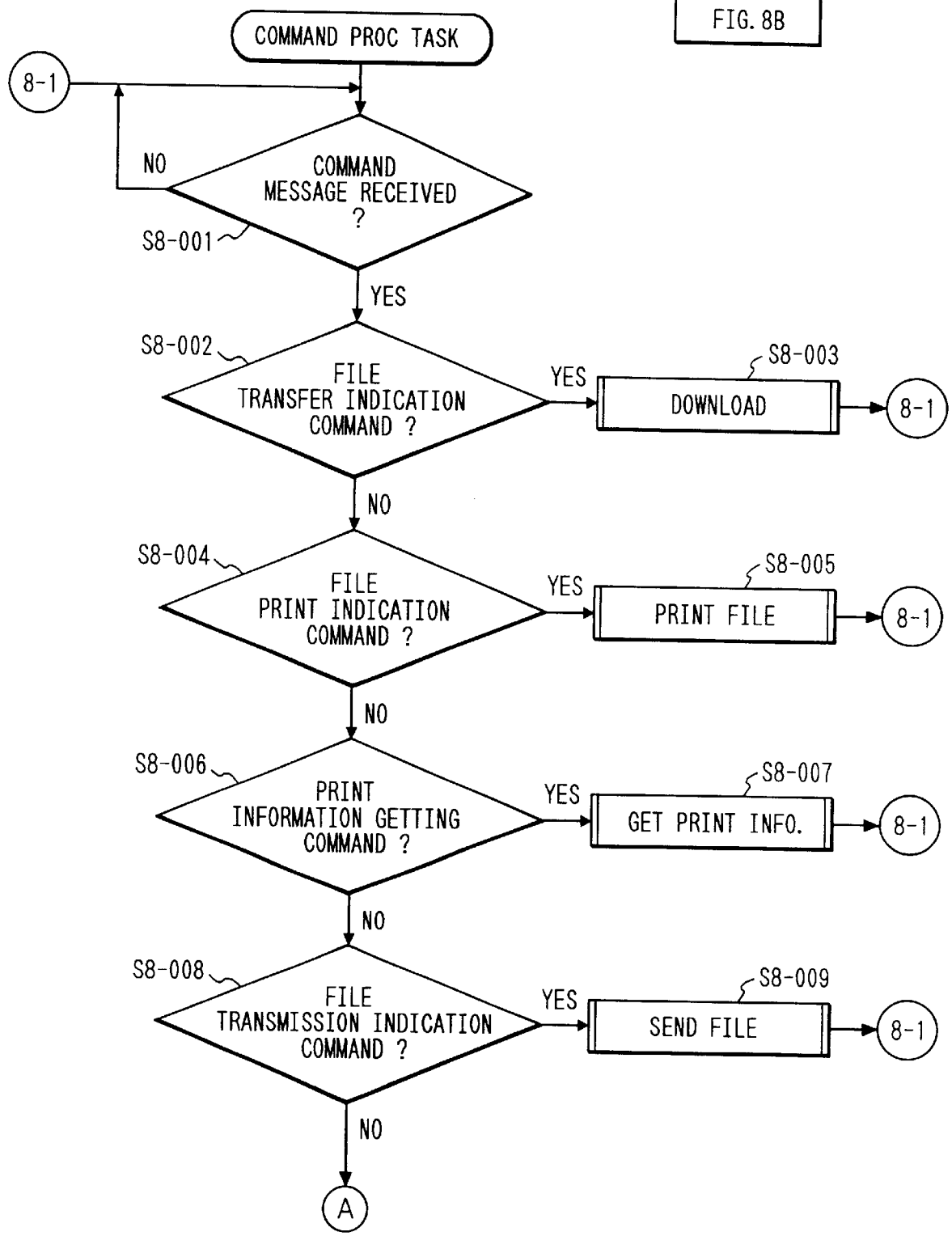

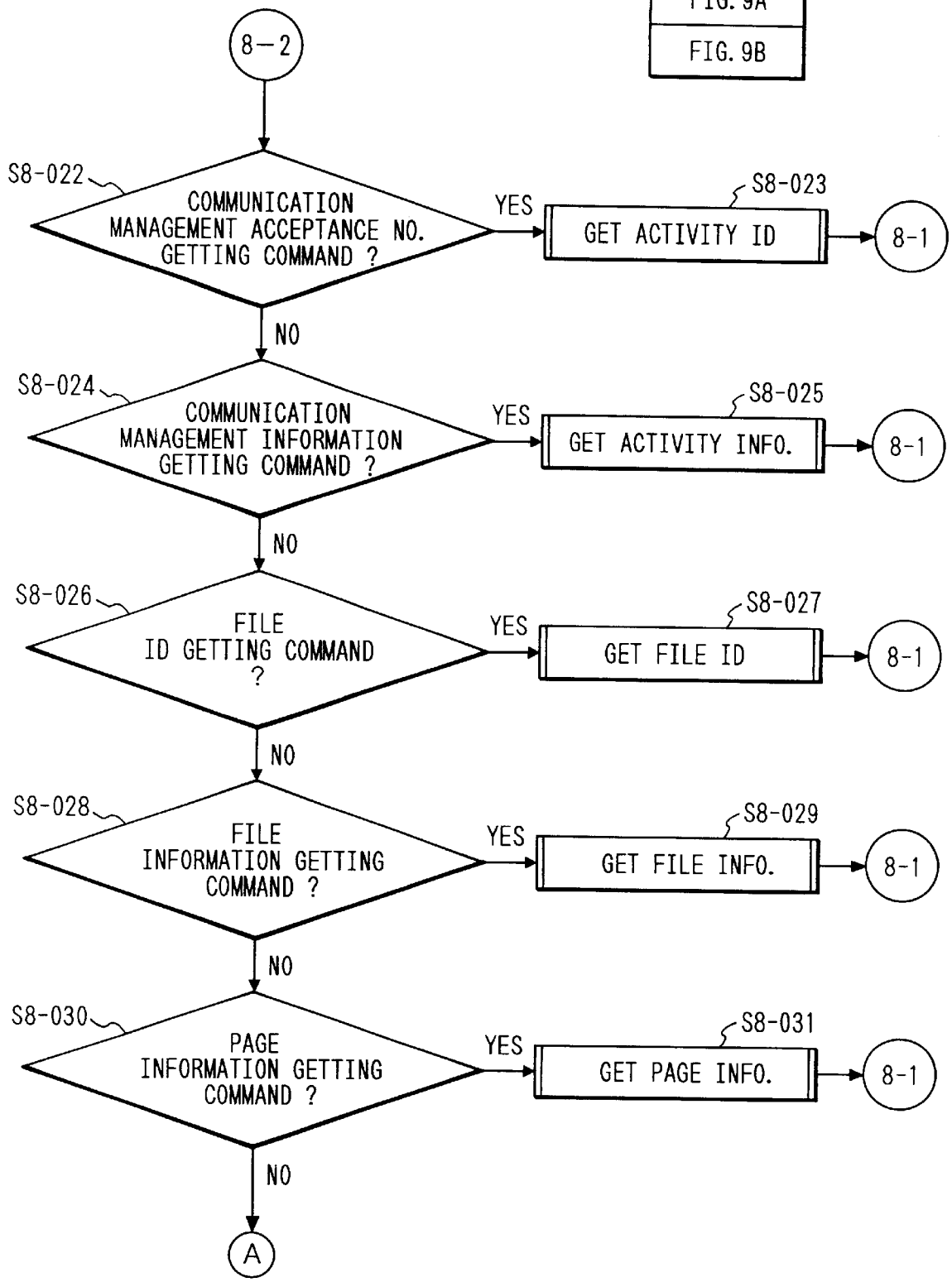

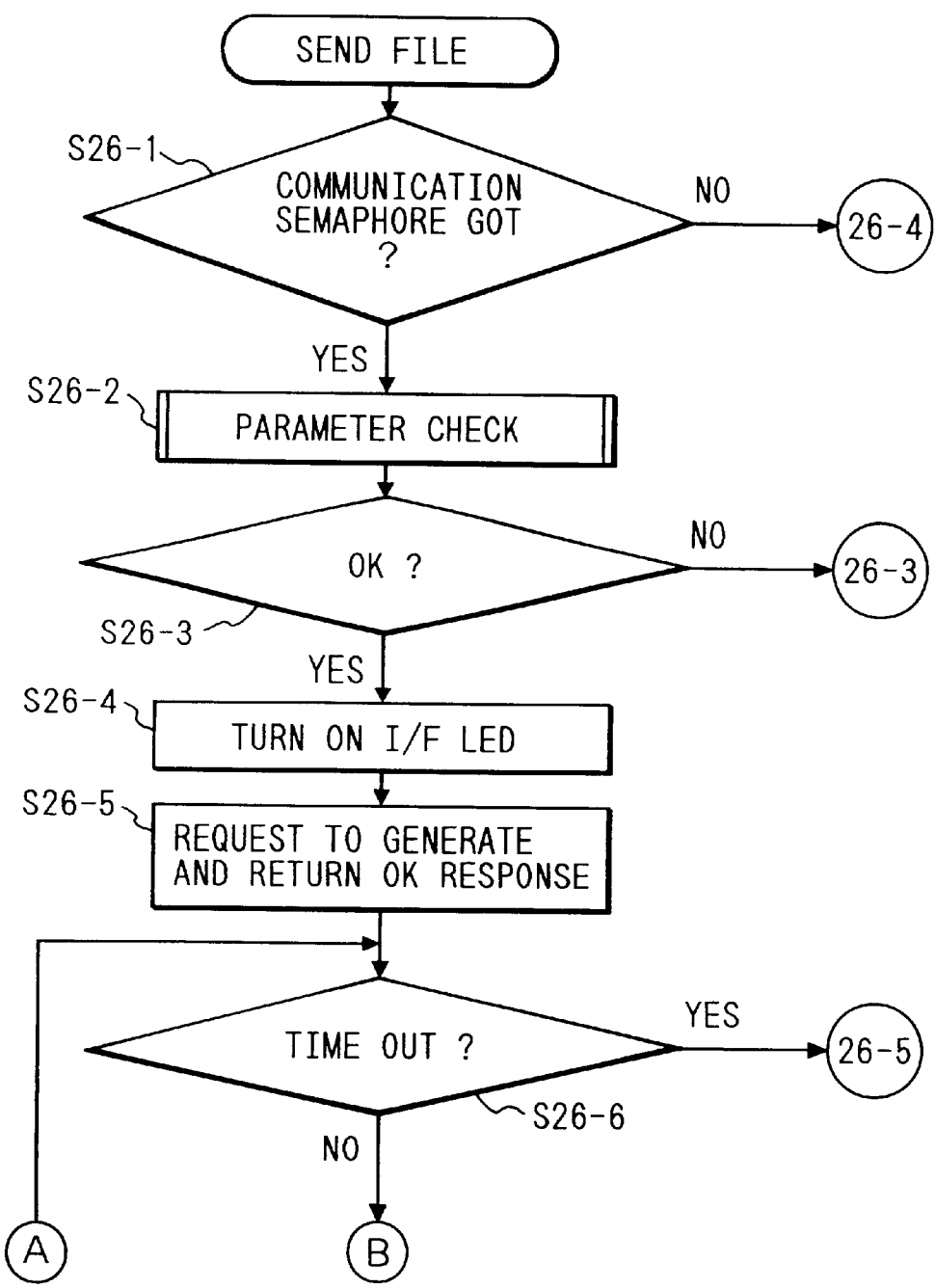

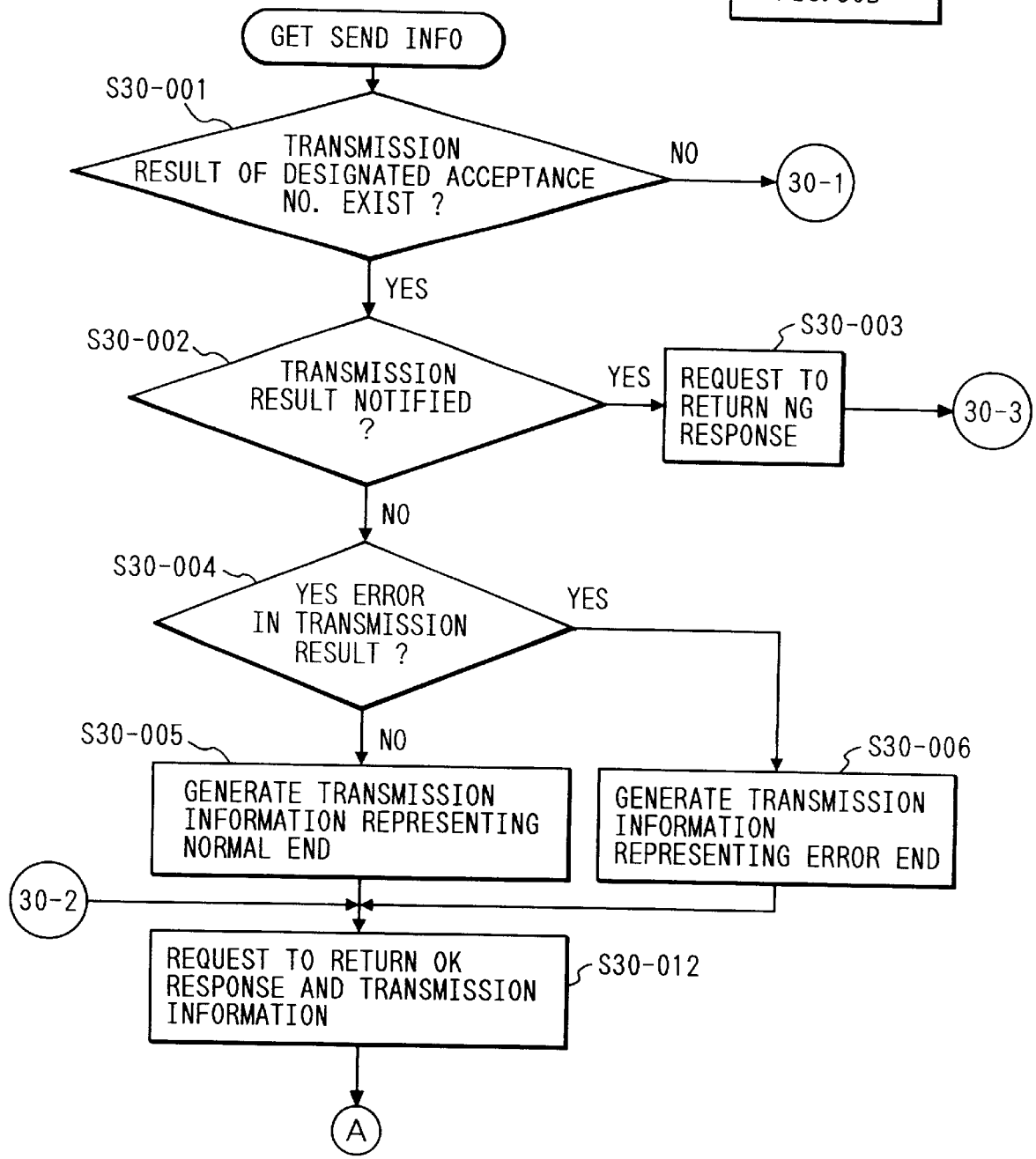

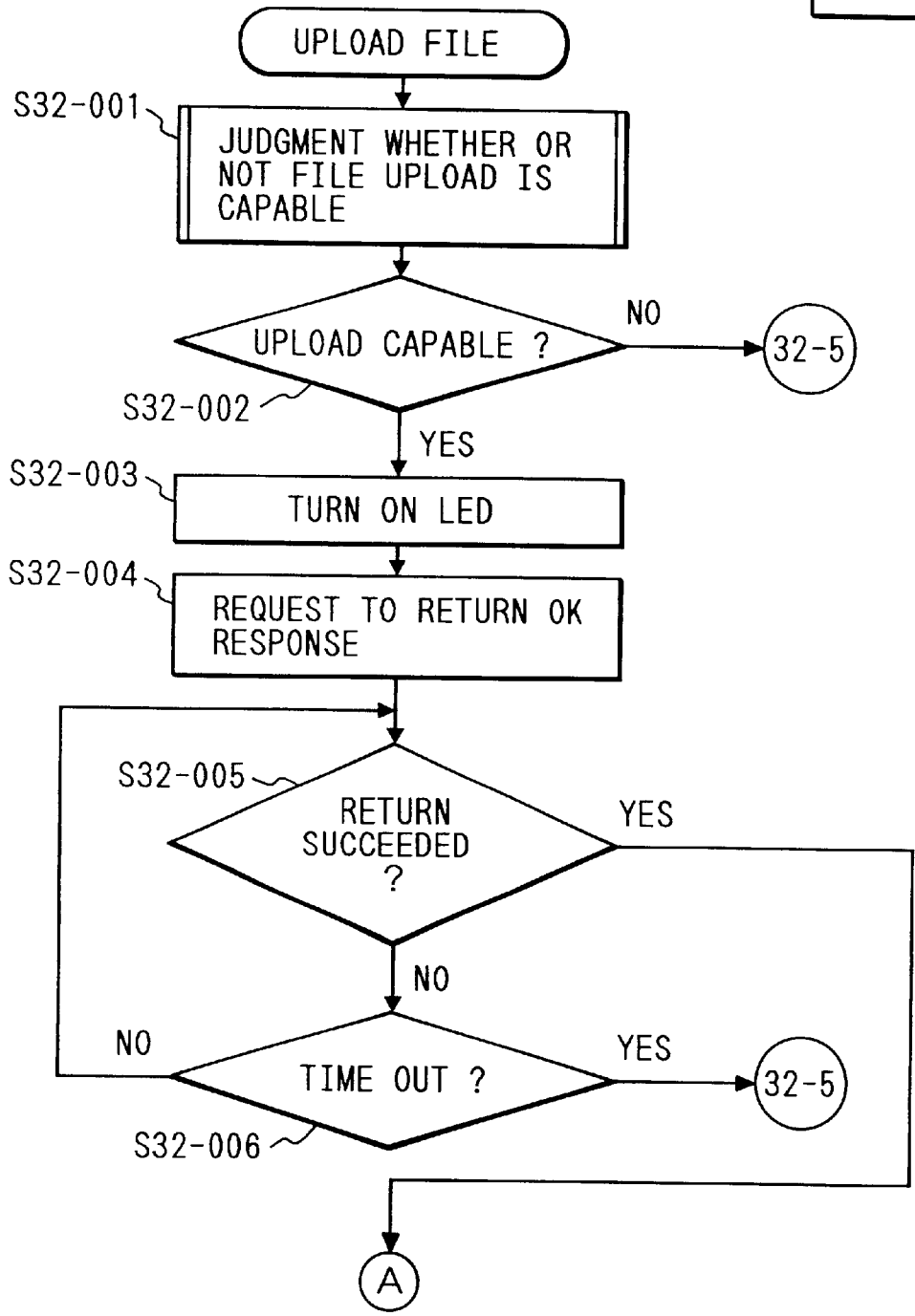

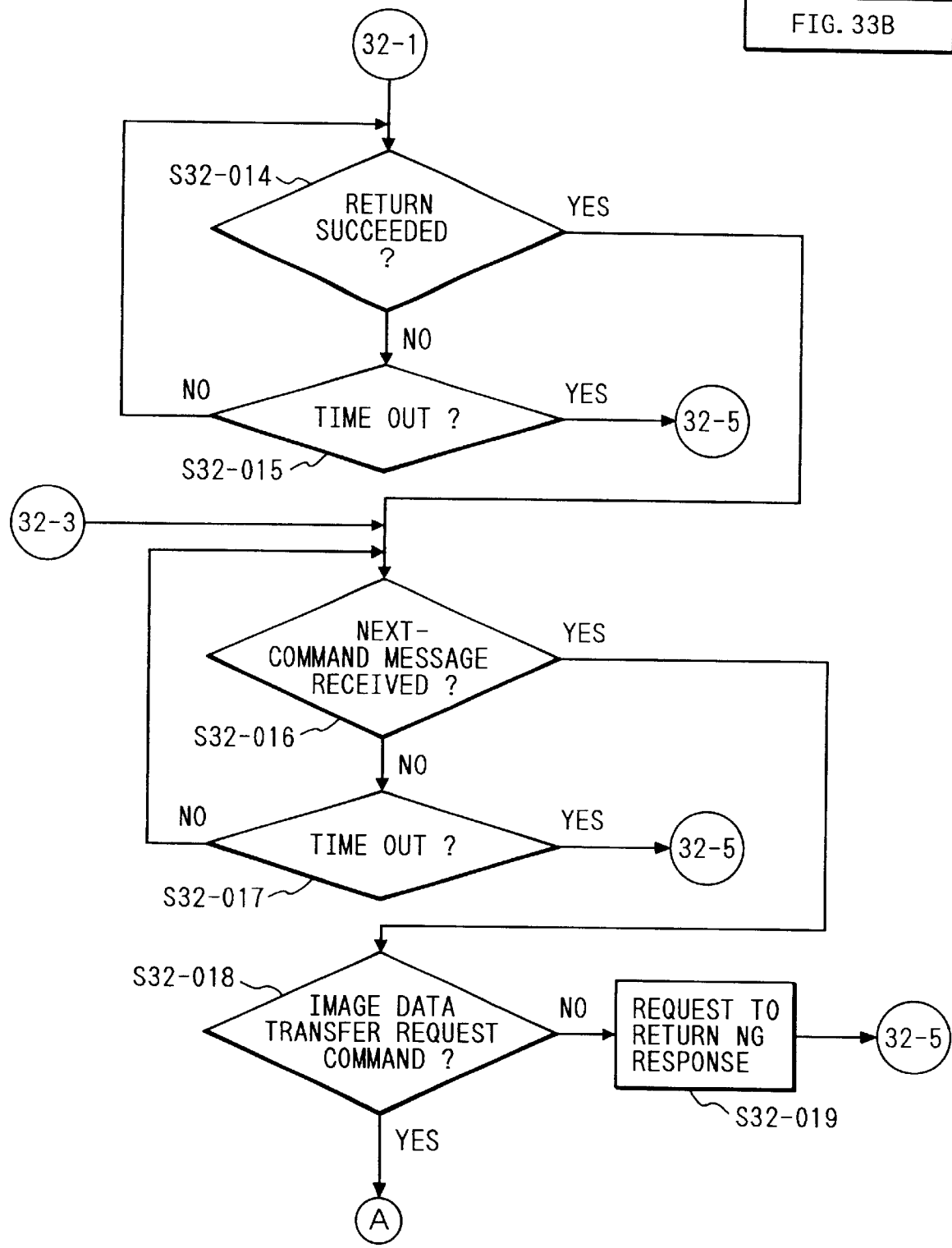

FIG. 48

*** COMMUNICATION MANAGEMENT REPORT ***

| COMMUNICATION KIND, PROTOCOL, COMMUNICATION MANAGEMENT REPORT OUTPUT HISTORY | PARTNER'S TEL NO. | PARTNER'S ABBREVIATION NAME | COMMUNICATION START TIME | COMMUNICATION PERIOD OF TIME | PAGES | COMMUNICATION RESULT |
|---|---|---|---|---|---|---|
| *TRANSMISSION | 110 | POLICE | 10/07 11:16 | 00'00 | 0 | NG |
| *TRANSMISSION | 177 | WEATHER | 10/07 11:18 | 00'11 | 1 | OK |
| *RECEPTION | 104 | GUIDANCE | 10/07 11:20 | 00'20 | 2 | OK |
| *MANUAL TRANSMISSION | 110 | POLICE | 10/18 11:20 | 00'18 | 1 | OK |
| TRANSMISSION ECM | 177 | WEATHER | 10/18 11:22 | 00'22 | 1 | OK |
| TRANSMISSION | 104 | GUIDANCE | 10/18 11:24 | 00'00 | 0 | NG |

48-1

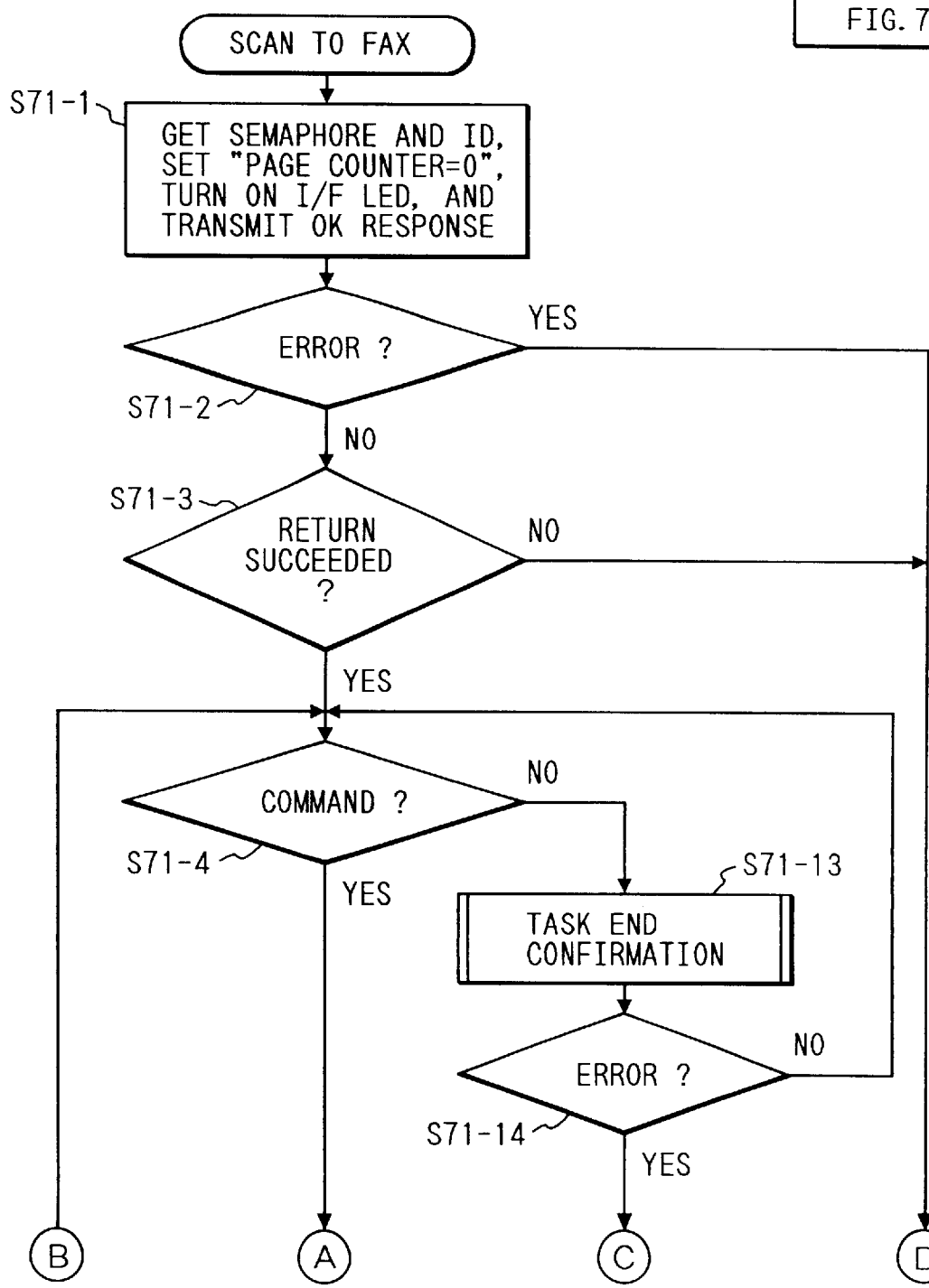

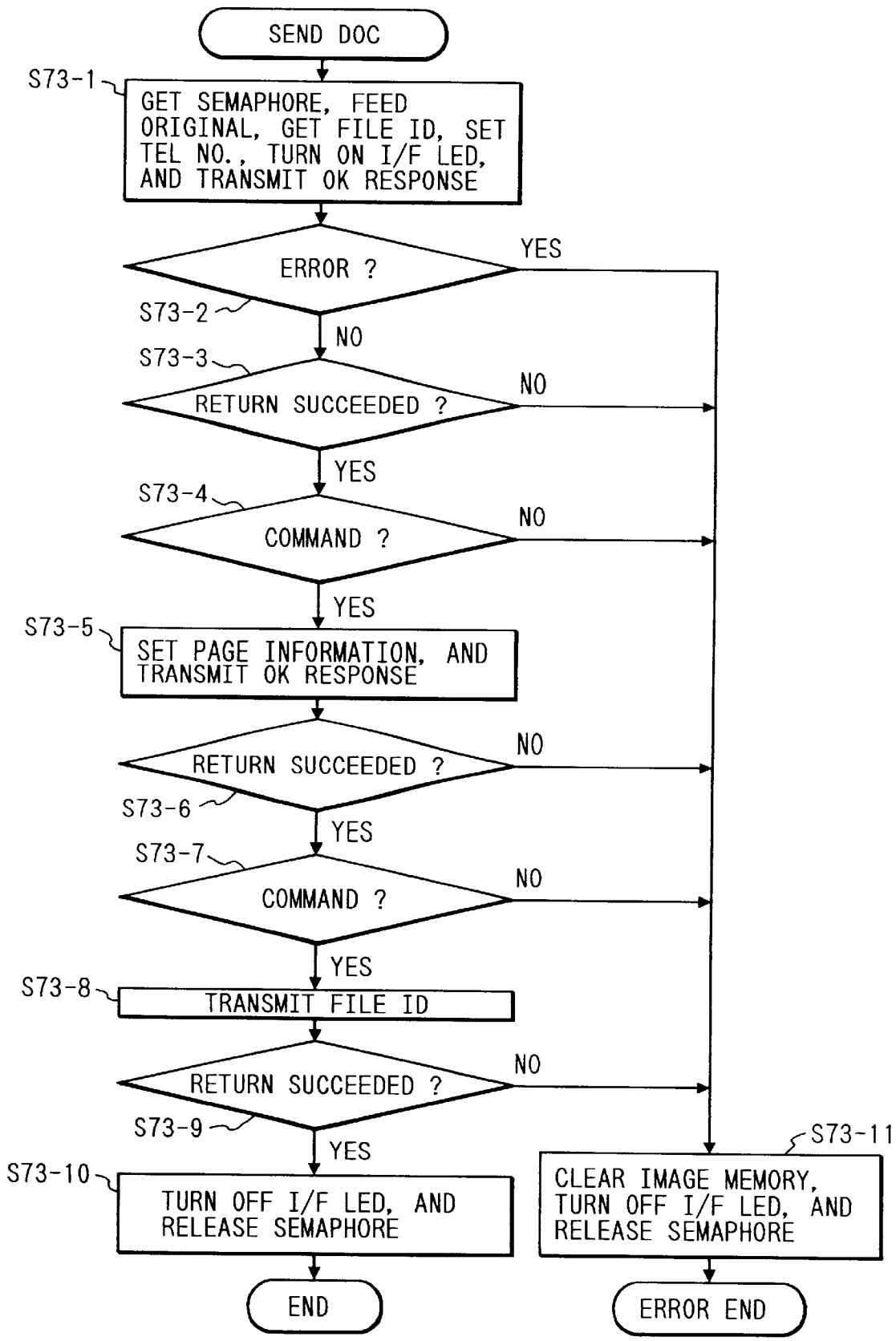

IMAGE COMMUNICATION APPARATUS FOR SELECTIVELY CONTROLLING OUTPUT OF COMMUNICATION MANAGEMENT INFORMATION

BACKGROUND OF THE INVENTION

1. Field of the Invention

The present invention relates to an image communication apparatus connectable to an information processing Terminal and capable of communication therewith.

2. Related Background Art

In a conventional apparatus of this kind, for example, a facsimile apparatus in which instructions can be given from an operation panel provided in said apparatus or from an information processing terminal connected to the main body of the facsimile apparatus, the instructions given by these instruction means are not particularly classified.

Also in such conventional facsimile apparatus in which instructions can be given from the operation panel provided in said apparatus or from an information processing terminal connected to the facsimile apparatus, the management information for the communications transmitted or received by the operation of said operation panel is separated from that for the communications transmitted or received by the instruction from the information processing terminal connected to the facsimile apparatus.

Also in a conventional facsimile apparatus capable of sending the communication management information to the information processing terminal, there are separately provided a buffer for temporarily storing the image data and a buffer for temporarily storing the communication management information. For this reason it is necessary to secure, on a RAM, an area for temporarily storing the communication management information.

In the above-mentioned conventional facsimile apparatus in which instructions can be given from the operation panel and from the information processing terminal connected to the facsimile apparatus, it is inconvenient that the management information for the communications transmitted or received by the operation of the operation panel is not separated from that for the communications transmitted or received by the instructions from the information processing terminal connected to the facsimile apparatus.

Also in such conventional facsimile apparatus in which instructions can be given from the operation panel and from the information processing terminal connected to the facsimile apparatus, the management information for the communications transmitted by the operation of the operation panel can be separated from that for still untransmitted communications, but the management information for the communications transmitted by the instructions from the information processing terminal connected to the facsimile apparatus cannot be separated from that for still untransmitted communications. For this reason, on the information processing terminal connected to the facsimile apparatus, it is not possible to separate the communication management information which is already present at the last observation of said information and the information newly added after said last observation.

Also in the conventional facsimile apparatus capable of transmitting the communication management information to the information processing terminal, there are separately provided a buffer for temporarily storing the image data and a buffer for temporarily storing the communication management information. For this reason an area for temporarily storing the communication management information has to be secured on a RAM, and the efficiency of memory utilization is undesirably low.

SUMMARY OF THE INVENTION

An object of the present invention is to provide an image communication apparatus not associated with the above-explained drawbacks.

Another object of the present invention is to provide an image communication apparatus capable of separating the management information for the communications made by the operation of operation means from that for the communications made by the instruction of an information processing terminal.

Still another object of the present invention is to provide an image communication apparatus allowing to identify whether the communication management information has been issued as a communication management report by output means of the facsimile apparatus and whether the communication management information has been transmitted to the information processing terminal.

Still another object of the present invention is to provide an image communication apparatus enabling efficient memory utilization by common use of the buffer for temporarily storing the image data and the buffer for temporarily storing the communication management information.

Still other objects of the present invention, and the features thereof, will become fully apparent from the following detailed description which is to be taken in conjunction with the attached drawings.

BRIEF DESCRIPTION OF THE DRAWINGS

FIG. 2 is a view showing the structure of an interface control unit 108;

FIG. 3 is a view showing signal lines between a facsimile unit 1 and a printer unit 2;

FIGS. 45 and 46 are flow charts showing a communication management acceptance number getting process;

FIG. 73 is a flow chart showing an original transmission process.

DESCRIPTION OF THE PREFERRED EMBODIMENTS

In the following there will be explained embodiments of the present invention, with reference to the attached drawings.

Figure 1B:
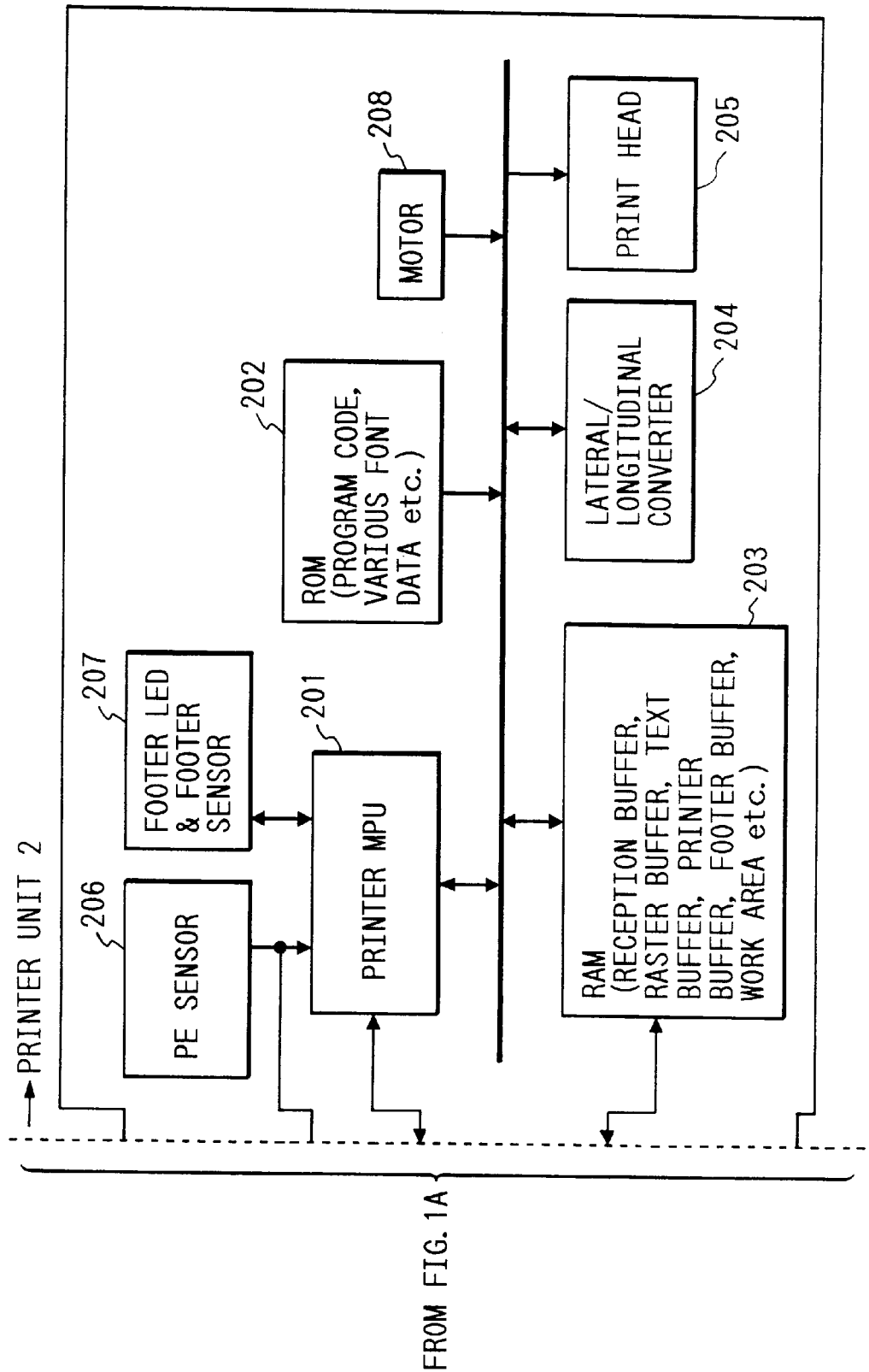
FIG. 1, composed of FIGS. 1A and 1B, is a block diagram of a facsimile apparatus constituting an embodiment of the present invention.

FIGS. 1A and 1B are views showing an example of the configuration of a facsimile apparatus constituting an embodiment of the present invention. The facsimile apparatus of the present embodiment consists of a facsimile unit 1 at the left-hand side of a broken line and a printer unit 2 at the right-hand side.

The facsimile unit 1 executes various facsimile functions including facsimile communication, image reading, image memory management and user registration but excluding printing operation. The printer unit 2 executes print operation of the image data transmitted through an internal interface signal line 302 and stored in an image memory in a RAM 103, and the data from an information processing terminal 109.

The facsimile unit 1 is composed of the following components.

101 is a facsimile MPU for controlling the functions of the facsimile unit 1.

102 is a ROM storing program codes constituting a program executed by the facsimile MPU 101 for controlling the facsimile unit 1, initial data, table data etc.

103 is a RAM to be assigned to an image memory, an image buffer, a read line buffer, a record line buffer, a user registered data area, a work area etc. The image memory is used for accumulating, as a file, the image data received through a communication unit 104 or from a reading unit 105 and the image data transmitted from the information processing terminal 109. The image buffer is used for temporarily storing the image data at the transmission or reception through the communication unit 104, and also used in transferring a large amount of data with the information processing terminal 109 (such as a download file process, an upload file process, a communication management information getting process etc. to be explained later). The read line buffer is a line buffer having a size of 4 lines (216 bytes×4 lines) in the original image data (uncompressed bit map image) after reading with the reading unit 105. The recording line buffer is a line buffer having a size of 4 lines (400 bytes×4 lines) of the original image data, including commands, before recording by the printer unit 2.

104 is a communication unit which is composed of a modem, an NCU (network control unit) etc. and to which a communication line or a telephone set (including a handset) is connected.

105 is a reading unit composed of an image sensor such as a CS (contact sensor), an image process control unit etc. It serves to optically read an original image, convert it into electrical image data and generate high-definition image data through various image processes such as binarization and intermediate tone process.

106 is a converter for converting image data of run length (RL) format, soft decoded by the facsimile MPU 101, into raw image (RAW) data.

107 is a resolution converter for converting raw image data of the facsimile unit 1 with a main scanning resolution of 8 pel/mm into raw image data of the printer unit 2 with a main scanning resolution of 360 dpi (dots per inch).

108 is an interface control unit for controlling an external interface signal line 110 and an internal interface signal line 302, as will be explained in more details later.

109 is an information processing terminal, such as a personal computer or a word processor, connected externally. In the information processing terminal 109 there is installed a software capable of remote control and remote management of the facsimile apparatus.

110 is an external interface signal line connecting the interface control unit 108 and the information processing terminal 109. In the present embodiment it is a signal line based on the bidirectional parallel interface described in the IEEE P1284 standards.

111 is a motor for picking up an original or a recording sheet.

112 is an operation panel, composed of keys, LCD's, LED's etc. and is used for various displays and for various inputs (for example of address, instruction for transmission, registration etc.) by the operator. On said operation panel 112 there are provided, for example, a printer key for switching a facsimile mode and a printer mode (both to be explained later), a printer LED indicating that the printer mode is in progress, and an interface LED indicating that the operation is instructed by the information processing terminal 109 and the local operation is inhibited. In the following description, a process conducted in the main body of the facsimile apparatus is called a local process, while a process based on a command from the information processing terminal 109 is called an on-line process.

113 is a sensor for detecting the original.

In the following there will be explained the configuration of the printer unit 2, which is composed of the following components.

201 is a printer MPU controlling the function of the printer unit 2, and 202 is a ROM storing program codes constituting a program to be executed by the printer MPU 201 for controlling the printer unit 2, initial data, table data, various font data etc.

203 is a RAM consisting of a reception buffer, a raster buffer, a text buffer, a printer buffer, a footer buffer, a work area etc. The reception buffer is used for temporarily storing the data received at a high speed from the interface control unit 108 of the facsimile unit 1. The raster buffer is used by the printer MPU 201 for analyzing, byte by byte, the data of the reception buffer and extracting the print data only. The text buffer is used by the printer MPU 201 for analyzing, byte by byte, the data of the reception buffer and extracting the character codes only. The print buffer is a buffer for the print data immediately before printing and has a size of two scannings of a print head 205 (360 bytes×64 nozzles×2 scans), said two-scan capacities being alternately used. The footer buffer is a character code buffer for printing the footer characters. 204 is a lateral/longitudinal converter for storing the print data of the raster buffer of the lateral format into the print buffer of the longitudinal format, and 205 is a print head effecting ink discharge from 64 nozzles arranged vertically with a pitch of $\frac{1}{360}$ inch, under the control of a heater driver. Ink is discharged from said nozzles while the print head is in a scanning motion, and an image is printed by the presence or absence of the ink dots.

206 is a paper end sensor for detecting the rear end of the recording sheet.

207 is a footer sensor composed of an LED light source and a photosensor for detecting the reflected light from a footer mark. The footer sensor detects the remaining amount of the ink in an ink cartridge, by detecting whether a predetermined pattern (footer mark) is printed in a predetermined position of the recording sheet.

208 is a motor for transporting the recording sheet.

In the following there will be explained the interface between the facsimile unit 1 and the printer unit 2.

301 is a signal line connecting the facsimile MPU 101 and the printer MPU 201, as will be explained in more details later.

302 is an internal interface signal line connecting the interface control unit 108 and the RAM 203. In the present embodiment it is an interface of the Centronics specification, as will be explained later.

4 is a power supply unit for supplying the facsimile apparatus with electric power.

FIG. 2 shows the details of the interface control unit 108 and surrounding circuits. The interface control unit 108 controls the external interface signal line 110 for effecting data communication with the information processing terminal 109, and also controls the internal interface signal line 302 for effecting data transmission to the printer unit 2.

The external interface signal line 110 is composed of an external data signal line 110-1, an external control signal line 110-2, and an external response signal line 110-3. The external data signal line 110-1 is a data bus for data transfer between the information processing terminal 109 and the interface control unit 108. The external control signal line 110-2 is controlled by the information processing terminal 109 and accommodates signals such as nSelectIn, nstrobe, nAutoFd, nInit etc. described in the IEEE P1284 standard. The external response signal line 110-3 is controlled by the interface control unit 108 and accommodates signals such as Busy, nAck, nFault, PError, Select etc. described in the IEEE P1284 standard. These signal lines function according to the IEEE P1284 standard, and bidirectional data transfer is possible between the information processing terminal 109 and the interface control unit 108.

On the other hand, the internal interface signal line 302, connecting the interface control unit 108 and the printer unit 2, is composed of an internal data signal line 302-1, an internal control signal line 302-2 and an internal response signal line 302-3. The internal-data signal line 302-1 is a data bus. The internal control signal line 302-2 is controlled by the interface control unit 108 and accommodates signals similar to those of the external control signal line 110-2. The internal response signal line 302-3 is controlled by the printer unit 2 and accommodates signals similar to those of the external response signal line 110-3. These signal lines function according to the Centronics standard, and data transfer is possible only in a direction from the interface control unit 108 to the printer unit 2.

The present facsimile apparatus has a facsimile mode in which the printer unit 2 functions as a recording system for the facsimile unit 1 and a printer mode in which the printer unit 2 functions as a printer of the information processing terminal 109, said modes being switched under the control of the facsimile MPU 101.

The facsimile mode and the printer mode are switched by the depression of the printer key, or by a command set switching command from the information processing terminal 109. In response to each depression of the printer key, the mode is switched to the facsimile mode if it is currently in the printer mode, or to the printer mode if it is currently in the facsimile mode. At such mode transition, there are conducted ON/OFF switching of a soft power supply of the printer unit 2, ON/OFF switching of the printer LED and shifting of an interface signal line control switch 120. The details of the process by the command set switching command will be explained later. The interface control unit 108 is provided with the interface signal line control switch 120, which is shifted between the facsimile mode and the printer mode.

In the facsimile mode, said interface signal line control switch 120 is placed at a side A, whereby the external interface signal line 110 and the internal interface signal line 302 are placed under the control of the facsimile MPU 101. It is therefore possible to operate the printer unit 2 as the recording system of the facsimile unit 1, while effecting bidirectional data transfer with the information processing terminal 109 through the external interface signal line 110. In this state control commands, image data and character code data are transferred from the facsimile unit 1 to the printer unit 2 according to a general command system and a facsimile command system.

On the other hand, in the printer mode, the interface signal line control switch 120 is placed at a side B whereby the external interface signal lines 110-1, 110-2, 110-3 are directly connected respectively with the internal interface signal lines 302-1, 302-2, 302-3 to enable direct data transmission from the information processing terminal 109 to the printer unit 2. In this state, control commands, image data and character code data are transmitted from the information processing terminal 109 to the printer unit 2 according to a general command system. In this state the facsimile MPU 101 is incapable of controlling the signal lines, so that the printer unit 2 cannot be utilized as the recording system for the facsimile unit 1.

FIG. 3 shows the details of the signal line 301, which is composed of a signal line group 301-1 from the facsimile MPU 101 to the printer MPU 201, and a signal line group 301-2 from the printer MPU 201 to the facsimile MPU 101.

The signal line group 301-1 from the facsimile MPU 101 to the printer MPU 201 is composed of the followings:

(1) Reset Signal Line:

It is used at the start of power supply or in releasing an abnormality in the printer unit 2.

(2) Auto Recovery Inhibition Signal Line:

It is used in case of inhibiting an auto recovery operation of the printer unit 2.

(3) Facsimile Mode Signal Line:

It informs the printer unit 2 that the operation is in the facsimile mode. The facsimile command system (explaned later) is usable only when the facsimile mode signal line is active. The printer MPU 201 judges, utilizing this facsimile mode signal line, whether the data and commands transmitted to the printer unit 2 through the internal interface signal line 302 are either from the facsimile unit 1 or from the information processing terminal 109.

(4) Emulation Mode Signal Line:

It informs the printer unit 2 of the kind of the emulation mode in the printer mode. The emulation mode can be changed by a user registration operation. The signal line is used for selecting the command system, as the command system to be used in the printer varies depending on the information processing terminal 109.

(5) Soft Power Supply Switch Signal Line:

It effects ON/OFF control of a soft power supply to the printer unit 2. This signal line is used to start soft power supply to the printer unit 2 at the start of power supply, before and after a printing operation, at a change in the printer setting registration and at the shift to the printer mode.

(6) On-line Switch:

It controls an ON/OFF line of the facsimile unit 1 and the printer unit 2.

In the following explained is the signal line group 301-2 from the printer MPU 201 to the facsimile MPU 101:

(7) Idle Signal Line:

It informs the facsimile unit 1 of an idle state of the printer unit 2. The idle state is a state in which the printer unit 2 has processed all the received control commands. Except in the idle state, the facsimile unit 1 cannot turn off the soft power supply of the printer unit 2.

(8) Paper Feed Request Signal Line:

It informs the facsimile unit 1 of feeding of the recording sheet in the printer unit 2. In the facsimile mode, this signal line is used when the data to be printed are received from the facsimile unit 1 or in case of a long printing operation in which the print data exceed a recording sheet. Also in the printer mode, it is used when the data to be printed are received from the information processing terminal 109 or in case of a long printing operation in which the print data exceed a recording sheet.

(9) Ink Residual Quantity Detection Output Signal Line:

It informs the facsimile unit 1 that the presence or absence of ink can be judged, and is used in combination with an ink residual quantity detection result signal line to be explained next. The facsimile apparatus of the present embodiment has a function of detecting the ink residual quantity, only during the printing of the received image in the facsimile mode. Because of the nature of the received image, it has to be printed securely. Consequently the absence of ink is informed to the facsimile unit 1, which in response stores the received image in the RAM 103 and provides a display requesting replacement of cartridge to the user. Thereafter the printing of the received image is tried again. For detecting the ink residual quantity, there is conducted footer print detection, in which an ink residual quantity detection mark (footer) is printed in a predetermined position at the rear end of each printed page of the received image, and is detected by a photosensor. The ink is identified present or absent respectively if the output of the photosensor indicates black or white.

(10) Ink Residual Quantity Detection Result Signal Line:

It informs the facsimile unit 1 of the result of presence or absence of ink, and is used in combination with the above-explained ink residual quantity detection output signal line. In case of detection of absence of ink, this signal line is used to transmit the result of detection and the above-explained ink residual quantity detection output signal line is made active. Thus the facsimile unit 1 can identify presence or absence of ink by confirming the state of said ink residual quantity detection output signal line and referring to the result of detection.

(11) Colored Recording Paper Signal Line:

It informs the facsimile unit 1 that the recording sheet is a colored sheet, and is used in combination with the above-explained ink residual quantity detection output signal line. In case of detection that the recording sheet is a colored sheet, this colored recording paper signal is released and the ink residual quantity detection output signal line is made active. Thus the facsimile unit 1 can judge whether the recording sheet is a colored sheet, by confirming the state of the ink residual quantity detection output signal line and referring to the colored recording paper signal.

(12) Cartridge Presence/Absence Signal Line:

It informs the facsimile unit 1 of the presence or absence of the ink cartridge. The printer unit 2 varies the state of the cartridge presence/absence signal line if a state of presence or absence of cartridge continues 16 times in the timer interruption of 100 msec. Upon detecting the absence of the cartridge by this cartridge presence/absence signal line, the facsimile unit 1 effects LCD display to request the cartridge mounting and inhibits the printing operation in the facsimile mode.

(13) Cartridge Correct/Incorrect Signal Line:

It informs the facsimile unit 1 whether the cartridge is correct or not. The printer unit 2 varies the state of the cartridge correct/incorrect signal line if a state of correct or incorrect cartridge mounting continues 16 times in the timer interruption of 100 msec. Upon detecting an incorrect cartridge by this cartridge correct/incorrect signal line, the facsimile unit 1 effects LCD display to request mounting of a correct cartridge.

(14) Soft Power Supply Signal Line:

It indicates the soft power state of the printer unit 2. In the facsimile mode, it is turned on during the printing operation or during the recovery operation. In the printer mode, it is always turned on, both in the printing operation and in the stand-by state.

(15) On-line Signal Line:

It indicates the on-line or off-line state of the printer unit 2 in the facsimile mode. In the off-line state, a command through the internal interface signal 302 cannot be accepted.

(16) Error Signal Line:

It indicates an error state of the printer unit 2.

(17) Facsimile Mode Reset Request Signal Line:

It is used, in the printer mode, to inform the facsimile MPU 101 that a facsimile mode reset request command has been sent from the information processing terminal 109. In response the facsimile MPU 109 effects control to shift from the printer mode to the facsimile mode, as will be explained in more details later.

In the following there will be given detailed explanation on the command systems.

The command systems utilizing the internal interface signal line 302 include a general command system and a facsimile command system. The general command system is a command system used generally and is usable both in the facsimile mode and in the printer mode. The setting of the command system in the printer mode can be varied by the user registration.

The facsimile command system is a special system prepared for the functions not realizable by the general command system mentioned above. Because of such special functions, it is used only in the facsimile mode. The commands of this system are disregarded, in the printer mode, by the printer unit 2.

The facsimile command system is composed of the following commands:

(1) Printer Setting Command:

It is related to the initial setting of the printer unit 2, and is used at the start of power supply, at a variation in the registration of the printer setting, at the sheet feeding or sheet discharge in the facsimile mode and at the end of an abnormality in the facsimile mode.

(2) Bidirectional Print Correction Command:

It corrects the aberration in printing between forward and reverse motions in the bidirectional printing, and is used at the start of power supply and at the feeding of the recording sheet in the facsimile mode. As the printer unit 2 effects shuttle printing by moving the print head, provided with plural ink discharge openings, in the main scanning direction by a carriage, the correction value for the aberration in printing between the forward and reverse scan motions is sent, as a value for each print mode and for each apparatus, to the printer unit 2, which, according to said correction value, effects correction of the bidirectional printing at the start of the soft power supply and immediately before the start of printing.

(3) Bidirectional Print Command:

It is related to the bidirectional and unidirectional printing, and is used at the feeding of the recording sheet in the facsimile mode. It transfers, to the printer unit 2, the setting of the bidirectional or unidirectional printing selected by the user registration (selection being made separately for the image printing and for the character code printing in the facsimile mode). In the printer mode, the user registration is disregarded.

(4) Footer Print Command:

It collectively indicates whether or not to effect reception information footer print, whether or not to effect detection of the ink residual quantity, the scan number for starting the recording sheet rear end detection and the footer character codes, and is used at the sheet feeding for each page of the reception image.

The reception information footer means information characters including the date and time of image reception by this apparatus, a reception number, a received image page etc. In case the printing of the reception information footer is selected by the user registration, the printer unit (receiving side) prints the information characters, developed with the font data of the printer unit, at the rear end of the recording sheet immediately before discharge. If the detection of the ink residual quantity is set by the user registration, an ink residual quantity detection mark, for the detection of the ink residual quantity, is printed in the same scanning line as that of said reception information footer and there is executed a process for ink residual quantity detection.

(5) Facsimile Image Command:

It transmits the ratio of conversion of the resolution in the sub scanning direction, together with the image data of a line, and is used for printing the received image, copied image and untransmitted image. The conversion of the resolution in the main scanning direction is conducted by a hardware (8 pel—360 dpi resolution converter 107), but that in the sub scanning direction is realized by a software. A software of the facsimile unit 1 calculates the ratio of conversion, and this command transmits the ration of conversion of the resolution, together with the image data of a line. On the other hand, a software of the printer unit 2, having received the image data of a line and the ratio of conversion, expands said image data by said ratio of conversion and prints said data.

(6) Facsimile Reset Command:

It initializes flags of the printer unit 2 to be used in the facsimile mode, and is used at the discharge of the recording sheet in the facsimile mode.

Figure 4:
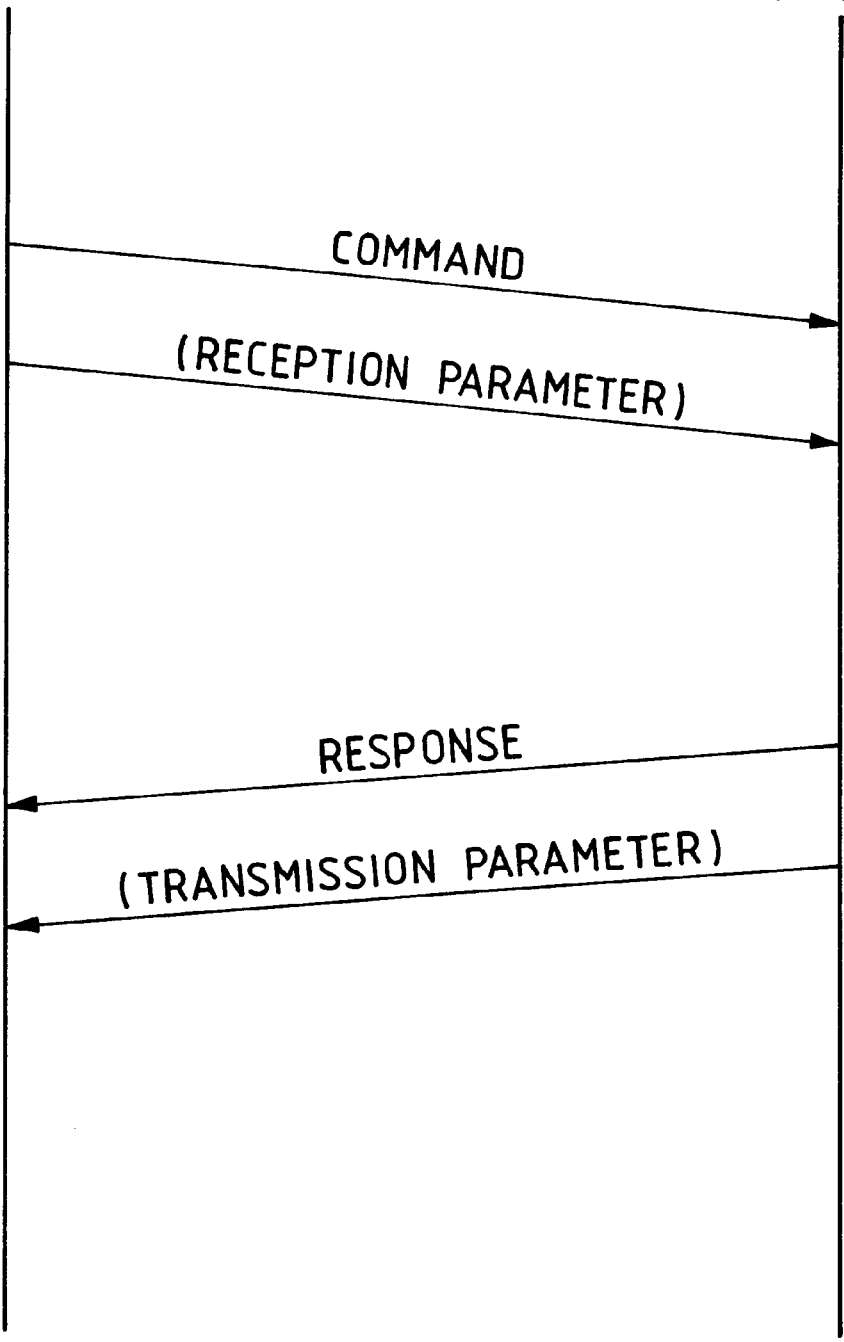
FIG. 4 is a view schematically showing data transmission and reception between an information processing terminal and a facsimile apparatus in a facsimile mode.

FIG. 4 schematically shows the data transmission and reception between the information processing terminal 109 and the interface control unit 108 in the facsimile mode.

Between the information processing terminal 109 and the facsimile apparatus, there are exchanged commands and responses, for each operation, according to a predetermined interface protocol. At first a command corresponding to a desired operation is transmitted from the information processing terminal 109 to the facsimile apparatus. A reception parameter follows certain commands. Each command contains a command code for identifying the command, and the size of the ensuing reception parameter. The reception parameter contains set values (file ID, resolution etc.) required for executing the operation corresponding to the command, and the image data. In the present embodiment, these command and reception parameter are subjected to a DMA process and normally stored, by the interface control unit 108, in succession in a predetermined location in the work area of the RAM 103. However, the image buffer of the RAM 103 is used for certain reception parameters with a large data amount.

Having received the command, the facsimile apparatus generates and transmits a response to said command. Said response contains an OK response indicating that the received command has been accepted, an NG response indicating that the received command is erroneous and has not been accepted, and a BUSY response indicating that the received command cannot be currently accepted for example because an operation is currently in progress. The OK response may be accompanied by a transmission parameter, which contains information in the facsimile apparatus corresponding to the command, such as the result of transmission or print and the file properties. In the present facsimile apparatus, these response and transmission parameter are transmitted, in succession by DAM process, normally from a predetermined location in the work area of the RAM 103, to the information processing terminal 109 through the interface control unit 108. However, the image buffer of the RAM 103 is used for certain transmission parameters of a large data amount.

Figure 5:
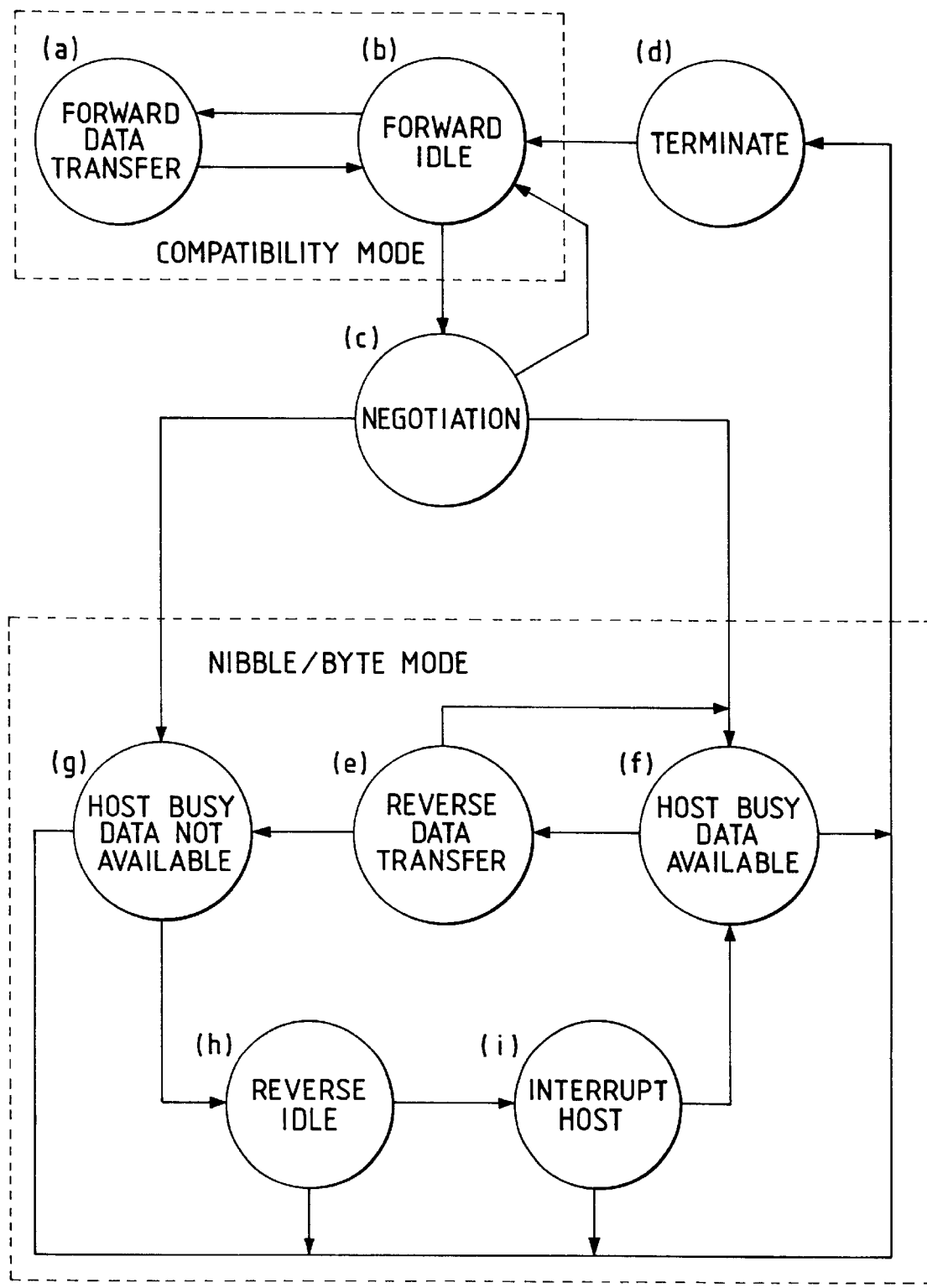
FIG. 5 is a view showing phase transitions of a bidirectional parallel interface of IEEE P1284 standard.

FIG. 5 is a view showing phase transitions in a Nibble Mode and a Byte Mode described in the IEEE P1284 standard.

Process in a phase and transition between phases are executed by a handshake between the information processing terminal 109 and the interface control unit 108, utilizing the external interface signal line 110. Consequently the information processing terminal 109 and the facsimile apparatus can always be in a same phase. In a Compatibility mode shown in FIG. 5, data transfer is conducted in a direction from the information processing terminal 109 to the interface control unit 108 (said direction being hereinafter defined as forward). In a Nibble/Byte mode, the data transfer is conducted in a direction (reverse direction) from the interface control unit 108 to the information processing terminal 109.

In the facsimile mode of the present facsimile apparatus, except for the duration of data transfer, an interruption is generated by a state change in the external control signal line 110-2, and the handshake is realized by a state change of the external response signal line 110-3 in said interruption process. During the data transfer, the handshake is automatically achieved-with a hardware, in combination with DMA.

As the different phases are detailedly described in the IEEE P1284 standard, these phases will be only briefly explained in the following:

(a) Forward Data Transfer Phase:

It effects data transfer of a byte in the forward direction.

(b) Forward Idle Phase:

It allows transition to the data transfer in the forward direction or to a Negotiation Phase. The command and reception parameter explained above are transferred from the information processing terminal 109 to the interface control unit 108, by repeating (a) and (b) for each byte.

(c) Negotiation Phase:

It is used for transition from the Compatibility Mode to the Nibble/Byte Mode.

(d) Termination Phase:

It is for transition from the Nibble/Byte Mode to the Compatibility Mode.

(e) Reverse Data Transfer Phase:

It effects data transfer of a byte in the reverse direction.

(f) Host Busy Data Available Phase:

This is a phase where there exist data to be transmitted in the reverse direction but the information processing terminal 109 is busy and is incapable of receiving the data. The response and the transmission parameter explained above are transferred from the interface control unit 108 to the information processing terminal 109, by repeating (e) and (f) for each byte.

(g) Host Busy Data Not Available Phase:

This is a phase where there are no data to be transmitted in the reverse direction and the information processing terminal 109 is busy.

(h) Reverse Idle Phase:

This is a phase awaiting the generation of data of the reverse direction in the facsimile apparatus.

(i) Interrupt Host Phase:

It informs, from the facsimile apparatus to the information processing terminal 109, the generation, in the facsimile apparatus, of the data to be transmitted to the information processing terminal 109 (data of the reverse direction).

Among the transitions of the phase (a) to (h), the facsimile apparatus can only activate the transition from (h) to (i), and all other transitions are activated by the information processing terminal 109. Consequently, even when the data to be transmitted are present in the facsimile apparatus, the transmission may not be permitted immediately.

Also in the above-mentioned standard, if data (for example a response) to be transmitted are already present in the facsimile apparatus in the phase (c), a transition to the phase (f) is possible, but, in the present facsimile apparatus, the transition does not take place directly from (c) to (f) but always through a route of (c)→(g)→(h). Then, if the data to be transmitted are generated in the facsimile apparatus in the phase (h), the transition from (h) to (i) is activated from the facsimile apparatus and the data transfer is executed by repeating (f) and (e) thereafter. Also a transmission start ready flag in the work area of the RAM 103 indicates a state in the Reverse Idle Phase, and is set ON in the transition from (g) to (h) but OFF in the transition from (h) to (i) or (d).

In the printer mode, as explained in the foregoing, the external interface signal line 110 and the internal interface signal line 302 are connected directly, and there can only be executed the unidirectional data transfer based on the Centronix standard. This operation corresponds to the Compatibility Mode shown in FIG. 5. Consequently the information processing terminal 109 can identify the mode of the facsimile apparatus by activating the (c) Negotiation Phase and detecting the presence or absence of the response. More specifically, the information processing terminal 109 can identify the facsimile mode or the printer mode, respectively in the presence or absence of the response.

Figure 6B:
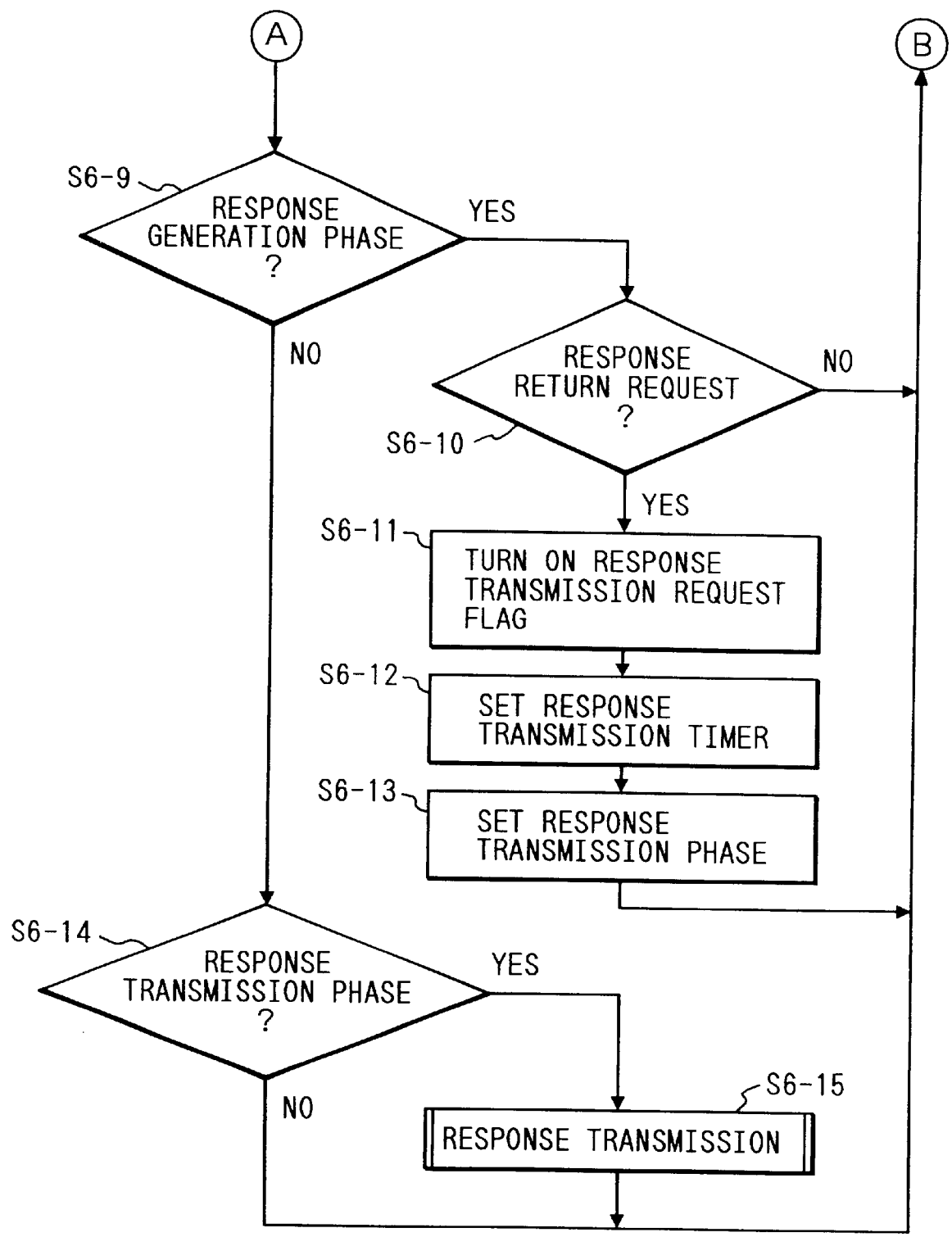
FIG. 6, composed of FIGS. 6A and 6B, is a flow chart showing the sequence of an interface control task.

FIGS. 6A and 6B are flow charts showing the operation in an interface control task.

At first a step S6-1 discriminates whether the facsimile apparatus is in the printer mode. If in the printer mode, a step S6-2 discriminates whether there has been a request for resetting to the facsimile mode, by the state of the (17) facsimile mode resetting request signal line in the signal line 301 from the printer MPU 201 to the facsimile MPU 101. If said request exists, a step S6-3 transmits a message, indicating the command set switching command, to the command process task and stores a value, indicating the command reception phase, in a predetermined location in the work area of the RAM 103 (hereinafter called phase management RAM) and the sequence returns to the step S6-1. Also in case the step S6-2 identifies the absence of the request for resetting the facsimile mode, the sequence returns to the step S6-1.

If the step S6-1 identifies that the facsimile apparatus is not in the printer mode, a step S6-5 discriminates, from the value of the phase management RAM, whether the apparatus is in the command reception phase. If in said phase, a step S6-6 discriminates whether the command and accompanying reception parameter have been received from the information processing terminal 109, and, if not, the sequence returns to the step S6-1. If the command has been received, a step S6-7 transmits a message containing information relating to said command and reception parameter to the command process task, then a step S608 stores a value, indicating the response generation phase, in the phase management RAM and the sequence returns to the step S6-1.

If the step S6-5 identifies that the apparatus is not in the command reception phase, a step S6-9 discriminates, from the value of the phase management RAM, whether the apparatus is in the response generation phase. If in said phase, a step S6-10 discriminates whether there is received a request (message) to return a response from the command process task, and, if not, the sequence returns to the step S6-1. If there is a request to return a response, a step S6-11 turns on a response transmission request flag in the work area of the RAM 103. The response transmission request flag indicates presence, in the facsimile apparatus, of data to be transmitted to the information processing terminal 109, and is turned off when all the data have been transmitted. Then a step S6-12 stores a predetermined value in a response transmission timer in the work area of the RAM 103. Said response transmission timer effects a decrement at every predetermined time and is used for detecting expiration of a predetermined time, in case the data cannot be transmitted within said time. Then a step S6-13 stores a value, indicating the response transmission phase, in the phase management RAM, and the sequence returns to the step S6-1.

If the step S6-9 identifies that the apparatus is not in the response generation phase, a step S6-14 discriminates, from the value of the phase management RAM, whether the apparatus is in the response transmission phase. If in said phase, the sequence proceeds to a step S6-15 to effect a response transmission process, but, if not in said response transmission phase, the sequence returns to the step S6-1.

Figure 7:
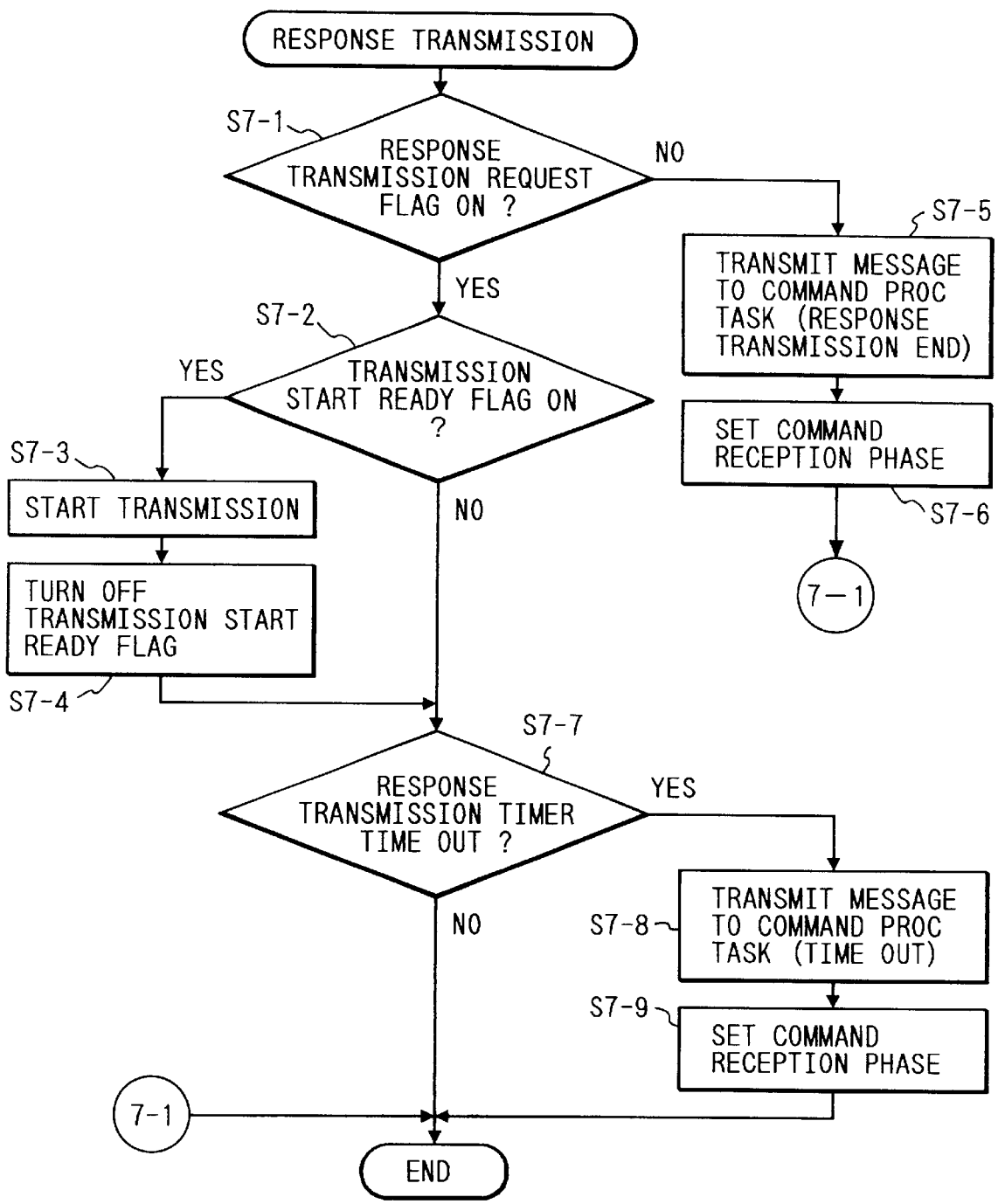
FIG. 7 is a flow chart of a response transmitting process.

FIG. 7 is a flow chart showing the response transmission process.

At first a step S7-1 discriminates whether a response transmission request flag is turned on, and, if on, indicating the presence, in the facsimile apparatus, of data to be transmitted to the information processing terminal 109, a step S7-2 discriminates whether a transmission start ready flag is on in the work area of the RAM 103. As already explained in the foregoing, said transmission start ready flag indicates that the apparatus is in the Reverse Idle Phase, and, if said flag is off, the sequence proceeds to a step S7-7. If said flag is on, a step S7-3 activates a phase transition from (h) to (i), as shown in FIG. 5, to start data transmission, then a step S7-4 turns off the transmission start ready flag and the sequence proceeds to the step S7-7. On the other hand, if the step S7-1 identifies that the response transmission request flag is off, indicating that the transmission of all the data to the information processing terminal 109 has been completed, a step S7-5 transmits a message, indicating the completion of response transmission, to the command process task. Then a step S7-6 stores a value indicating the command reception phase management RAM, and the response transmission process is thus terminated.

The step S7-7 detects whether the response transmission timer has expired, and, if not, the response transmission process is terminated. If expired, a step S7-8 transmits a message, indicating the expiration, to the command process task, then a step S7-9 stores a value indicating the command reception phase in the phase management RAM and the response transmission process is terminated. In the above-explained process, the process is interrupted in case the interface does not become capable of transmission within a predetermined time, whereby provided is a facsimile apparatus convenient for use, utilizing parallel interface capable of high-speed data transfer.

Also effective utilization of the memory is made possible, through common use and exclusive control of the buffer.

FIGS. 8A through 9B are flow charts showing a command process task by the facsimile apparatus.

At first a step S8-001 awaits a message relating to the command, from the interface control task. If said message has not been received, said step S8-001 is repeated, but, if said message is received, the sequence proceeds to a step S8-002.

The step S8-002 discriminates whether the received message indicates a file transfer indication command. If so, a step S8-003 executes a download file process, of which details will be explained later. Thereafter the sequence returns to the step S8-001.

On the other hand, if the step S8-002 identifies that the message does not indicate the file transfer indication command, the sequence proceeds to a step S8-004.

The step S8-004 discriminates whether the received message indicates a file print indication command, and, if so, a step S8-005 executes a print file process, of which details will be explained later. Thereafter the sequence returns to the step S8-001.

On the other hand, if the step S8-004 identifies that the message does not indicate the file print indication command, the sequence proceeds to a step S8-006.

The step S8-006 discriminates whether the received message indicates a print information getting command, and, if so, a step S8-007 executes a print information getting process, of which details will be explained later. Thereafter the sequence returns to the step S8-001.

On the other hand, if the step S8-006 identifies that the message does not indicate the print information getting command, the sequence proceeds to a step S8-008.

The step S8-008 discriminates whether the received message indicates a file transmission indication command, and, if so, a step S8-009 executes a file transmission process, of which details will be explained later. Thereafter the sequence returns to the step S8-001.

On the other hand, if the step S8-008 identifies that the message does not indicate the file transmission indication command, the sequence proceeds to a step S8-010.

The step S8-010 discriminates whether the received message indicates an original transmission indication command, and, if so, a step S8-011 executes a document transmission process, of which details will be explained later. Thereafter the sequence returns to the step S8-001.

On the other hand, if the step S8-010 identifies that the message does not indicate the original transmission indication command, the sequence proceeds to a step S8-012.

The step S8-012 discriminates whether the received message indicates a transmission information getting command, and, if so, a step S8-013 executes a transmission information getting process, of which details will be explained later. Thereafter the sequence returns to the step S8-001.

On the other hand, if the step S8-012 identifies that the message does not indicate the transmission information getting command, the sequence proceeds to a step S8-014.

The step S8-014 discriminates whether the received message indicates a file transfer request command, and, if so, a step S8-015 executes an upload file process, of which details will be explained later. Thereafter the sequence returns to the step S8-001.

On the other hand, if the step S8-014 identifies that the message does not indicate the file transfer request command, the sequence proceeds to a step S8-016.

The step S8-016 discriminates whether the received message indicates a storage scan indication command, and, if so, a step S8-017 executes a facsimile storage scan process (SCAN to FAX), of which details will be explained later. Thereafter the sequence returns to the step S8-001.

On the other hand, if the step S8-016 identifies that the message does not indicate the storage scan indication command, the sequence proceeds to a step S8-018.

The step S8-018 discriminates whether the received message indicates a reception mode change indication command, and, if so, a step S8-019 executes a reception process, of which details will be explained later. Thereafter the sequence returns to the step S8-001.

On the other hand, if the step S8-018 identifies that the message does not indicate the reception mode change indication command, the sequence proceeds to a step S8-020.

The step S8-020 discriminates whether the received message indicates a reception information getting command, and, if so, a step S8-021 executes a reception information getting process, of which details will be explained later. Thereafter the sequence returns to the step S8-001.

On the other hand, if the step S8-020 identifies that the message does not indicate the reception information getting command, the sequence proceeds to a step S8-022.

The step S8-022 discriminates whether the received information indicates a communication management acceptance number getting command, and, if so, a step S8-023 executes a communication management acceptance number getting process (GET ACTIVITY ID), of which details will be explained later. Thereafter the sequence returns to the step S8-001.

On the other hand, if the step S8-022 identifies that the message does not indicate the communication management acceptance number getting command, the sequence proceeds to a step S8-024.

The step S8-024 discriminates whether the received message indicates a communication management information getting command, and, if so, a step S8-025 executes a communication management information getting process (GET ACTIVITY ID), of which details will be explained later. Thereafter the sequence returns to the step S8-001.

On the other hand, if the step S8-024 identifies that the message does not indicate the communication management information getting command, the sequence proceeds to a step S8-026.

The step S8-026 discriminates whether the received message indicates a file ID getting command, and, if so, a step S8-027 executes a file ID getting process, of which details will be explained later. Thereafter the sequence returns to the step S8-001.

On the other hand, if the step S8-026 identifies that the message does not indicate the file ID getting command, the sequence proceeds to a step S8-028.

The step S8-028 discriminates whether the received message indicates a file information getting command, and, if so, a step S8-029 executes a file information getting process (GET FILE INFO), of which details will be explained later. Thereafter the sequence returns to the step S8-001.

On the other hand, if the step S8-028 identifies that the message does not indicate the file information getting command, the sequence proceeds to a step S8-030.

The step S8-030 discriminates whether the received message indicates a page information getting command, and, if so, a step S8-031 executes a page information getting process (GET PAGE INFO), of which details will be explained later. Thereafter the sequence returns to the step S8-001.

On the other hand, if the step S8-030 identifies that the message does not indicate the page information getting command, the sequence proceeds to a step S8-032.

The step S8-032 discriminates whether the received message indicates a file deletion indication command, and, if so, a step S8-033 executes a file deletion process (DELETE FILE), of which details will be explained later. Thereafter the sequence returns to the step S8-001.

On the other hand, if the step S8-032 identifies that the message does not indicate the file deletion indication command, the sequence proceeds to a step S8-034.

The step S8-034 discriminates whether the received message indicates a FAX information getting command, and, if so, a step S8-035 executes a facsimile information getting process (FAX INFO), of which details will be explained later. Thereafter the sequence returns to the step S8-001.

On the other hand, if the step S8-034 identifies that the message does not indicate the FAX information getting command, the sequence proceeds to a step S8-036.

The step S8-036 discriminates whether the received message indicates a telephone call generation indication command, and, if so, a step S8-037 executes a telephone call process (SIMPLE DIAL), of which details will be explained later. Thereafter the sequence returns to the step S8-001.

On the other hand, if the step S8-036 identifies that the message does not indicate the telephone call generation indication command, the sequence proceeds to a step S8-038.

The step S8-038 discriminates whether the received message indicates a call disconnection command, and, if so, a step S8-039 executes a call disconnection process (RELEASE LINE), of which details will be explained later. Thereafter the sequence returns to the step S8-001.

On the other hand, if the step S8-038 identifies that the message does not indicate the call disconnection command, the sequence proceeds to a step S8-040.

The step S8-040 discriminates whether the received message indicates a command set switch command, and, if so, a step S8-041 executes a command set switch process (SWITCH COMMAND SET), of which details will be explained later. Thereafter the sequence returns to the step S8-001.

On the other hand, if the step S8-040 identifies that the message does not indicate the command set switch command, the sequence proceeds to a step S8-042.

If the received message does not indicate any of the foregoing commands, the step S8-042 sends an NG response message, indicating a sequence error, to the interface control task and asks it to return an NG response, and the sequence returns to the step S8-001.

Through the foregoing process, the command process task receives a message relating to the command from the interface control task and delivers said message to a process matching the content of said message.

In the foregoing there will be explained the operations of the processes shown in FIGS. 8A to 9B, in the following order:

1. Download file process (DOWNLOAD FILE)
2. File print process (PRINT FILE)
3. Print information getting process (GET PRINT INFO)
4. File transmission process (SENT FILE)
5. Transmission information getting process (GET SEND INFO)
6. Upload file process (UPLOAD FILE)
7. Reception process (RECEIVE)
8. Reception information getting process (GET RECEIVE INFO)
9. Communication management acceptance number getting process (GET ACTIVITY INFO)
10. Communication management information getting process (GET ACTIVITY INFOR)
11. File ID getting process (GET FILE ID)
12. File information getting process (GET FILE INFO)
13. Page information getting process (GET PAGE INFO)
14. File deletion process (DELETE FILE)
15. Facsimile information getting process (FAX INFO)
16. Telephone call process (SIMPLE DIAL)
17. Call disconnection process (RELEASE LINE)
18. Command set switching process (SWITCH COMMAND SET)
19. Facsimile storage scan process (SCAN TO FAX)
20. Original transmission process (SEND DOC)

These processes will be explained in the following.

1. Download File Process (DOWNLOAD FILE):

This is a process for storing the image data, transferred by the external information processing terminal 109, as the image data in the image memory of the RAM 103 in the facsimile apparatus.

This operation is realized by three commands, i.e. the file transfer command, the page information command and the image data transfer command. The file transfer command informs the transfer of the image data from the information processing terminal 109 to the facsimile apparatus, and the actual image data transfer is realized by the image data transfer command. The page information command is to designate, from the information processing terminal 109 to the facsimile apparatus, the properties of each page of the image data, such as the data format and the resolution of said page. The actual image data transfer is realized by the image data transfer command, which is to transfer the image data from the information processing terminal 109 to the facsimile apparatus.

Thus downloaded image data are used for recording by the file print (PRINT FILE) function, transmission by the file transmission (SEND FILE) function, upload by the upload file (UPLOAD FILE) function and deletion by the file deletion (DELETE FILE) function.

Figure 10:
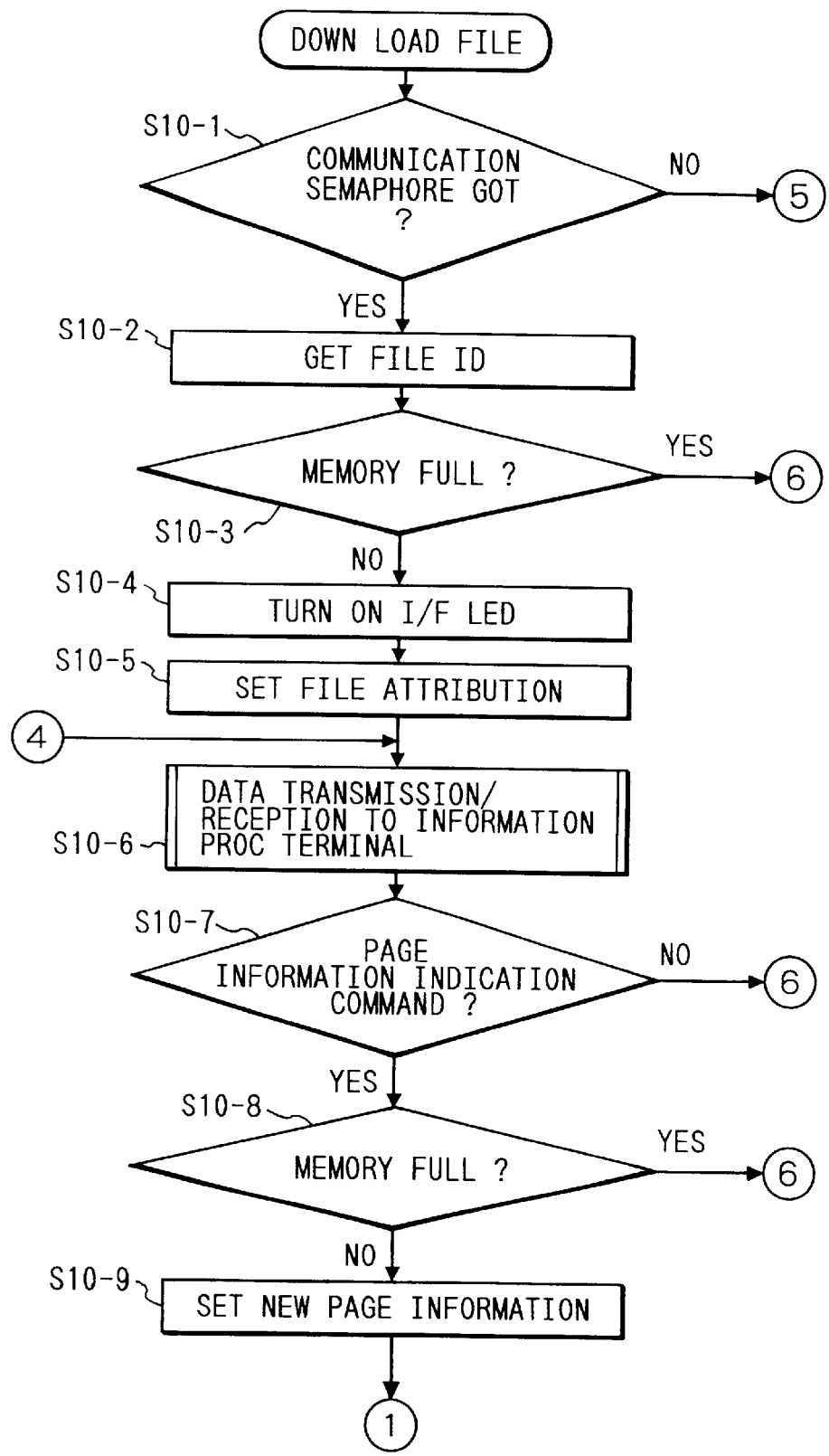
FIGS. 10 and 11 are flow charts of a download file process.
Figure 11:
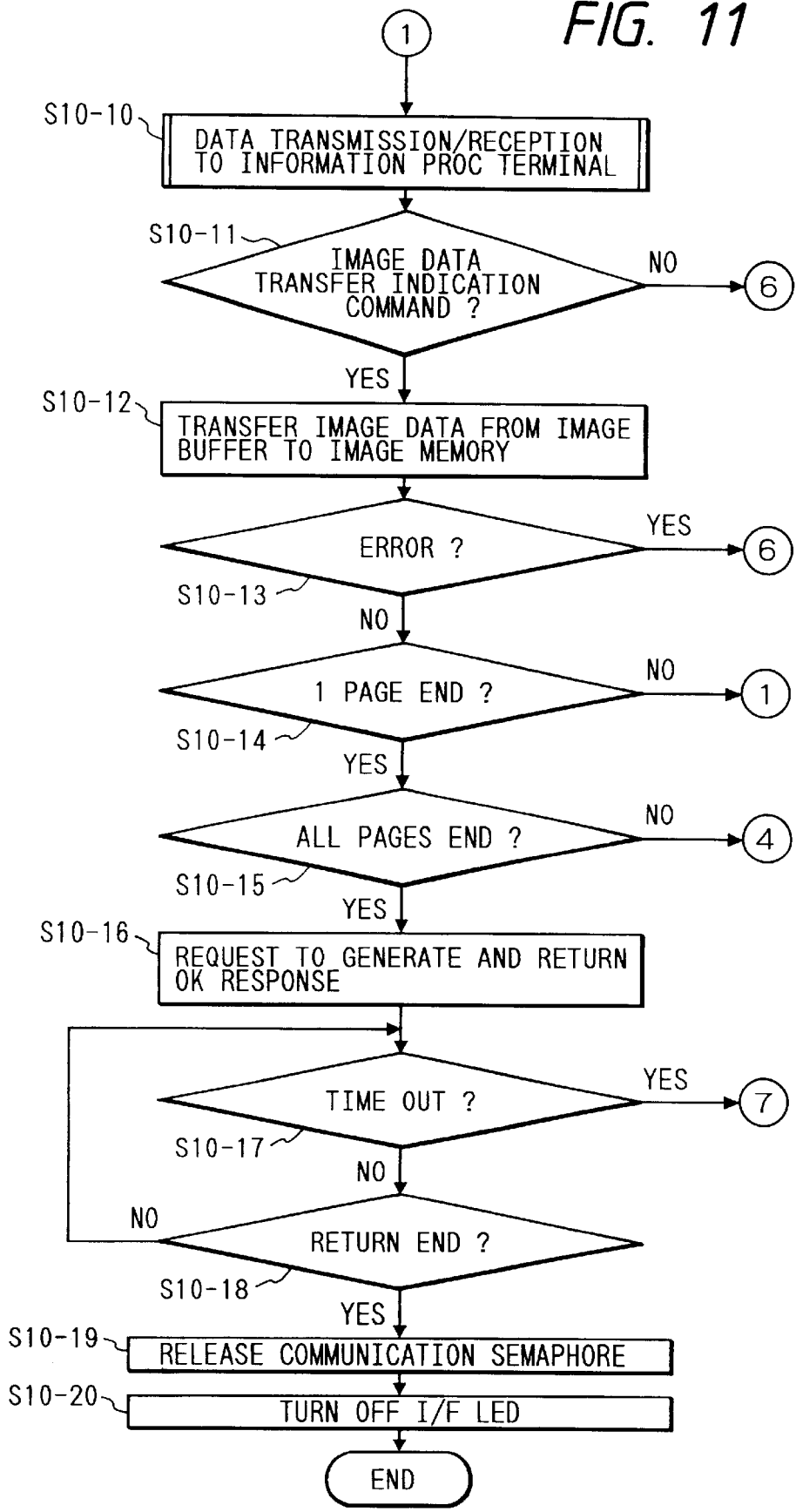

Detailed functions will be explained with reference to FIGS. 10 and 11.

A step S10-1 acquires a communication semaphore. The communication semaphore is acquired by the facsimile apparatus in an operation thereof utilizing the communication unit 104, and is released at the end of said operation, and the operation (such as transmission or reception) cannot be executed if the semaphore cannot be acquired. This arrangement enables smooth simultaneous operation. If the communication semaphore can be acquired in the step S10-1, the sequence proceeds to a step S10-2, but, if it cannot be acquired, the sequence branches to a BUSY process to be explained later. The step S10-2 acquires the file ID of the image data to be downloaded. In the facsimile apparatus of the present embodiment, the image data (files) accumulated in the image memory of the RAM 103 are given serial numbers (file ID), and the image data in said image memory are managed by the file ID. The file ID assumes a value from 1 to 9999, which are cyclically used. A step S10-3 discriminates whether the image memory of the RAM 103 has an empty area. If a sufficient empty area is available, the sequence proceeds to a step S10-4, but, if not available, there is executed an NG process to be explained later. The step S10-4 turns on the interface LED, thereby indicating that the operation is in progress. During the turn-on state of the interface LED, the key input is inhibited in the facsimile apparatus. Then a step S10-5 sets the property of the image data to be downloaded, in a file designated by the information processing terminal 109. A step S10-6 sends the information processing terminal 109 a response that the facsimile apparatus can effect execution in response to the file transfer command, and executes data transmission and reception, as will be explained later, with the information processing terminal 109 in order to receive a next command therefrom. When the step S10-6 is completed properly a step S10-7 discriminates whether the next command, received from the information processing terminal 109, is a page information command, and, if so, the sequence proceeds to a step S10-8, but, if otherwise, there is executed an NG process. The step S10-8 discriminates whether the image memory of the RAM 103 has an empty area. If a sufficient empty area is available, the sequence proceeds to a step S10-9, but, if not available, there is executed an NG process. The step S10-9 sets new page information according to the page information command. Then a step S10-10 sends the information processing terminal 109 a response that the operation is progressing properly, and effects data transmission and reception with the information processing terminal 109 in order to receive a next command therefrom. When the step S10-10 is completed properly, a step S10-11 discriminates whether the next command, received from the information processing terminal 109, is an image data transfer command, and, if so, the sequence proceeds to a step S10-12, but, if otherwise, there is executed an NG process. The step S10-12 transfers the data of the image buffer, in which the image data from the information processing terminal 109 are accumulated, to the image memory. The image data are not subjected to error check, since the image data reception from the information processing terminal 109, different from the communication through a public communication line, is free from transfer error. Also an improvement in the throughput is achieved by direct transfer, without decoding, of the compressed data received from the information processing terminal 109 to the image memory. Also the common use of the buffer used in the communication between the plural facsimile apparatus through a telephone line and the buffer used in the data transfer from the information processing terminal 109 allows the transfer of the image files, managed by the information processing terminal 109, to the facsimile apparatus with a reduced buffer area in the RAM.

After the transfer of the length of the transferred image data, contained in the image data transfer command, the sequence proceeds to a step S10-13 which discriminates whether an error has been generated in the execution of the step S10-12. If not, the sequence proceeds to a step S10-14, but, if generated, there is executed an NG process. The step S10-14 discriminates whether the transfer of the image data from the information processing terminal 109 has been completed for a page. In the present embodiment, the image data of a page can be received in divided manner, according to the length of the transferred image data, contained in the image data transfer command. If the transfer of a page has been completed, the sequence proceeds to a step S10-15, but, if not completed, the sequence branches to the step S10-10. The step S10-15 discriminates whether the transfer of the image data from the information processing terminal 109 has been completed for all the pages. In the present embodiment, the image data of plural pages can be received in combined manner, by the combination of three commands, i.e. the file transfer command, the page information command and the image data transfer command. If the transfer of all the pages has been completed, the sequence proceeds to a step S10-16, but, if not completed, the sequence branches to the step S10-6 for continuing the process. The step S10-16 generates an OK response to the interface control task and sends the interface control task a request for sending the information processing terminal 109 a response that the operation is in progress properly. The response is sent by the interface control task.

Then steps S10-17 and S10-18 discriminate whether the interface control task has completed response to the information processing terminal 109. If completed, the sequence proceeds to a step S10-19, but, if expiration of time occurs in the step S10-17 before the completion of response, the sequence branches to an abnormality process. In the present embodiment, said time is fixed, but it may also be rendered variable by a registration in the facsimile apparatus or in the information processing terminal 109. A step S10-19 releases the communication semaphore acquired in the step S10-1. Then a step S10-20 turns off the interface LED, thereby informing the termination of the DOWNLOAD FILE process. Also the key input in the facsimile apparatus is permitted in response to the turning-off of the interface LED.

Figure 12:
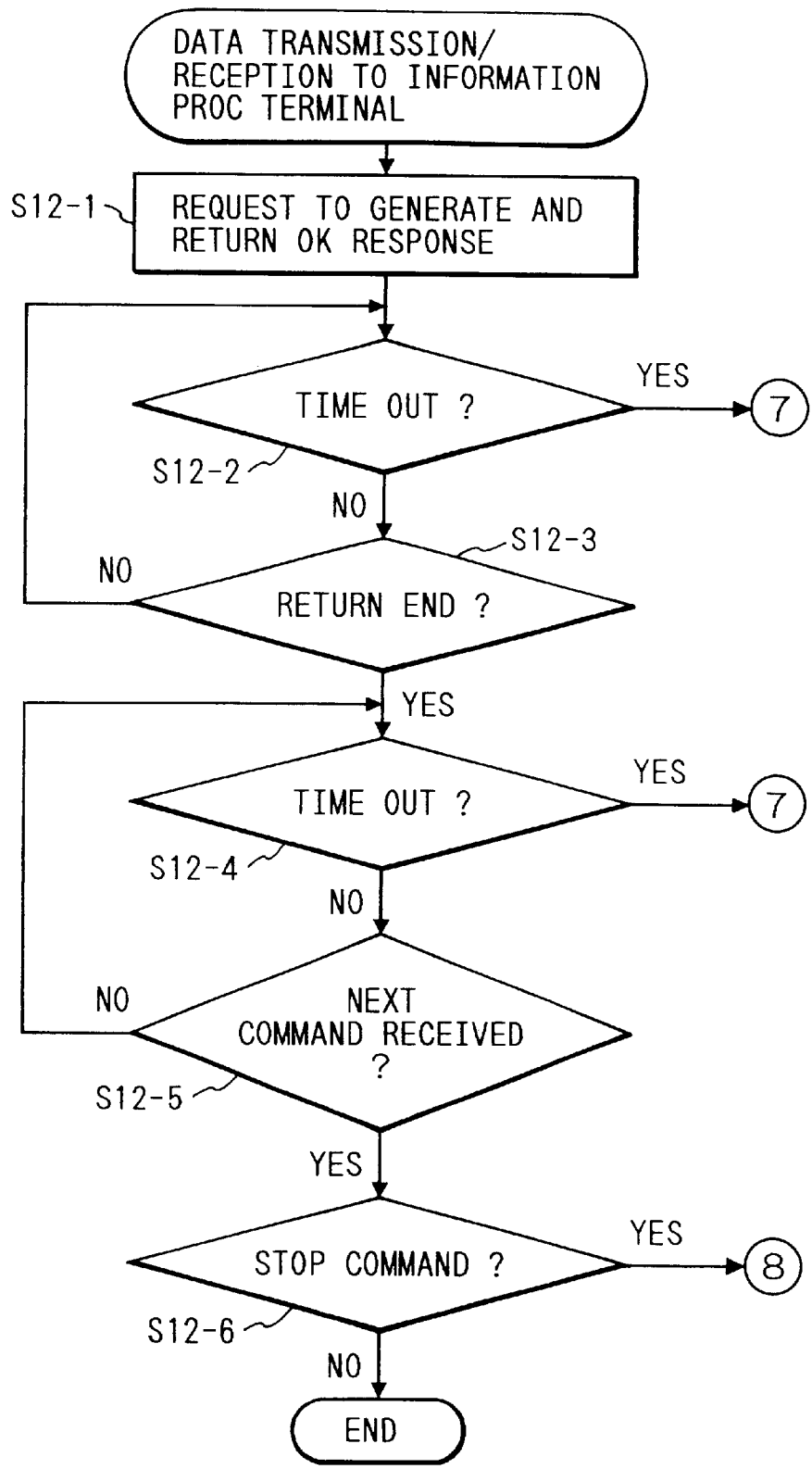
FIG. 12 is a flow chart showing the details of data transmission and reception with an external information processing terminals shown in FIGS. 10 and 11.

In the following there will be given a detailed explanation, with reference to FIG. 12, on the data transmission/reception process to be executed with the information processing terminal 109 in the step S10-6 or S10-10.

At first a step S12-1 generates an OK response to the interface control task, and sends the interface control task a request for sending, to the information processing terminal 109, a response that the operation is in progress properly.

Then steps S12-2 and S12-3 discriminate whether the interface control task has completed the response to the information processing terminal 109. If completed, the sequence proceeds to a step S12-4, but, if expiration of time occurs in the step S12-2 before the completion of response, the sequence branches to an abnormality process. In the present embodiment, said time is fixed, but it may also be rendered variable by a registration in the facsimile apparatus or in the information processing terminal 109.

Then steps S12-4 and S12-5 receive a next command from the information processing terminal 109, and, when the next command is received, the sequence proceeds to a step S12-6. If a predetermined time expires in the step S12-4 before the reception of the next command, the sequence branches to an abnormality process. In the present embodiment, said time is fixed, but it may also be rendered variable by a registration in the facsimile apparatus or in the information processing terminal 109.

The step S12-6 discriminates whether the received next command is a stop command, and, if not, the process is terminated normally, but, if it is a stop command, the sequence branches to a step S13-1.

Figure 13:
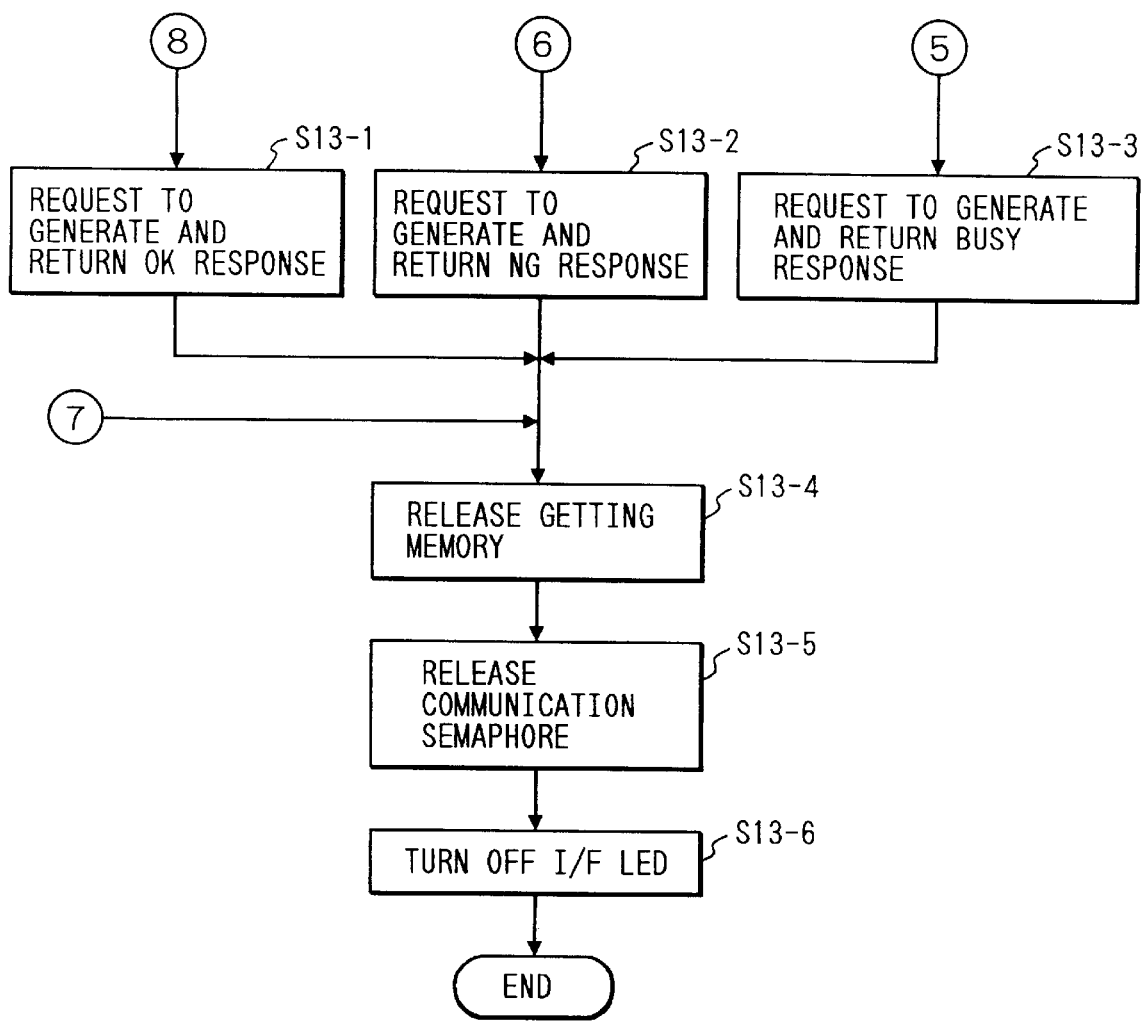
FIG. 13 is a flow chart showing the details of a post process shown in FIGS. 10, 11 and 12.

In the following the abnormality process will be explained in detail, with reference to FIG. 13.

In case of branching to the step S13-1, this step generates an OK response to the interface control task and sends the interface control task a request to send, to the information processing terminal 109, a response that the operation is in progress properly. The response is sent by the interface control task. In case of branching to the step S13-2, this step generates an NG response to the interface control task and sends the interface control task a request to send, to the information processing terminal 109, a response that the operation is in progress properly. The response is transmitted by the interface control task. In case of branching to the step S13-3, this step generates a BUSY response to the interface control task and sends the interface control task a request to send, to the information processing terminal 109, a response that the operation is in progress properly. The response is transmitted by the interface control task.

A step S13-4 releases the secured image memory, and a step S13-5 releases the semaphore acquired in the step S10-1. Then a step S13-6 turns off the interface LED to indicate that the DOWNLOAD FILE process is terminated. Also in response to the turning-off of the interface LED, the key input of the facsimile apparatus permitted.

2. File Print (PRINT FILE) Process:

This process is to record, by the facsimile apparatus, a desired image accumulated in the image memory designated by information processing terminal 109 in the RAM 103 of the facsimile apparatus.

The PRINT FILE function is realized by a file print command, which is accompanied by a parameter for designating the recording sheet size, the file ID etc.

The PRINT FILE function is normally used in combination with the GET PRINT INFO function.

The image recordable by the PRINT FILE function is limited to a download image (transmitted from the information processing terminal 109), a received image (received through the communication unit 104) or a scanned image (read by the reading unit 105), designated by the information processing terminal 109.

Figure 14:
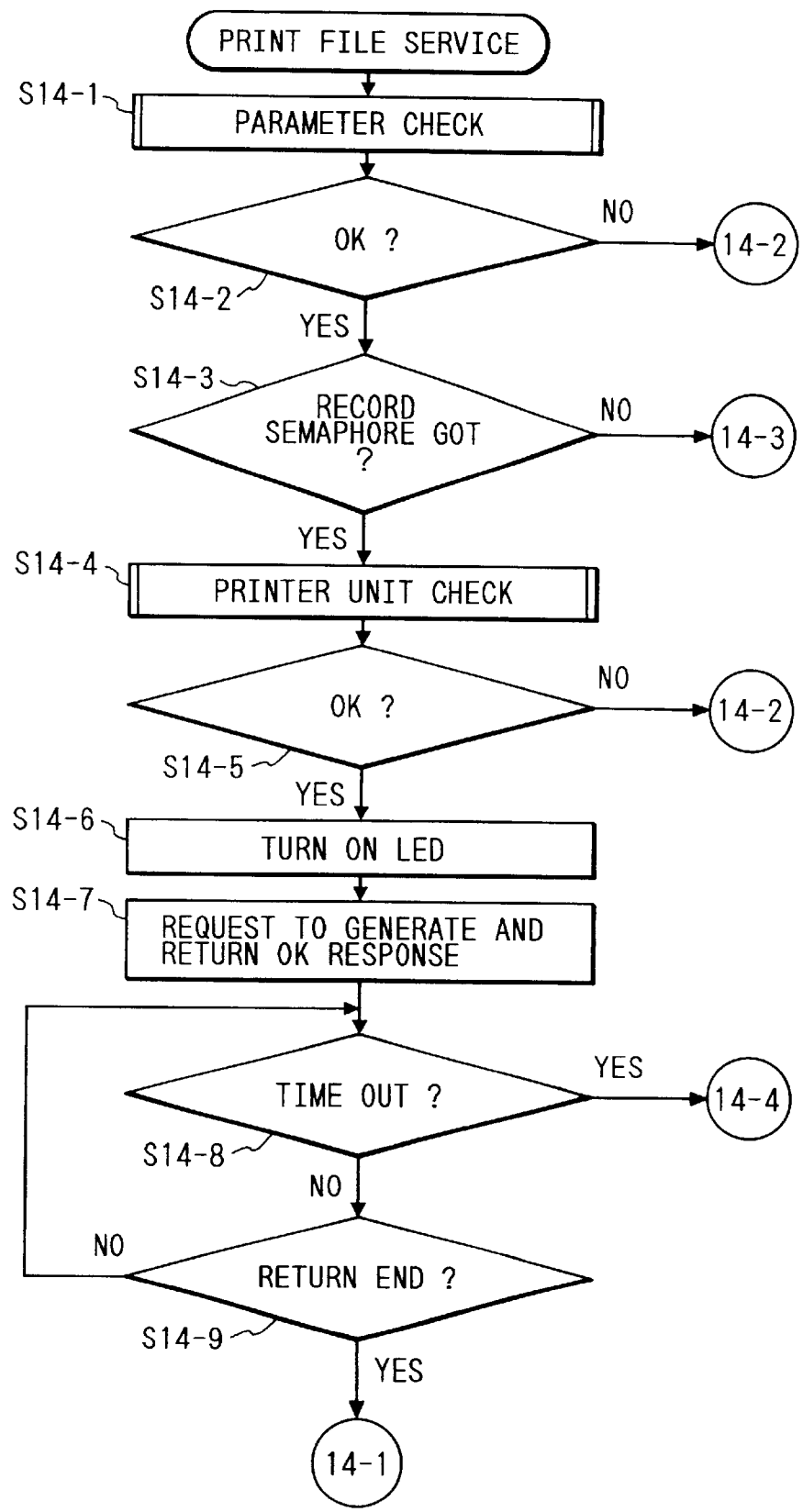
FIGS. 14 and 15 are flow charts showing a file print process.
Figure 15:
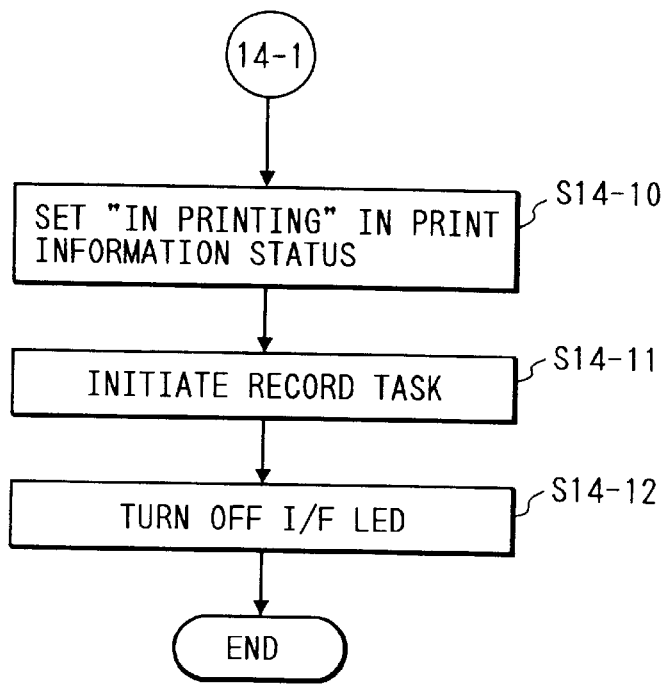

The detailed operations of this process will be explained with reference to FIGS. 14 and 15.

When the command process task identifies a file print command and the sequence branches to a step S14-1, there is discriminated whether the reception parameter accompanying the file print command is correct or incorrect, as will be explained later, and the sequence branches from steps S14-2 to S14-3 if said parameter is identified correct or to an NG process to be explained later in a step S14-4 if the parameter is incorrect. The step S14-3 acquires a recording semaphore, which has to be acquired for effecting the recording. The recording semaphore is acquired by the facsimile apparatus in an operation utilizing the printer unit 2, and is released at the end of the operation, and the operation (such as the recording of the received image or the copy image) unless the recording semaphore is acquired. This arrangement enables smooth simultaneous operations (such as memory transmission during copying operation). If the recording semaphore can be acquired in the step S14-3, the sequence proceeds to a step S14-4, but, if not, the sequence branches to a BUSY process. The step S14-4 checks the abnormality in the printer unit 2, as will be explained later, and the sequence branches from steps S14-5 to S14-6 if the result of said check is OK, or to an NG process if an abnormality is found. The step S14-6 turns on the interface LED, thus indicating that the operation is in progress. During the turn-on state of the interface LED, the key input of the facsimile apparatus inhibited. A step S14-7 generates an OK response to the interface control task, and sends the interface control task a request to send, to the information processing terminal 109, a response that the operation is in progress properly. The response is transmitted by the interface control task. Steps S14-8 and S14-9 discriminate whether the interface control task has completed the response to the information processing terminal 109, and, if completed, the sequence proceeds to a step S14-10, but, if a predetermined has expired in the step S14-8 before the completion of the response, the sequence branches to an abnormality process. In the present embodiment, said predetermined time is fixed, but it may be rendered variable by a registration in the facsimile apparatus or in the information processing terminal 109. A step S14-10 sets "PRINT IN PROGRESS" in the print information status, which is an information status for the GET PRINT INFO function, secured in the work area of the RAM 103 of the facsimile unit 1. A step S14-11 activates the recording task, thereby initiating the recording operation, which will be explained later. A step S14-12 turns off the interface LED, thus indicating the completion of the PRINT FILE process, and permitting the key input of the facsimile apparatus.

Figure 16:
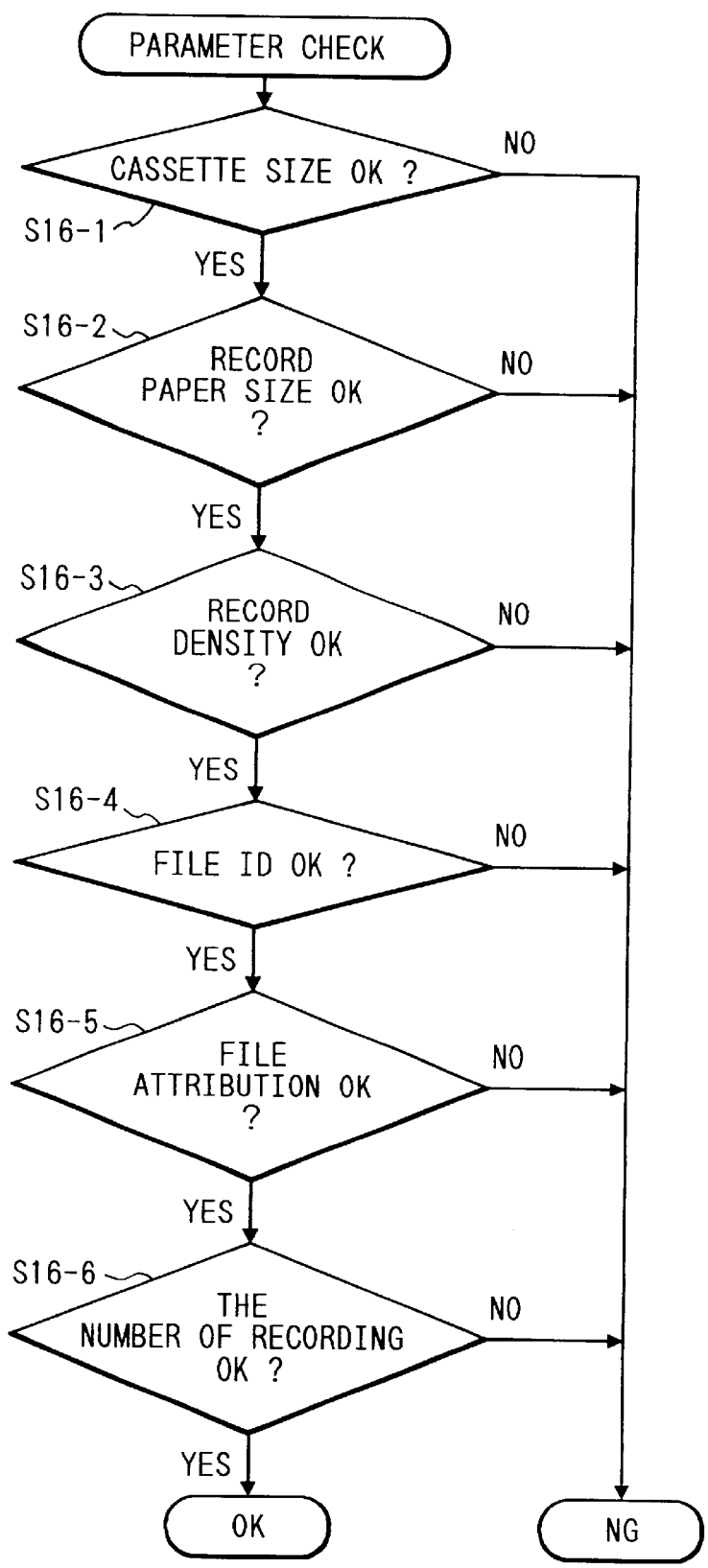
FIG. 16 is a flow chart showing the details of a parameter check process shown in FIG. 14.

In the following there will be explained the reception parameter check in the step S14-1, with reference to FIG. 16.

The reception parameter contains the following items and has the following selections:

Recording sheet cassette size: no check
Recording sheet size: no check, letter, legal, A4
Recording density: standard, economy
File ID: 1–9999
Number of records: 1–99

A reception error occurs if the content of the reception parameter is different from the setting of the facsimile apparatus. However, in such case, it is possible to continue the process by "giving priority to the content of the reception parameter" or "giving priority to the setting of the facsimile apparatus" instead of setting the reception error.

A step S16-1 checks the recording sheet cassette size. As the facsimile apparatus of the present embodiment has only one size in the recording sheet cassette (not shown) if the content of the reception parameter is "no check", the recording sheet cassette size is not checked and the sequence proceeds to a step S16-2. However, it is also possible to mount plural cassettes and to check the cassette size. A step S16-2 checks the recording sheet size by comparing the content of the reception parameter with the recording sheet size registered by the operator, and the sequence proceeds to a step S16-3 if the sizes mutually coincide, but the process is terminated by an abnormality process if the sizes are mutually different. If the content of the reception parameter is "no check", the sequence proceeds to the step S16-3 without comparison. It is also possible to automatically read the recording sheet size for example with a mechanical sensor, instead of the registration by the operator. The step S16-3 checks the recording density by comparing the content of the reception parameter with the recording density registered by the operator, and the sequence proceeds to a step S16-4 if the densities mutually coincide, but the process is terminated by an abnormality process if they do not mutually coincide. If the content of the reception parameter is "no check", the sequence proceeds to the step S16-4 without comparison. It is also possible to automatically set the recording density for example according to the residual amount of the recording ink, density of the image and source of facsimile transmission, instead of the registration by the operator. The step S16-4 checks the file ID, which is a serial number given to the image entered into or released from the facsimile apparatus, and by which access is made to a desired image accumulated in the image memory of the RAM 103 of the facsimile apparatus. The step S16-4 discriminates whether an image corresponding to the file ID in the content of the reception parameter is present in the image memory, and, if present, the sequence proceeds to a step S16-5, but, if absent, the process is terminated by an abnormality process. The step S16-5 checks the file attribution, and if the attribution of the image obtained in the step S16-4 corresponds to the file designated by the information processing terminal 109, the sequence proceeds to a step S16-6, but, if otherwise, the process is terminated by an abnormality process. The step S16-6 checks the number of records. If the content of the reception parameter is within a range of 1–99 records, the reception parameter check process is terminated normally, but, if otherwise, it is terminated by an abnormality process.

Figure 17:
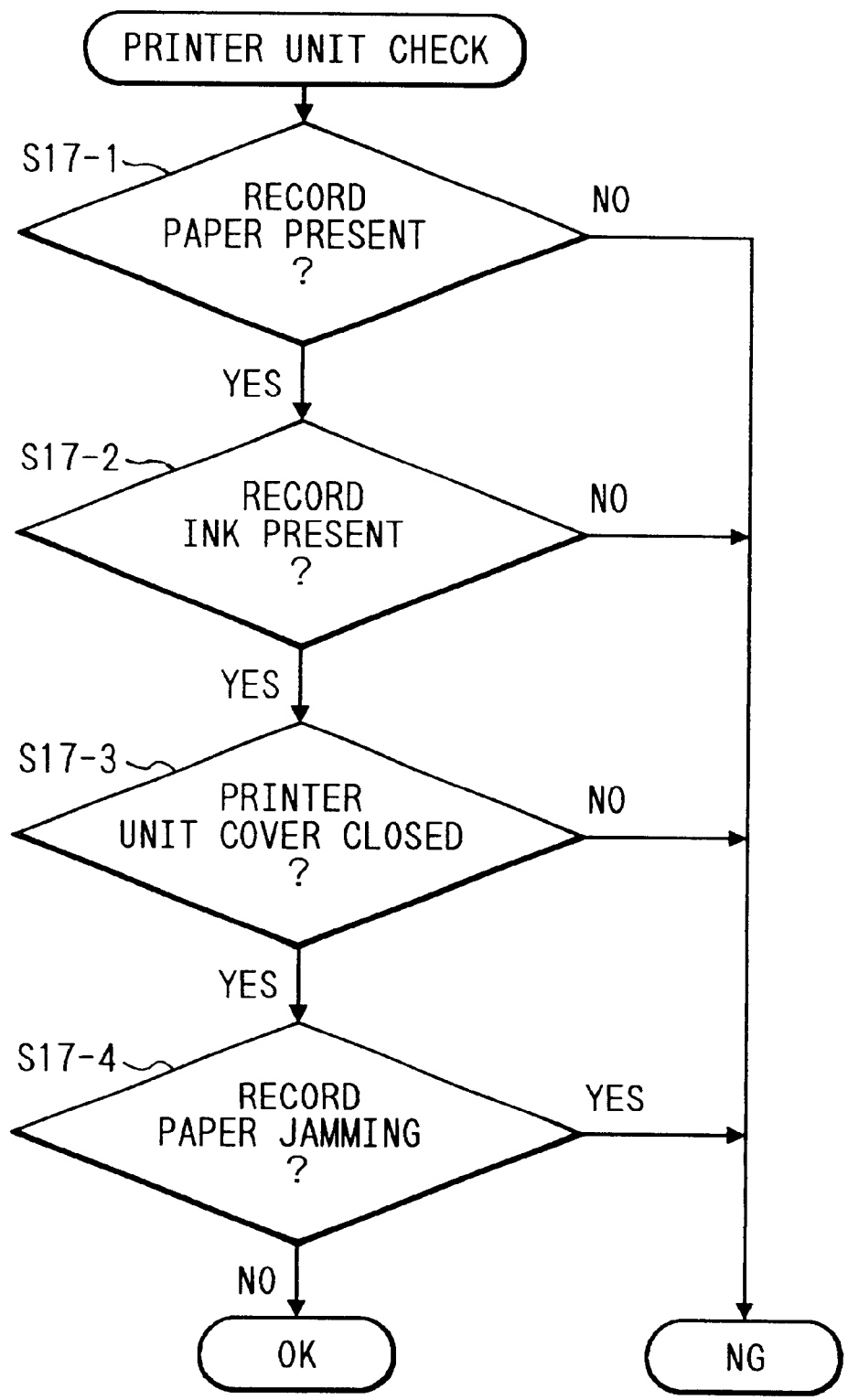
FIG. 17 is a flow chart showing the details of a printer unit check process shown in FIG. 14.

In the following there will be explained the printer check in the step S14-4, with reference to FIG. 17.

A step S17-1 checks the presence or absence of the recording sheet in the recording sheet cassette by means of an unrepresented sheet sensor, and, if present, the sequence proceeds to a step S17-2, but, if absent, the process is terminated by an abnormality process. A step S17-2 checks the presence or absence of the recording ink, and, if present, the sequence proceeds to a step S17-3, but, if absent, the sequence is terminate by an abnormality process. The present embodiment utilized recording ink for recording, but the present invention is applicable also to a facsimile apparatus with a printer unit with laser recording process utilizing toner. A step S17-3 checks the presence or absence of a cover of the printer unit 2, and, if it is closed, the sequence proceeds to a step S17-4, but, if open, the sequence is terminated by an abnormality process. A step S17-4 checks the presence or absence of the recording sheet jam. If the sheet jamming is not detected for example by the PE sensor 206, the printer check process is terminated normally, but, if detected, it is terminated by an abnormality process.

Figure 18:
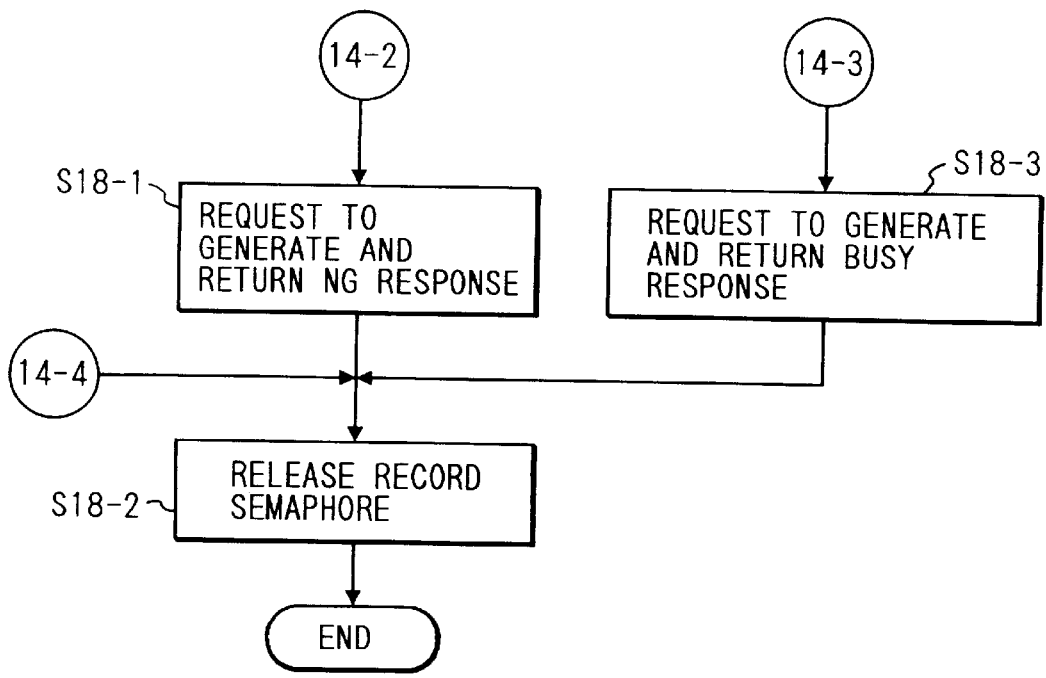
FIG. 18 is a flow chart showing the details of a post process shown in FIG. 14.

Now there will be explained the abnormality process with reference to FIG. 18.

If an NG status occurs, a step S18-1 generates an NG response to the interface control task, and sends the interface control task a request to send, to the information processing terminal 109, a response that the process is terminated by an abnormality process. In case a BUSY status occurs, a step S18-3 generates a BUSY response to the interface control task, and sends the interface control task a request to send, to the information processing terminal 109, a response that the process is terminated by an abnormality process. the transmission is made by the interface control task. Then a step S18-2 releases the recording semaphore and the abnormality process is thus terminated. The recording semaphore is not released if it has not been acquired before.

In the following there will be explained difference between the recording operation in the conventional configuration and that of the present embodiment.

To the top of the received image in the conventional facsimile apparatus, there is attached the transmission source record, such as the date and time of transmission, telephone number, name of transmitter and the number of pages, for identifying the information of the source of transmission of the image. Consequently the length of information at the receiving side is usually larger than that at the transmitting side. Thus, if the recording is conducted in the original size, the information of a standard format sheet at the transmitting side cannot be accommodated in the standard format sheet at the receiving side. Consequently there is already known a technology for effecting image reduction with a fixed ratio at the receiving side, thereby accommodating the information in the standard format sheet. However such image reduction at the receiving side leads to a drawback that the transmitted image cannot be faithfully reproduced.

Also there is known a technology of reception information recording, in which the data and time of reception, telephone number, name of sender and number pages are added by the receiving side, at the rear red of the received image. However, the image magnification has to be further lowered in order to accommodate the information in a standard format sheet, utilizing this function.

Also the image received in the facsimile apparatus has to be securely recorded, even when the recording ink runs out in the facsimile apparatus utilizing such recording ink, as in the present embodiment. Consequently there is known a technology of detecting the residual ink quantity after the recording process, in order to judge whether the recording has actually been achieved. If the recording ink is judged to have run out, the image is accumulated in the image memory for recording the same image again and the operation by the operator is requested. However, for effecting such detection, it has been necessary to effect unnecessary recording on the recorded image or to waste the recording ink. Also the throughput of the entire system is lowered by the detection of the residual ink quantity. On the other hand, if the recording operation is completed properly, the image accumulated in the memory is forcedly erased, but, if another record is desired, it has been necessary to copy the recording sheet bearing the recorded image so that the image is inevitably deteriorated.

On the other hand, in the present embodiment, the recording operation is conducted in the conventional manner in the conventional facsimile reception, and, for the image having the file attribution designated by the information processing terminal 109, there is conducted the recording operation not associated with the above-mentioned drawbacks. More specifically, for the file designated by the information processing terminal 109, there is not conducted the additional process such as the detection of the residual ink quantity or the reduction recording, nor the recording of additional recording or the recording of the reception information, so that the faithful reproduction of the transmitted image can be realized. Also it is rendered possible, by merely looking at the recording sheet, whether the record is obtained by the conventional recording operation or by the recording of the file designated by the information processing terminal 109. Also the image, after the recording operation of the file designated by the information processing terminal 109 is stored in the image memory regardless whether the process is terminated normally or by the abnormality process.

Figure 24:
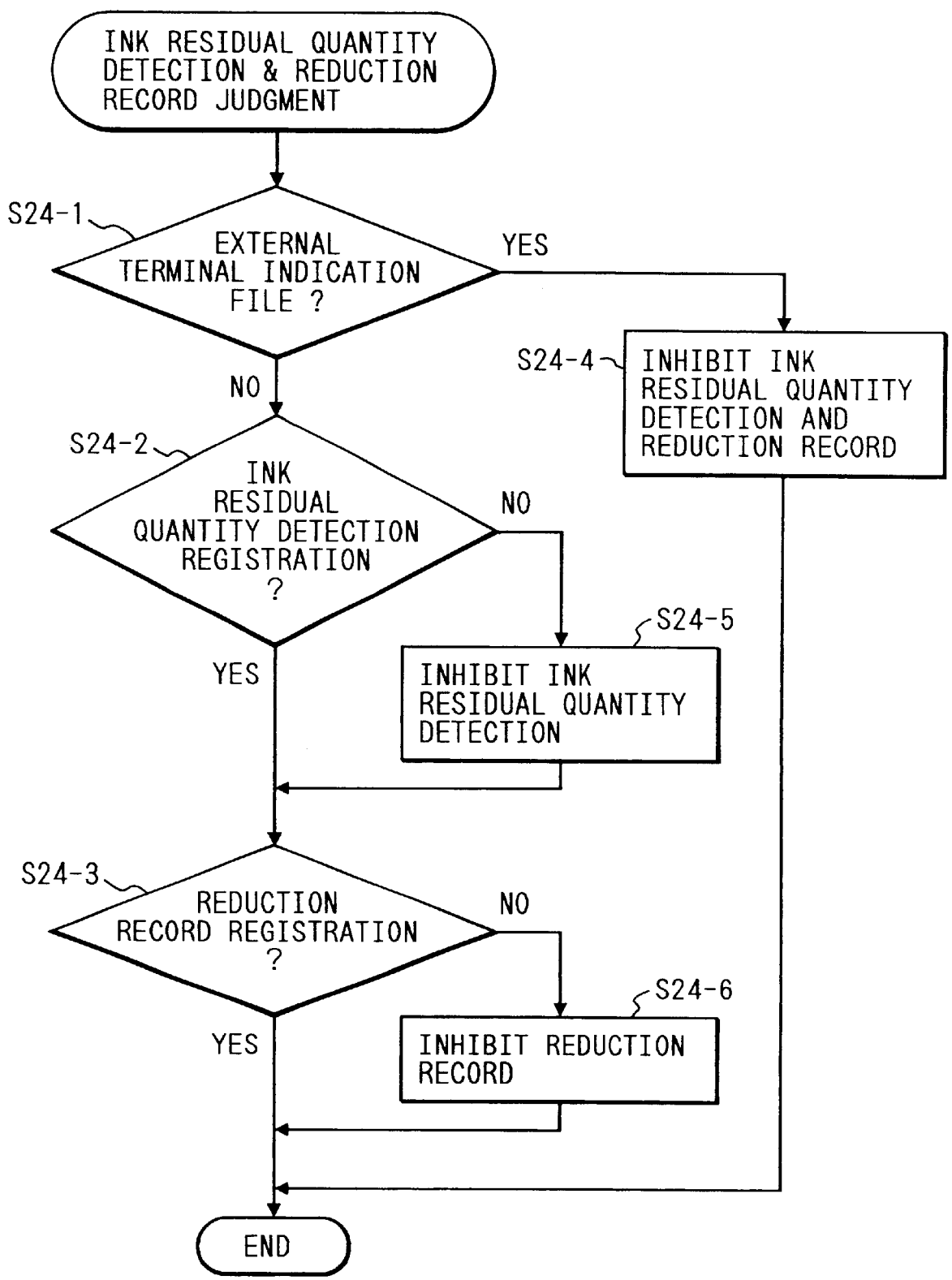
FIG. 24 is a flow chart showing the details of discrimination process for a remaining recording sheet detection process and a reduction recording process.

In the following there will be explained, with reference to FIG. 24, the judgment whether or not to effect the detection of the residual ink quantity and the reduction recording.

At first a step S24-1 discriminates whether the attribution of the image file to be recorded is a file designated by the information processing terminal 109, and, if so, the sequence proceeds to a step S24-2, but, if not, the sequence branches to a step S24-4 to assume a mode for inhibiting the detection of the residual ink quantity and the reduction recording, and the judgment process is terminated. the step S24-2 discriminates whether the setting of the facsimile apparatus is to effect or not the detection of the residual ink quantity. If the setting is to effect said detection, the sequence proceeds to a step S24-3, but, if not, the sequence branches to a step S24-5 to assume a mode for inhibiting the detection of the residual ink quantity and the sequence proceeds to the step S24-3. The step S24-3 discriminates whether the setting of the facsimile apparatus is to effect or not the reduced recording, and, if the setting is to effect the reduced recording, the judgment process is terminated, but, if not, the sequence branches to a step S24-6 to assume the mode for inhibiting the reduced recording, and the judgment process is terminated.

In the following there will be given a detailed explanation on the recording operation in the present embodiment.

Figure 19:
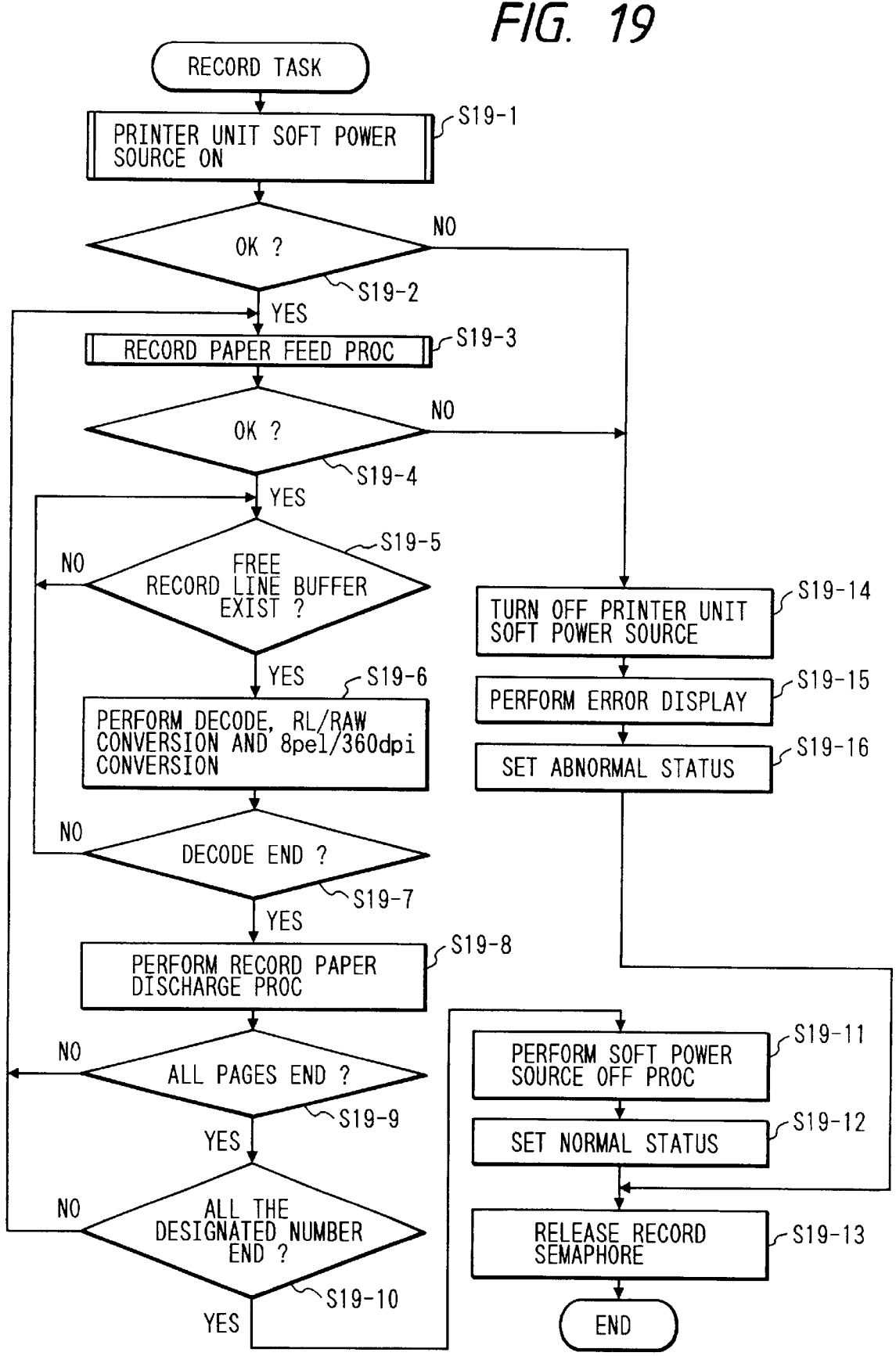
FIG. 19 is a flow chart showing the details of a record process task.

The recording task activated in the step S14-11 effects operations shown in a flow chart in FIG. 19. At first a step S19-1 turns on the soft power supply of the printer unit 2. The on/off process of the soft power supply will be explained later. A step S19-2 discriminates whether the soft power supply has been normally turned on, and, if turned on normally, the sequence proceeds to a step S19-3. If completed abnormally, a step S19-14 effects forced turn-off of the soft power supply, and a step S19-15 effects an error display be the display unit of the operation panel 112. Then a step S19-16 stores error information in the print information status in the work area of the RAM 103 in the facsimile unit 1, and the sequence proceeds to a step S19-13. The step S19-3 effects feeding of the recording sheet, as will be explained later, and then a step S19-4 discriminates whether the feeding of the recording sheet has been completed normally. If completed normally, the sequence proceeds to a step S19-5. If completed abnormally, a step S19-14 effects forced turn-off of the soft power supply, and a step S19-15 effects an error display in the display unit of the operation panel 112. Then a step S19-16 stores error information in the print information status in the work area of the RAM 103 in the facsimile unit 1, and the sequence proceeds to a step S19-13. The step S19-5 discriminates the presence or absence of a free record line buffer 103. In the present embodiment, the recording data for the printer unit 2 are managed in the unit of a line, and, the recording data cannot be generated unless a record line buffer 103 is made free. There are usually prepared plural line buffers, which are cyclically utilized. When a record line buffer 103 is made free, a step S19-6 effects decoding, RL (run length)—RAW conversion and conversion of resolution (8 pel—360 dpi), and the recording-data are stored in the record line buffer 103. The actual recording data transfer to the printer unit 2 is conducted by an interruption recording process, and the record line buffer 103 is made free at the completion of the recording data transfer. Then a step S19-7 discriminates whether the decoding of the 1st page has been completed, and, if completed, the sequence proceeds to a step S19-8, but, if not, the process branches to the step S19-5 to repeat the above-explained process. A step S19-8 discharges the recording sheet after recording. Then a step S19-9 discriminates whether the image recording has been completed for all the pages, and, if completed, the sequence proceeds to a step S19-10, but, if not the sequence branches to the step S19-3 to repeat the process from the feeding of the recording sheet. Then a step S19-10 discriminates whether the image recording has been completed for all the number of records designated by the reception parameter in S16-6, and, if completed, the sequence proceeds to a step S19-11, but, if not, sequence branches to the step S19-3 to repeat the process from the feeding of the recording sheet. The step S19-11 turns off the soft power supply of the printer unit 2. Then a step S19-12 stores normal end information in the print information status of the work area of the RAM 103 of the facsimile unit 1. Then a step S19-13 releases the recording semaphore acquired in the step S14-3, and the recording task is terminated normally.

In the following there will be explained in detail the soft power supply turn-on process in a step S19-1 and the soft power supply turn-off process in steps S19-11 and S19-14.

The facsimile apparatus of the present embodiment has three power supply states. In a first state (hard power supply off state), the power supply is cut off by hardware, wherein the facsimile unit 1 and the printer unit 2 are not powered. In a second state (soft power supply off state), the power supply is turned on in hardware so that the facsimile unit 1 and the printer unit 2 are powered, but the printer unit 2 merely effects the initialization for turning on the hard power supply, without turn-on of the LED (not shown), and is a state equivalent to the unpowered state. In a third state (soft power supply on state), the power supply is turned on by hardware whereby the facsimile unit 1 and the printer unit 2 are powered and the printer unit 2 is rendered operable. Such three states are provided for the following reasons. Firstly, the soft power supply off state is assumed except in the recording operation, in order to avoid uncontrolled operation of the printer unit 2. Second, the throughput will be lowered if the initialization is conducted at each activation of the printer unit 2 in the same manner as at the start of power supply. Third, the activation of the LED in the printer unit 2 except in the recording operation will result in a waste in the electric power. Fourth, if the LED of the printer unit 2 is continuously turned on, the user may misunderstand that the printer unit 2 is in operation. Fifth, at the end of an error, the printer unit 2 can easily get out of the error state by the initialization by turning off and on the soft power supply.

Figure 20:
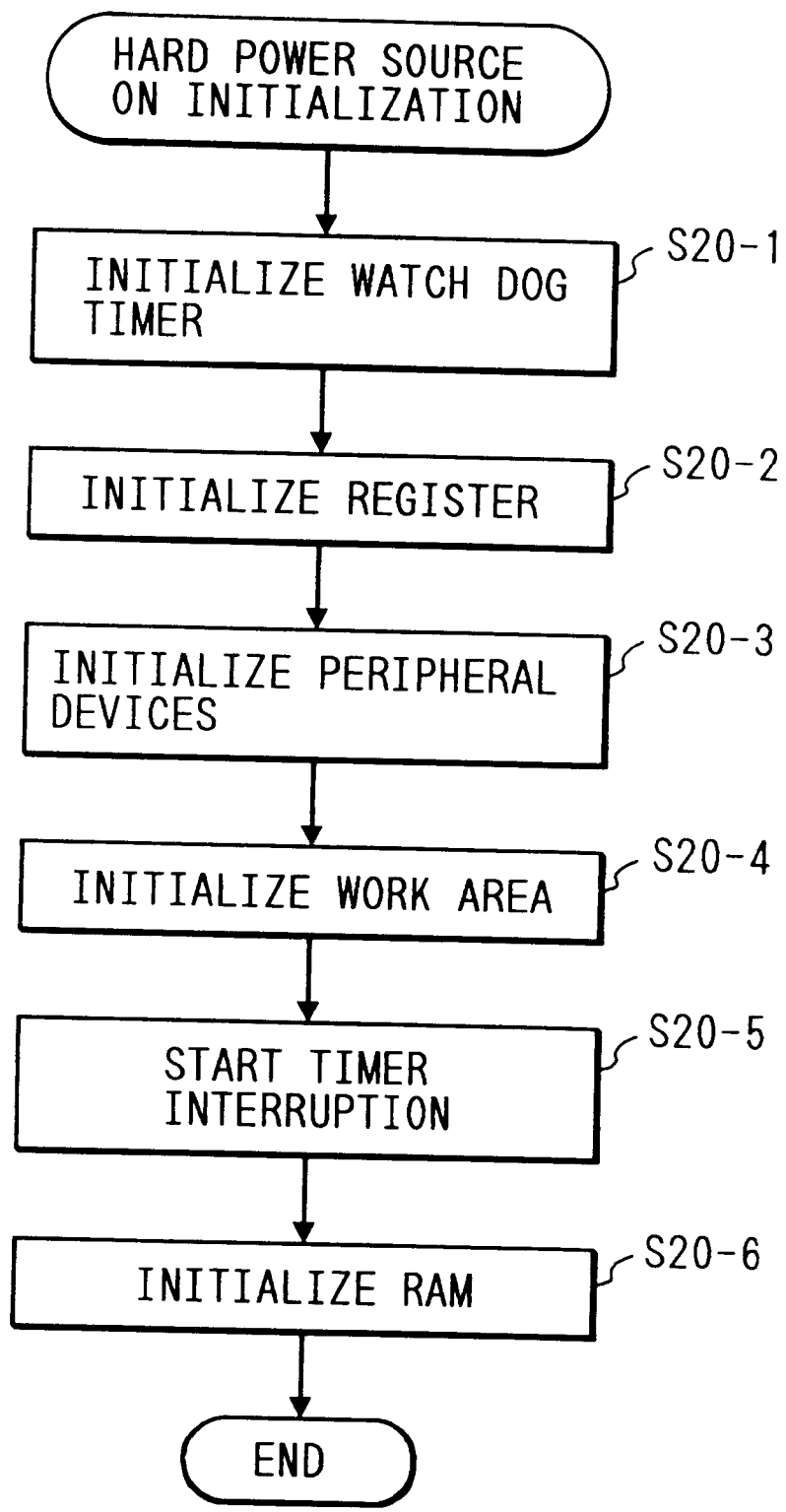
FIG. 20 is a flow chart showing the details of an initialization process at the start of power supply to the printer unit 2.
Figure 21:
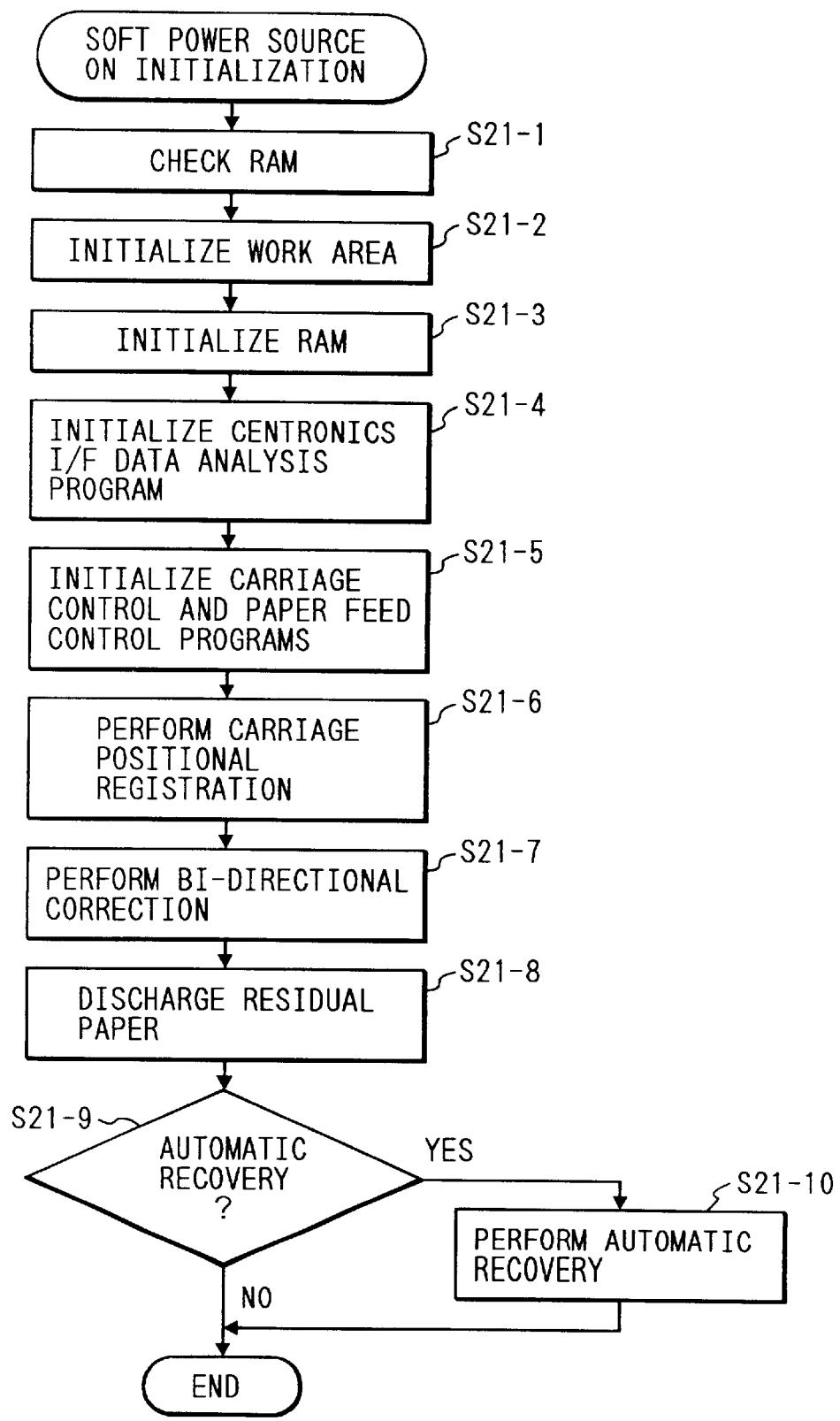
FIG. 21 is a flow chart showing the details of an initialization process at the start of soft power supply to the printer unit 2.

In the following there will be explained, with reference to FIGS. 20 and 21, the initialization when the hard power supply is turned on and that when the soft power supply is turned on.

In the initialization when the hard power supply is turned on, at first a watchdog timer for preventing the uncontrolled operation of the printer MPU 201 is initialized (a step S20-1), then a register is initialized for preventing the erroneous operation of the printer MPU 201 (a step S20-2), further initialized are peripheral devices such as the lateral-longitudinal converter 204 and the Centronics interface 302 (a step S20-3), and the work area of the RAM 203 is initialized for preventing the erroneous operation of the printer MPU 201 and setting the initial values of various parameters (a step S20-4). Thereafter initiated is a timer interruption process (a step S20-5). Then a RAM 203 is initialized for erasing the data remaining in the buffers (a step S20-6).

The initialization when the soft power supply is turned on is conducted only on the resources to be used after the soft power supply is turned on. At first the RAM 203 is checked (a step S21-1) and there are conducted initializations of the work area (a step S21-2), RAM 203 (a step S21-3), data analysis program transmitted from the Centronics interface (a step S21-4) and the carriage control and sheet transport control (a step S21-5). The printer MPU 201 effects initial position setting of the carriage or the print head 205, by means of an unrepresented home position sensor (a step S21-6). This process sets the reference position of the carriage by means of the home position sensor, as the position of the carriage is obtained by the number of pulses supplied to a stepping motor for driving the carriage. Then, for the purpose of bidirectional correction, the carriage is moved in the forward direction by a predetermined amount from the reference position, then moved in the reverse direction, and the state of the home position sensor is sampled (a step S21-7). In this operation there are counted the number of pulses required for the movement in the forward direction and that required for the movement in the reverse direction, and a correction value for the bidirectional printing is determined from these counts. If said correction value exceeds a predetermined range, there is identified an error state in which the recording operation is disabled. Then there is discriminated, for example by the PE sensor 206, whether a sheet is remaining in the apparatus, and, if any, the remaining sheet is discharged (a step S21-8). Then discriminated is whether to effect an automatic recovery process (a step S21-9), which is to avoid nozzle blocking in case the print head 205 is of the ink jet process. If such process is adopted, there is executed the automatic recovery operation (a step S21-10) and the initialization process is terminated. If such process is not adopted, the initialization process is simply terminated.

Figure 22:
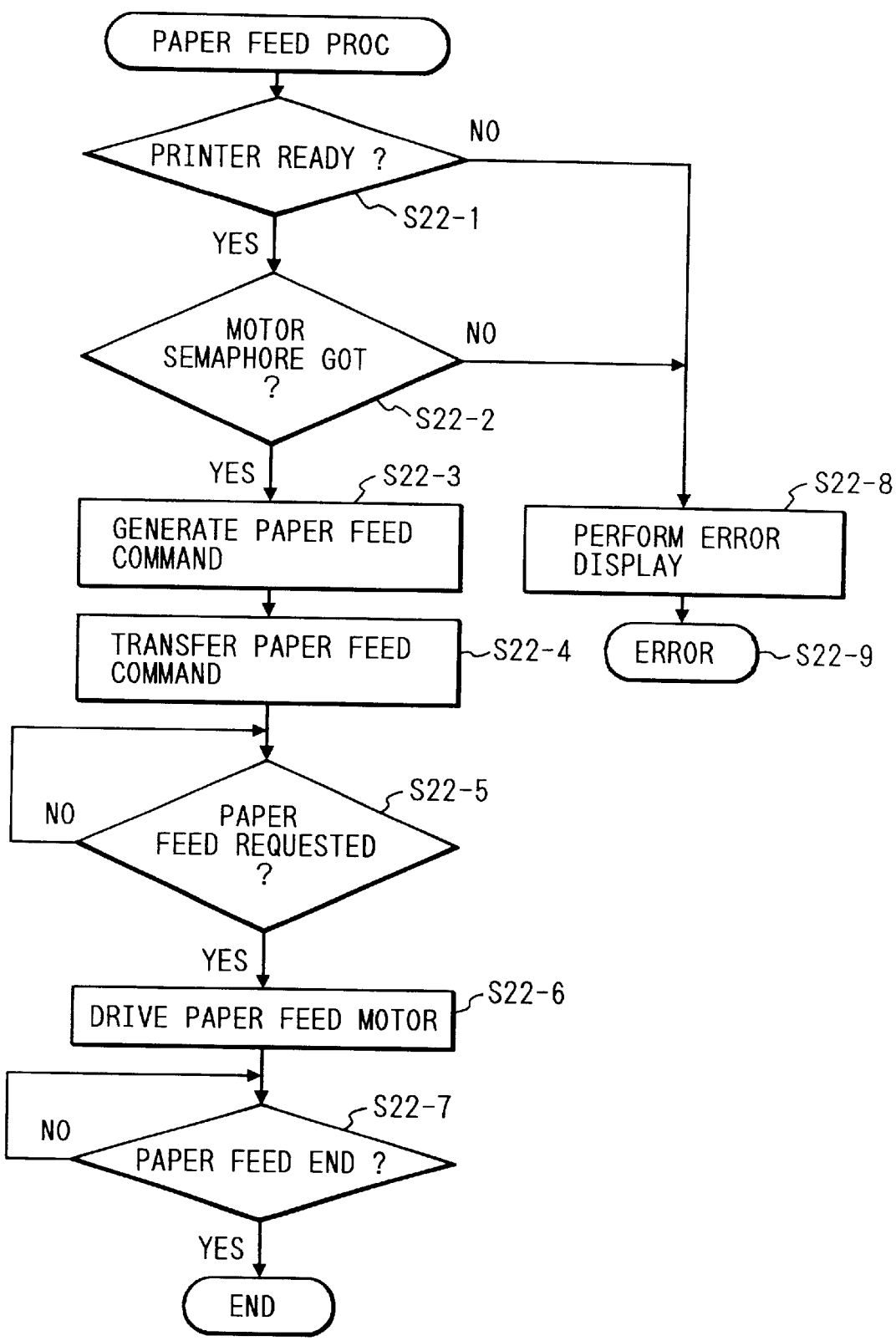
FIG. 22 is a flow chart showing the details of a recording sheet feed process shown in FIG. 19.

In the following there will be explained the recording sheet feed process in the step S19-3, with reference to FIG. 22.

The recording sheet feed process is from the generation of a recording sheet feed command by the facsimile unit 1 according to the user registration and transfer of said command to the printer unit 2, to the guiding of the leading end of the recording sheet by the pick-up roller (not shown).

At first there is discriminated whether the printer is ready (a step S22-1), and, if not, an error is displayed (a step S22-8) and the sequence is terminated by the error (a step S22-9). If the printer is ready, a motor semaphore is acquired (a step S22-2). If it cannot be acquired, an error is displayed (the step S22-8) and the sequence is terminated by the error (the step S22-9). If the printer is ready and the motor semaphore can be acquired, there is generated a recording sheet feed command (a step S22-3), which consists of the following commands:

Printer reset;

Print mode (normal or economy);

Printer setting;

Bidirectional print correction;

Page mode;

Footer printing;

Bidirectional printing; and

Raster skip.

The functions of these commands will be explained in the following.

The printer reset command initializes the printer unit 2. The print mode command follows the image print mode registered by the user. The printer setting command follows that of the facsimile mode registered by the user. The bidirectional print correction is not registered by the user but is specific to each apparatus, registered by the service personnel. The page mode is to select, in case of printing long data, whether to disregard the remaining data in the first page or to continue the printing on the second page, and this command is turned on in case of copying or printing the report on the untransmitted images, and off in case of printing the received image or ordinary report. The footer printing will be explained later. The bidirectional printing follows the bidirectional print mode in the image printing registered by the user. The raster skip is a command to start feeding of the recording sheet.

When the preparation of said recording sheet feed command is completed in the facsimile unit 1 (the step S22-3), said command is collectively transmitted to the printer unit 2 through the Centronics I/F 302 (a step S22-4). Then the facsimile unit 1 awaits a request for sheet feeding from the printer unit 2 (a step S22-5). Receiving said recording sheet feed command, the printer unit 2 analyzes and executes said command in succession. Upon analyzing the last raster skip command, it sends a request for sheet feeding to the facsimile unit 1. Upon receiving said request (the step S22-5), the facsimile unit 1 starts the sheet feeding operation by the motor 111 (a step S22-6), and terminates the sheet feeding operation when the recording sheet is transported to the PE sensor 206 (a step S22-7). The subsequent guiding of the front end of the recording sheet is done by the printer unit 2, which causes the front end of the recording sheet to protrude by a predetermined amount.

In the following there will be given a detailed explanation on the footer printing.

In the facsimile apparatus of the present embodiment, after the image recording of a page, a footer mark for detecting presence or absence of ink is printed on the rear end portion of the recording sheet and detected by a footer sensor 207, and the presence or absence of ink is judged according to the result of said detection.

The footer print command contains parameters, which contain whether or not to effect the detection of the residual ink quantity, a character train of the reception information and a character train of the footer mark. In the normal recording of the received image, the parameter is set to "effect" said detection, since the received image cannot be recorded again and will be lost if the recording ink is absent. On the other hand, in the recording of the image from the information processing terminal 109, the parameter is set "not to effect" said detection, since such image can be recorded again by receiving said image again from the information processing terminal 109, even if the recording ink is absent. The absence of detection for the residual ink quantity in the recording of the image from the information processing terminal 109 avoids the waste of the recording ink and improves the throughput.

Figure 23:
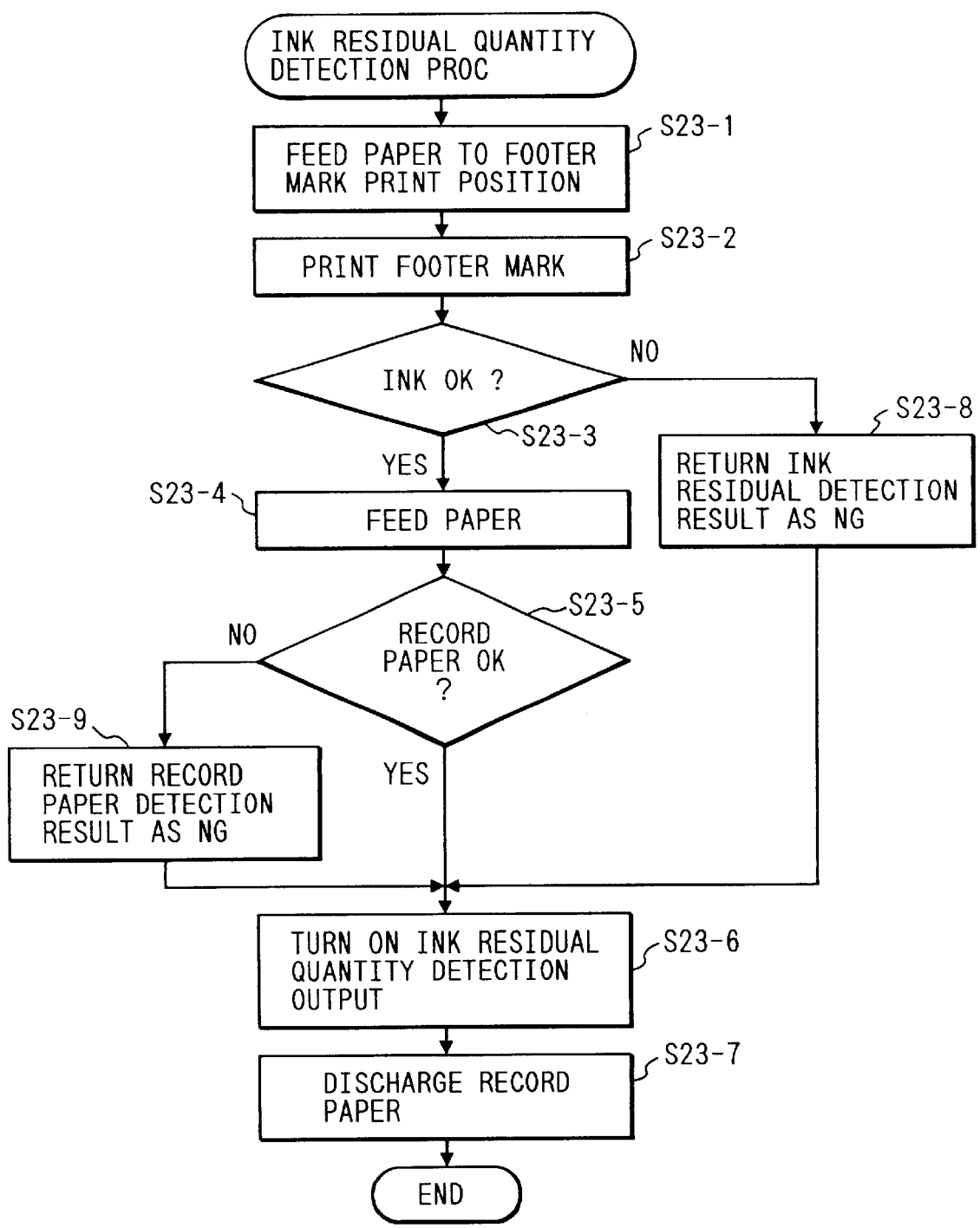
FIG. 23 is a flow chart showing the details of a remaining recording sheet detection process of the printer unit 2.

In the following there will be explained, with reference to FIG. 23, the ink residual quantity detection process in the printer unit 2 of the present embodiment.

The execution of the ink residual quantity detection process is designated by the footer print command from the facsimile unit 1, the printer unit 2 advances, after the image data recording, the recording sheet to a position where the characters of the reception information and those of the footer mark are to be printed (a step S23-1). Then there are printed the footer character codes of the footer buffer, in which the characters of said footer print command are stored (a step S23-2). If the ink residual quantity detection mark, thus printed, is not detected (a step S23-3), an NG detection result is returned to the facsimile unit 1 (a step S23-8). If said mark is detected (the step S23-3), the recording sheet is advanced (a step S23-4) and there is discriminated whether the recording sheet is colored (a step S23-5). If colored, an NG detection result is returned to the facsimile unit 1 (a step S23-9). After these detections, an OK output signal for the ink residual quantity detection is generated for informing the facsimile unit 1 of the completion of detections (a step S23-6). Upon completion of the residual ink quantity detection process, the first page is discharged (a step S23-7), and, if the print data for the next page have been received, the second sheet is fed and the printing operation is continued.

The ink quantity can also be detected by the following methods:

to detect the residual ink quantity in the ink tank by an optical sensor or a weight sensor;

to detect the presence or absence of the ink by interception of the light of the photosensor by the discharged ink;

to direct the discharged ink to a thermistor, and to detect the resulting change in temperature, thereby detecting the presence or absence of the ink; or to count the number of all the ink discharges, thereby predicting the presence or absence of the ink.

The above-explained processes allow to provide a facsimile apparatus capable of recording operation based on the automatic judgement of the attribution of the image and other factors. It is also made possible to improve the running cost and the throughput and to process the required images only. It is also possible to prevent drawback such as the loss of the received image without recording or the divided recording, on two pages, of the received image of a page. It is furthermore possible to use the buffer used in the communication between plural facsimile apparatus through a telephone line also for the buffer used in the transfer of the image data from the information processing terminal 109, and to transfer the image files, managed by the information processing terminal 109, to the facsimile apparatus. It is thus possible to reduce the RAM buffer capacity, and to achieve the file print function with a lowered cost.

3. Print Information Getting (GET PRINT INFO) Process:

This is a function for informing the information processing terminal 109 of the status of the recording operation by the PRINT FILE function designated by the information processing terminal 109, and is normally used in comnation with the PRINT FILE function.

This function is realized by a file information getting command.

This function is possible even during the transmission or reception of facsimile, the copying operation or the registration operation, as long as data transmission/reception is possible with the information processing terminal 109.

Figure 25:
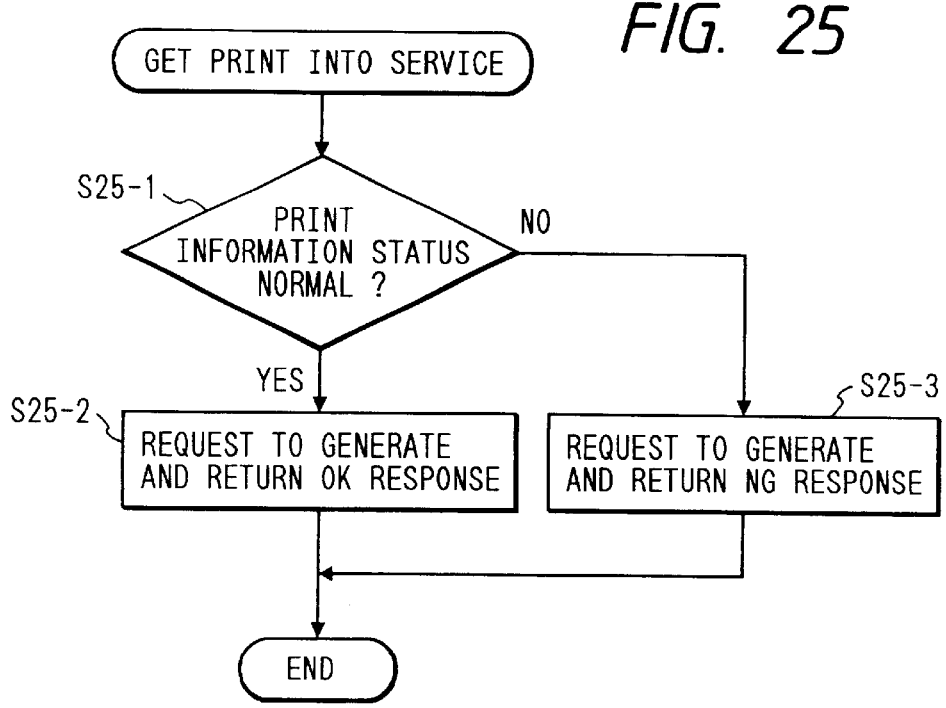
FIG. 25 is a flow chart showing a print information obtaining process.

Detailed operations will be explained in the following with reference to FIG. 25.

When the command process task identifies a file information getting command, the sequence branches to a step S25-1, which discriminates whether the PRINT FILE recording operation is terminated normally (or in progress) or is terminated by an abnormality, by referring to the content of the print information status in the work area of the RAM 103 of the facsimile apparatus. In case of normal termination (or recording operation in progress), the sequence proceeds to a step S25-2, but, in case of termination by abnormality, the sequence branches to a step S25-3. The step S25-2 generates an OK response to the interface control task and sends the interface control task a request to send, to the information processing terminal 109, a response that the operation is in progress properly. The transmission is made by the interface control task. On the other hand, in case of termination by abnormality, the step S25-3 generates an NG response to the interface control task, and sends the interface control task a request to send, to the information processing terminal 109, a response that the process is terminated by an abnormality. Then the GET PRINT INFO process is terminated.

4. File Transmission (SEND FILE) Process:

This is a function to transmit a desired image, accumulated in the image memory, designated by the information processing terminal 109 in the RAM 103 of the facsimile apparatus, to a desired address by the facsimile apparatus.

The SEND FILE function is realized by a file transmission command and an acceptance number getting command. The file transmission command is directed from the information processing terminal 109 to the facsimile apparatus and instructs the transmission, in combination with designating parameters. The acceptance number getting command is directed from the information processing terminal 109 to the facsimile apparatus is to return, from the facsimile apparatus to the information processing terminal 109, the acceptance number of the transmission based on the file transmission command. The image transmittable by the SEND FILE function is limited to a download image, a received image or a scanned image, designated by the information processing terminal 109.

Figure 26B:
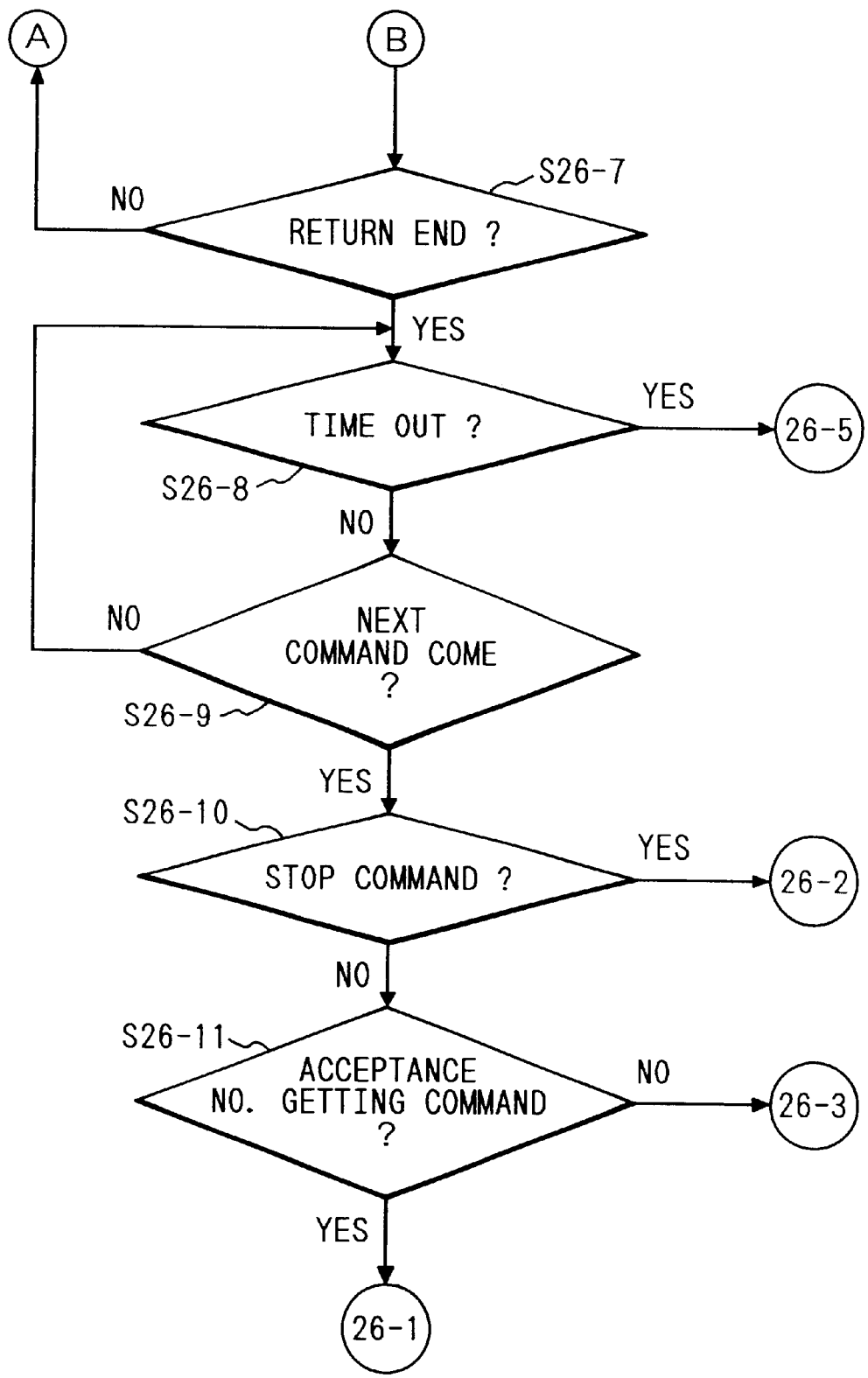
FIG. 26, composed of FIGS. 26A and 26B.
Figure 27:
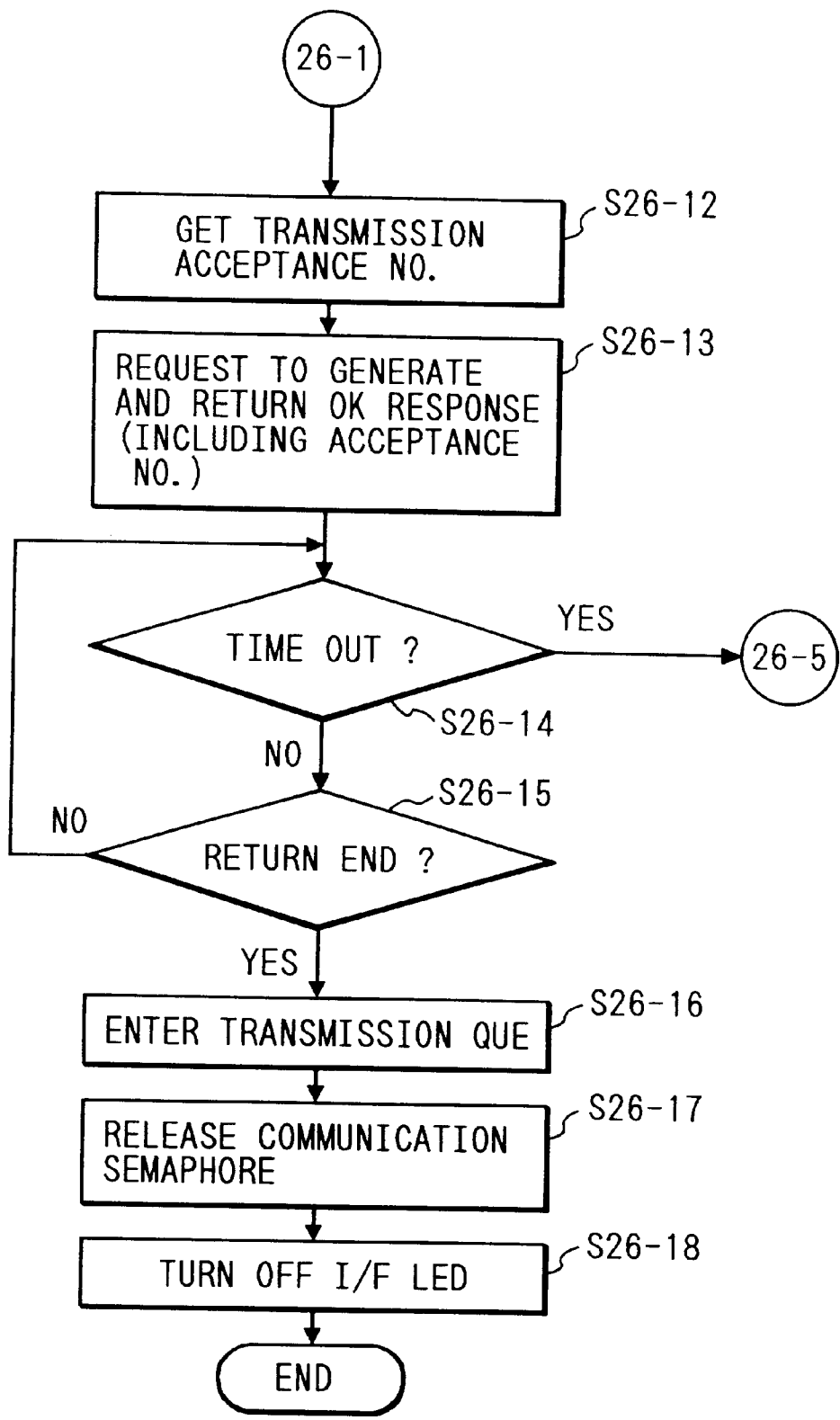
FIG. 27 are flow charts showing a file transmission process.

The detailed functions of this process will be explained in the following with reference to FIGS. 26A, 26B and 27.

A step S26-1 acquires a communication semaphore. The communication semaphore is acquired by the facsimile apparatus in an operation thereof utilizing the communication unit 104, and is released at the end of said operation, and the operation (such as transmission or reception) cannot be executed if the semaphore cannot be acquired. This arrangement enables smooth simultaneous operations. If the communication semaphore can be acquired in the step S26-1, the sequence proceeds to a step S26-2, but, if it cannot be acquired, the sequence branches to a BUSY process to be explained later. The step S26-2 discriminates whether the reception parameter, accompanying the file transmission command, is correct or incorrect, as will be explained later. The sequence branches from steps S26-3 to S26-4 or to an NG process to be explained later, respectively if the parameter is identified correct or incorrect. The step S26-4 turns on the interface LED, thereby indicating that the operation is in progress. During the turn-on state of the interface LED, the key input is inhibited in the facsimile apparatus. Then a step S26-5 generates an OK response to the interface control task, and sends the interface control task a request to send, to the information processing terminal 109, a response that the operation is in progress properly. The transmission is executed by the interface control task. Then steps S26-6 and S26-7 discriminate whether the interface control task has completed the response to the information processing terminal 109. If completed, the sequence proceeds to a step S26-8, but, if a predetermined time expires in the step S26-6 before the completion of the response, the sequence branches to an abnormality process. In the present embodiment, said time is fixed, but it may also be rendered variable by a registration in the facsimile apparatus or in the information processing terminal 109. Then steps S26-8 and S26-9 receives a next command from the information processing terminal 109, and, when the next command is received, the sequence proceeds to a step S26-10, but, if a predetermined time expires in the step S26-8 before the reception of the next command, the sequence branches to an abnormality process. In the present embodiment, said time is fixed, but it may also be rendered variable by a registration in the facsimile apparatus or in the information processing terminal 109. The step S26-10 discriminates whether the received next command is a stop command, and, if it is not a stop command, the sequence proceeds to a step S26-11, but, if it is a stop command, the sequence branches to an interruption process for the SEND FILE function. The step S26-11 discriminates whether the next command received from the information processing terminal 109 is an acceptance number getting command, and, if so, the sequence proceeds to a step S26-12, but, if otherwise, there is executed an NG process. The step S26-12 acquires an acceptance number (file ID) for the image to be transmitted next. In the facsimile apparatus of the present embodiment, serial numbers are given to the image data (files) accumulated in the image memory of the RAM 103, and said image data are managed by the acceptance numbers, which assume values 1 to 9999 and are cyclically used. The step S26-13 generates an OK response to the interface control task and acceptance number information, and sends the interface control task a request to send, to the information processing terminal 109, a response that the operation is in progress properly and information responding to the acceptance number getting command. The transmission is executed by the interface control task. Then steps S26-14 and S26-15 discriminate whether the interface control task has completed the response to the information processing terminal 109, and, if completed, the sequence proceeds to a step S26-16, but, if a predetermined time expires in the step S26-14 before the completion of the response, the sequence branches to an abnormality process. In the present embodiment, said time is fixed, but it may also be rendered variable by a registration in the facsimile apparatus or in the information processing terminal 109. Then the step S26-16 sends a transmission cue to the transmission execution task, and a step S26-17 releases the communication semaphore acquired in S26-1. At the execution of the transmission by the transmission execution task, it again executes acquisition and release of the communication semaphore. Then a step S26-18 turns off the interface LED, thereby indicating that the SEND FILE process is terminated.

Also in response to the turn-off of the interface LED, the key input of the facsimile apparatus is permitted.

Figures 28, 28A:
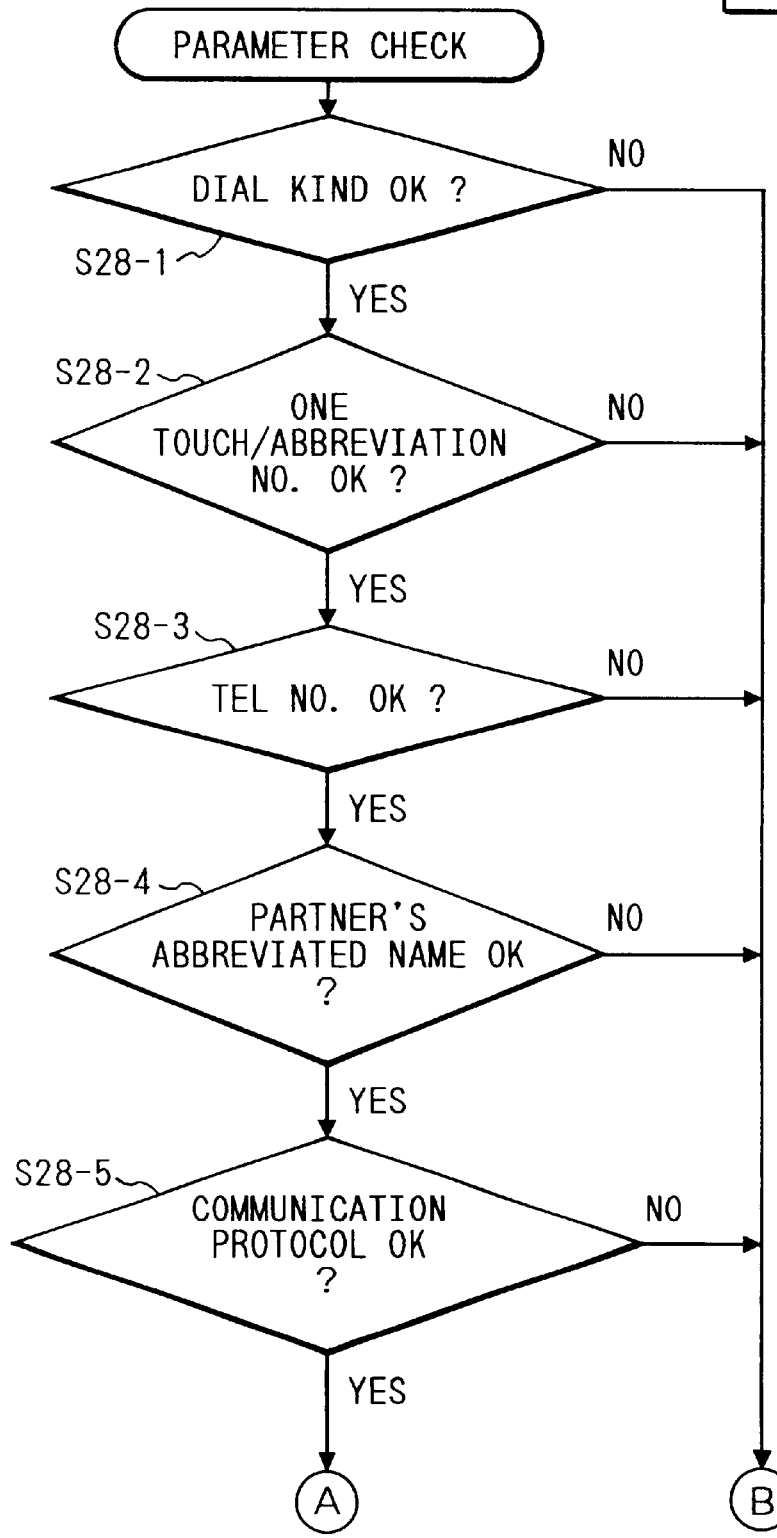
FIG. 28, composed of FIGS. 28A and 28B, is a flow chart showing the details of a parameter check process in FIGS. 26A and 26B.
Figure 28B:
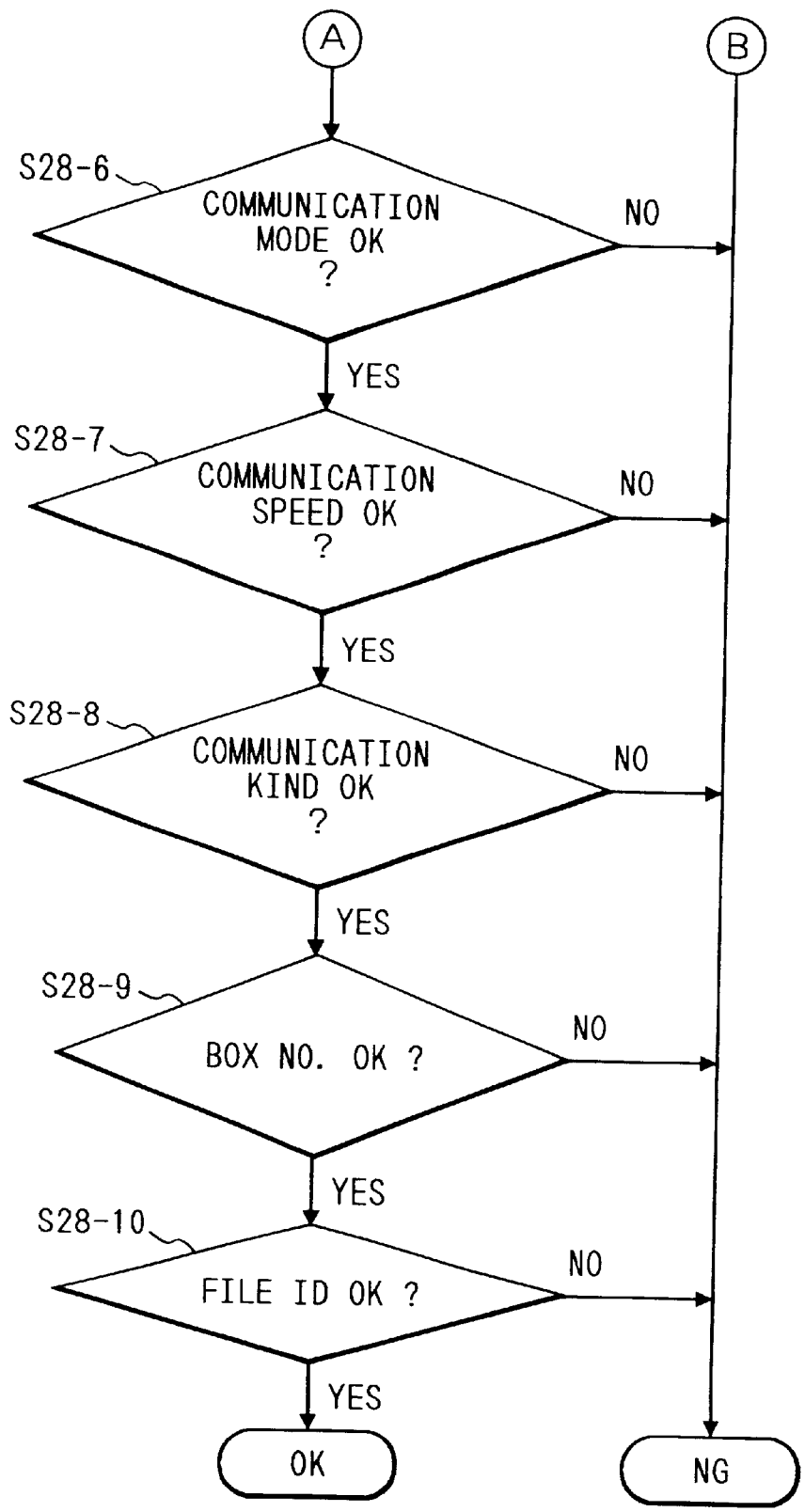

In the following there will be explained the reception parameter check in S26-2, with reference to FIGS. 28A and 28B.

The reception parameter contains following items and has following selections:

Kind of dial: ten key, one touch, contracted;

One-touch/contracted dial numbers: 1–16 (one-touch mode, 0–99 (contracted mode);

Telephone number: ASCII 32 characters max (ten key mode);

Abbreviated name of partner: ASCII characters;

Communication protocol: no check, G3 (PSTN);

Communication mode: no check, international line (1), international line (2), international line (3);

Communication speed: no check, 4800 bps, 9600 bps;

Kind of communication: normal transmission, private transmission, relay-indicated transmission;

Box number: 0–99;

File ID: 1–9999;

If the content of the reception parameter is different from the setting of the facsimile apparatus, there is set a reception parameter error. However, it is also possible, in such case, to continue the process by "giving priority to the content of the reception parameter" or "giving priority to the setting of the facsimile apparatus" instead of setting the reception parameter error.

A step S28-1 checks the kind of dial. The check is considered OK if the content of the reception parameter is ten key, one-touch or contracted, and NG if otherwise. A step S28-2 checks the one-touch/contracted dial number. This is an item effective only when the one-touch or contracted dial is designated in the step S28-1. The check is considered OK if the received parameter number is within the range and if the partner is registered at the designated number, but NG if the designated number is outside the range or if the partner is not registered at the designated number. A step S28-3 checks the telephone number. This is an item only effective when the ten key dial is designated in the step S28-1. The check is considered OK if the received parameter number consists solely of ASCII characters not exceeding 32 characters, but NG if the designated number contains other than ASCII characters or exceeds 32 characters. A step S28-4 checks the abbreviated name of the partner. The check is considered OK if the abbreviated name in the reception parameter consists solely of the ASCII character, but NG if otherwise. A step S28-5 checks the communication protocol. The check is considered OK if the content of the reception parameter is "no check" or "G3(PSTN)", but NG otherwise. A step S28-6 checks the communication mode. The check is considered OK if the content of the reception parameter is "no check", "international line (1)", "international line (2)" or "international line (3)", but NG otherwise. A step S28-7 checks the communication speed. The check is considered OK if the content of the reception parameter is "no check", "4800 bps" or "9600 bps", but NG otherwise. A step S28-8 checks the kind of communication. The check is considered OK if the content of the reception parameter is "normal transmission", "private transmission" or "relay-indicated transmission", but NG otherwise. A step S28-9 checks the box number. The check is considered OK if the content of the reception parameter is within a range of 0–99, but NG otherwise. A step S28-10 checks the file ID, which is a serial number given to the image entered into or released from the facsimile apparatus and by which access is made to the desired image stored in the image memory of the RAM 103. A step S28-10 discriminates whether an image, corresponding to the file ID in the reception parameter, is present in the image memory, and, if present, the file attribution is checked. If it belongs to the file designated by the information processing terminal 109, the process is terminated normally. The check is considered NG if the image corresponding to the file ID is not present in the image memory or if the attribution of the image is not within the file designated by the information processing terminal 109.

Figure 29:
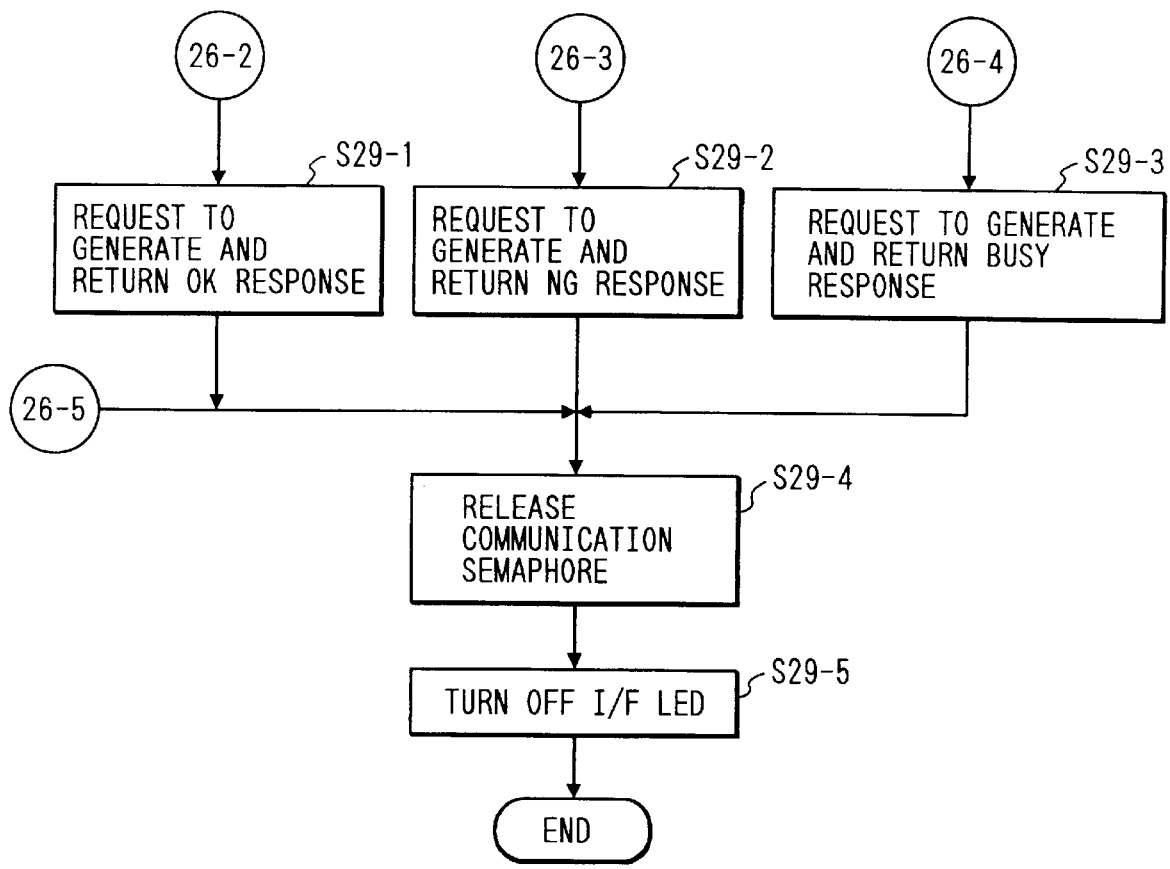
FIG. 29 is a flow chart showing the details of a post process in FIGS. 26A to 27.

Now there will be explained the abnormality process with reference to FIG. 29.

In case the sequence branches to a step S29-1, it generates an OK response to the interface control task and sends the interface control task a request to send, to the information processing terminal 109, a response that the operation is in progress properly. The transmission is executed by the interface control task. In case the sequence branches to a step S29-2, it generates an NG response to the interface control task and sends the interface control task a request to send, to the information processing terminal 109, a response that the operation is in progress properly. The transmission is executed by the interface control task. In case the sequence branches to a step S29-3, it generates a BUSY response to the interface control task and sends the interface control task a request to send, to the information processing terminal 109, a response that the operation is in progress properly. The transmission is executed by the interface control task. A step S29-4 releases the communication semaphore, acquired in the step S26-1. Then a step S29-5 turns off the interface LED, thereby indicating that the SEND FILE process is terminated. In response the key input of the facsimile apparatus is permitted.

The above-explained process provided a facsimile apparatus utilizing a parallel interface capable of high-speed data transfer, wherein the convenience of use is improved by a control that the process is interrupted in case the interface is rendered capable of data transfer within a predetermined time.

Figure 30B:
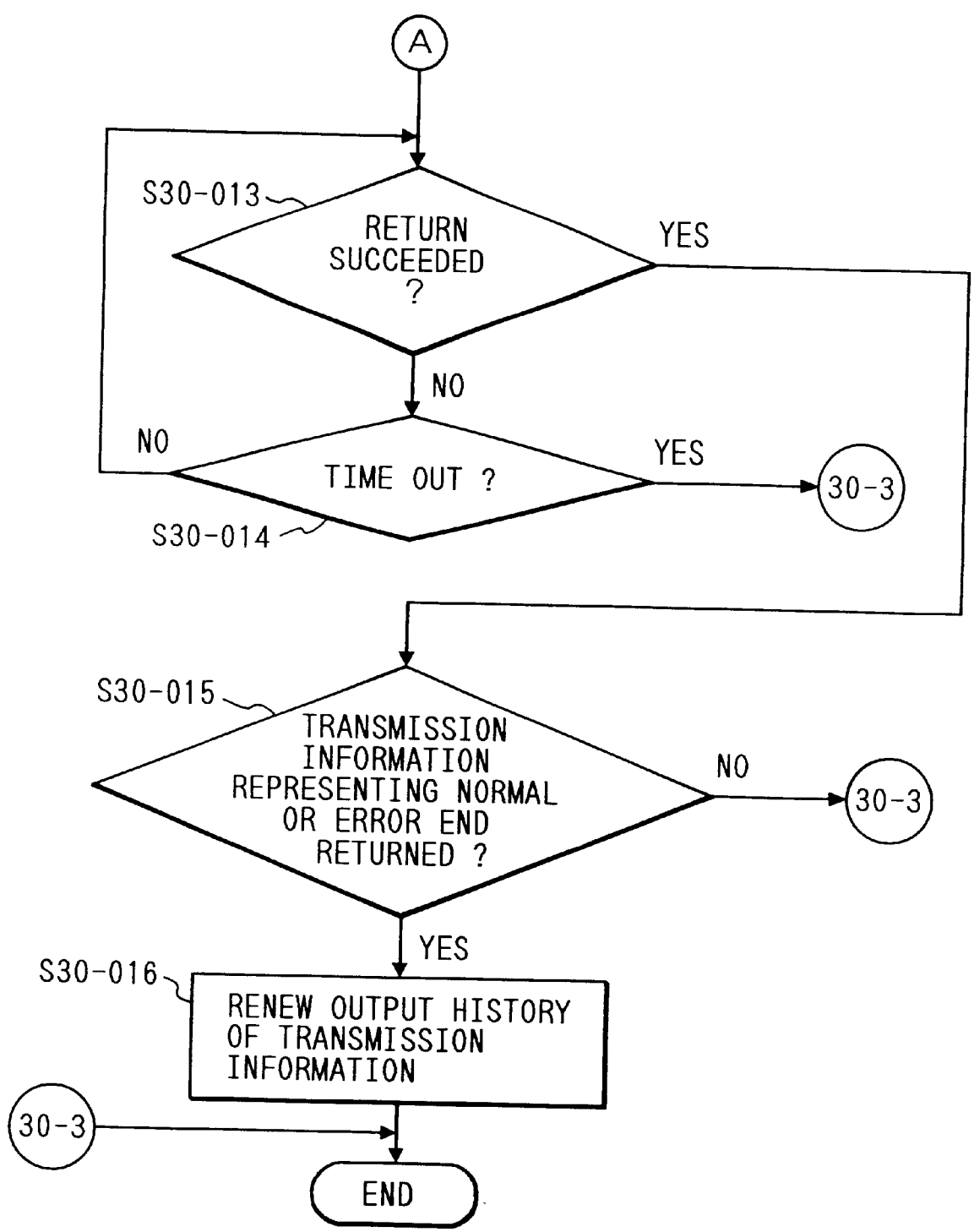
FIG. 30, composed of FIGS. 30A and 30B.
Figure 31:
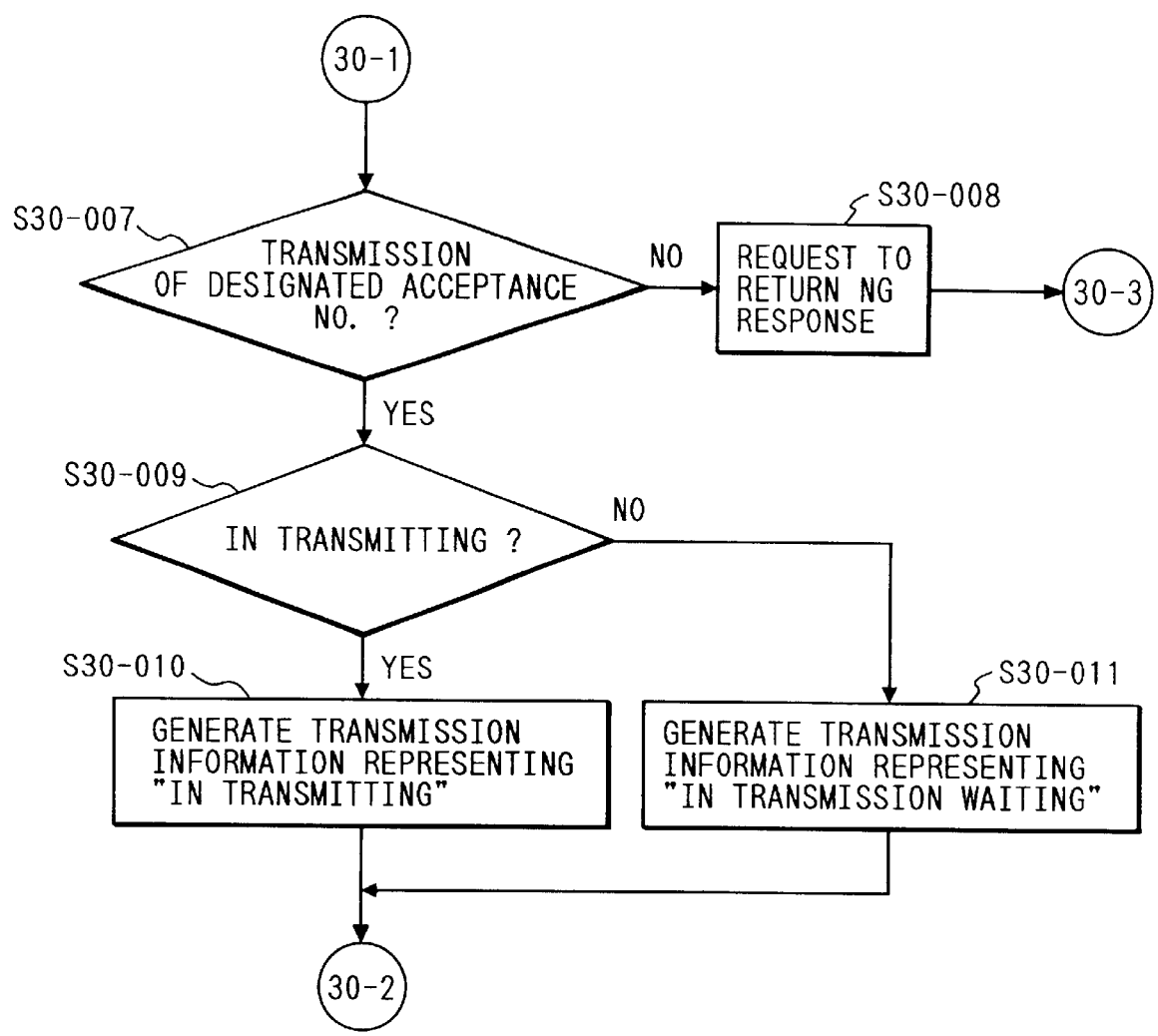
FIG. 31 are flow charts showing a transmission information getting process.

5. Transmission Information Getting (GET SEND INFO) Process:

FIGS. 30A to 31 are flow charts showing a process of the present embodiment for transferring information relating to the transmission of the facsimile apparatus to the information processing terminal 109.

Figure 8B:
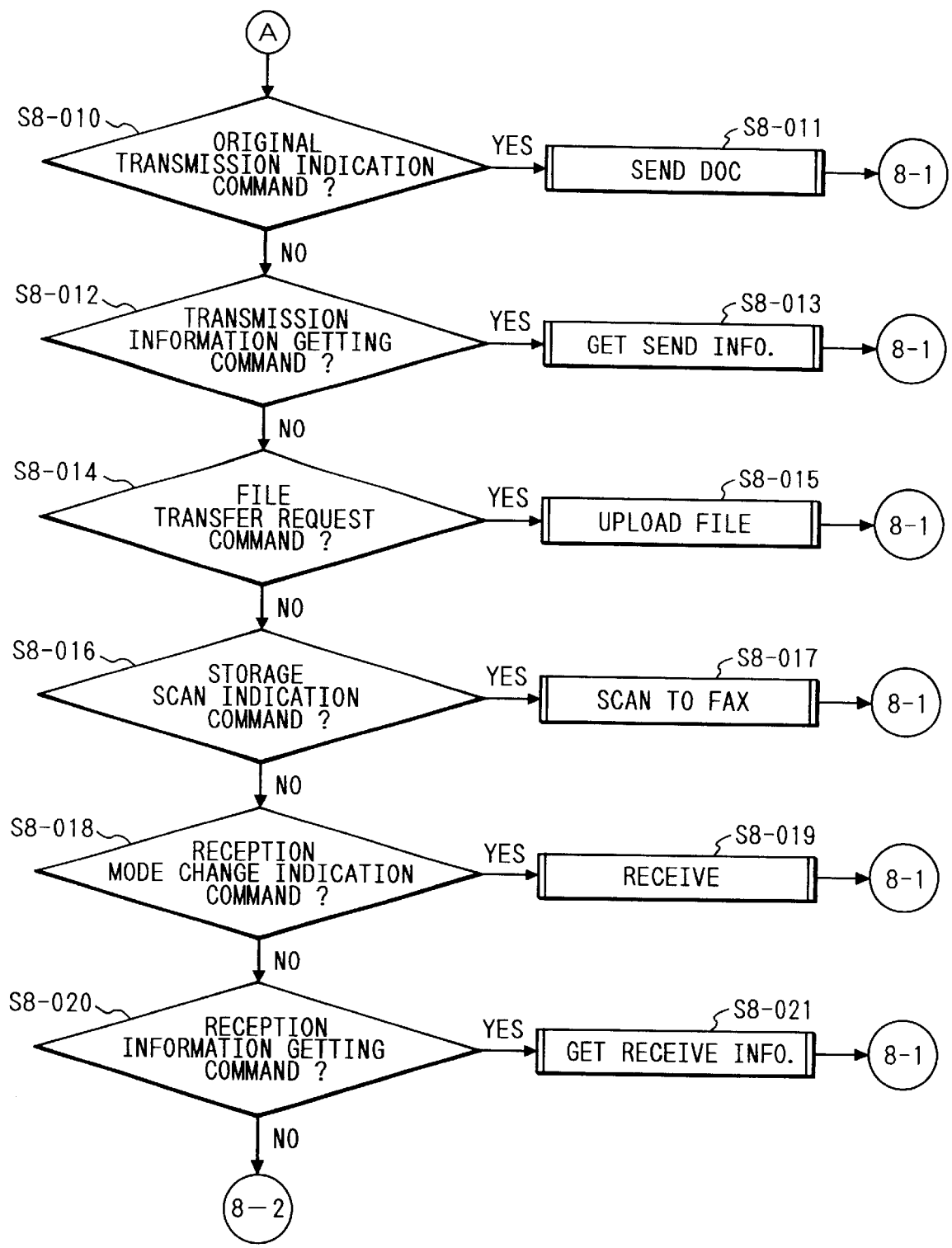
FIG. 8, composed of FIGS. 8A and 8B.

The GET SEND INFO process is executed when the command process task shown in FIGS. 8A and 8B receives a command from the interface control task and if said command is a transmission information getting command.

At first a step S30-001 discriminates whether the result of transmission corresponding to the acceptance number designated by the transmission information getting command from the information processing terminal 109 esits in the communication management information. If the communication management number 44-001 of the communication management information shown in FIG. 44 coincides with the acceptance number designated by the transmission information getting command and if the kind of communication 44-005 in FIG. 44 indicates "transmission", the sequence proceeds to a step S30-002.

The step S30-002 discriminates whether the communication management information found in the step S30-001 has already been informed as the transmission information. If the communication management report output history information 44-011 for the communication management information, shown in FIG. 44, does not indicate that the transmission information has not been informed, the sequence proceeds to a step S30-003.

The step S30-003 sends, to the interface control task, an NG response indicating that the object of transmission of the designated acceptance number does not exist, and the GET SEND INFO process is terminated.

Figure 44:
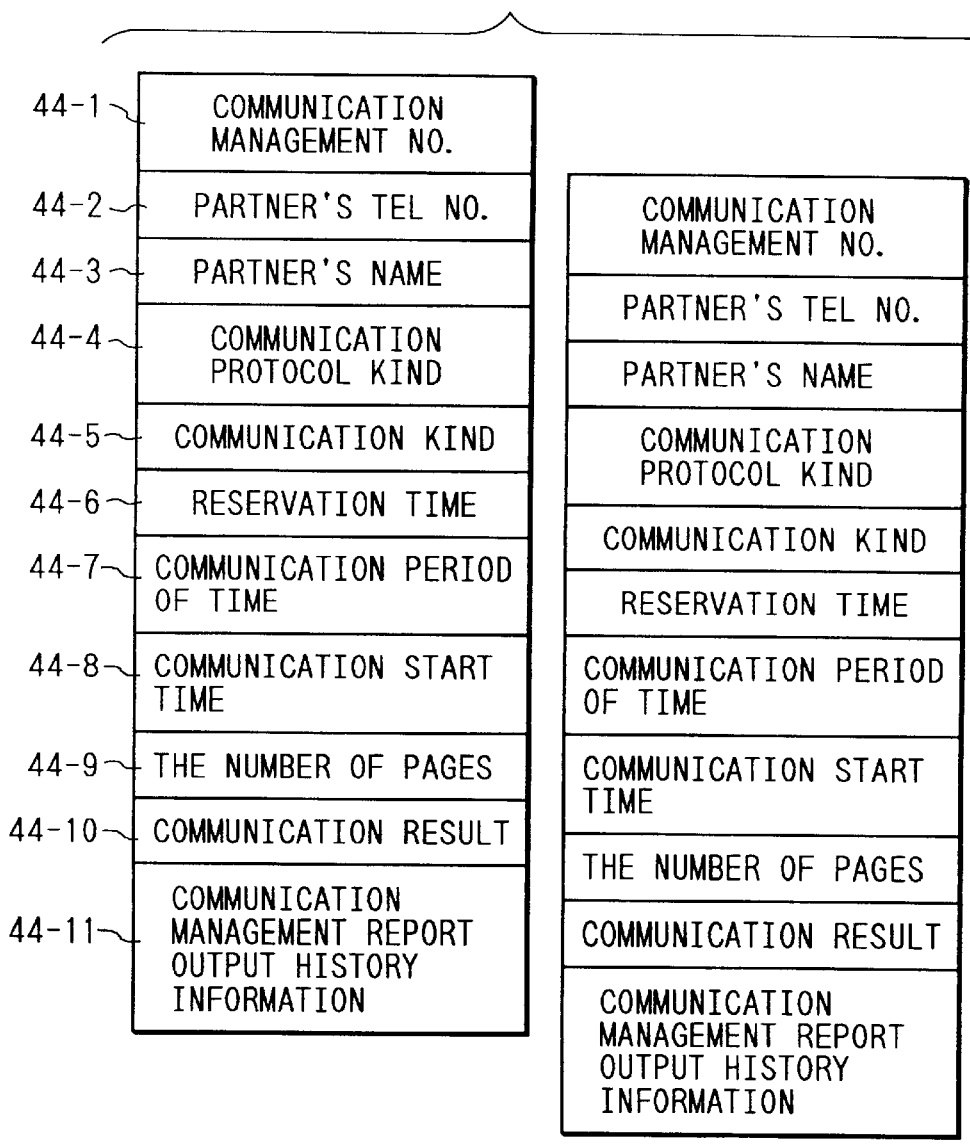
FIG. 44 is a view showing the configuration of communication management information stored in the RAM 103.

On the other hand, if the step S30-002 identifies that the communication management information has not been informed as the transmission information, or that the communication management report history information 44-011 for the communication management information, shown in FIG. 44, indicates absence of issuance of the transmission information, the sequence proceeds to a step S30-004.

The step S30-004 discriminates whether the communication result in said communication management information indicates an error. If the result 44-010 shown in FIG. 44 indicates "normal termination", the sequence proceeds to a step S30-005.

The step S30-005 generates transmission information indicating "normal termination" as the transmission status, and the sequence proceeds to a step S30-012.

On the other hand, if the step S30-004 identifies that the communication result 44-010 indicates "error termination", the sequence proceeds to a step S30-006.

The step S30-006 generates transmission information indicating "error termination" as the transmission status, and the sequence proceeds to a step S30-012.

On the other hand, if the step S30-001 identifies that the communication management number 44-001 of the communication management information, shown in FIG. 44, does not coincide with the acceptance number designated by the transmission information getting command or that the kind of communication 44-005 in FIG. 44 does not indicate "transmission", the sequence proceeds to a step S30-007.

The step S30-007 discriminates whether the object of transmission of the acceptance number designated by the transmission information getting command is present in the transmission cue, and, if not, the sequence proceeds to a step S30-008.

The step S30-008 sends, to the interface control task, an NG response indicating the absence of the object of transmission of the designated acceptance number, and the GET SEND INFO process is terminated.

On the other hand, if the step S30-007 identifies that the object of transmission of the designated acceptance number is present in the transmission cue, the sequence proceeds to a step S30-009.

The step S30-009 discriminates whether said object of transmission is in the course of transmission, and the sequence proceeds to a step S30-011 respectively if said object is in the course of transmission or not.

The step S30-010 generates transmission information indicating "transmission in progress" as the transmission status and the sequence proceeds to a step S30-012. The step S30-011 generates transmission information indicating "stand-by for transmission" as transmission status, and the sequence proceeds to the step S30-012.

The step S30-012 sends the OK response and the transmission information generated in the steps S30-005, S30-006, S30-010 or S30-011 to the interface control task and request the return of said OK response and said transmission information, and the sequence proceeds to a step S30-013.

The step S30-013 discriminates whether a message indicating the success of return of the OK response and the transmission information is received from the interface control task, and the sequence proceeds to a step S30-015 or S30-014 respectively if said message is received or not.

The step S30-014 discriminates whether a message indicating that the return of the OK response and the transmission information cannot be achieved within a predetermined time is received from the interface control task, and, if received, the GET SEND INFO process is immediately terminated, but, if not, the sequence returns to the step S30-013.

Then a step S30-015 discriminates whether the transmission information, of which return is requested in the step S30-012 indicates "normal termination" or "error termination" and, if so, the sequence proceeds to a step S30-016, but, if not, the GET SEND INFO process is terminated.

The step S30-016 renews the communication management report output history information 44-011 of the communication management information, referred to in the step S30-04 for discriminating whether the result of transmission is an error, so as to indicate that the transmission is an error, so as to indicate that the transmission information is already informed, and the GET SEND INFO process is terminated.

Through the above-explained processes, the facsimile apparatus of the present embodiment can inform the transmission information, such as the "normal termination", "error termination", "transmission in progress" or "transmission stand-by state" of each object of transmission, required in the management of the object of transmission requested by the information processing terminal 109 in the SEND FILE process etc., without constructing a new information structure different from the existing communication management information.

6. Upload File (UPLOAD FILE) Process:

FIGS. 32A to 34 are flow chart of the file upload process for transferring the image data, stored in the image memory of the RAM 103 of the facsimile apparatus, to the information processing terminal 109, in the unit of each file managed by the facsimile apparatus.

The UPLOAD FILE process is executed when the command process task shown in FIGS. 8A and 8B receives a message from the interface control task and if the received command is a file transfer command.

At first a step S32-001 discriminates whether the file upload process is possible as will be explained later (FIG. 35), in order to prevent erroneous operation resulting from the common use of the image buffer of the RAM 103 for the communication through the communication unit 104 and for the data transfer to the information processing terminal 109. Then the sequence branches from steps S32-002 to S32-003 or a step S32-028 respectively if the step S32-001 identifies that the file upload process is possible or not.

The step S32-003 turns of the interface LED for informing, to the operator, that the command process is in progress and that the local operation (manual operation on the operation panel 112) is inhibited, and the sequence proceeds to a step S32-004.

The step S32-004 sends an OK response to the interface control task and request return of the OK response. If a step S32-005 receives, from the interface control task, a message indicating the success of OK return, the sequence proceeds to a step S32-007, but, if not, the sequence proceeds to a step S32-006.

If the step S32-006 receives, from the interface control task, a message indicating that the OK return did not succeed within a predetermined time, the sequence proceeds to a step S32-028, but, if not, the sequence returns to the step S32-005.

Then, if the step S32-007 receives, from the interface control task, a message indicating a next command, the sequence proceeds to a step S32-009, but, if not, the sequence proceeds to a step S32-008.

If the step S32-008 cannot receive, from the interface control task, the message indicating the next command within a predetermined time, the sequence proceeds to a step S32-028, but, if otherwise, the sequence returns to the step S32-007.

The step S32-009 discriminates whether the message, received in the step S32-007, indicates a request page information command, and, if not, the sequence proceeds to a step S32-010.

The step S32-010 sends an NG response indicating a sequence error to the interface control task, and the sequence proceeds to a step S32-028.

On the other hand, if the step S32-009 identifies that the received message indicates the request page information command, the sequence proceeds to a step S32-011.

The step S32-011 discriminates whether the indication of the request page information, such as the encoding method and the resolution, is correct or not, as will be explained later, and the sequence proceeds to a step S32-012.

If the step S32-012 identifies that the discrimination of the step S32-011 indicates absence of error, i.e. that the indication of the request page information is correct, the sequence proceeds to a step S32-013, but, if otherwise, the sequence proceeds to a step S32-028.

The step S32-013 sends an OK response to the interface control task and requests return of an OK message.

If a step S32-014 receives, from the interface control task, a message indicating the successful OK return, the sequence proceeds to a step S32-016, but, if not, the sequence proceeds to a step S32-015.

If the step S32-015 receives, from the interface control task a message indicating that the OK return is not successfully conducted within a predetermined time, the sequence proceeds to a step S32-028, but, if otherwise, the sequence returns to the step S32-014.

Then, if the step S32-016 receives, from the interface control task, a message indicating a next command, the sequence proceeds to a step S32-018, but if not, the sequence proceeds to the step S32-017.

If the step S32-017 cannot receive, from the interface control task, the message indicating the next command within a predetermined time, the sequence proceeds to a step S32-028, and, if otherwise, the sequence returns to the step S32-016.

The step S32-018 discriminates whether the message, received in the step S32-017, indicates an image data transfer command, and, if not, the sequence proceeds to a step S32-019.

The step S32-019 sends an NG response indicating a sequence error to the interface control task, and the sequence proceeds to a step S32-028.

On the other hand, if the step S32-018 identifies that the received message indicates an image data transfer request command, the sequence proceeds to a step S32-020.

The step S32-020 discriminates whether the request for image data transfer is correct, as will be explained later, and the sequence proceeds to a step S32-021.

If the step S32-021 identifies that the discrimination of the step S32-020 indicates absence of error, namely if the request for image data transfer is correct, the sequence proceeds to a step S32-022, but, if otherwise, the sequence proceeds to a step S32-028.

The step S32-022 generates image data to be transferred to the information processing terminal 109, as will be explained later, and the sequence proceeds to a step S32-023.

The step S32-023 sends an OK response and the image data generated in the step S32-022 to the interface control task and request return of the OK response and the image data.

If a step S32-024 receives, from the interface control task, a message indicating successful return of the OK response and the image data, the sequence proceeds to a step S32-025.

If the step S32-025 receives, from the interface control task, a message indicating that the return of the OK response and the image data did not succeed within a predetermined time, the sequence proceeds to a step S32-028, but, if otherwise, the sequence returns to the step S32-024.

The step S32-026 discriminates whether the image data, of which return is request in the step 532-022, is the last block of a page. If so, namely if the transfer of a page has been completed, the sequence proceeds to a step S32-027, but, if not, the sequence returns to the step S32-016.

The step S32-027 discriminates whether the image data, of which return is requested in the step S32-023, is the last block of the designated file, and, if so, namely if the next page does not exist, the sequence proceeds to a step S32-028, but, if otherwise, the sequence returns to the step S32-007.

The step S32-028 permits the communication and local operation which have been inhibited, thereby enabling facsimile communication, and the sequence proceeds to a step S32-029.

The step S32-029 turns off the interface LED, turned on in the step S32-003, thereby informing the operator of the permission for the local operation, and the UPLOAD FILE process is terminated.

Figure 35:
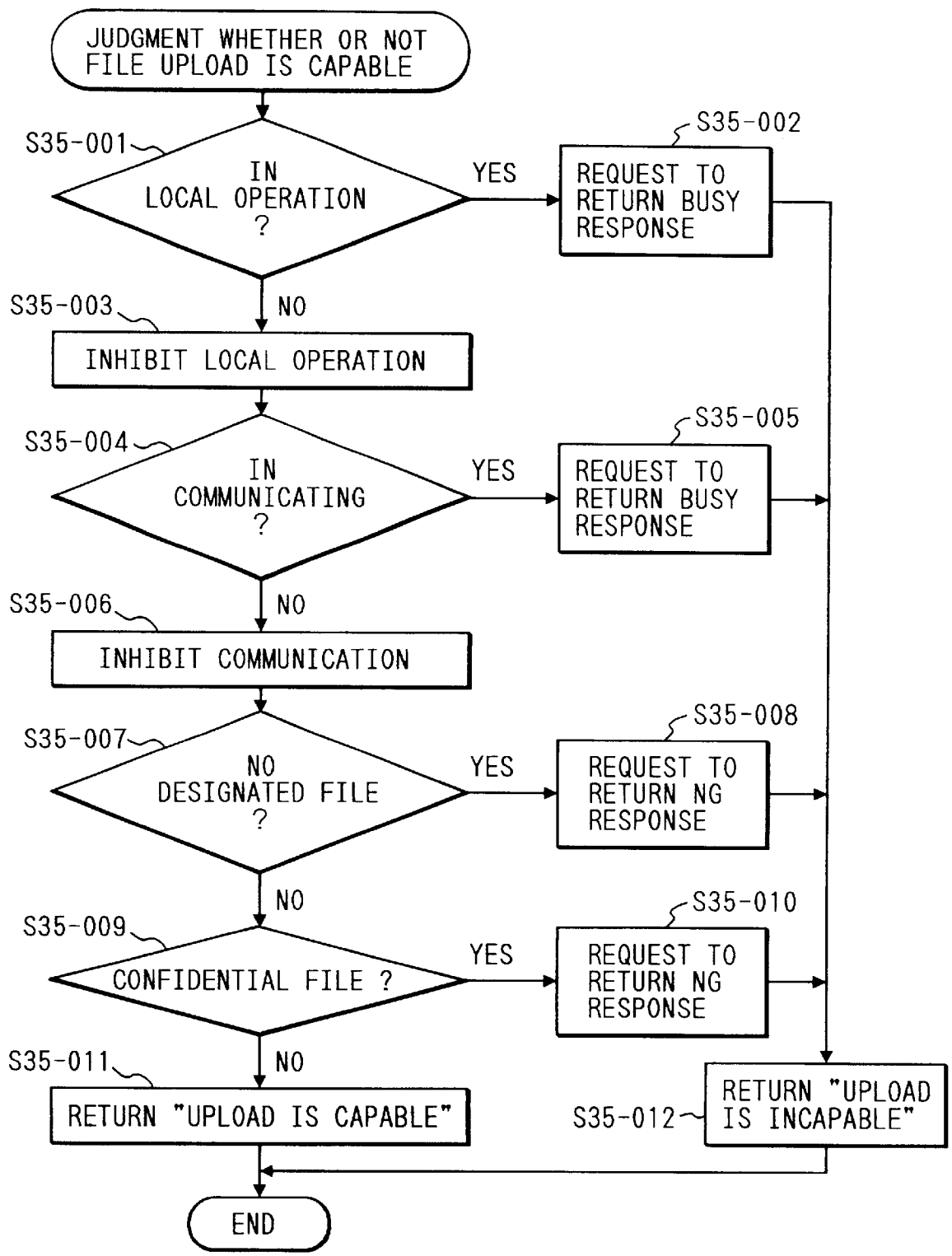
FIG. 35 is a flow chart showing the details of a file upload judgment process in FIGS. 32A and 32B.

FIG. 35 is a flow chart showing the details of the file upload possible/impossible judgment in the step S32-001 in FIG. 32A.

At first a step S35-001 discriminates whether the facsimile apparatus is in the course of a local operation, and, if so, the sequence proceeds to a step S35-002.

The step S35-002 sends a BUSY response to the interface control task, and the sequence proceeds to a step S35-012.

On the other hand, if the step S35-001 identifies that the facsimile apparatus is not in the local operation, the sequence proceeds to a step S35-003.

The step S35-003 inhibits a new local operation, and the sequence proceeds to a step S35-004.

The step S35-004 discriminates whether the facsimile apparatus in the course of a facsimile communication, and, if so, the sequence proceeds to a step S35-005.

The step S35-005 sends a BUSY response to the interface control task, and the sequence proceeds to a step S35-012.

On the other hand, if the step S35-004 identifies that the facsimile apparatus is not in the communication, the sequence proceeds to a step S35-006.

The step S35-006 inhibits a new communication, and the sequence proceeds to a step S35-007.

The step S35-007 discriminates whether a file designated by the file transfer request command is present, and, if not, the sequence proceeds to a step S35-008.

The step S35-008 sends an NG response, indicating the absence of the designated file, to the interface control task, and the sequence proceeds to a step S35-012.

On the other hand, if the step S35-007 identifies the presence of the designated file, the sequence proceeds to a step S35-009.

The step S35-009 discriminates whether the file designated by the file transfer request command is a confidential file, and, if so, the sequence proceeds to a step S35-010.

The step S35-010 sends an NG response indicating that the designated file is ineffective to the interface control task, and the sequence proceeds to a step S35-012.

On the other hand, if the step S35-009 identifies that the designated file is not confidential, the sequence proceeds to a step S35-011.

The step S35-011 informs the process of the caller side that the file upload is possible, and the file upload possible/impossible judgment process is terminated.

Figure 32B:
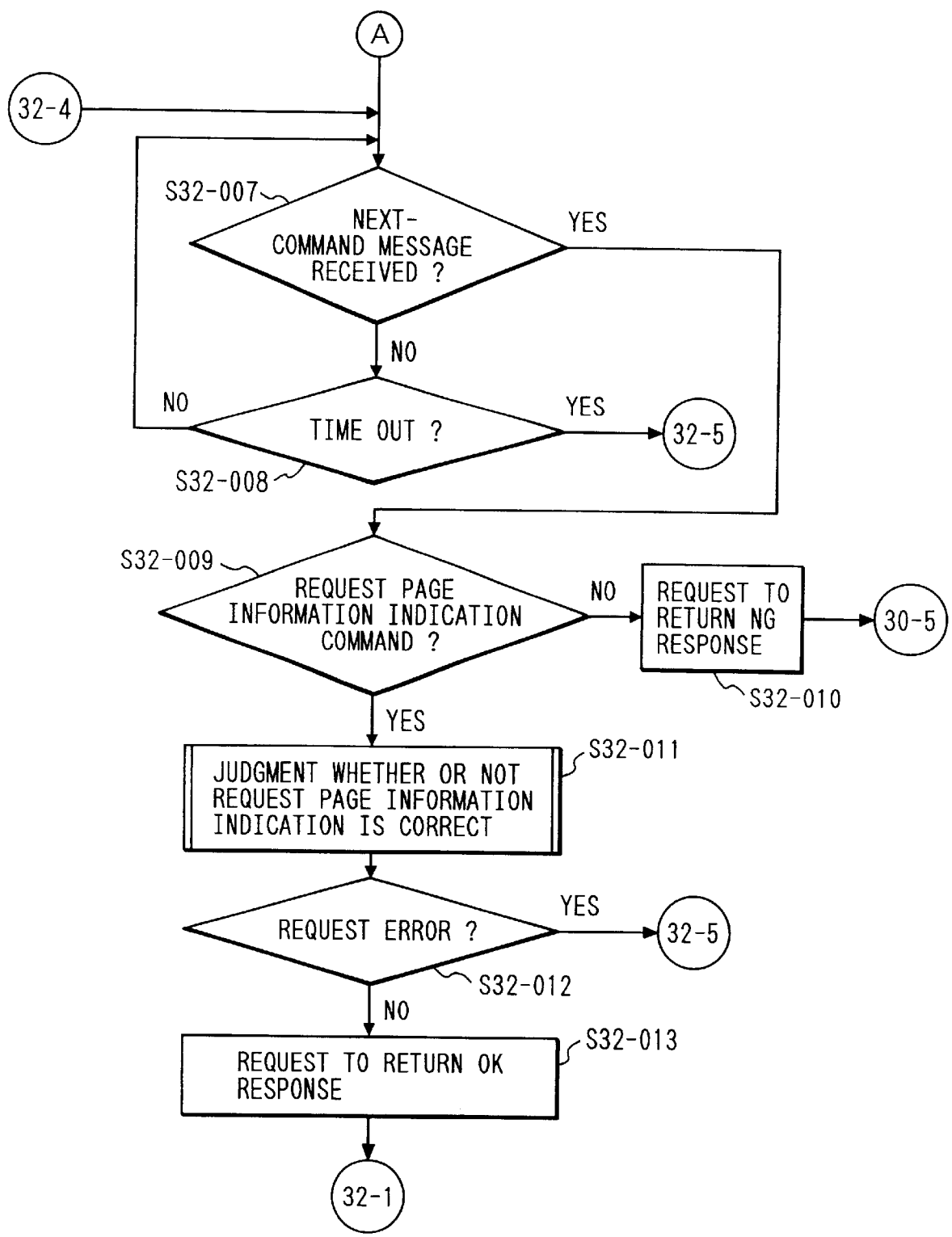
FIG. 32, composed of FIGS. 32A and 32B.
Figure 36:
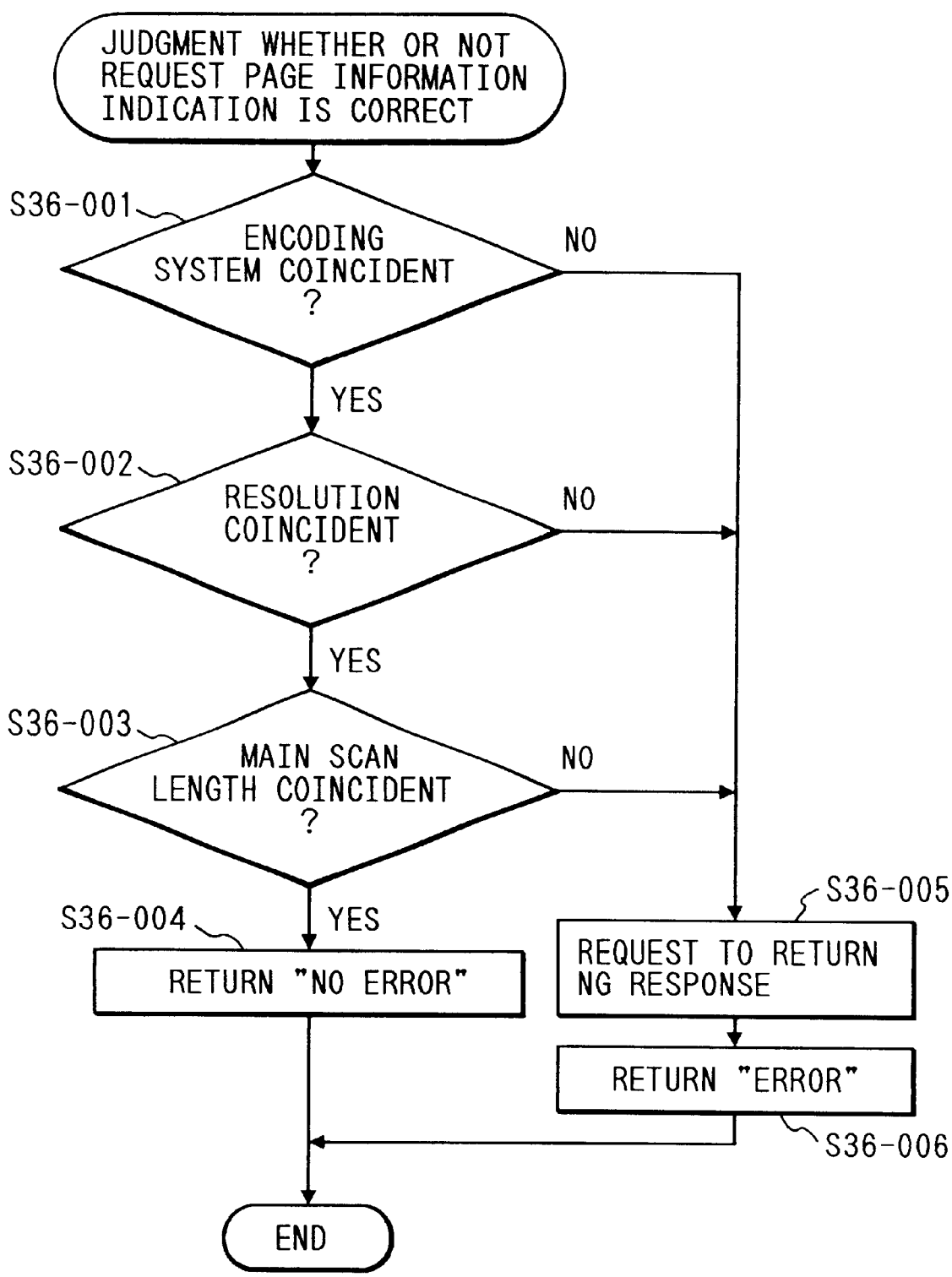
FIG. 36 is a flow chart showing the details of a page information request judgment in FIGS. 32A and 32B.

The step S35-012 informs the process of the caller side that the file upload is impossible, and the file upload possible/impossible judgment process is terminated. FIG. 36 is a flow chart showing the details of a process for judging whether the request page information indication, in the step S32-011 in FIG. 32B, is correct.

At first a step S36-001 discriminates whether the encoding method designated by the request page information command coincides with that of the image file, designated by the aforementioned file transfer request command. The encoding method is selected from "MH", "MR" and "MMR" described in ITU-T recommendation T-4 and T-30. The sequence proceeds to a step S36-002 or S36-005 respectively in case of coincidence or non-coincidence.

The step S36-002 discriminates whether the resolution designated by the request page information command coincides with that of the corresponding page of the image file stored in the facsimile apparatus and designated by said file transfer request command. The resolution is, according to the ITU-T recommendation T-4 and T-30, either "standard" with a main scanning resolution of 8 dot/mm and a sub scanning resolution of 3.75 line/mm, or "fine" with a main scanning resolution of 8 dot/mm and a sub scanning resolution of 7.7 line/mm. The sequence proceeds to a step S36-003 or S36-005 respectively in case of coincidence or non-coincidence.

The step S36-003 discriminates whether the main scanning length, designated by the request page information command coincides with that of the corresponding page of the image file, stored in the facsimile apparatus and designated by said file transfer request command. The main scanning length is the lateral length of the sheet when placed vertically oblong, and can be selected from "A4", "B4" and "A3", corresponding to the ITU-T recommendation T-4 and T-30. The sequence proceeds to a step S36-004 or S36-005 respectively in case of coincidence or non-coincidence.

The step S36-004 informs the process of the caller side of the absence of error in the request page information command, and the process for judging whether the request page information indication is terminated.

The step S36-005, executed in case of non-coincidence in the encoding method, resolution or main scanning length in the step S36-001, S36-002 or S36-003, sends an NG response indicating that the parameter is ineffective, to the interface control task, and the sequence proceeds to a step S36-006.

The step S36-006 informs the process of the caller side of the presence of an error in the request page information command, and the correct/incorrect judgment process is terminated.

Figure 33B:
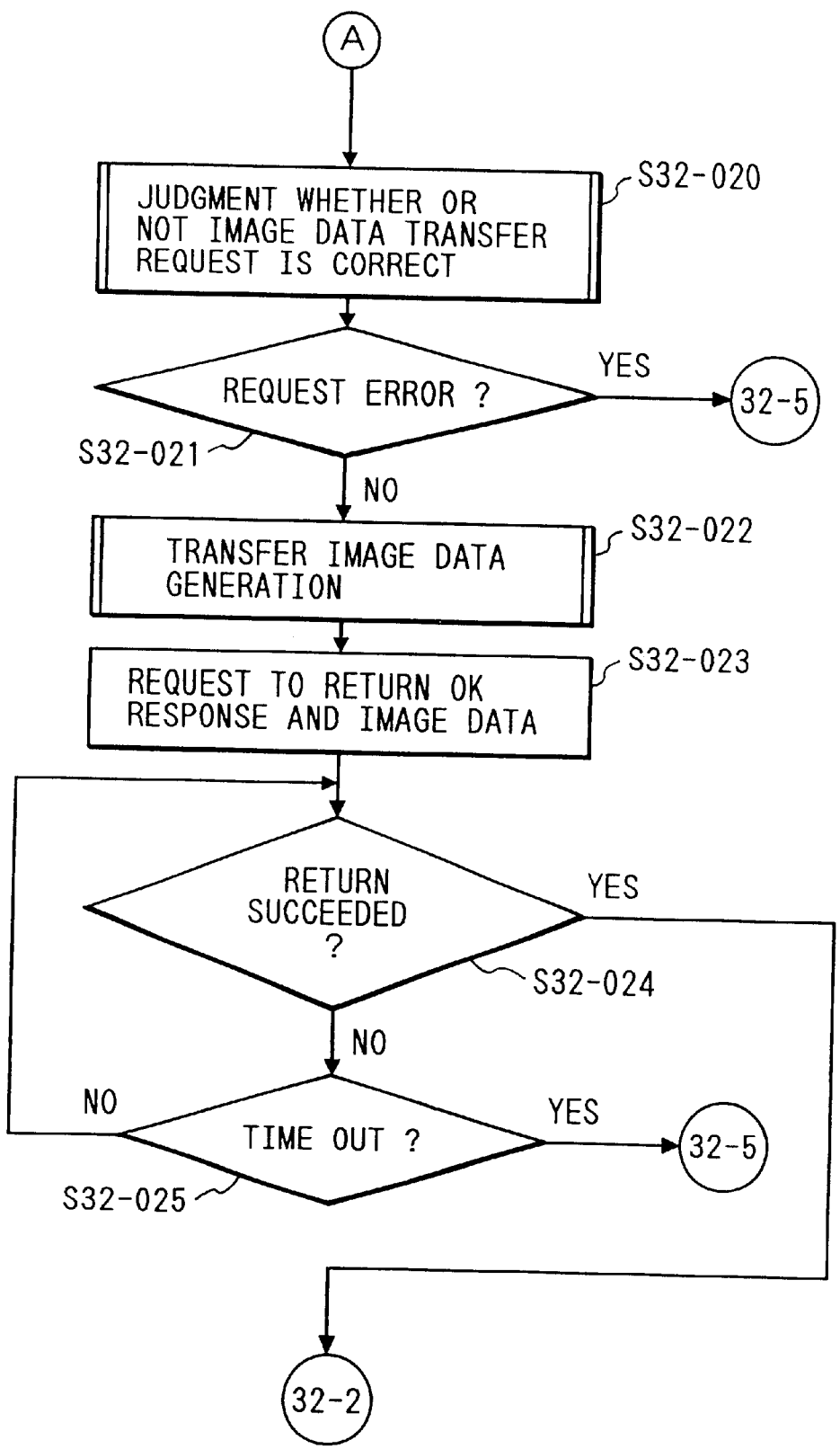
FIG. 33, composed of FIGS. 33A and 33B.
Figure 34:
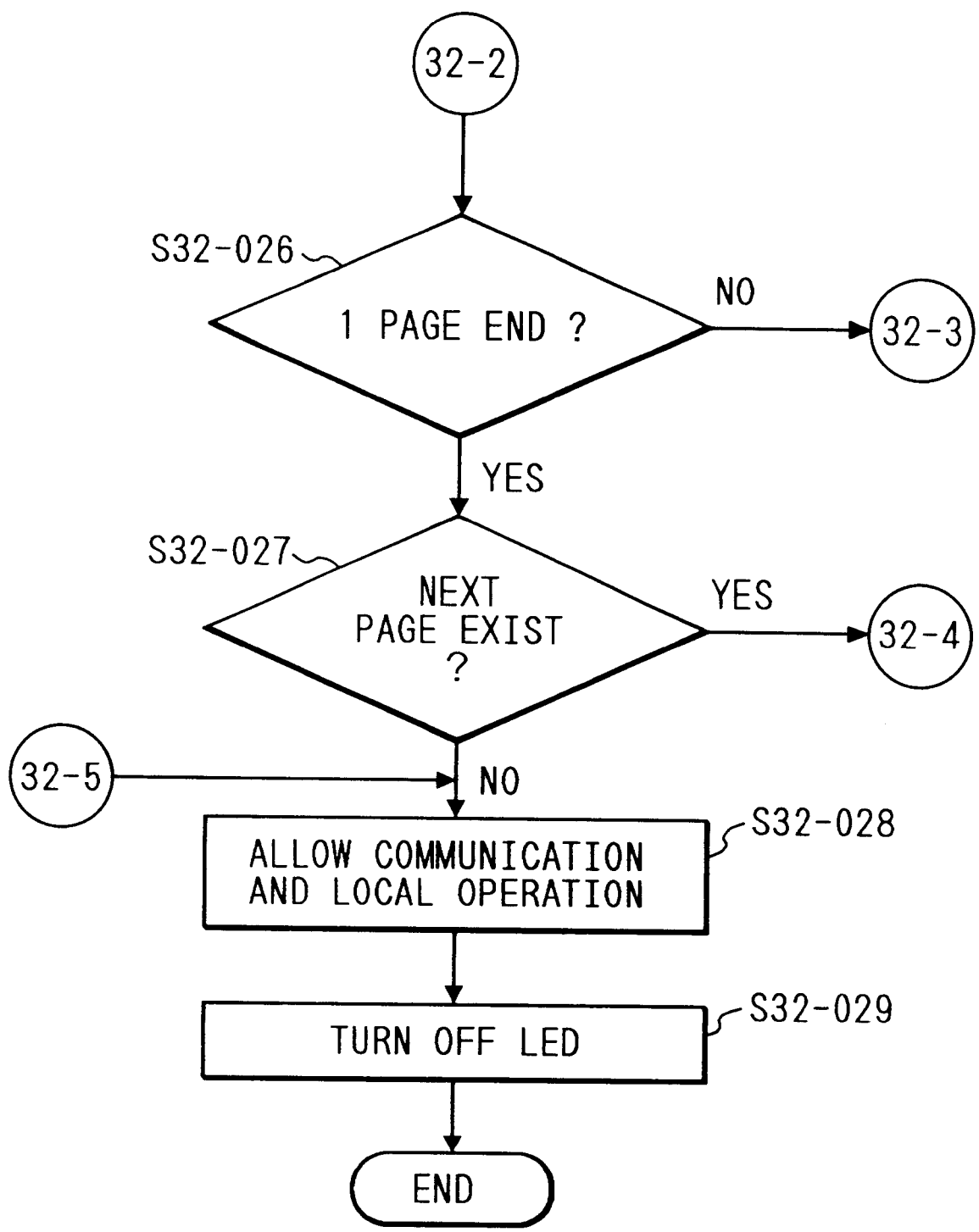
FIG. 34 are flow charts showing an upload film process.
Figure 37:
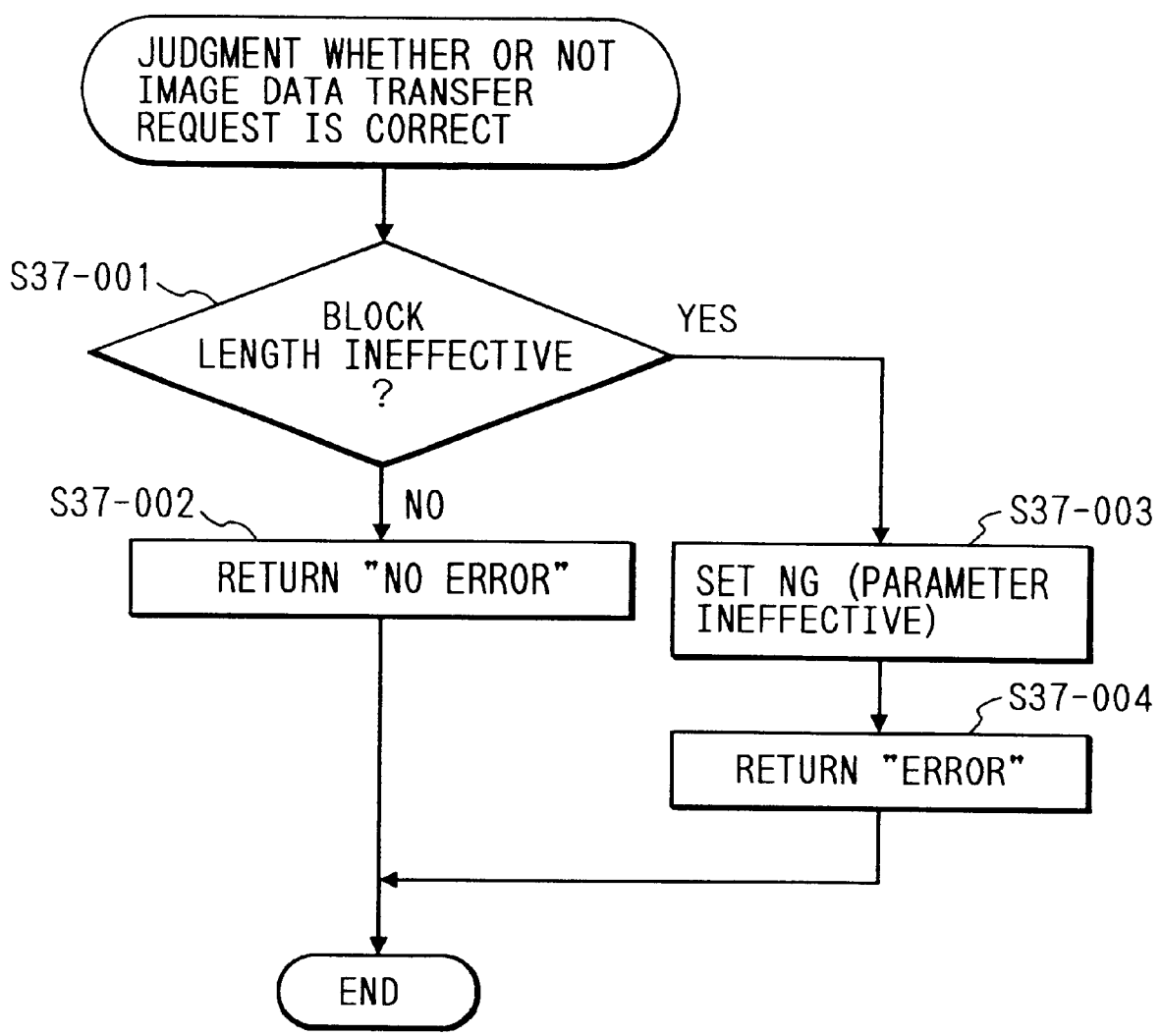
FIG. 37 is a flow chart showing the details of an image data transfer request judgment process in FIGS. 33A and 33B.

FIG. 37 is a flow chart showing the details of a process for judging whether the image data transfer request, in the step S32-020 in FIG. 33B, is correct.

At first a step S37-001 discriminates whether the block length, designated by the image data transfer request command is effective or not. If the block length is longer than the header data length to be explained later, it is judged effective and the sequence proceeds to a step S37-002, but, if not, the sequence proceeds to a step S37-003.

The step S37-002 informs the process of the caller side of the absence of error in the image data transfer command, and terminates the image data transfer request judgment process.

On the other hand, the step S37-003 sends an NG response, indicating that the block length is ineffective to the interface control task, and the sequence proceeds to a step S37-004.

The step S37-002 informs the process of the caller side of the absence of error in the image data transfer command, and terminates the image data transfer request judgment process.

Figure 38:
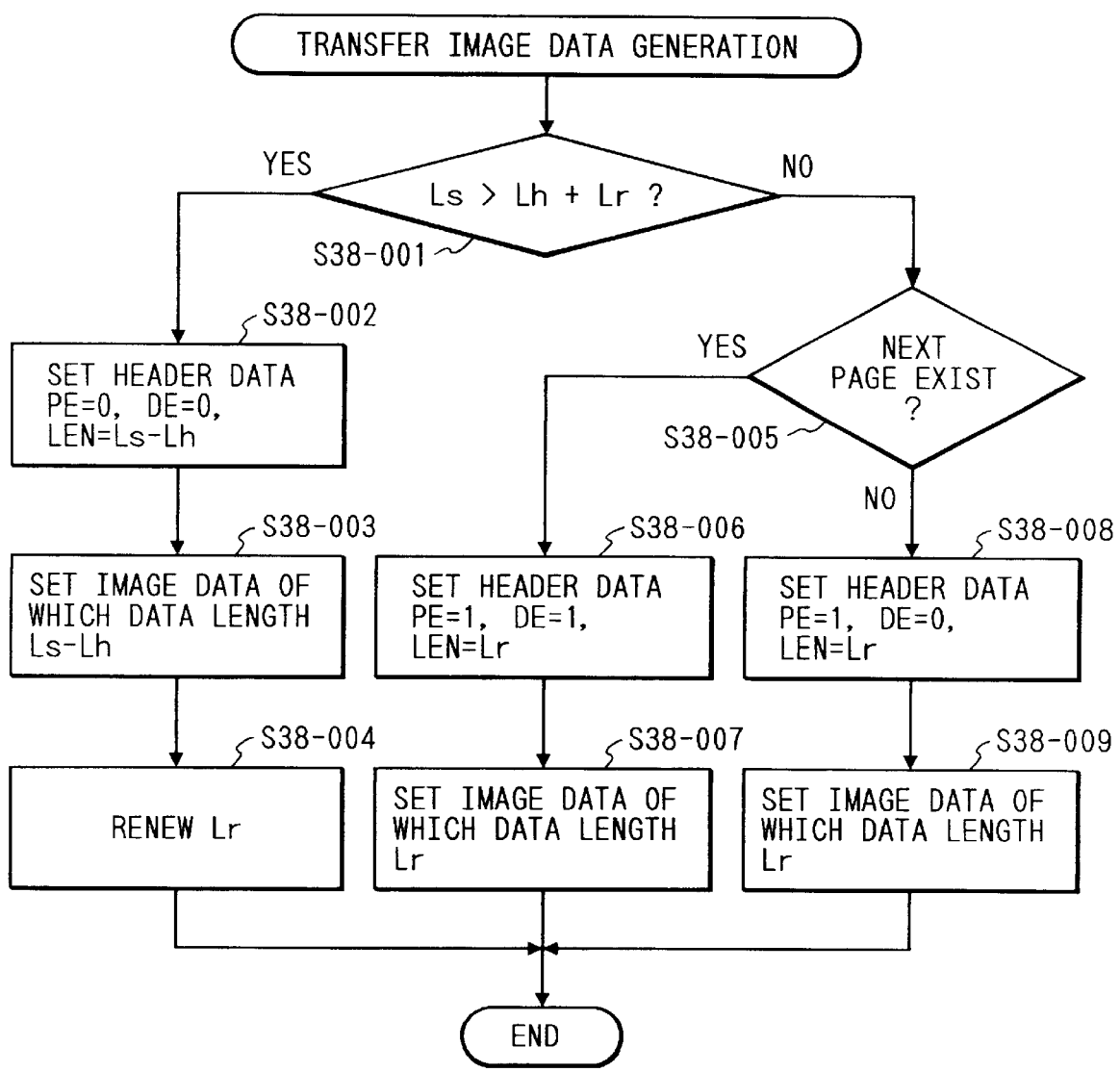
FIG. 38 is a flow chart showing the details of a transfer image data generation process in FIGS. 33A and 33B.

FIG. 38 is a flow chart showing the details of the transfer image data generation in the step S32-022 in FIG. 33B.

At first a step S38-001 compares the block length Ls, designated by the aforementioned image data transfer request command, with the quantity Lr of untransferred page data (residual page data length). The data length of the header attached immediately in front of each image data block is represented by Lh. Said header contains a PE flag indicating the rear end of a page, a DE flag indicating the end of a file, and the length LEN of the image data ensuing the header. If Ls>Lh+Lr stands, i.e. if the block length designated by the image data transfer request command is longer than the sum of the header data length and the residual page data length, the sequence proceeds to a step S38-002.

The step S38-002 sets, in the image buffer of the RAM 103 to be used in the data transfer to the information processing terminal 109, header data consisting of PE=0 indicating non-page end, DE=0 indicating non-file end and LEN=Ls−Lh indicating the length of the image data following the header, and the sequence proceeds to a step S38-003.

The step S38-003 copies the image data from the image memory of the RAM 103 to the image buffer of the RAM 103, used in the data transfer to the information processing terminal 109, in such a manner that the data length becomes LEN=Ls−Lh, and the sequence proceeds to a step 600-004.

The step S38-004 renews the quantity Lr of the untransferred page data to Lr=LEN, and the transfer image data generation process is terminated.

On the other hand, if Ls>Lh+Lr does not stand in the step S38-001, i.e. if the block length designated by the image data transfer request command is equal to or smaller than the sum of the header data length and the residual page data length, the sequence proceeds to a step S38-005.

The step S38-005 discriminates whether a next page exists, and, if a new page exists after the current page to be transmitted, the sequence proceeds to a step S38-006.

The step S38-006 sets header data, consisting of PE=1 indicating page end, DE=0 indicating non-file end and the length LEN=Lr of the image data following the header, in the image buffer of the RAM 103, to be used in the data transfer to the information processing terminal 109, and the sequence proceeds to a step S38-007.

The step S38-007 copies the remaining image data of a data length LEN=Lr from the image memory of the RAM 103 to the image buffer of the RAM 103, used in the data transfer to the information processing terminal 109, and the transfer image data generation process is terminated.

On the other hand, if the step S38-005 identifies the absence of a new page after the current page to be transferred, the sequence proceeds to a step S38-008.

The step S38-008 sets header data, consisting of PE=1 indicating page end, DE=1 indicating file end the length LEN=Lr of the image data following the header, in the image buffer of the RAM 103 to be used in the data transfer to the information processing terminal 109, and the sequence proceeds to a step S38-009.

The step S38-009 copies the remaining image data of a data length LEN=Lr from the image memory of the RAM 103 to the image buffer of the RAM 103, used in the data transfer to the information processing terminal 109, and the transfer image data generation process is terminated.

Utilizing the above-explained process, the facsimile apparatus of the present embodiment can transfer the image data, stored in the image memory of the RAM 103, to the information processing terminal 109 in the unit of a file managed by the facsimile apparatus, while using the image buffer on the RAM 103 both in the communication through the communication unit 103 and in the data transfer to the information processing terminal.

Also the facsimile apparatus of the present embodiment transfers the image data of each page, divided into blocks of a size designated by the information processing terminal 109.

Furthermore, in the image data transfer of each page divided in the block size designated by the information processing terminal 109, the facsimile apparatus of the present embodiment adds, immediately in front of the image data, a header containing the information on the page end, data end and the size of the ensuring actual image data. Also in case the untransferred image data in the facsimile apparatus is less than the block size designated by the information processing terminal 109, said header is utilized with suitably modified information on the actual image data size to transfer the data, less than said block size designated by the information processing terminal 109, to said information processing terminal 109.

The above-explained process enables to transfer the image file, managed by the facsimile apparatus, to the information processing terminal 109, while using in common the buffer used in the communication between the plural facsimile apparatus through the telephone line and the buffer used for data transfer to the information processing terminal 109. It is thus rendered possible to reduce the RAM quantity for the buffers and to achieve the file upload function with a reduced cost.

Also the inhibition of the file upload function during the local operation significantly simplifies the program structure and allows to develop the file upload function within a short time.

Furthermore, it is made possible to designate the block length when the information processing terminal 109 requests actual transfer of the image data. More specifically, the information processing terminal 109 can declare the block length managed thereby in each request, independently from the facsimile apparatus, so that the load on the information processing terminal 109 can be alleviated.

Furthermore, the header containing the information on the page end, data end and size of the ensuing actual image data is added when the facsimile apparatus requests the transfer of the actual image data. Thus, in case the untransferred image data in the facsimile apparatus is less than the block size designated by the information processing terminal 109, it is rendered possible to transfer the data, less than said block size designated by the information processing terminal 109, to said terminal 109, by suitably setting the information on the size of the ensuing actual image data in said header. In this manner it is made possible to reduce redundant data transfer.

Figure 39:
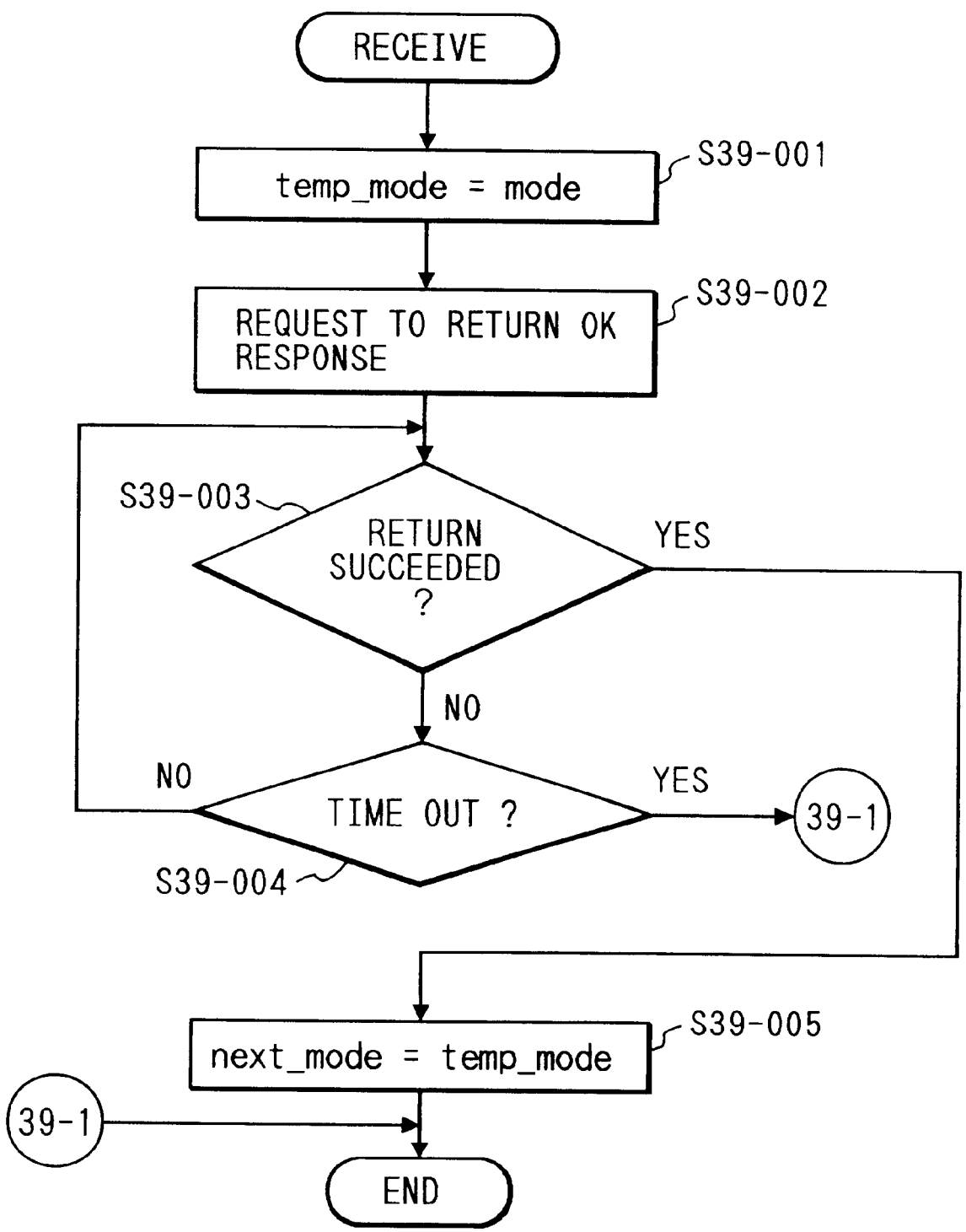
FIG. 39 is a flow chart showing a reception process.

7. Reception (RECEIVE) Process:

FIG. 39 is a flow chart of a reception mode changing process for changing the reception mode of the facsimile apparatus of the present embodiment to "standard reception", "memory reception" or "memory reception and record output".

The RECEIVE process is executed when a message is received from the interface control task in the command process task shown in FIGS. 8A and 8B and if the received command is a reception mode change command.

At first a step S39-001 copies the reception mode, indicated by the reception mode change command, in a temporary mode retaining area "temp$_{13}$ mode" secured in the work area of the RAM 103, and the sequence proceeds to a step S39-002.

The step S39-002 sends an OK response as a message to the interface control task, and the sequence proceeds to a step S39-003.

The step S39-003 discriminates whether a message, indicating successful return of the OK response, has been received from the interface control task, and the sequence proceeds to a step S39-005 or S39-004 respectively if said message has been received or not.

The step S39-004 discriminates whether a message, indicating that the return of the OK response has not been achieved within a predetermined time, has been received from the interface control task, and, if received, the RECEIVE process is immediately terminated, but, if not received, the sequence returns to the step S39-003.

The step S39-005 copies the content of the above-mentioned temporary reception mode retaining area "temp__mode" in a next reception mode retaining area "next mode" secured in the work area of the RAM 103, and the RECEIVE process is terminated.

Figure 40:
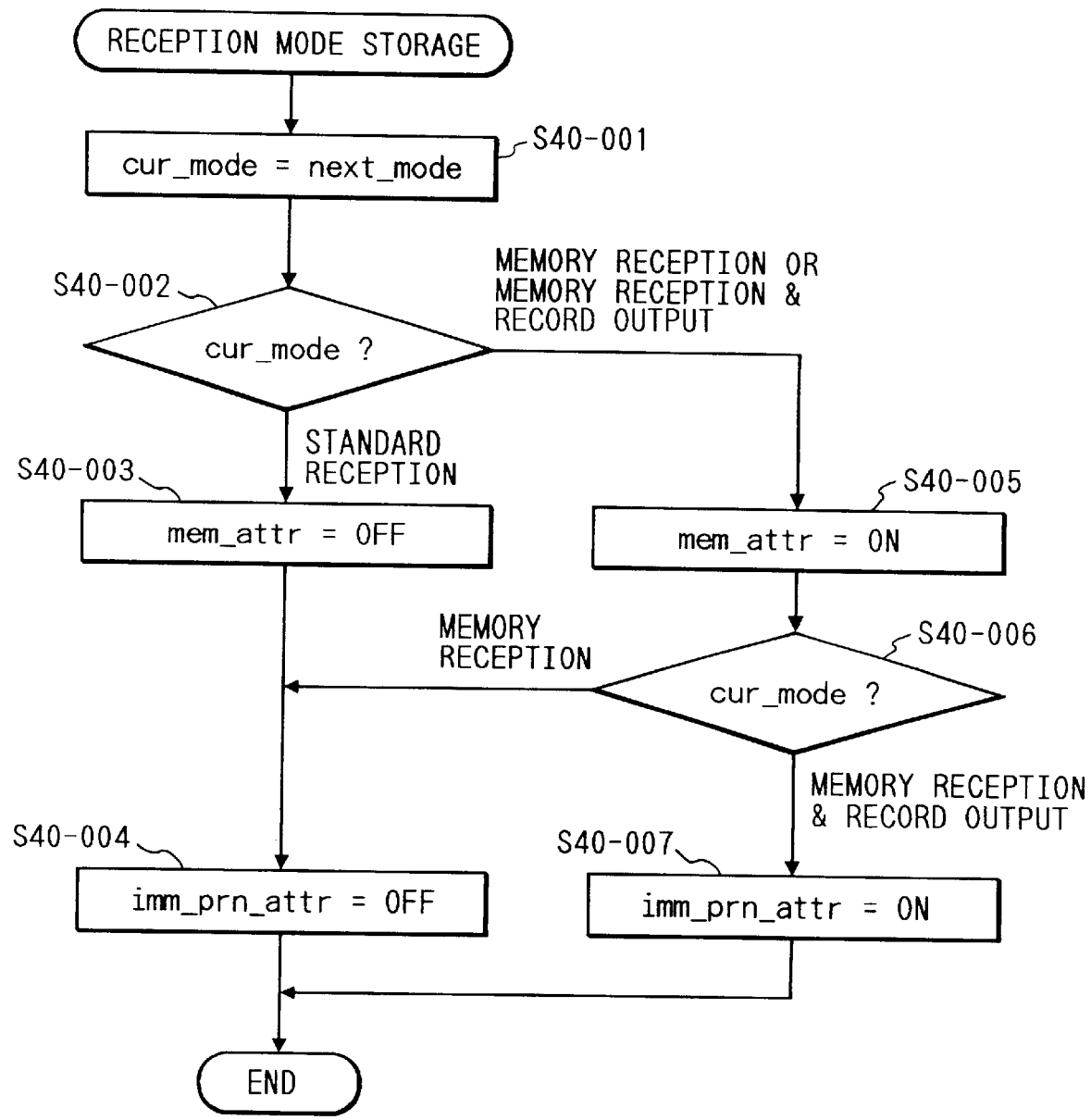
FIG. 40 is a flow chart showing a reception mode storage process.

FIG. 40 is a flow chart of a reception mode storage process for storing the attribution of the received image, indicating the reception mode by which the received image is prepared, in each received image.

The reception mode storage process is executed when the facsimile apparatus of the present embodiment starts the facsimile reception, either according to the facsimile transmission procedure by connecting a line in response to the CI detection from a communication line, or in response to a request for facsimile reception from the operator.

At first a step S40-001 copies the content of the above-mentioned next reception mode retaining area "next_mode" in the current reception mode retaining area "cur_mode" secured in the work area of the RAM 103, and the sequence proceeds to a step S40-002.

The step S40-002 judges the reception mode indicated by said "cur_mode", and, if it is "standard reception", the sequence proceeds to a step S40-003.

The step S40-003 sets the memory reception attribution "men_attr" of the received image at OFF, indicating that the memory reception is not selected, and the sequence proceeds to a step S40-004.

Also the step S40-003 sets the immediate print attribution "imm_prn_attr" in the memory reception of said received image at OFF, indicating that the immediate printing is not selected at the memory reception, and the reception mode storage process is terminated.

On the other hand, if the step S40-002 identifies that the current reception mode is not "standard reception" but "memory reception" or "memory reception and print output", the sequence proceeds to a step S40-005.

The step S40-005 sets the memory reception attribution "men_attr" of the received image at ON, indicating the memory reception, and the sequence proceeds to a step S40-006.

The step S40-006 discriminates whether the above-mentioned current reception mode retaining area "cur_mode" indicates "memory reception" or "memory reception and print output". If the current reception mode is "memory reception", the sequence proceeds to a step S40-003 to set, as explained above, the immediate print attribution "imm_prn_attr" of the memory reception of said received image at OFF, indicating that the immediate printing at the memory reception is not selected, and the reception mode storage process is terminated.

On the other hand, if the step S40-006 identifies that the current reception mode is "memory reception and print output", the sequence proceeds to a step S40-007.

The step S40-007 sets the immediate print attribution "imm_prn_attr" in the memory reception of said received image at ON, indicating the immediate printing at the memory reception, and the reception mode storage process is terminated.

Figure 41:
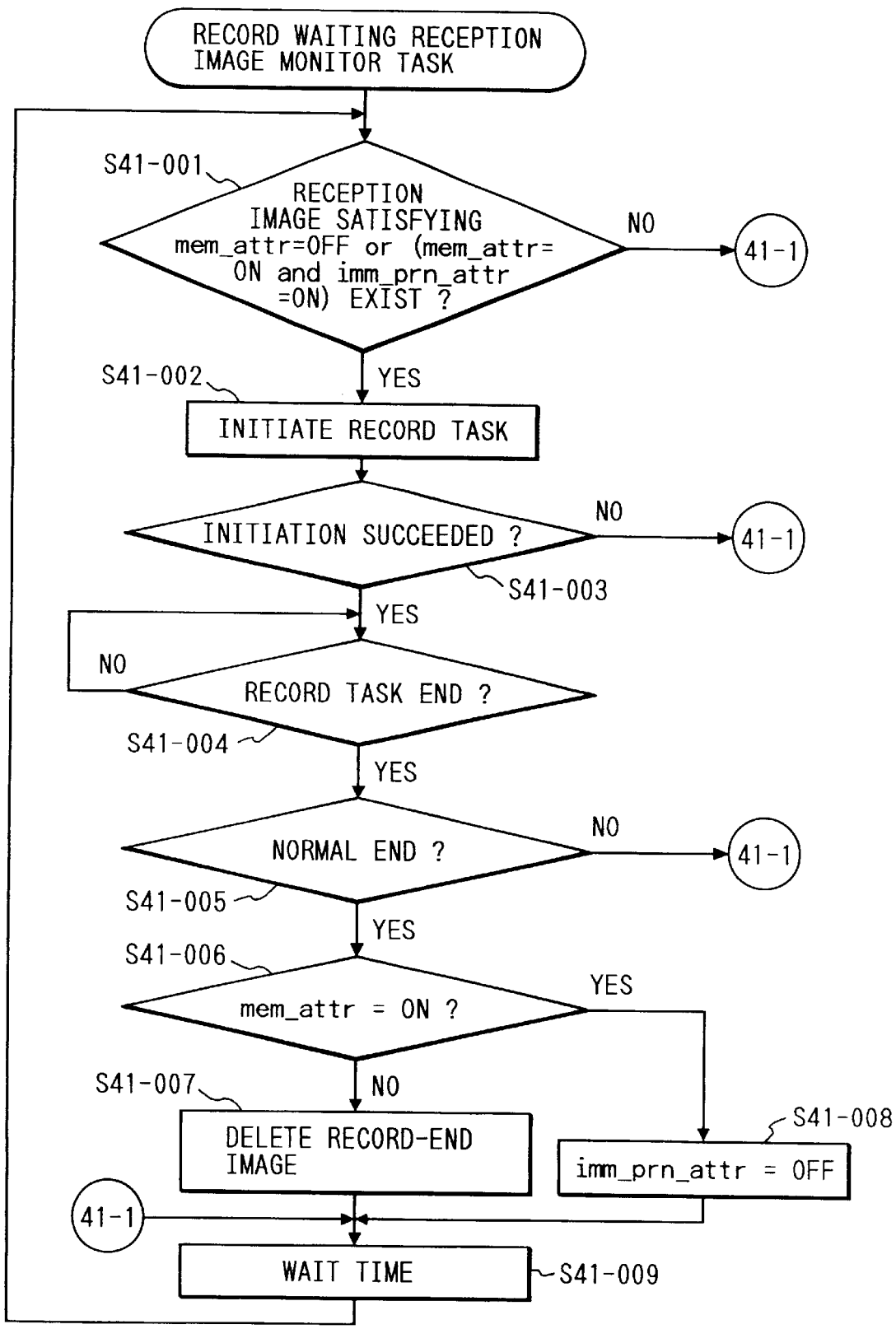
FIG. 41 is a flow chart showing a record waiting reception image monitoring task process.

FIG. 41 is a flow chart showing a record-waiting received image monitor task, for periodically monitoring the received image awaiting the recording operation in the facsimile apparatus of the present embodiment.

At first a step S41-001 searches a received image awaiting the recording, among the received image train. If there exists a received image satisfying a memory reception attribution mem_attr=OFF, or a received image satisfying a memory reception attribution mem_attr=ON and an immediate printing attribution imm_prn_attr=ON at the memory reception, namely if there exists an image received at the "standard reception" mode at the "memory reception and print output" mode among the received images, the sequence proceeds to a step S41-002, but, if not, the sequence proceeds to a step S41-009.

The step S41-002 activates the recording task (cf. FIG. 19), and requests the printed output of the received image, and the sequence proceeds to a step S41-003.

The step S41-003 discriminates whether the activation in the step S41-002 has been successful, and, if successful, the sequence proceeds to a step S41-004, but, if not, to a step S41-009.

If the recording task has been successfully activated, a step S41-004 awaits the completion thereof, and, upon detection of the completion, the sequence proceeds to a step S41-005.

The step S41-005 discriminates whether the recording task has been terminated normally, and, if so, the sequence proceeds to a step S41-006, but, if not, to a step S41-009.

The step S41-006 discriminates whether the memory reception attribution mem_attr of said received image indicates the memory reception. If mem_attr=ON does not stand, i.e. if said received image is received in the "standard reception" mode, the sequence proceeds to a step S41-007, but, if mem_attr=ON stands, namely if said image is received in the "memory reception and print output" mode, the sequence proceeds to a step S41-008.

The step S41-007 deletes said received image, received in the "standard reception" mode, from the image memory of the RAM 103, and the sequence proceeds to a step S41-009.

On the other hand, the step S41-008 sets the immediate print attribution "imm_prn_attr" at the memory reception of said received image, received in the "memory reception and print output" mode, at OFF indicating the completion of the immediate printing at the memory reception, and the sequence proceeds to a step S41-009.

The step S41-009 interrupts, for a predetermined time, the record-waiting image monitor task for periodically monitoring the received image awaiting the recording, and the step returns to the step S41-001.

Owing to the above-explained process, the facsimile apparatus of the present embodiment can accept the reception mode changing command from the information processing terminal 109 any time, regardless whether the reception process is in progress or not. Also even if there is required a change in the reception mode in the course of reception, and the object of reception is subjected to facsimile reception based on the reception mode at the start of said object, and the facsimile reception based on the changed reception mode is started from the next object of reception.

Thus, owing to the above-explained process, the facsimile apparatus can select, in addition to a mode of accumulating the received image in the memory, then sending said image to the printer unit and erasing said image from the memory after the print output in the printer unit and a mode of accumulating all the received images in the memory without printing in the printer unit, another mode of accumulating the received image in the memory, sending said image to the printer unit and retaining said image in the memory even after print output in the printer unit.

Also these modes can be switched from the information processing unit 109.

Also based on the instruction from the information processing terminal 109, the information relating to reception can be separated from that relating to transmission, and can be informed as a reception status, even during a reception operation.

Also based on the instruction from the information from the information processing terminal 109, the information relating to the result of reception, if once informed as an output, can be prevented from repeated output.

Also in case of changing the reception mode based on the instruction from the information processing terminal 109, such change is executed only if the information that such change of the reception mode is executable is completely transmitted to the information processing terminal 109, and the change of the reception mode is suspended if the information that the change is executable cannot be released within a predetermined time measured by a timer.

Furthermore, in case of output of the reception information according to the instruction from the information processing terminal 109, the completion of the output is memorized only when the reception information can be completely transmitted to the information processing terminal 109, and the completion of the output is not memorized if the reception information cannot be transmitted within a predetermined time measured by a timer.

Figure 42:
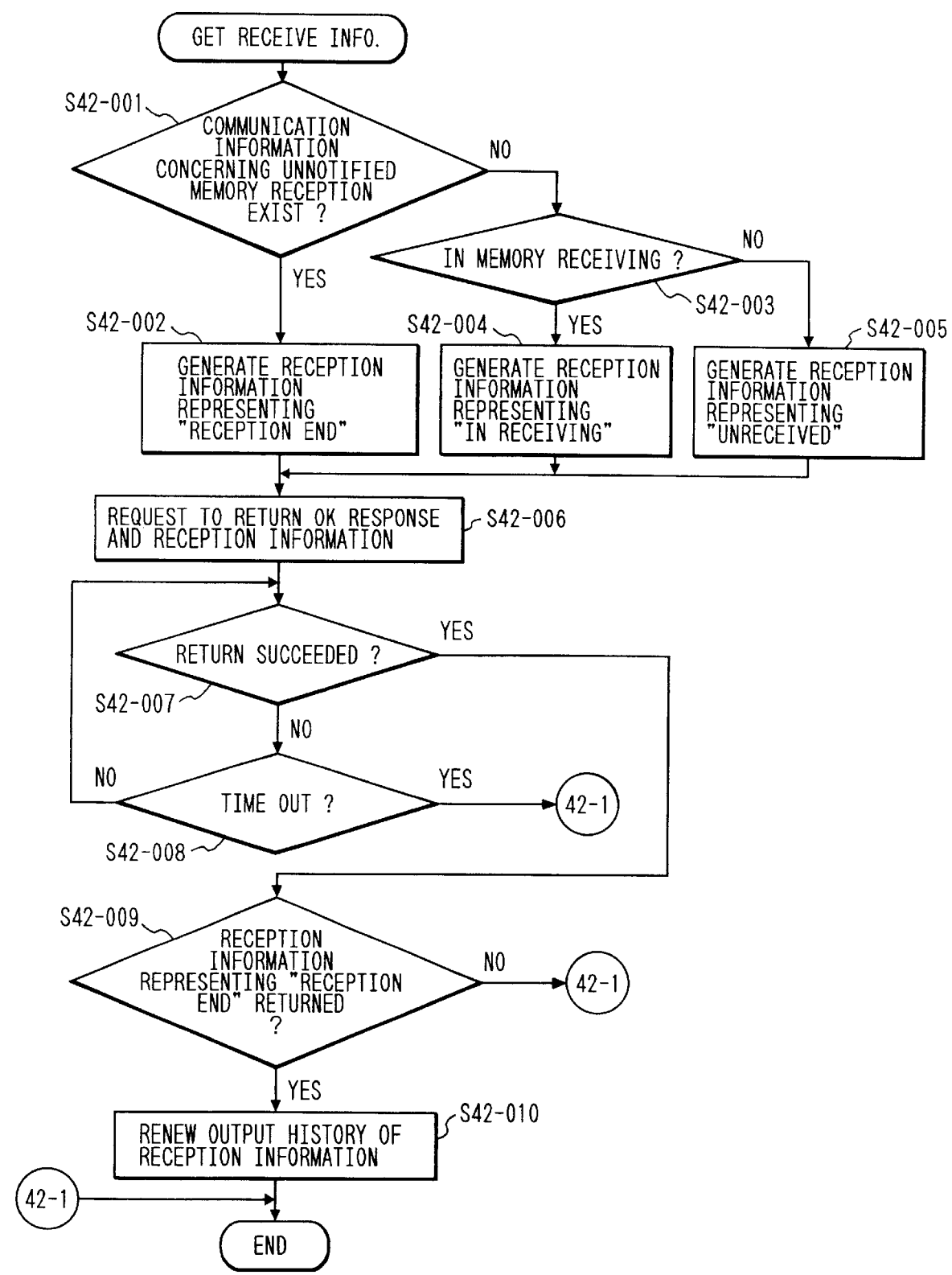
FIG. 42 is a flow chart showing a reception information getting process.

8. Reception Information Getting (GET RECEIVE INFO) Process:

FIG. 42 is a flow chart of a reception information getting (informing) process for transferring the information, relating to the reception of the facsimile apparatus of the present embodiment, to the information processing terminal 109.

The GET RECEIVE INFO process is executed when the command process task in FIGS. 8A and 8B receive a message from the interface control task and if the received command is a reception information getting command.

At first a step S42-001 discriminates whether there is communication information on memory reception, not yet transmitted to the information processing terminal 109. If the communication kind 44-005 of the communication management information shown in FIG. 44 indicates "reception" and "communication by the designation of the information processing terminal 109", and if there is communication management information in which the communication management report output history information 44-011 indicates uninformed reception information, there is selected the oldest communication management information among such uninformed reception information, and the sequence proceeds to a step S42-002. The data indicating "communication by the designation of the information processing terminal 109" on the communication kind 44-005 in the communication management information is automatically set, in case said communication is a reception, in the renewal of the communication management information in the post process of the reception, if the memory reception attribution of said received image indicates the memory reception.

Figure 43:
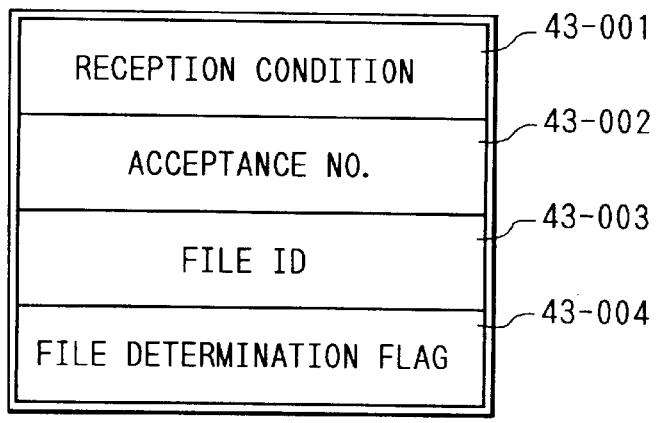
FIG. 43 is a view showing the configuration of reception information.

The step S42-002 generates the reception information, indicating already made receptions, from the communication management information selected in the step S42-001. The reception information is constructed as shown in FIG. 43. In this state, the reception status 43-001 is set as "already received", and the acceptance number 43-002 copies the content of the communication management number 44-001 of the communication management information. In the facsimile apparatus of the present embodiment, as a received image file is generated by a reception, the communication management number is regarded as the file ID. Consequently, the file ID also copies the content of the communication management number 44-001 of the communication management information. Then the file determination flag 43-004 is set at "determined", and the sequence proceeds to a step S43-006.

On the other hand, if the step S42-001 identifies that the information processing terminal 109 does not have any communication information relating to the uninformed memory reception, the sequence proceeds to a step S42-003.

The step S42-003 discriminates whether memory reception is currently in progress. If the memory reception is in progress and the memory reception attribution of the received image indicates memory reception, the sequence proceeds to a step S42-004.

The step S42-004 generates the reception information indicating that the reception operation is in progress, by setting the reception status at "already received", copying the communication management number of said reception in the acceptance number 43-002 and the file ID, and setting the file determination flag 43-004 at "undetermined", and the sequence proceeds to a step S43-006.

On the other hand, in said step S42-003, if the memory reception is not in progress or if the memory reception attribution of the received image does not indicate the memory reception though the reception is in progress, the sequence proceeds to a step S42-005.

The step S42-005 generates the reception information indicating reception not yet conducted, by setting the reception status 43-001 at "not yet received", copying a value indicating the absence at the acceptance number 43-002 and the file ID 43-003, and setting the file determination flag 43-004 at "undetermined" and the sequence proceeds to a step S42-006.

The step S42-006 sends the OK response and the reception information generated in the step S42-002, S42-004 or S42-005 to the interface control task and requests return of said OK response and reception information, and the sequence proceeds to a step S42-007.

If the step S42-007 receives a message, indicating successful return of the OK response and reception information, from the interface control task, the sequence proceeds to a step S42-009, but, if not received, the sequence proceeds to a step S42-008.

If the step S42-008 receives a message, indicating that the return of the OK response and reception information has not been achieved within a predetermined time, from the interface control task, the GET RECEIVE INFO process is immediately terminated, but, if otherwise, the sequence returns to the step S42-007.

The step S42-009 discriminates whether the reception information, of which return is request in the step S42-996 indicates "reception end", and, if so, the sequence proceeds to a step S42-010, but, if not, the GET RECEIVE INFO process is terminated.

The step S42-010 renews the communication management report output history information 44-011 of the communication management information, referred to in the generation in the step S42-002 of the reception info to be returned, so as to indicate that the reception information has already been informed, and the GET RECEIVE INFO process is terminated.

Owing to the process explained above, the facsimile apparatus of the present embodiment can inform the reception information on the object of reception in the "memory reception" or "memory reception and print output" mode, required particularly in the manipulation of the image data by the information processing terminal 109, completely separate from the reception information on the object of reception in the "standard reception" mode.

9. Communication Management Acceptance Number Getting (GET ACTIVITY ID) Process:

In the following the communication management acceptance number getting (GET ACTIVITY ID) process will be explained with reference to FIGS. 44 and 45.

Figure 45:
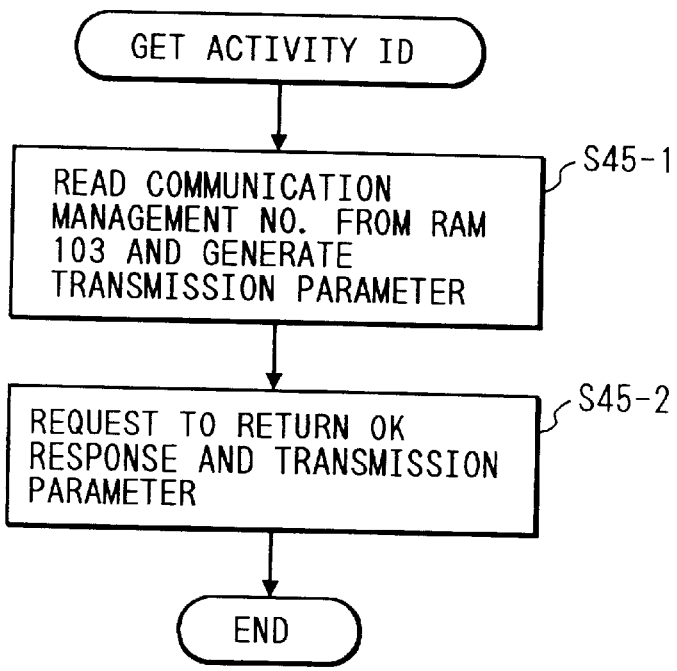

FIG. 44 shows the configuration of the communication management information stored in the RAM 103 of the facsimile apparatus, and FIG. 45 shows the control sequence.

A group from the communication management number 44-1 to the communication management report output history 44-11 constitutes a unit block for memorizing the communication management information of a communication, and an area for 20 communications is secured in the RAM 103 of the facsimile apparatus.

The communication management information stores the information of the latest 20 communications, and, when it becomes full, it is overwritten in the order starting from the oldest communication.

The communication management number 44-1 is an ID number assigned to each communication.

The partner telephone number 44-2 is the telephone number of the partner of communication.

The partner name 44-3 is the name of the partner of communication.

The communication protocol kind 44-4 indicates the communication protocol which is used in the communication and which can be G3, ECM or G4.

The communication kind 44-5 indicates classification of the communication and is composed of a combination of the following factors:

transmission;
reception;
palling;
distribution;
secret;
relay;
relay indication;
relay result;
memory;
timer;
manual;

F network;

telephone;

communication by instruction from the information processing terminal 109.

The reserved time 44-6 is effective for a reserved communication.

The communication time 44-7 indicates the time required for communication, in the unit of seconds.

The communication start time 44-8 indicates the time of start of communication, and contains factors of year, month, day, hour, minute and second.

The page number 44-9 indicates the number of pages of the communication.

The communication result 44-10 indicates the result of communication, which is either the normal termination or the error termination.

The communication management report output history information 44-11 indicates whether the communication management information of the communication has been outputted in the communication management report.

Said history information 44-11 independently has the information for the output of the communication management report from the facsimile apparatus and that for transmission of the communication management information to the information processing terminal 109. A step S45-1 in FIG. 45 reads the communication management number 44-1 shown in FIG. 44, from the communication management information stored in the work area of the RAM 103 and generates the transmission parameter on the image buffer in the RAM 103, then a step S45-2 requests the I/F control task to transmit said transmission parameter and an OK response, and the sequence is terminated.

10. Communication Management Information Getting (GET ACTIVITY INFO) Process:

This process is to transmit the communication management information to the information processing terminal 109 thereby enabling to refer to the communication management information on the information processing terminal 109.

In this process, as a large amount of data is transmitted to the information processing terminal 109, the transmission parameter is processed on the image buffer. If plural processes utilizing the image buffer are conducted simultaneously, there may occur mutual destruction of the data. Consequently, during the GET ACTIVITY INFO process, other processes utilizing the image buffer are inhibited.

In the following, this process will be explained with reference to FIGS. 44 and 46 to 48.

Figure 47:
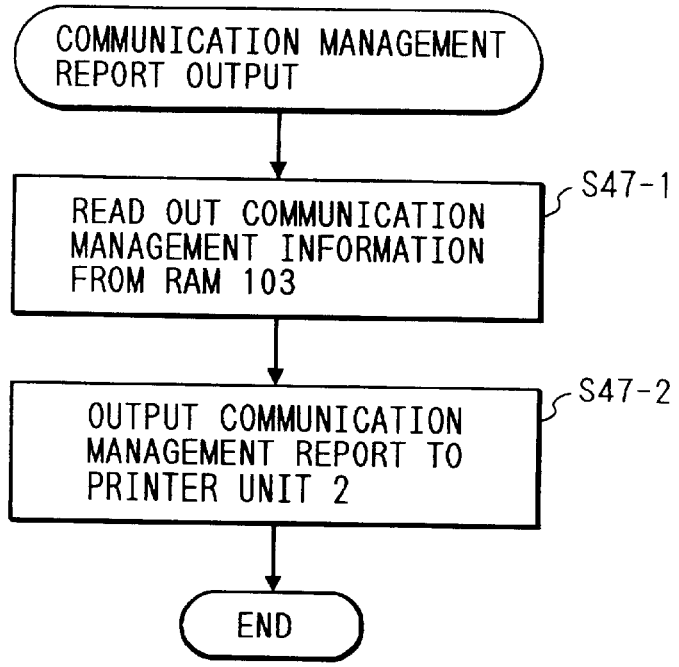
FIG. 47 is a flow chart showing a communication management report recording process by the operation of the main body of the facsimile apparatus.
Figure 48:
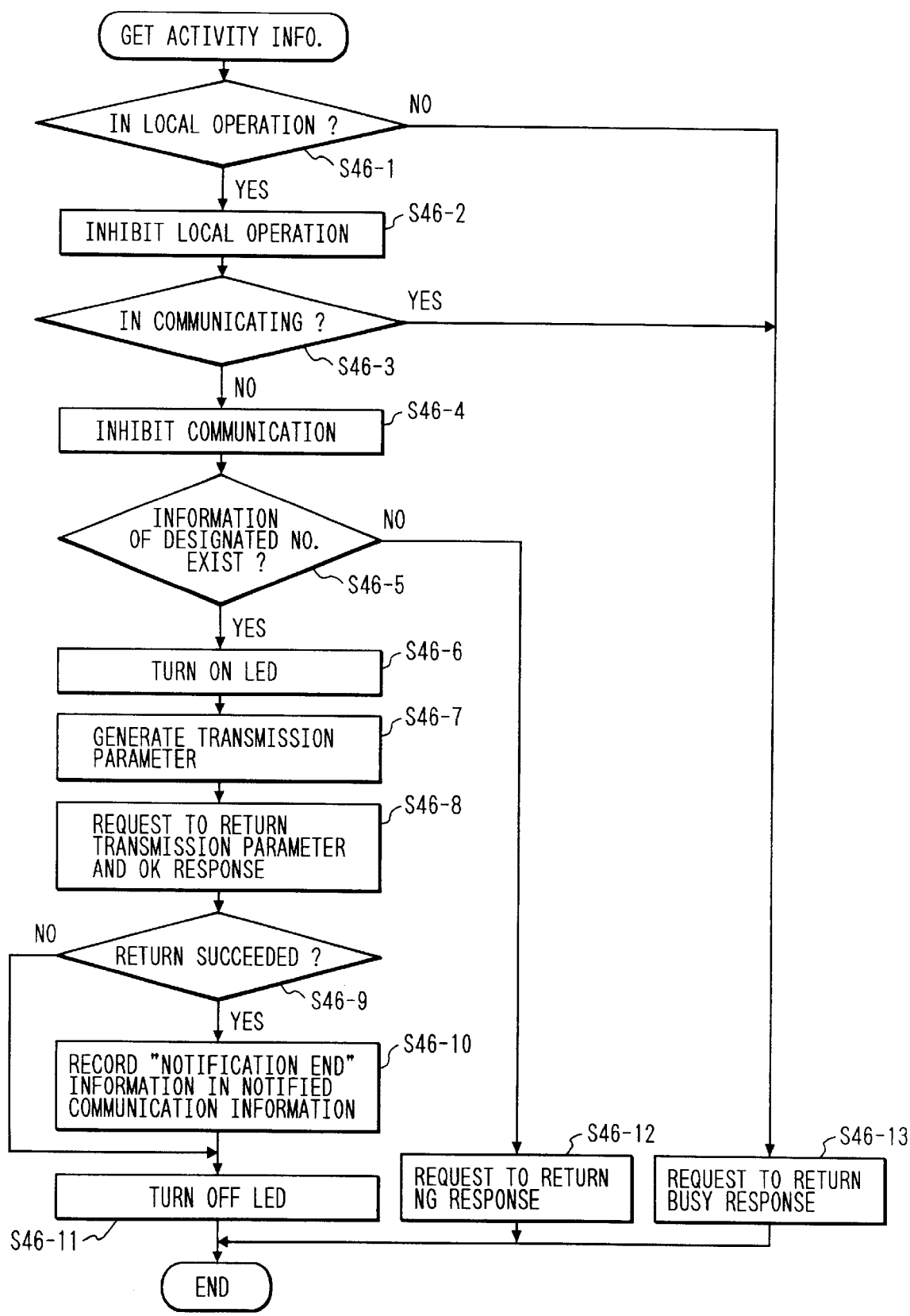
FIG. 48 is a view showing an example of the communication management report.

FIG. 44 shows the configuration of the communication management information stored in the RAM 103 of the facsimile apparatus, FIGS. 46 and 47 are flow charts showing control sequence, and FIG. 48 is a view of the communication management report of the facsimile apparatus.

Referring to FIG. 46, a step S46-1 discriminates whether a local operation is in progress, and, if in progress, the operation may shift to the communication utilizing the image buffer, so that the sequence proceeds to a step S46-13 to request the transmission of a BUSY response to the I/F control task, and the sequence is terminated.

If the step S46-1 identifies that the local operation is not in progress, a step S46-2 inhibits the local operation, and then the sequence proceeds to a step S46-3 to discriminate whether a communication is in progress.

If the communication is in progress, there may be used the image buffer, so that the sequence proceeds to the step S46-13 to request the transmission of a BUSY response to the I/F control task and the process is terminated.

If the communication is not in progress, a step S46-4 inhibits the communication, and a step S46-5 discriminates whether there exists information of the communication of the communication management number designated by the reception parameter accompanying the command, among the communication management information stored in the RAM 103.

If the information of the designated communication does not exist, a step S46-12 requests the transmission of an NG response to the I/F control task, and the process is terminated. If said information exists, a step S46-6 turns on the LED, and the sequence proceeds to a step S46-7.

The step S46-7 generates, on the image buffer of the RAM 103, a transmission parameter to be transferred to the I/F control task, from the communication management information stored in the work area of the RAM 103, and the sequence proceeds to a step S46-8. The transmission parameter to be transferred to the I/F control task includes:

Partner telephone number;

Partner name;

Communication protocol kind (ECM, G3);

Communication kind (manual-auto, reception-transmission, polling, relay, relay indication, simultaneous delivery, timer, secret, memory, instruction source (facsimile-information processing terminal 109) etc.);

Reserved time;

Communication time;

Communication start time (including year, month and date);

Page number;

Communication result (success-failure);

Communication management report output history information (facsimile main unit/information processing unit separated).

The instruction source in the communication kind 44-5 indicates whether the communication is made by the instruction from the operation panel of the facsimile main unit, or from the information processing terminal 109.

The communication management report output history information 44-11 indicates whether the communication management information of the communication has been issued as a report from the facsimile main unit or has been transmitted to the information processing terminal 109.

These information allow the operator to more exactly know the state of use of the facsimile apparatus.

The step S46-8 requests the transmission of the transmission parameter, generated in the step S46-7 and an OK response to the I/F control task.

Then a step S46-9 awaits a message that the information processing terminal 109 has properly received the OK response and the transmission parameter, from the I/F control task.

If said message is not received within a predetermined time, it is identified that the information processing terminal 109 has not properly received the OK response and the transmission parameter, and the sequence proceeds to a step S46-11.

If the message that the OK response and the transmission parameter have been received is received from the I/F control task, it is identified that the information processing terminal 109 has properly received the OK response and the transmission parameter and the sequence proceeds to a step S46-10.

The step S46-10 causes the communication management report output history information 44-11, in the communication management information of the RAM 103, to memorize the record of transmission to the information processing terminal 109, on the communication of which communication information has been properly transmitted to the information processing terminal 109, and the sequence proceeds to the step S46-11.

The step S46-11 turns off the LED and the process is terminated. FIG. 47 is a flow chart of the output of the communication management report in the facsimile main unit, based on the operation thereof.

A step S47-1 in FIG. 47 reads, from the RAM 103, all the stored communication management information of the communications.

Then a step S47-2 releases said communication management information as a report from the printer unit 2.

FIG. 48 illustrates said report of the communication management information.

In FIG. 48, an output mark * indicates that the communication management information of the communication has been released from the facsimile main unit, according to the instruction from the operation panel 112.

The communication management report output history information indicates those released from the facsimile main unit by the operation therein.

The communication management information transmitted to the information processing terminal 109 is given a mark (for example ◊) different from the above-mentioned mark *. Naturally, both marks are attached to the communication management information that has been subjected to the release from the facsimile main unit and the transmission to the information processing terminal 109.

Also the communication management report shown in FIG. 48 may be provided with a column for the source of instruction, thereby indicating, based on the communication kind 44-5 in FIG. 44, whether the communication has been instructed from the operation panel 112 or from the information processing terminal 109.

As explained in the foregoing, the history of transmission to the information processing terminal 109 is separated from the history of release from the facsimile main unit.

This arrangement enables not only the operator of the facsimile main unit but also that of the information processing terminal 109 to distinguish the new information, and to separate the information released from the facsimile main unit and that transmitted to the information processing terminal 109.

The above-explained process allows to distinguish the communication management information of the communications according to the operation of the operation panel 112 and that of the communications according to the instruction from the information processing terminal 109, and also to distinguish whether the communication management information has been issued in the report of the facsimile main unit and whether the communication management information has been transmitted to the information processing terminal 109.

Also the effective utilization of memory can be achieved by common use of the buffer for temporarily storing the image data and that for temporarily storing the communication management information.

It is also possible, by a suitable setting of the operator, to issue a communication management report on the necessary information within the communication management information as shown in FIG. 44, stored in the RAM 103, or to issue a report of desired content by suitably increasing the items of the communication management information stored in the RAM 103.

Figure 49:
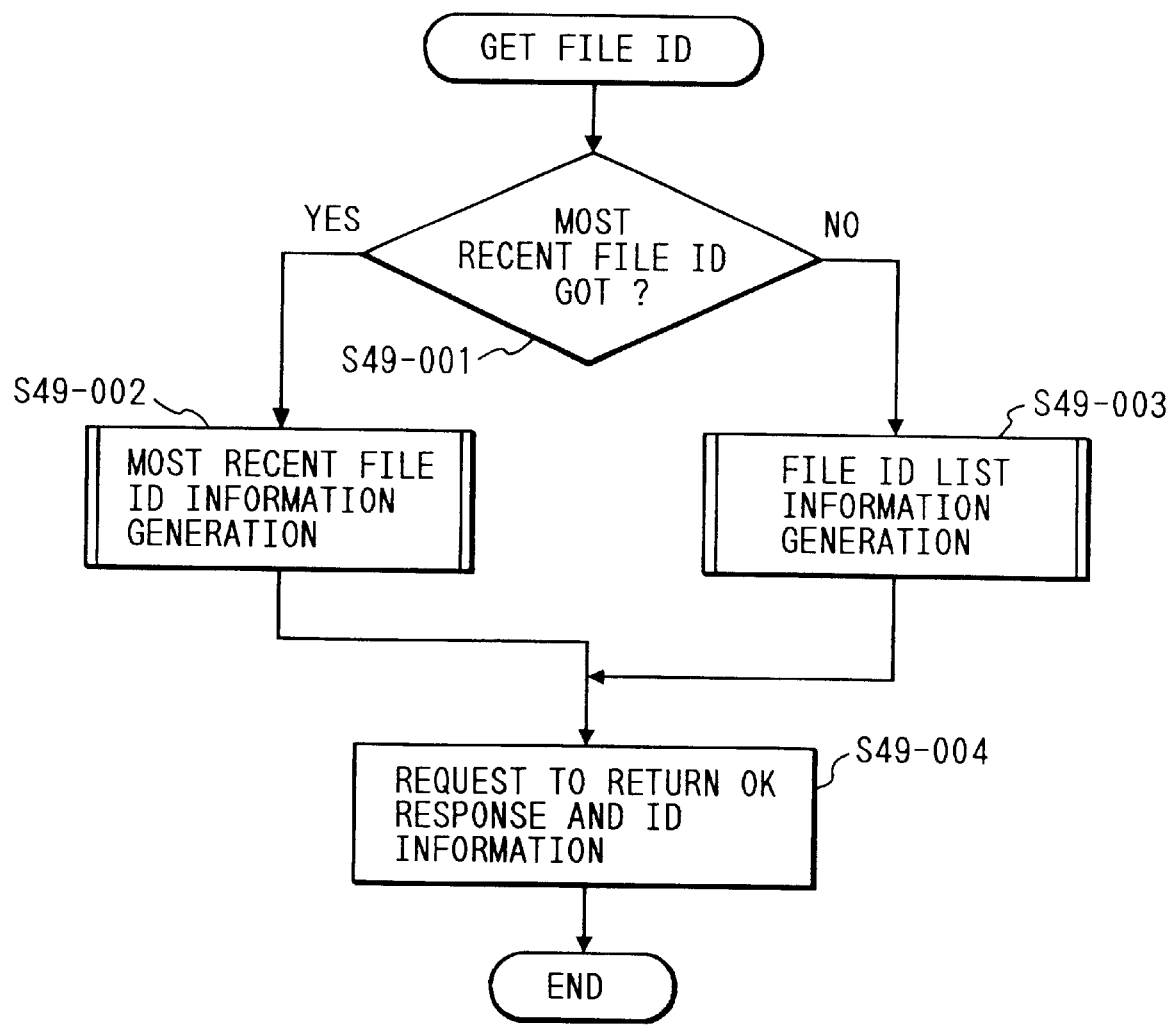
FIG. 49 is a flow chart showing a file ID getting process.

11. File ID Getting (GET FILE ID) Process:

FIG. 49 is a flow chart of the file ID transfer process, for transferring the information on the file ID for image file identification, stored in the image memory of the RAM 103 of the facsimile apparatus, to the information processing terminal 109.

The GET FILE ID process is executed when the command process task in FIGS. 8A, 8B and 9 receives a message from the interface control task, and if the received command is a file ID getting command.

At first a step S49-001 discriminates whether the file ID getting command requests the ID of the latest file, and, if so, the sequence proceeds to a step S49-002.

The step S49-002 generates the latest file ID information of the file type indicated by the file ID getting command, as will be explained later, and the sequence proceeds to a step S49-004.

On the other hand, if the step S49-001 identifies that the ID of the latest file is not requested, the sequence proceeds to a step S49-003.

The step S49-003 generates a list of the file ID of the file type indicated by the file ID getting command, as will be explained later, and the sequence proceeds to a step S49-004.

The step S49-004 sends an OK response and the file ID information, generated in the step S49-002 or S49-003, to the interface control task, and requests return of the OK response and the file ID information, and the GET FILE ID process is terminated.

Figure 50:
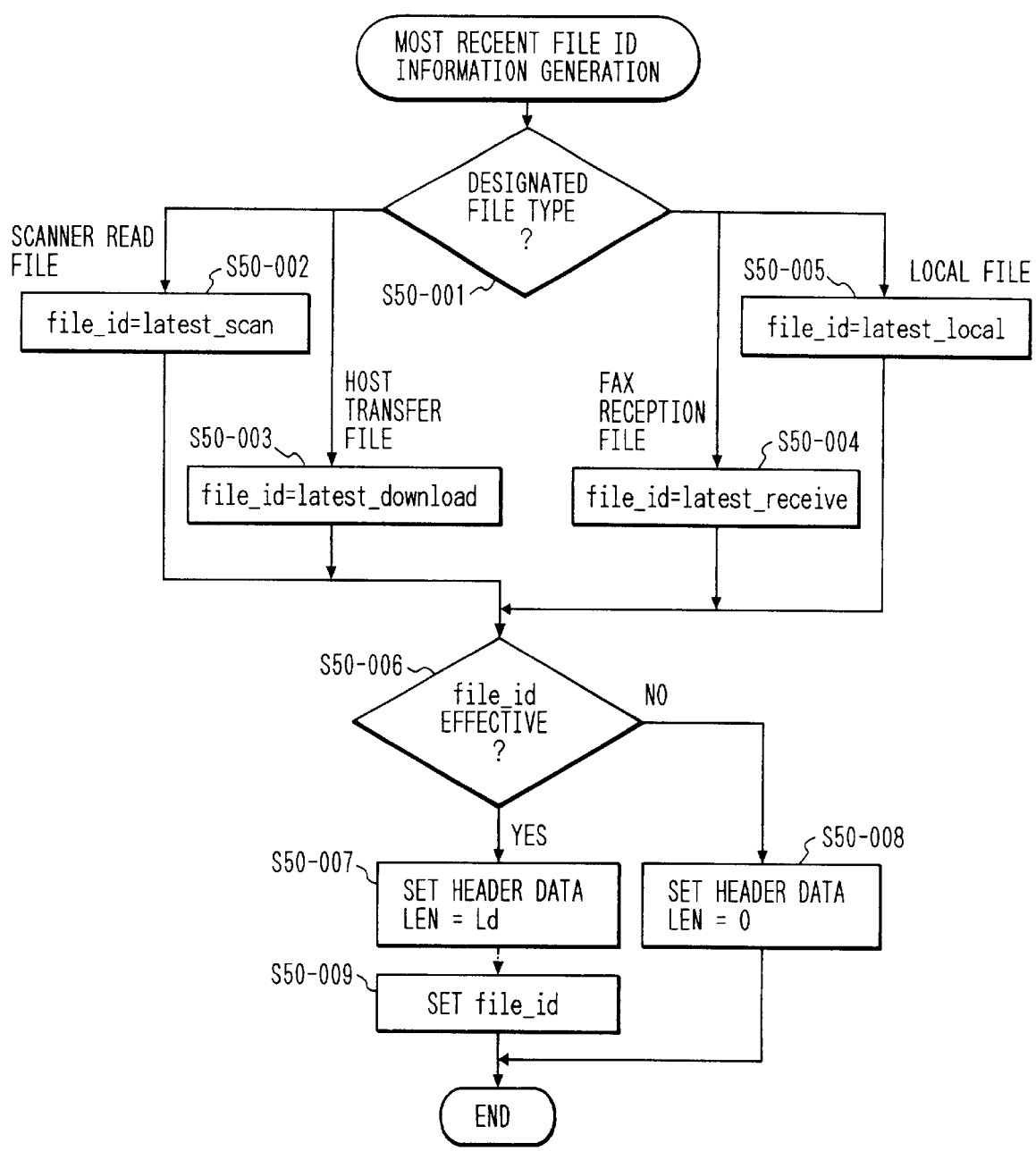
FIG. 50 is a flow chart showing the details of a generation process for the latest file ID information shown in FIG. 49.

FIG. 50 is a flow chart showing the details of generation of the latest file ID information in the step S49-002 in FIG. 49.

At first a step S50-001 discriminates whether the file type, indicated by the file ID getting command, is "scanner read file", "host transfer file", "facsimile reception file" or "local file". Each file type has the following meaning, and, when a corresponding process is executed, a value identifying the file type is automatically set in each area of the image train stored, for managing the image file, in the image memory of the RAM 103:

Scanner read file: a file formed by the SCAN TO FAX indication of the information processing terminal 109;

Host transfer file: a file transferred by the DOWNLOAD indication of the information processing terminal 109;

Facsimile reception file: a file received in the "memory reception" or "memory reception and record output" mode by the RECEIVE indication of the information processing terminal 109;

Local file: any other file, not formed by the instruction of the information processing terminal 109.

If the step S50-001 identifies that the indicated file type is "scanner read file", "host transfer file", "facsimile reception file" or "local file", the sequence branches to a step S50-002, S50-003, S50-004 or S50-005 respectively.

The step S50-002 copies the content of the latest scanner read file ID area "latest_scan", set in the work area of the RAM 103 automatically at the execution of the SCAN TO FAX process, into the latest file ID area "file_id" secured in said work area, and the sequence proceeds to a step S50-006.

The step S50-003 copies the content of the latest host transfer file ID area "latest_down", set automatically in the work area of the RAM 103 at the execution of the DOWNLOAD FILE process, into the latest file ID area "file_id" secured in said work area, and the sequence proceeds to a step S50-006.

The step S50-004 copies the content of the latest facsimile reception file ID area "latest_receive", set automatically in the work area of the RAM 103 at the execution of the reception process in the "memory reception" or "memory reception and record output" mode under the RECEIVE command, into the latest file ID area "file_id" secured in said work area, and the sequence proceeds to a step S50-006.

The step S50-005 copies the content of the latest local file ID area "latest_local", set automatically in the work area of the RAM 103 at the execution of any other process, not instructed by the information processing terminal 109, into the latest file ID area "file_id" secured in said work area, and the sequence proceeds to a step S50-006.

The step S50-006 discriminates whether the content of the latest file ID area "file_id", copied in the step S50-002, S50-003, S50-004 or S50-005 is effective, and, if effective, i.e., if a latest file exists, the sequence proceeds to a step S50-007. On the other hand, if said content is ineffective, i.e., if the latest file does not exist for example by the absence of execution of a process for generating the image file of the indicated file type, the sequence proceeds to a step S50-008.

The step S50-007 generates data of a header to be attached immediately in front of the file ID information. Said header data contain the length LEN of the ensuing file ID information, and the addition of such header data in front of the file ID information facilitates acquisition, by the information processing terminal 109, of the file ID information which can be of a variable length. In this state, header data in which the length LEN of the ensuing file ID information set at the length Ld of a file ID information is set in the file ID information area, prepared in advance on the RAM 103 and to be used in the request of return in the aforementioned step S49-004, and the sequence proceeds to a step S50-009.

On the other hand, the step S50-008, for indicating the absence of the ensuing file ID information, sets header data with the length LEN=0, in the file ID information area, prepared in advance on the RAM 103 and to be used in the request of return in the aforementioned step S49-004, and the latest file ID information generation, process is terminated.

The step S50-009 sets the content of the latest file ID area "file_id" in an area immediately after the header data set in the step S50-007, and the latest file ID information generation process is terminated.

Figure 51:
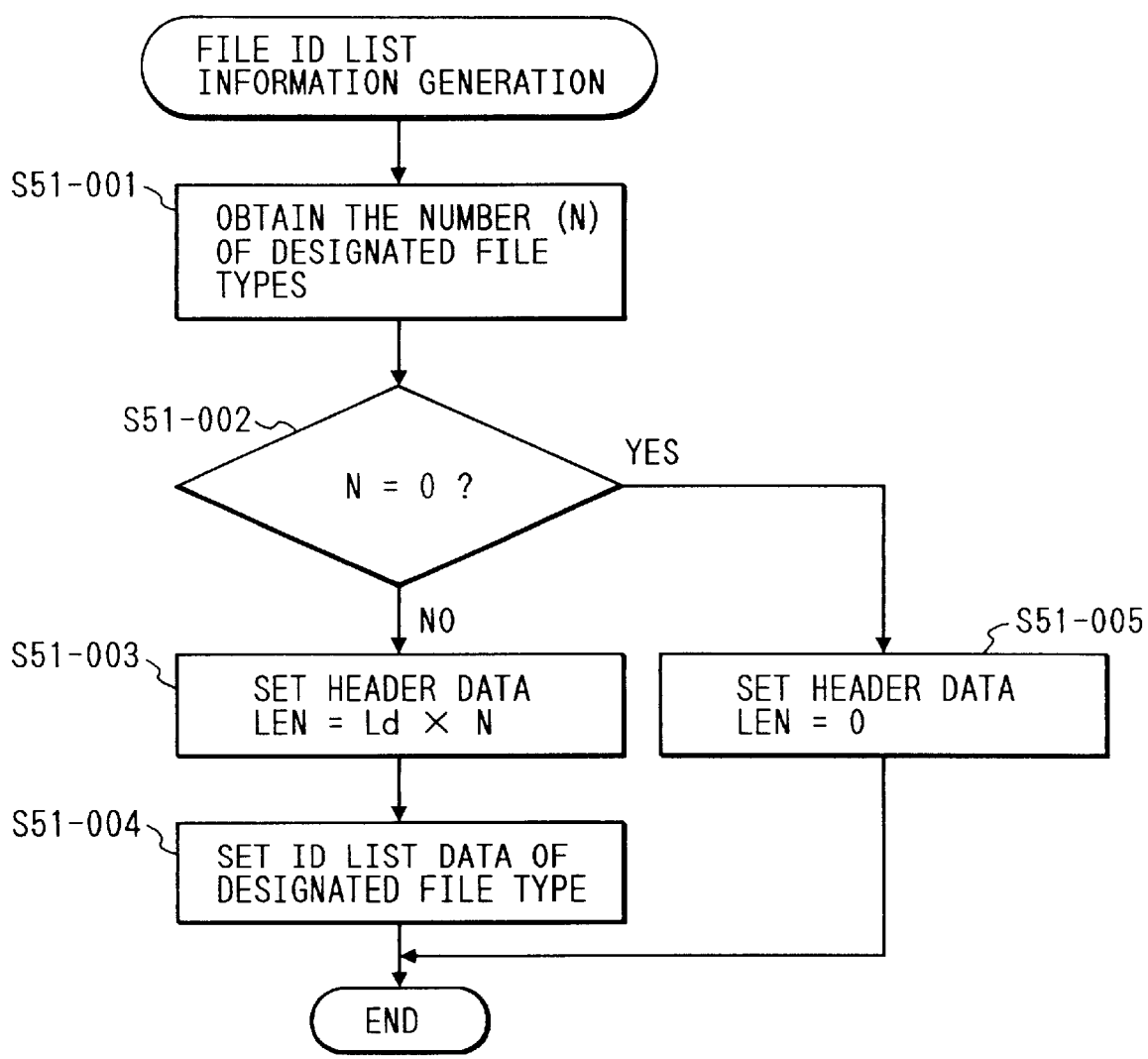
FIG. 51 is a flow chart showing the details of a generation process for the file ID list information in FIG. 49.

FIG. 51 is a flow chart showing the details of the file ID list generation process in the step S49-003 in FIG. 49.

At first a step S51-001 searches the image train for managing the image files stored in the image memory of the RAM 103 to determine the number N of the image files of the indicated file type, and then a step S51-002 discriminates whether the number N of the image files, determined in the step S51-001 is a positive number. If N is a positive number, indicating the presence of the image file of the indicated file type, the sequence proceeds to a step S51-003, but, if not, i.e. if such image file is absent for example because of the absence of execution of the process for generating the image file of the indicated file type, the sequence proceeds to a step S51-004. The step S51-003 generates data of a header to be attached immediately in front of the file ID information. Said header data contain the length LEN of the ensuing file ID information, and the addition of such header data in front of the file ID information facilitates acquisition, by the information processing terminal 109, of the file ID information which can be of a variable length. In this state, header data in which the length LEN of the ensuing file ID information is set as Ld×N, indicating the presence of N file ID information of the length Ld, is set in the file ID information area prepared in advance on the RAM 103 and to be used in the request of return in the step S49-004, and the sequence proceeds to a step S51-004.

The step S51-004, as in the step S51-001, searches the image train again and consecutively sets the file ID's of the image files of the indicated file type in an area immediately following the header data set in the step S50-007, and the file ID list generation process is terminated.

On the other hand, the step S51-005, for indicating the absence of the ensuing file ID information, sets header data with the length LEN=0, in the file ID information area prepared in advance on the RAM 103 and to be used in the request of return in the step S49-004, and the file ID list generation process is terminated.

Owing to the above-explained process, the facsimile apparatus of the present embodiment transfers the latest file ID information or the file ID list, indicated by the information processing terminal 109, separately for each indicated file type, to said terminal 109.

Also the facsimile apparatus of the present embodiment adds header data, including the data length of the file ID information, immediately in front of the file ID information, in order to facilitate acquisition, by the information processing terminal 109, of the file ID information of which length can be variable, and transfers the indicated latest file ID information or file ID list to the information processing terminal 109 separately for each indicated file type.

Owing to the above-explained process, the facsimile apparatus can transfer the identification code of the image file indicated by the information processing terminal 109 or the list of the identification codes to said terminal 109, separately for each indicated kind of code, by managing the identification code for identifying each image file and the kind code indicating the history of generation of each image file.

Also the facsimile apparatus, in releasing the identification code information in response to the instruction of the information processing terminal 109, adds a code indicating the length of the output information, whereby the information processing terminal 109 can acquire the identification code information which can be variable in length, with a limited load, even if it is composed of a high-speed interface.

Figure 52:
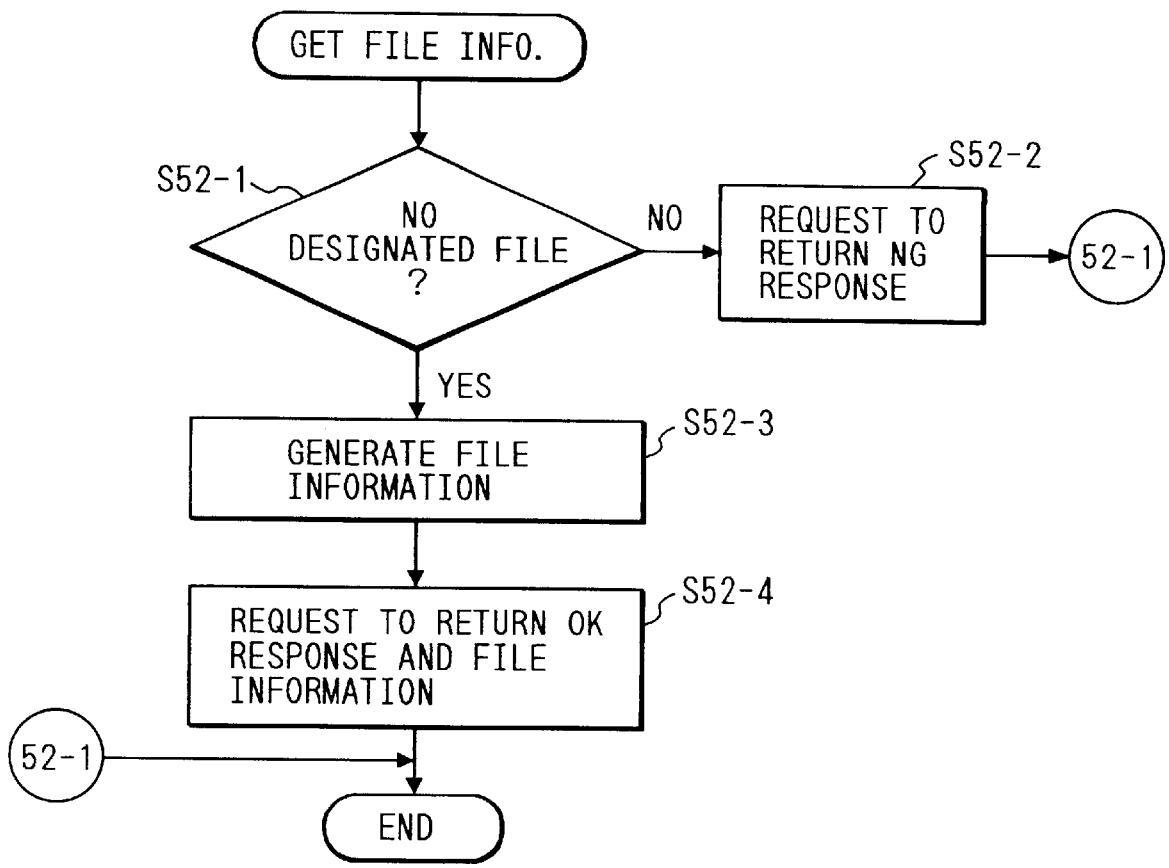
FIG. 52 is a flow chart showing a file information getting process.
Figure 53:
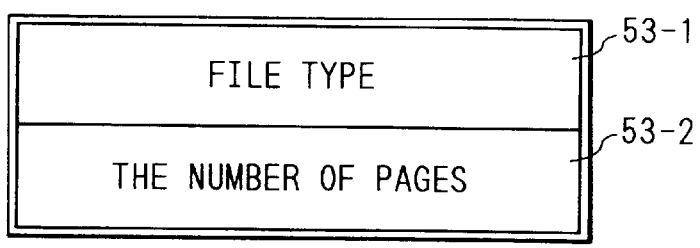
FIG. 53 is a view showing the configuration of file management information.

12. File Information Getting (GET FILE INFO) Process:

FIG. 52 is a flow chart showing the function of the file information getting command for transmitting the information of each file of the image data, stored in the image memory of the RAM 103, to the information processing terminal 109, and FIG. 53 is a view showing the configuration of the file information.

Figure 9B:
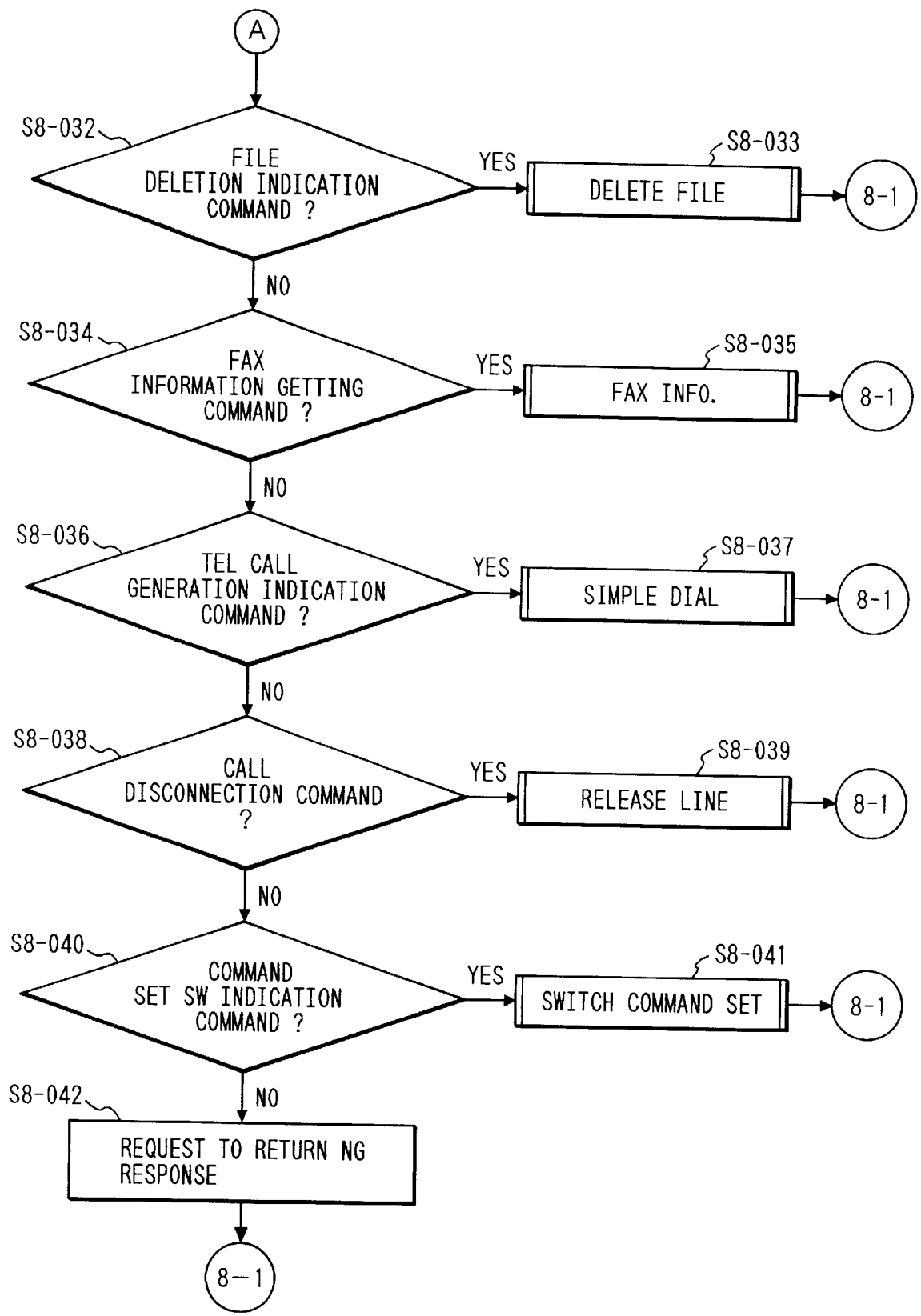
FIG. 9, composed of FIGS. 9A and 9B, are flow charts of a command process task.

The GET FILE INFO process is executed when the command process task in FIGS. 9A and 9B receive a message from the interface control task and if the received command is a file information getting command.

At first a step S52-1 discriminates whether the file designated by the file information getting command is present, and, if not, the sequence proceeds to a step S52-2.

The step S52-2 sends an NG response, indicating the absence of the designated file, to the interface control task, and the sequence is terminated.

On the other hand, if the step S52-1 identifies the presence of the designated file, the sequence proceeds to a step S52-3.

The step S52-3 generates the file information of the configuration shown in FIG. 53, from the management information stored in the RAM 103 of the facsimile apparatus, and the sequence proceeds to a step S52-4. The file information contains following components:

File type 53-1: type of the designated file (scanner read file, host transfer file, facsimile reception file, local file);

Page number 53-2: page number of the designated file.

The step S52-4 sends an OK response and the file information generated in the step S52-3 to the interface control task and requests return of the OK response and the file information, and the GET FILE INFO process is terminated.

Figure 54:
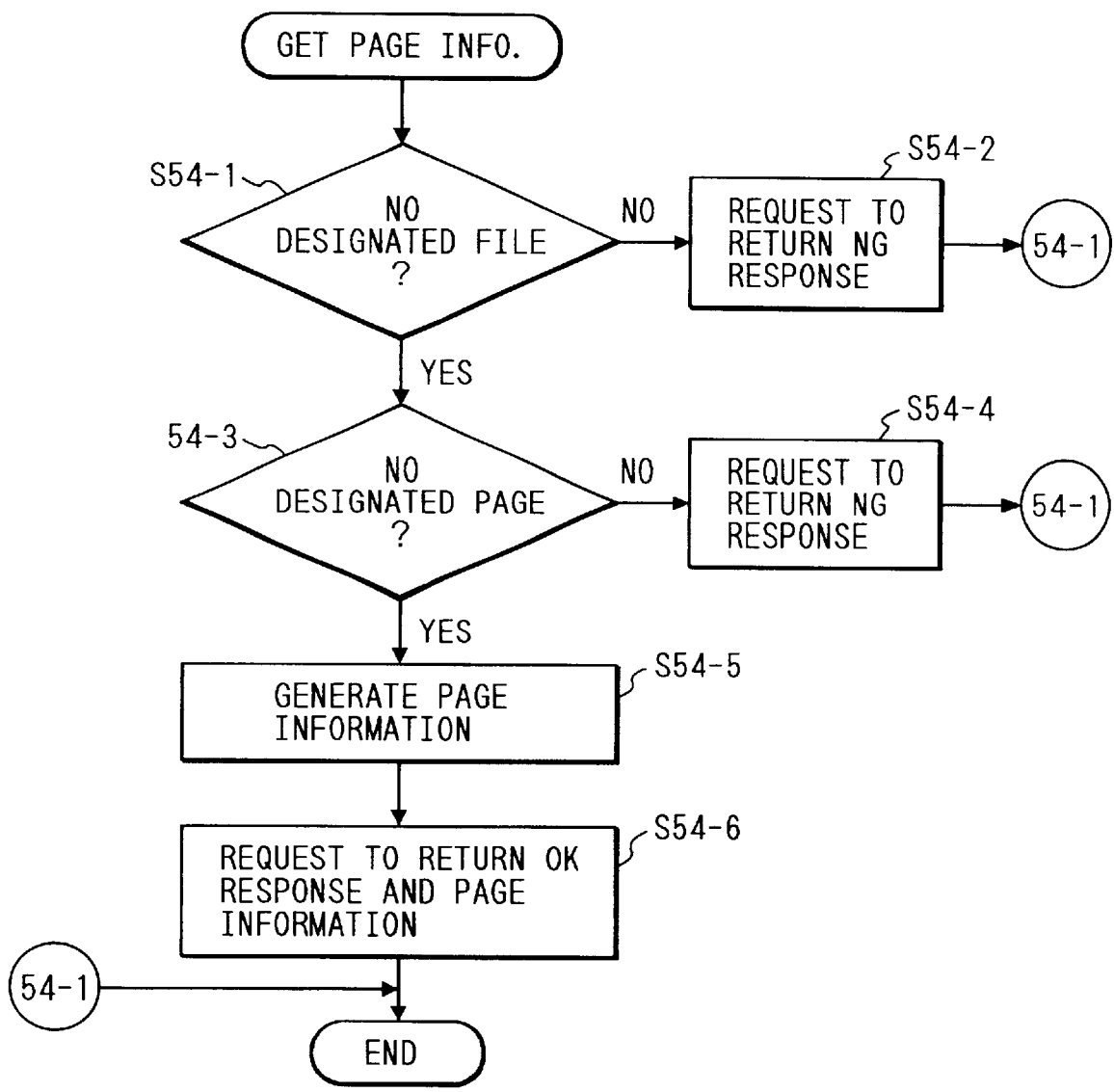
FIG. 54 is a flow chart showing a page information getting process.
Figure 55:
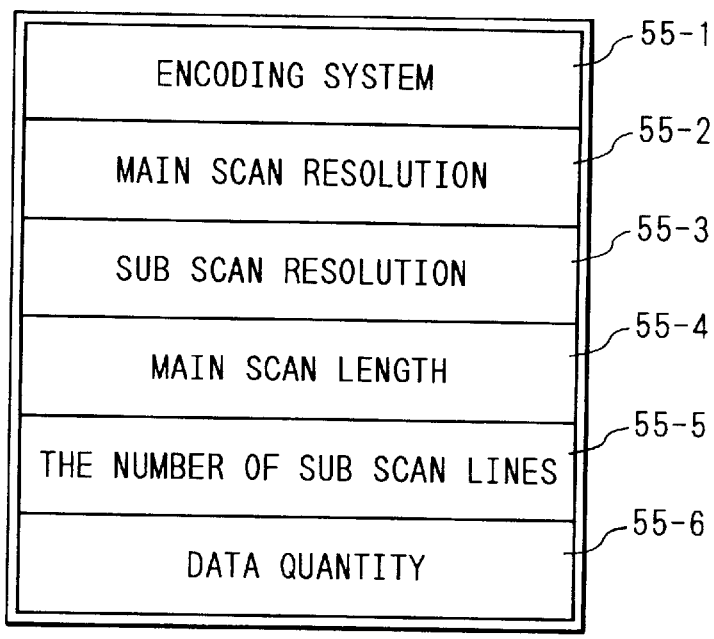
FIG. 55 is a view showing the configuration of page management information.

13. Page Information Getting (GET PAGE INFO) Process:

FIG. 54 is a flow chart showing the function of the page information getting command, for transmitting the information of each page of the image data, stored in the image memory of the RAM 103, to the information processing terminal 109, and FIG. 55 is a view showing the configuration of the page information.

The GET PAGE INFORMATION process is executed when the command process task in FIGS. 9A and 9B receive a message from the interface control task and if the received command is a page information getting command.

At first a step S54-1 discriminates whether the file designated by the page information getting command is present, and, if not, the sequence proceeds to a step S54-2.

The step S54-2 sends an NG response, indicating absence of the designated file, to the interface control task, and the sequence is terminated.

On the other hand, if the step S54-1 identifies the presence of the designated file, the sequence proceeds to a step S54-3.

The step S54-3 discriminates whether the page designated by the page information getting command is present, and, if not, the sequence proceeds to a step S54-4.

The step S54-4 sends an NG response, indicating absence of the designated page to the interface control task, and the sequence is terminated.

On the other hand, if the step S54-3 identifies the presence of the designated page, the sequence proceeds to a step S54-5.

The step S54-5 generates the page information of the configuration shown in FIG. 55, from the management information stored in the RAM 103 of the facsimile apparatus, and the sequence proceeds to a step S54-6. The page information contains the following components:

Encoding method 55-1: encoding method of the designated page (MH, MR, MMR);

Main scanning resolution 55-2: main scanning resolution of the designated page (8 dot/mm).

Sub scanning resolution 55-3: sub scanning resolution of the designated page (7.7 or 3.85 dot/mm);

Main scanning length 55-4: main scanning image size of the designated page (A4);

Sub scanning line number 55-5: number of sub scanning lines of the designated page, not fixed in case of 0;

Data amount 55-6: data amount including redundant portions, required for the storage of the designated page by the facsimile apparatus, not necessarily equal to the data amount in data transmission.

The step S54-6 sends an OK response and the page information, generated in the step S54-5, to the; interface control task, and request return of the OK response and the page information, and the GET PAGE INFO process is terminated.

14. File Deletion (DELETE FILE) Process:

The DELETE FILE process is to delete the image file, generated on the RAM 103 of the facsimile apparatus by the instruction of the information processing terminal 109. The image files generated by the instruction of the information processing terminal 109 include followings:

Scanner read file: file read by the SCAN TO FAX command of the information processing terminal 109;

Host transfer file: file transferred by the DOWNLOAD command of the information processing terminal 109;

Facsimile reception file: file received in the "memory reception" or "memory reception and record output" mode set by the RECEIVE command of the information processing terminal 109.

Figure 56:
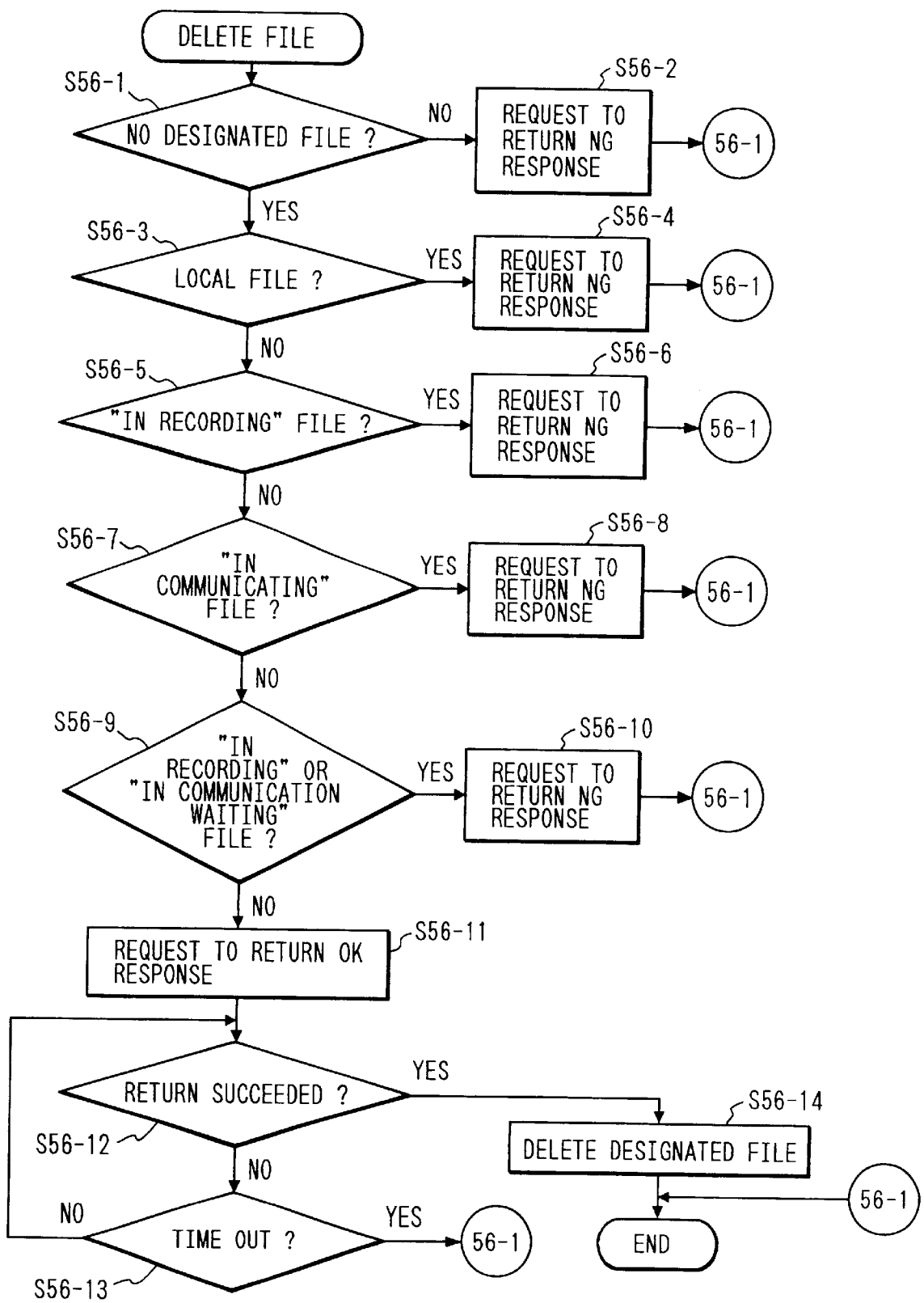
FIG. 56 is a flow chart showing a file deletion process.

FIG. 56 is a flow chart showing the file deletion process, for deleting the image data, stored in the image memory of the RAM 103 of the facsimile apparatus, in the unit of a file managed by said apparatus.

The DELETE FILE process is executed when the command process task in FIGS. 9A and 9B receive a message from the interface control task and if the received command is a file deletion command.

At first a step S56-1 discriminates whether the file designated by the file deletion command is present, and, if absent, the sequence proceeds to a step S56-2.

The step S56-2 sends a message indicating the absence of the designated file to the interface control task, and the process is terminated.

On the other hand, if the step 56-1 identifies the presence of the designated file, the sequence proceeds to a step S56-3.

The step S56-3 discriminates whether the designated file is a local file, and, if so, the sequence proceeds to a step S56-4.

The step S56-4 sends an NG response, indicating that the designated file is ineffective, to the interface control task, and the process is terminated.

On the other hand, if the step S56-3 identifies that the designated file is not a local file, the sequence proceeds to a step S56-5.

The steps S56-3 and S56-4 inhibit deletion of the local file in the DELETE FILE process. Similarly, the file generated by the information processing terminal 109 cannot be deleted by the local operation.

The step S56-5 discriminates whether the designated file is in the course of a record output operation, and, if so, the sequence proceeds to a step S56-6.

The step S56-6 sends an NG response, indicating that the designated is ineffective, to the interface control task, and the process is terminated.

On the other hand, if the step S56-5 identifies that the designated file is not in the course of record output operation, the sequence proceeds to a step S56-7.

The step S56-7 discriminates whether the designated file is in communication, and, if so, the sequence proceeds to a step S56-8.

The step S56-8 sends an NG response, indicating that the designated file is ineffective, to the interface control task, and the sequence is terminated.

On the other hand, if the step S56-7 identifies that the designated file is not in communication, the sequence proceeds to a step S56-9.

The step S56-9 discriminates whether the designated file is in the stand-by state for recording or communication, and, if so, the sequence proceeds to a step S56-10.

The step S56-10 sends an NG response, indicating that the designated file is ineffective, to the interface control task, and the sequence is terminated.

On the other hand, if the step S56-9 identifies that the designated file is not in the stand-by state for recording or communication, the sequence proceeds to a step S56-11.

In the foregoing steps S56-5 to S56-10, the deletion is inhibited if the file to be deleted is in access (in recording or in communication) or is reserved for access reserved for recording or communication). However the deletion is not inhibited even if there is a file in access or reserved for access, as long as said file is different from the file to be deleted.

The step S56-11 sends an OK response to the interface control task, and requests return thereof, and the sequence proceeds to a step S56-12.

If the step S56-12 receives a message, indicating successful return of the OK response, from the interface control task, the sequence proceeds to a step S56-14, but, if said message is not received, it proceeds to a step S56-13.

If the step S56-13 receives, from the interface control task, a message indicating that the return of the OK response has not been achieved within a predetermined time, the DELETE FILE process is immediately terminated, but, if said message is not received, the sequence returns to the step S56-12.

Through the above-explained process, the facsimile apparatus of the present embodiment can inhibit deletion, from the information processing terminal 109, of the files other than those in communication, in recording, in the stand-by state for recording or communication, or generated by the instruction of the information processing terminal 109.

15. Facsimile Information Getting (FAX INFO) Process:

This process is to transmit, to the information processing terminal 109, the ROM version, manufacturer, apparatus model and version of I/F with the information processing terminal 109.

By separate management of the ROM version of the facsimile apparatus and the version of I/F with the information processing terminal and by transmission thereof to said terminal 109, it can known the I/F version supported by the facsimile apparatus, even without the correspondence table between the ROM version and the I/F version.

Consequently, the application software working on the information processing terminal 109 can know, from the information on the version thereof and that of said I/F version, whether the facsimile apparatus connected to the information processing terminal can be utilized. Also said software can know the apparatus model, and consequently the functions supported by said model. Thus, the application software working on the information processing terminal 109 can be made common for different models, by providing said software with the functions of all the models.

Figure 57:
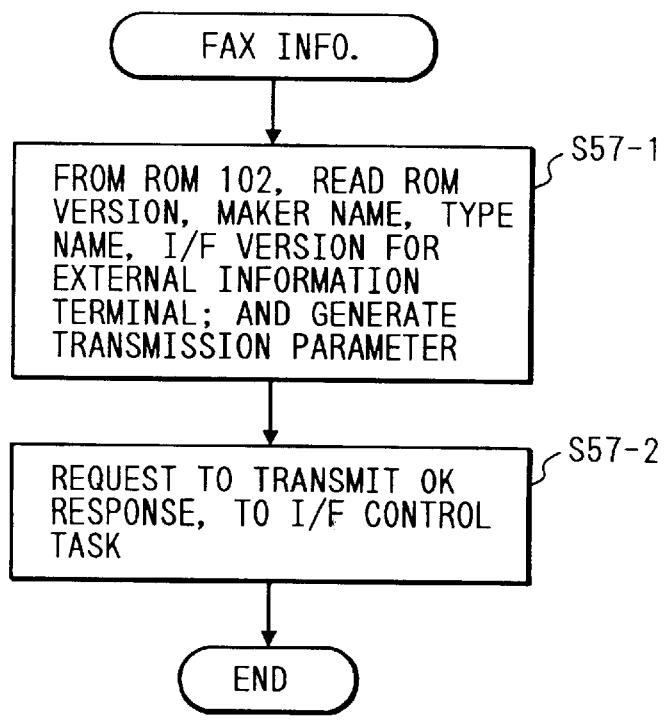
FIG. 57 is a flow chart showing a facsimile information process.

This process will be explained further in the following, with reference to FIG. 57.

A step S57-1 reads the ROM version, manufacturer, model, and version of the I/F with the information processing terminal 109, of the facsimile apparatus from the ROM 102 and generates the transmission parameter.

Then a step S57-2 requests the transmission of an OK response to the I/F control task, and the process is terminated.

16. Telephone Calling (SIMPLE DIAL) Process:

This process causes the facsimile apparatus to effect on-hook dialing by the instruction of the information processing terminal 109.

The on-hook dialing means to dial while the hand-sent is hooked, thereby capturing the telephone line. In the operation on the operation panel 112 of the facsimile apparatus, the on-hook dialing is executed by depressing an on-hook button and then effecting the dialing.

This process will be explained further with reference to FIGS. 58 to 63.

Figure 60:
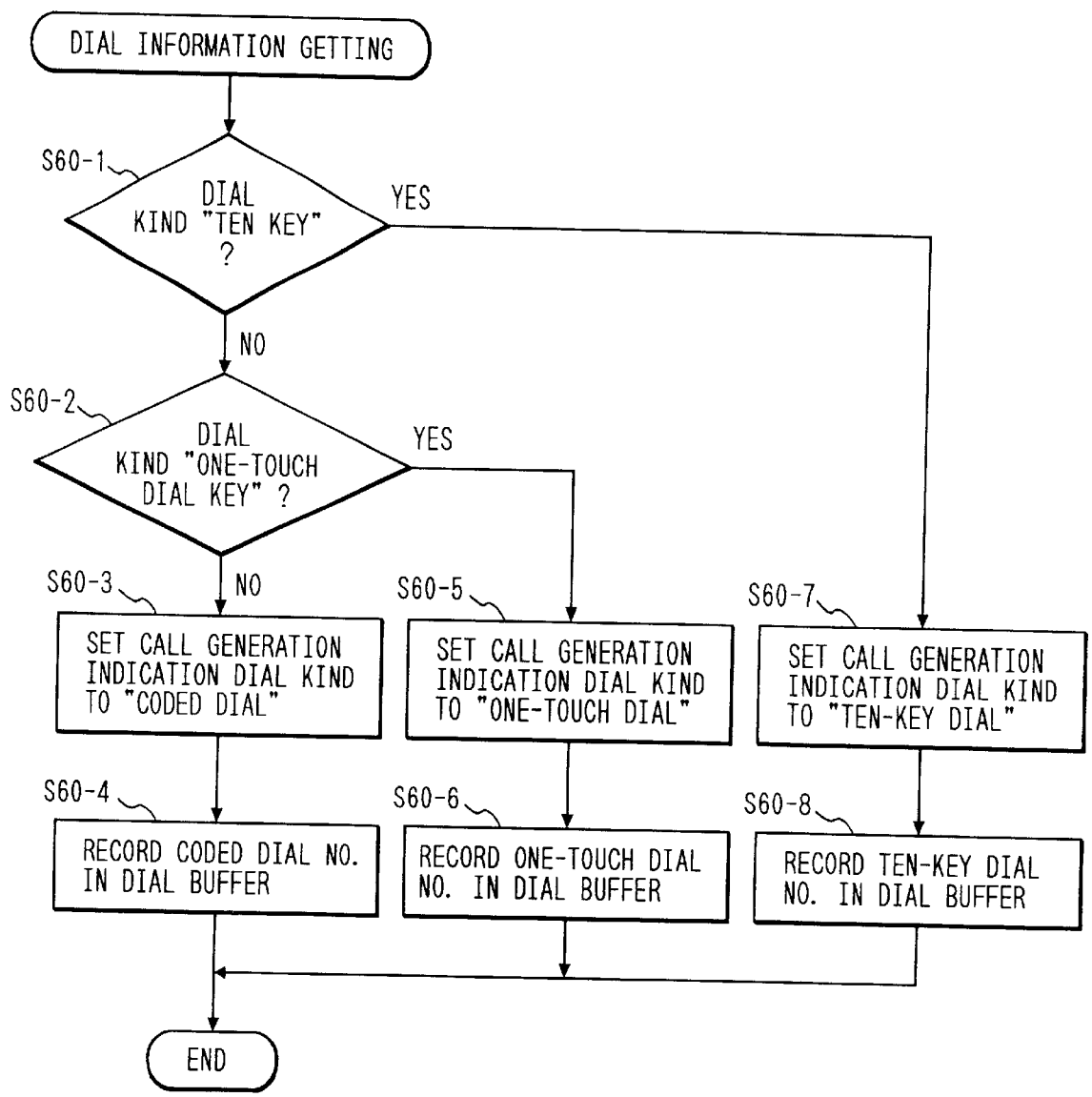
FIG. 60 is a flow chart showing the details of a dial information getting process in FIG. 58.
Figure 61:
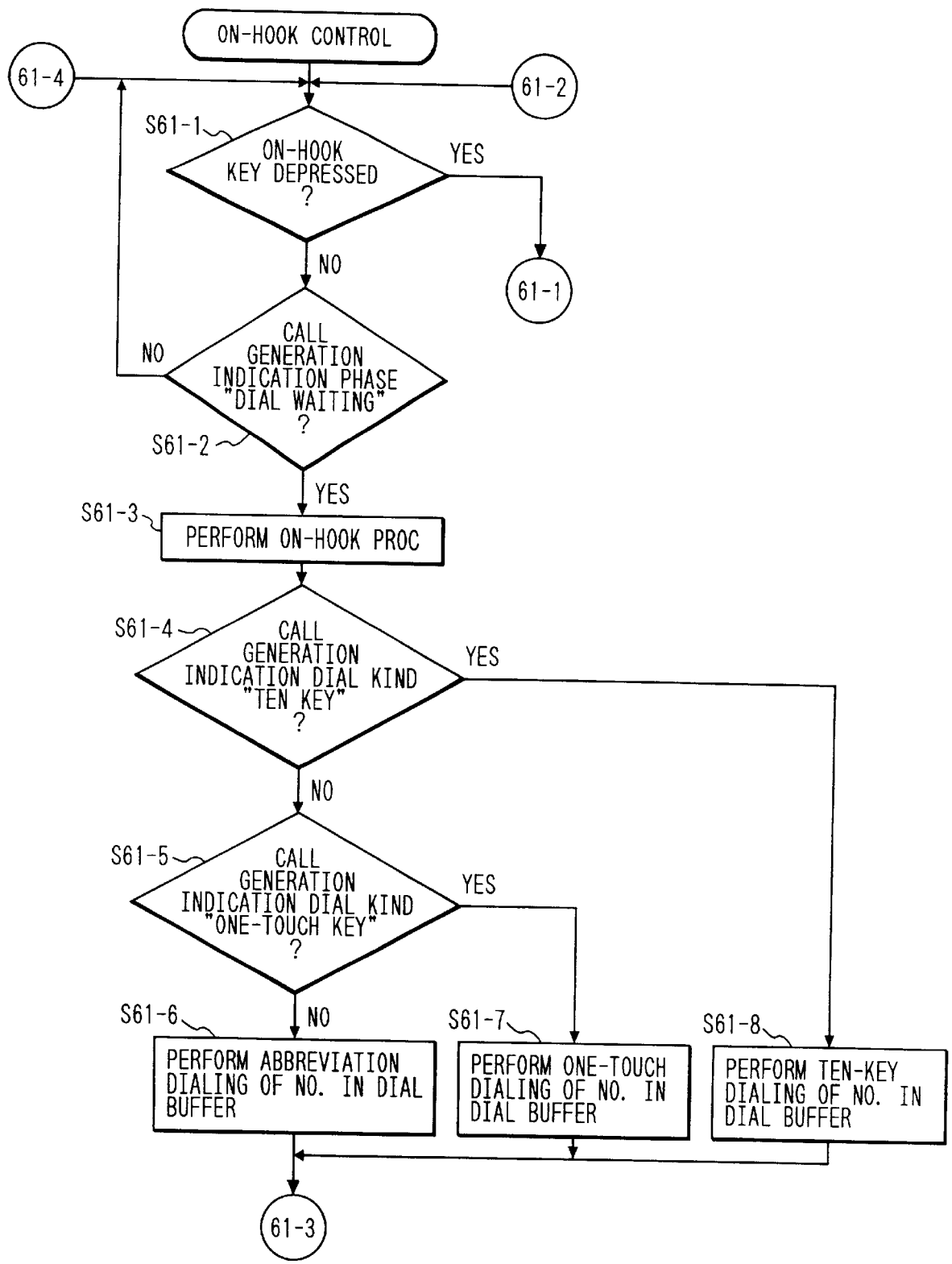
FIGS. 61 to 63 are flow charts showing an on-hook control process.
Figure 62:
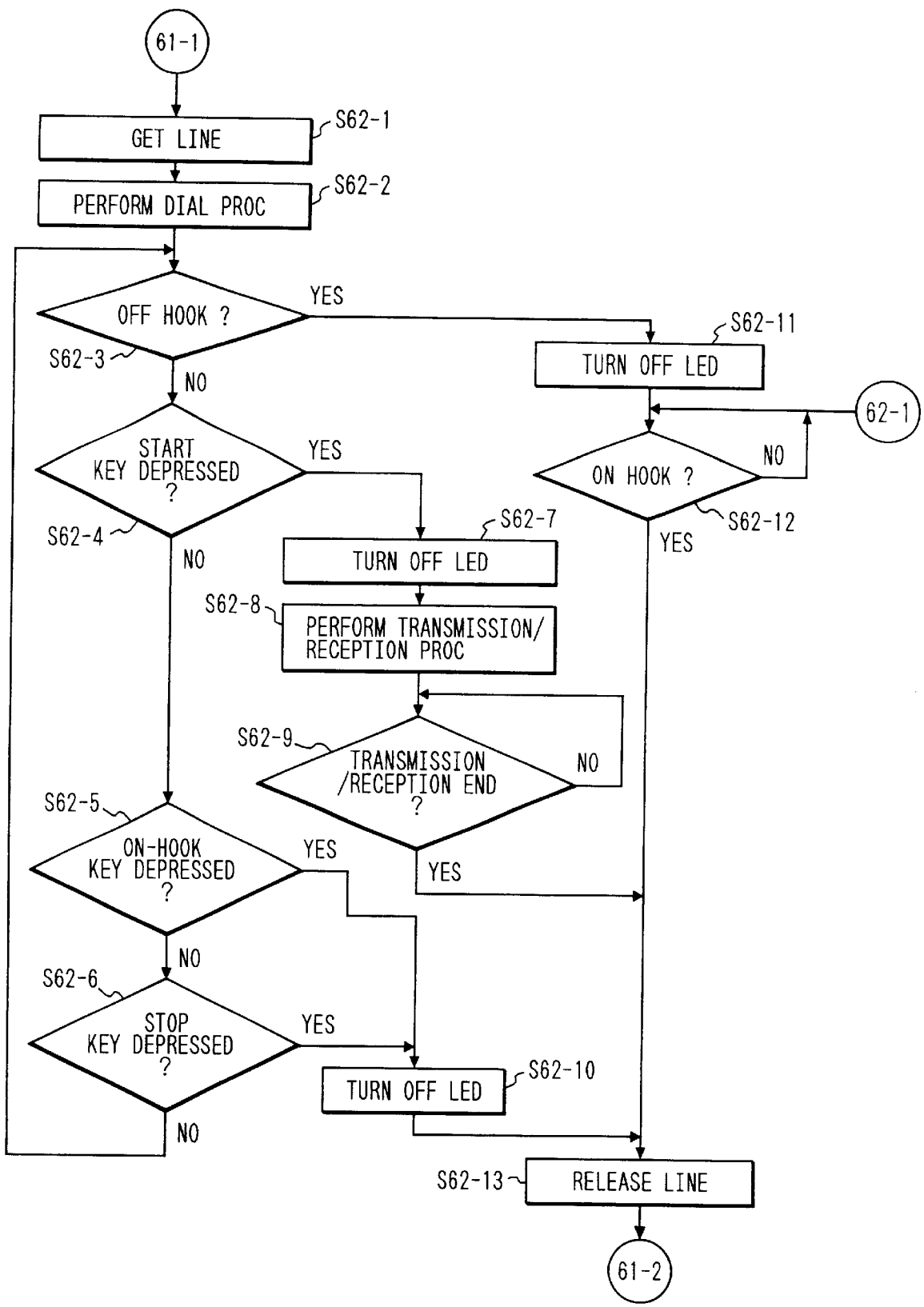
Figure 63:
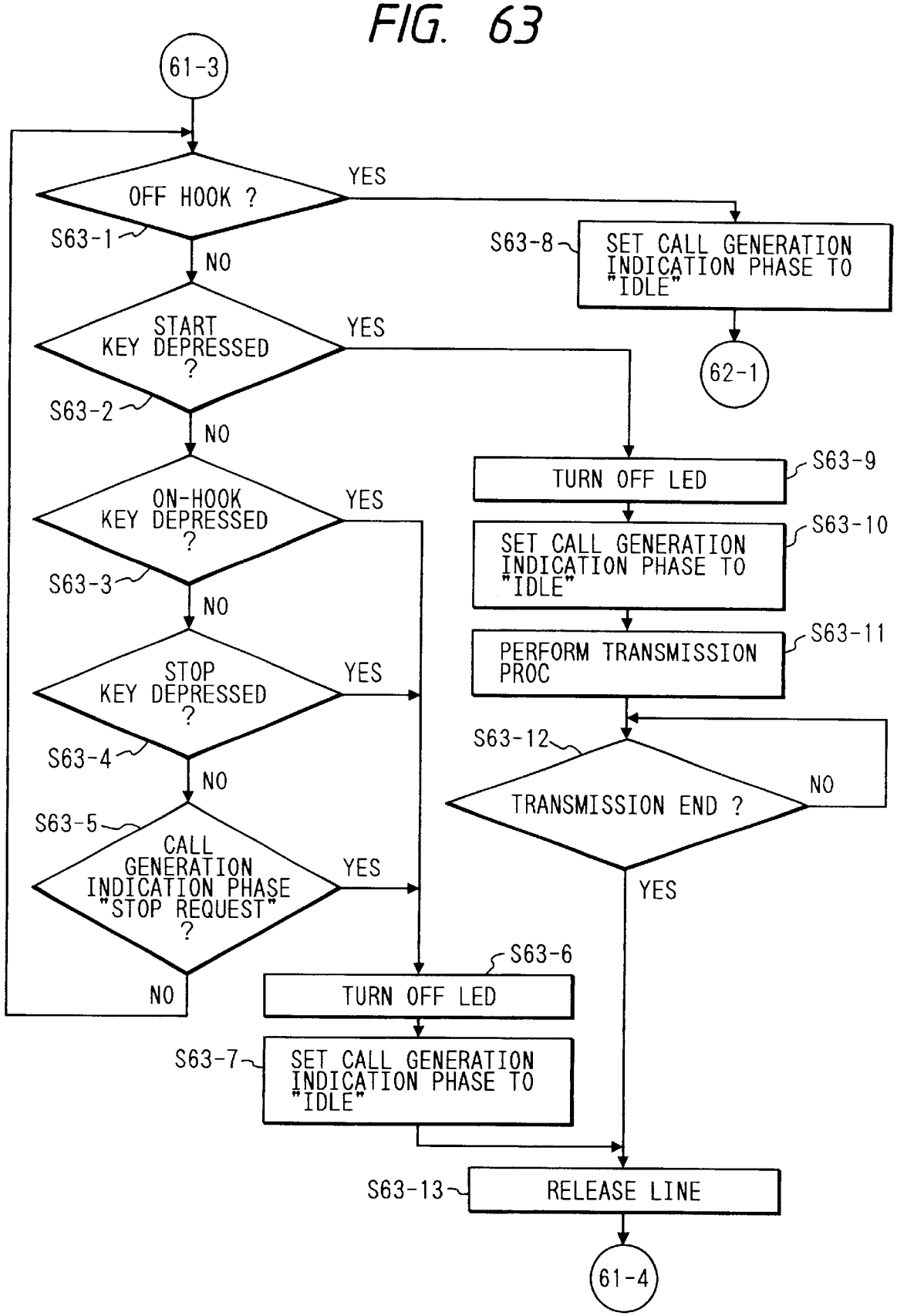

FIGS. 38 to 60 are flow charts of the SIMPLE DIAL process called when a SIMPLE DIAL command is received, and FIGS. 61 to 63 are flow charts of the on-hook process functioning parallel thereto.

Figure 58:
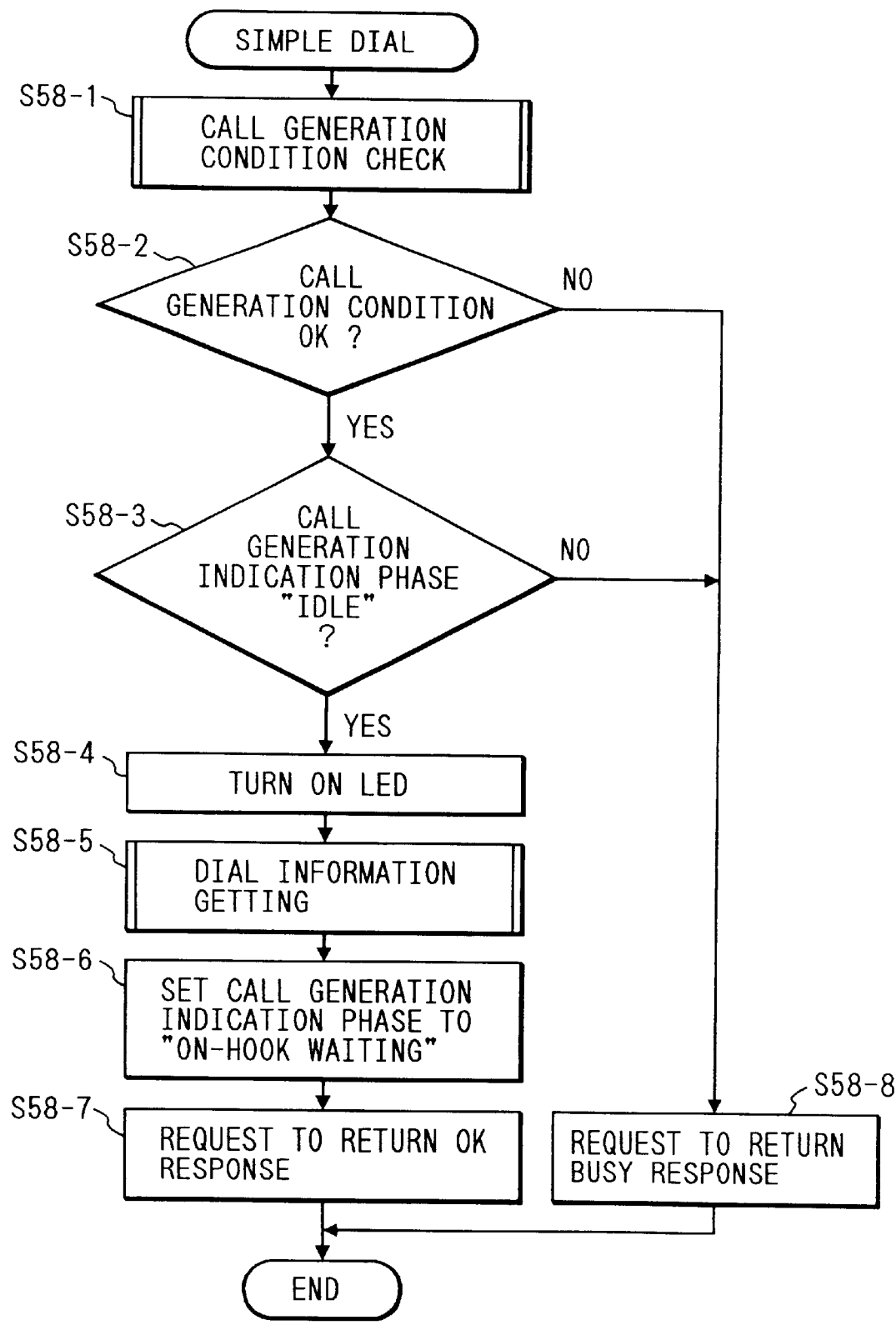
FIG. 58 is a flow chart showing a telephone call generation process.

At first, a step S58-1 in FIG. 58 calls a sub process "call generation condition check" for checking whether the on-hook dialing is possible (to be explained later).

If the check identifies that the on-hook dialing is not possible the sequence proceeds from a step S58-2 to S58-8 to request transmission of a BUSY response to the I/F control task, and the process is terminated.

If said check identifies that the on-hook dialing is possible, a step S58-3 checks whether the call indication phase is idle.

If not idle, the step S58-8 requests transmission of a BUSY response to the I/F control task, and the process is terminated. If idle, the sequence proceeds to a step S58-4 to turn on the LED, thereby indicating that the local operation is inhibited, and the sequence proceeds to a step S58-5.

The step S58-5 extracts the dial information from the reception parameter, and calls a sub process "dial information acquisition" for storing it in a dial buffer in the RAM 103 (to be explained later).

The step S58-6 shifts the call indication phase to "on-hook waiting".

Then a step S58-7 requests transmission of an OK response to the I/F control task, and the process is terminated.

Figure 59:
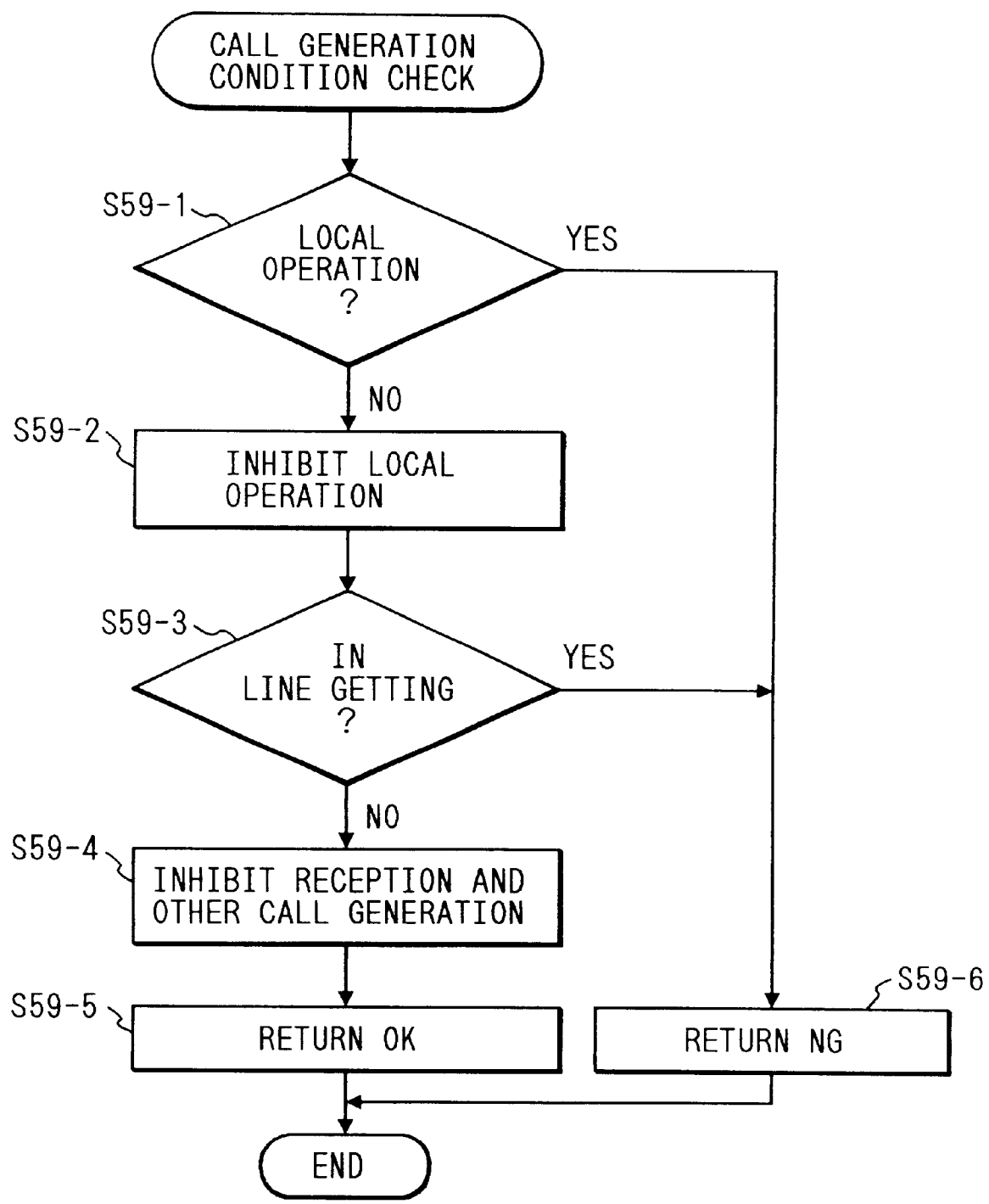
FIG. 59 is a flow chart showing the details of a call generation condition check process in FIG. 58.

FIG. 59 is a flow chart of the sub process "call generation condition check" called in the step S58-1.

In this sub process, a step S59-1 discriminates whether a local operation is in progress, and the sequence proceeds to a step S59-6 or S59-2 respectively if the local operation is in progress or not.

The step S59-2 inhibits the local operation and the sequence proceeds to a step S59-3.

The step S59-3 discriminates whether the telephone line is already captured, and, if captured, a step S59-6 returns an NG response and the process is terminated, but, if not captured, the sequence proceeds to a step S59-4.

The step S59-4 inhibits reception and other call generation (for example time-designated transmission or transmission awaiting re-dialing), then a step S59-5 returns an OK response and the sequence is terminated.

FIG. 60 is a flow chart of the sub process "dial information acquisition" called in the step S58-5.

In this process, the sequence branches into steps S60-1 and S60-2, according to the kind of the dial.

If a ten-key dial is used, a step S60-7 sets "ten-key dial" in the kind of the call generating dial, then a step S60-8 sets the ten-key dialing number in the dial buffer, and the sequence returns to the main sequence.

If a one-touch dial is used, a step S60-5 sets "one-touch dial" in the kind of the call generating dial, then a step S60-6 sets the one-touch dial number in the dial buffer, and the sequence return to the main sequence.

If a coded dial is used, a step S60-3 sets "coded dial" in the kind of the call generating dial, then a step S60-4 sets the coded dial number in the dial buffer and the sequence returns to the main sequence.

FIGS. 61 to 63 are flow charts of an on-hook controlling task.

In this task, a step S61-1 monitors whether the on-hook key is depressed and a step S61-2 monitors whether the call generation phase is shifted to "dial waiting" by the SIMPLE DIAL process, said two steps being executed as a loop.

When the on-hook key is depressed, the sequence proceeds from the steps S61-1 to S62-1.

The step S62-1 captures the line and a step S62-2 effects dialing.

After the step S62-2, the sequence enters a loop of steps S62-3 to S62-6.

The step S62-3 discriminates whether an off-hook operation is conducted, and, the sequence proceeds to a step S62-11 or S62-4 respectively if the off-hook operation is conducted or not.

The step S62-11 turns off the LED and the sequence proceeds to a step S62-12.

The step S62-12 awaits the on-hook state is established again, and, when established, the sequence proceeds to a step S62-13 to release the line and returns to the loop of the steps S61-1 and S61-2.

The step S62-4 discriminates whether the start key is depressed, and the sequence proceeds to a step S62-7 or S62-5 respectively depressed or not.

The step S62-7 turns off the LED and the sequence proceeds to a step S62-8.

The step S62-8 effects transmission or reception process, and the sequence proceeds to a strep S62-9.

The step S62-9 awaits completion of the transmission or reception, and then the sequence proceeds to a step S62-11.

The step S62-5 discriminates whether the on-hook key is depressed, and the sequence proceeds to a step S62-10 or S62-6 respectively if depressed or not.

The step S62-6 discriminates whether the stop key is depressed, and the sequence proceeds to the step S62-10 or returns to the step S62-3 respectively if depressed or not.

The step S62-10 turns off the LED and the sequence proceeds to a step S62-13.

The step S62-13 releases the line and the sequence returns to the loop of the steps S62-1 and S62-2.

If the step S61-2 identifies that the call generation phase is in "dial waiting", and the sequence proceeds to a step S61-3.

The step S61-3 gets the line and the sequence proceeds to a step S61-4.

In steps S61-4 and S61-5, the sequence branches according to the kind of the call indication dial. If it is "contracted", a step S61-6 effects contracted dialing of the number in the dial buffer. If it is "one-touch", a step S61-7 effects one-touch dialing of the number in the dial buffer. If it is "ten-key", a step S61-8 effects ten-key dialing of the number in the dial buffer.

After the dialing, the call is started and the sequence enters a loop of steps S63-1 to S63-5.

This loop effects discrimination of off-hook (S631), depression of the start key (S63-2), depression of the on-hook key (S63-3), depression of the stop key (S63-4) and whether the call generation phase is "stop request".

If the partner responds to the call, the operator lifts the handset to start conversation, and the sequence proceeds to a step S63-8.

The step S63-8 shifts the call generation dial phase to "idle" in order to avoid the release of the line by the RELEASE LINE process to be explained later, and the sequence proceeds to a step S62-12.

If the partner does not respond to the call, the operator can release the line by the on-hook key, the stop key or the RELEASE LINE process.

Steps S63-3, S63-4 and S63-5 respectively discriminate the depression of the on-hook key, depression of the stop key and whether the call generation indication phase is "stop request" by the activation of the RELEASE LINE process to be explained later. If the conditions of these steps S63-3 to S63-5 are satisfied, a step S63-6 turns off the LED, then a step S63-7 shifts the call generation indication phase to "idle", a step S63-13 releases the line and the sequence returns to the loop of the steps S61-1 and S61-2.

In case the partner responds to the call and the transmission or reception is subsequently conducted by the facsimile apparatus, the operator depresses the start key, whereupon the sequence proceeds from a step S63-2 to S63-9.

The step S63-9 turns off the LED, then a step S63-10 shifts the call generation indication phase to "idle", a step S63-11 effects transmission or reception, and a step S63-12 awaits the completion of transmission or reception. Upon completion, a step S63-13 releases the line and the sequence returns to the step S61-1.

The telephone call generation from the information processing terminal 109 can be realized by the above-explained process.

17. Call Disconnection (RELEASE LINE) Process:

This process is to cancel the call activated by the SIMPLE DIAL process.

However, even in case of the call activated by the SIMPLE DIAL process, if off-hook state is subsequently realized by the lifting of the handset after the dialing, the cancellation by the RELEASE LINE process is inhibited.

This process will be explained in the following with reference to FIG. 64.

Figure 64:
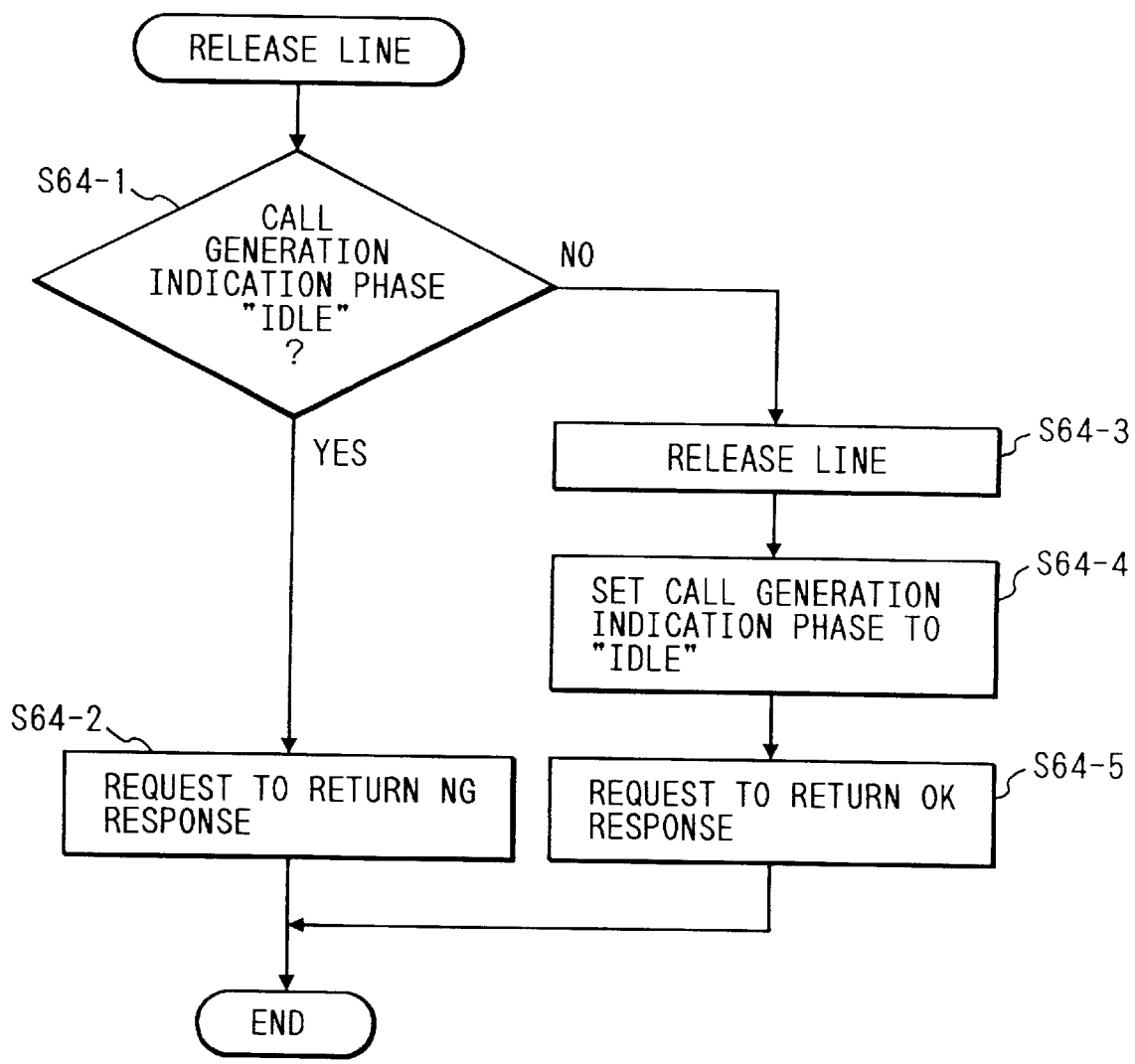
FIG. 64 is a flow chart showing a call disconnection process.

FIG. 64 is a flow chart of the RELEASE LINE process. At first a step S64-1 discriminates whether call generation indication phase is "idle".

If not, the facsimile apparatus is in the course of call generation or waiting for the response from the partner by the SIMPLE DIAL process, so that there is executed an interruption process, starting from a step S64-3, for the call generated by the SIMPLE DIAL process.

If said phase is "idle", the facsimile apparatus is not in the course of call generation or waiting for the response from the partner by the SIMPLE DIAL process, so that a step S64-2 requests transmission of an NG response, indicating absence of the object of interruption, to the I/F control task, and the sequence is terminated.

The step S64-3 releases the line, then a step S64-4 shifts the call generation indication phase to "idle", a step S64-5 requests transmission of an OK response to the I/F control task and the process is terminated.

The above-explained process, in combination with the SIMPLE DIAL process, allows the operator to effect dialing in the information processing terminal 109 by the SIMPLE DIAL process, and, in case of no response from the partner, to release the line by the RELEASE LINE process.

Thus the operation can make and disconnect telephone call by operating the information processing terminal 109 while working thereon, whereby the convenience can be improved.

18. Command Set Switch (SWITCH COMMAND SET) Process:

This process switches the command set for controlling the facsimile apparatus from the information processing terminal 109, according to the instruction therefrom.

The command set means a system of instructions determined in advance between the information processing terminal 109 and the apparatus connected thereto (facsimile apparatus in the present case). Usually one command set is enough because the information processing terminal 109 and the above-mentioned apparatus are connected in a one-to-one relationship. However, in the facsimile apparatus of the present embodiment, there is another unit to be connected (printer unit 2 of the facsimile apparatus, in the printer mode), so that another command system has to be provided in order to utilize the communication function of the facsimile apparatus and the memory of the facsimile unit 1 between the information processing terminal 109 and the printer unit 2. This process switches the plural command systems thereby directly connecting the information processing terminal 109 and the printer unit 2. Also inverse switching is possible. This function enables, in the facsimile apparatus, to execute the facsimile functions such as transmission and reception, and, in the printer unit 2 therein, to effect high-definition recording exceeding the resolution of the facsimile.

The details of the process will be explained with reference to FIGS. 65 and 66.

Figure 65:
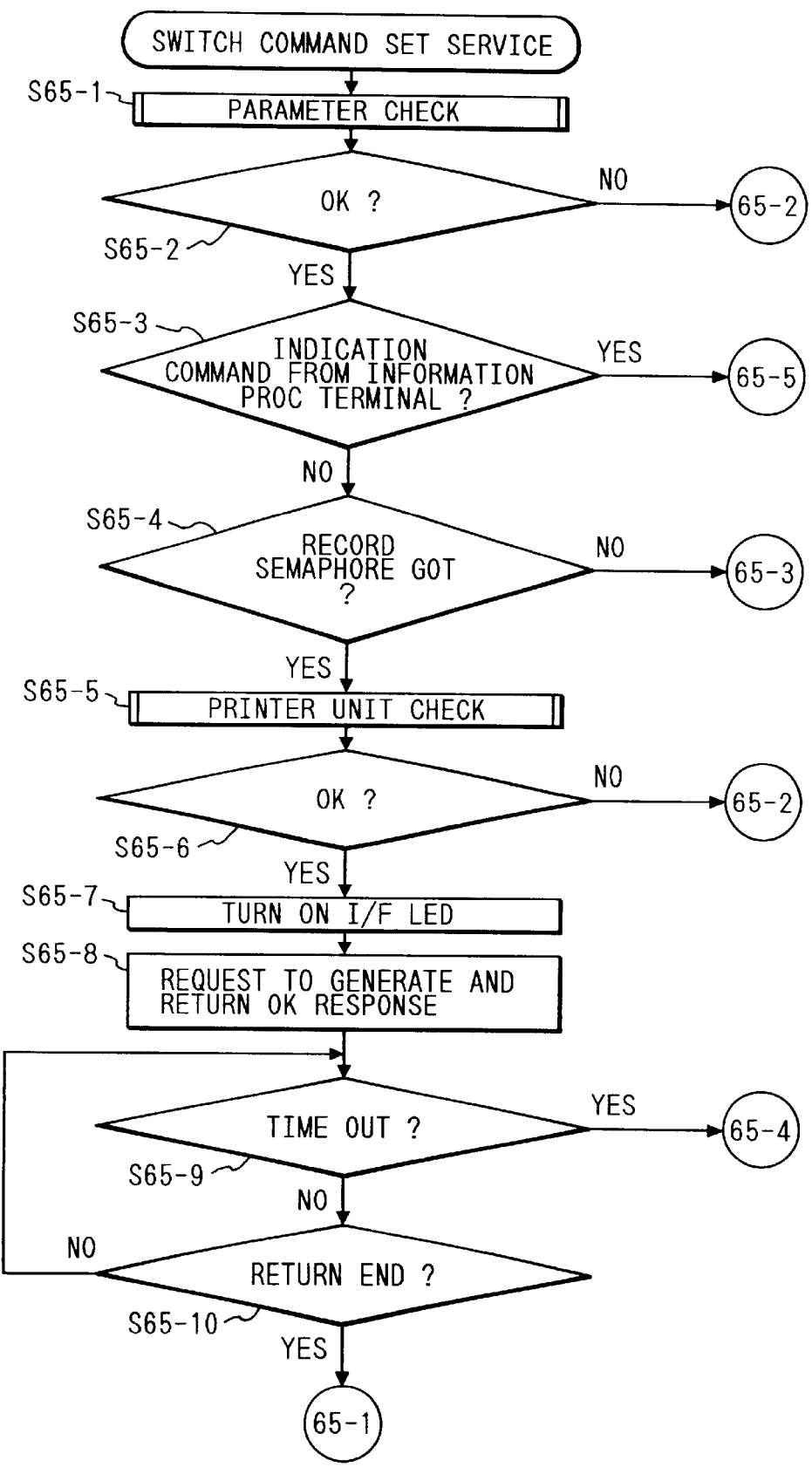
FIGS. 65 and 66 are flow charts showing a command set switching process.
Figure 66:
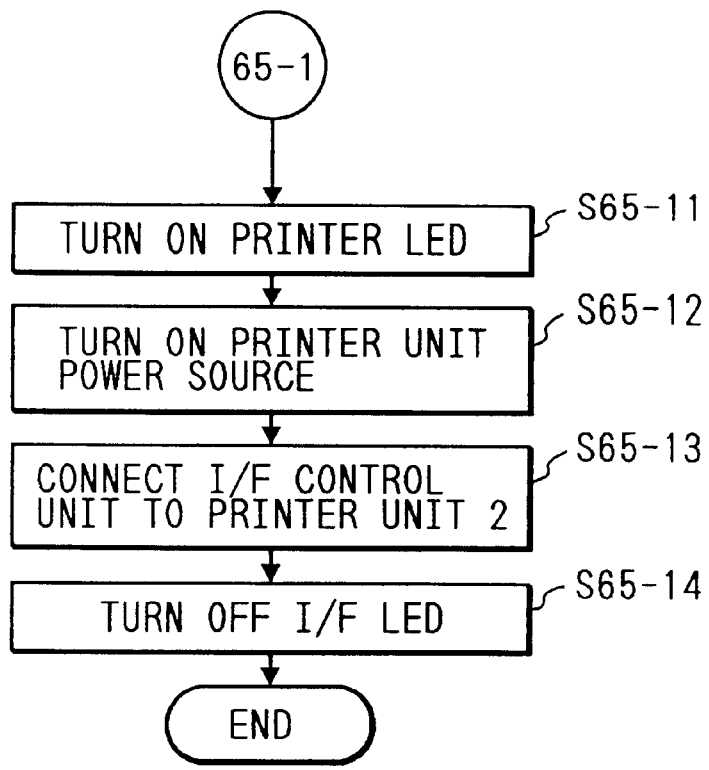

The process in FIG. 65 is executed when the command process task in FIGS. 8A and 8B identify a command set switching command.

A step S65-1 discriminates whether the reception parameter, accompanying the command set switching command and designating the command set, is correct, as will be explained later, and the sequence branches from steps S65-2 to S65-3 if said parameter is correct, but, if incorrect, to an NG process to be explained later.

The step S65-3 discriminates whether content of the command set in the reception parameter is either a command set indicated by the information processing terminal 109 or a printer emulation command set, and the sequence proceeds respectively to a step S69-1 (to be explained later) or to a step S65-4 for acquiring a recording semaphore (recording resourced).

The recording semaphore is acquired in the operation of the facsimile apparatus utilizing the printer unit 2, and is released at the end of said operation, and the operation (such as reception recording (record output of the received image) or copy recording (record output of the copy image) cannot be executed unless the semaphore is acquired. This arrangement enables smooth simultaneous operations.

If the recording semaphore can be acquired in the step S65-4, the sequence proceeds to a step S65-5, but, if cannot, the sequence branches to a BUSY process. The step S65-5 checks the abnormality of the printer unit 2, as will be explained later, and the sequence proceeds from steps S65-6 to S65-7 if the check turns out OK, but to an NG process in case abnormality such as absence of recording sheet or sheet jamming is found. In case of abnormality, the command set switching is inhibited, since the switching to the printer emulation mode is meaningless, as the printer normally shifts the interface to the off-line mode in case of the abnormality such as absence of the recording sheet, thereby inhibiting the entry of a command from the interface.

Then a step S65-7 turns on the interface LED to indicate that the operation is in progress. During the turn on state of the interface LED, the key input to the facsimile apparatus is inhibited. A step S65-8 generates an OK response to the interface control task, and requests thereto to return the OK response, indicating that the operation is in progress properly, to the information processing terminal 109. The transmission is executed by the interface control task. Steps S65-9 and S65-10 discriminate whether the interface control task has completed the return to the information processing terminal 109, and, if completed, the sequence proceeds to a step S65-11. If a predetermined time expires in the step S65-9 before the completion of the return, the sequence branches to an abnormality process. In the present embodiment, the above-mentioned time is fixed, but it may be made variable by a registration in the facsimile apparatus or in the information processing terminal 109. The step S65-11 turns on a printer LED (not shown) on the operation panel 112, indicating that the print emulation command set is selected. Then a step S65-12 turns on the soft power supply of the printer unit 2. In case of the uncontrollable operation of the printer MPU 201 or an error thereof, for example due to data remaining in the printer unit 2, there may exist complex requests for the copy recording, reception recording etc. from the facsimile MPU 101 and an error process for rectifying such situation according to the state of such error may result in a complication in the program. The soft power supply process is provided to resolve such drawback. More specifically, this process effects initialization of the printer unit 2. A step S65-13 shift the connection of the interface control unit 108, from [information processing terminal 109 to facsimile MPU 101] and [facsimile MPU 101 to printer unit 2] to [information processing terminal 109 to printer unit 2]. Consequently the data from the information processing terminal 109 are directly transmitted to the printer unit 2, as in the conventional one-directional Centronics. A step S65-14 turns off the interface LED, thereby indicating the end of the PRINT FILE process, whereupon the key input of the facsimile apparatus is permitted.

Figure 67:
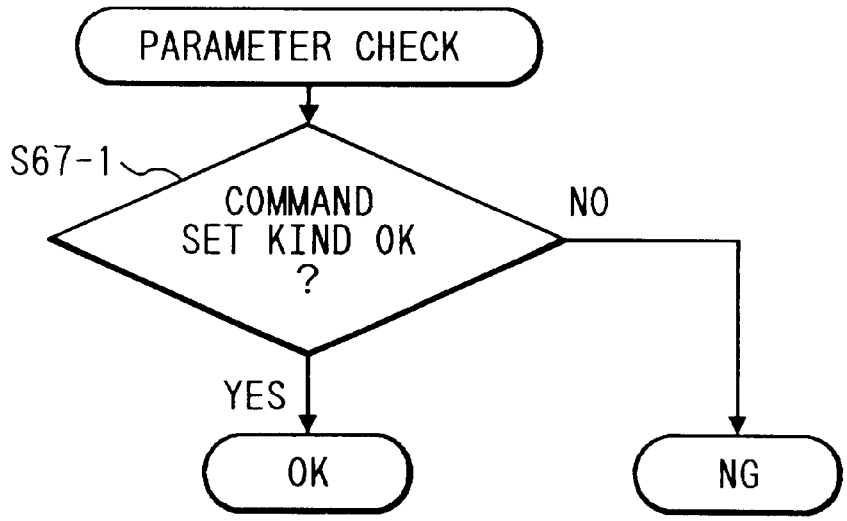
FIG. 67 is a flow chart showing the details of a parameter check process in FIG. 65.

The reception parameter check in the step S65-1 will be explained with reference to FIG. 67.

The reception parameter contains following item and following selection:

Command set: print emulation, designation by the information processing terminal 109.

If the content of the reception parameter and the setting of the facsimile apparatus are different, there occurs a reception parameter error. However, in such case, it is also possible to continue the process by "giving priority to the content of the reception parameter" or "giving priority to the setting of the facsimile apparatus", instead of setting the reception parameter error.

The step S67-1 checks the command set. If the content of the reception parameter is "print emulation" or "designated by the information processing terminal 109", the reception parameter check is terminated normally, but, if otherwise, it is terminated by an error process.

Figure 68:
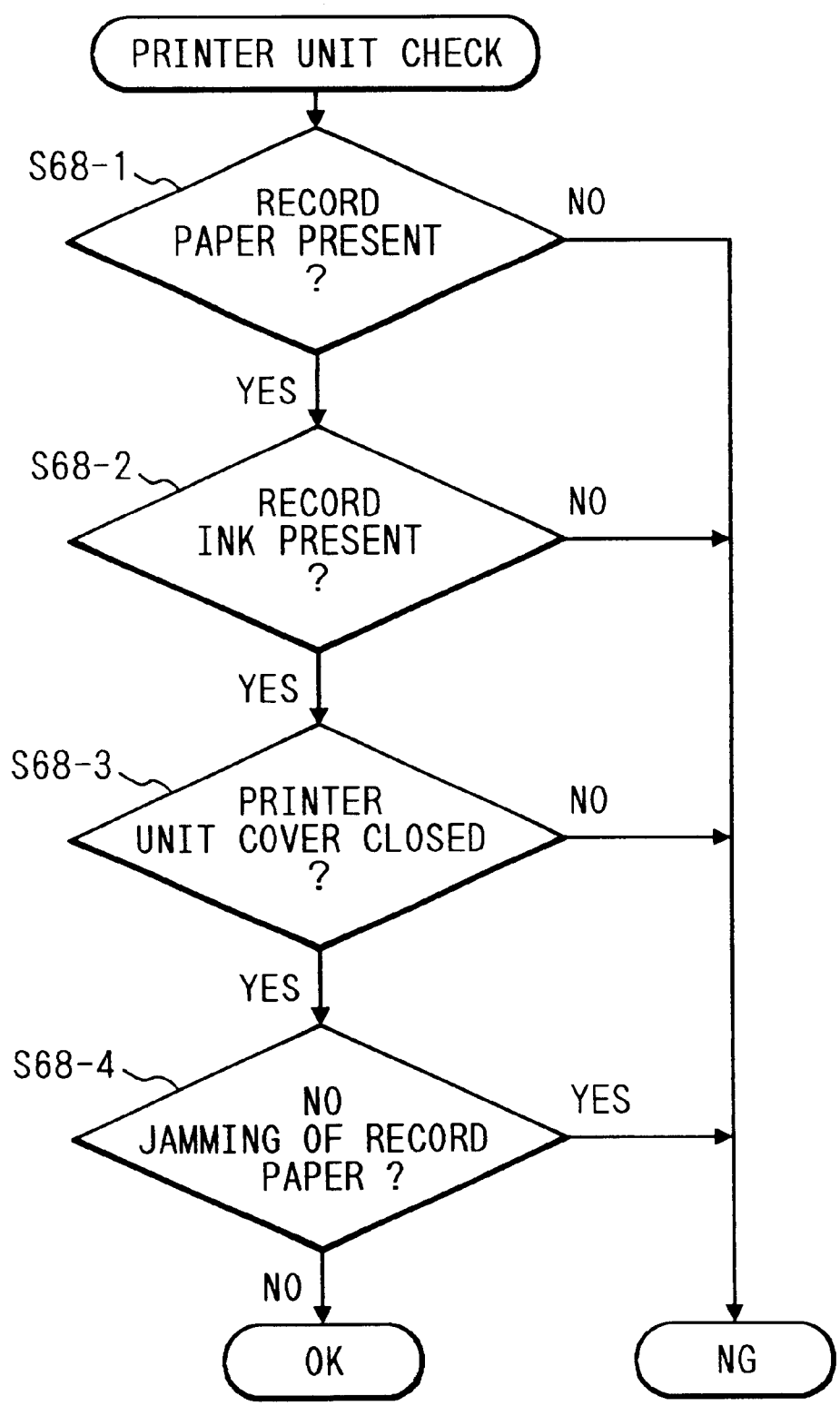
FIG. 68 is a flow chart showing the details of a record check process in FIG. 65.

The printer unit check in the step S65-5 will be explained in the following with reference to FIG. 68.

A step S68-1 checks the presence or absence of the recording sheet. The recording sheet in the sheet cassette is checked by an unrepresented sheet sensor, and, if present, the sequence proceeds to a step S68-2, but, if absent, the sequence is terminated by an error. The step S68-2 checks the presence of the recording ink, and, if present, the sequence proceeds to a step S68-3, but, if absent, the sequence is terminated by an error. The present embodiment employs ink for recording, but the present invention is applicable also to a facsimile apparatus with a printer unit utilizing laser recording and toner. The step S68-3 checks the state of the cover of the printer unit 2, and, if it is closed, the sequence proceeds to a step S68-4, but, if open, the sequence is terminated by an error. The step S68-4 checks the presence of the sheet jamming, and the sequence is terminated normally if the sheet jamming is not detected for example by the PE sensor 206, but terminated by an error if the jamming is detected.

Figure 69:
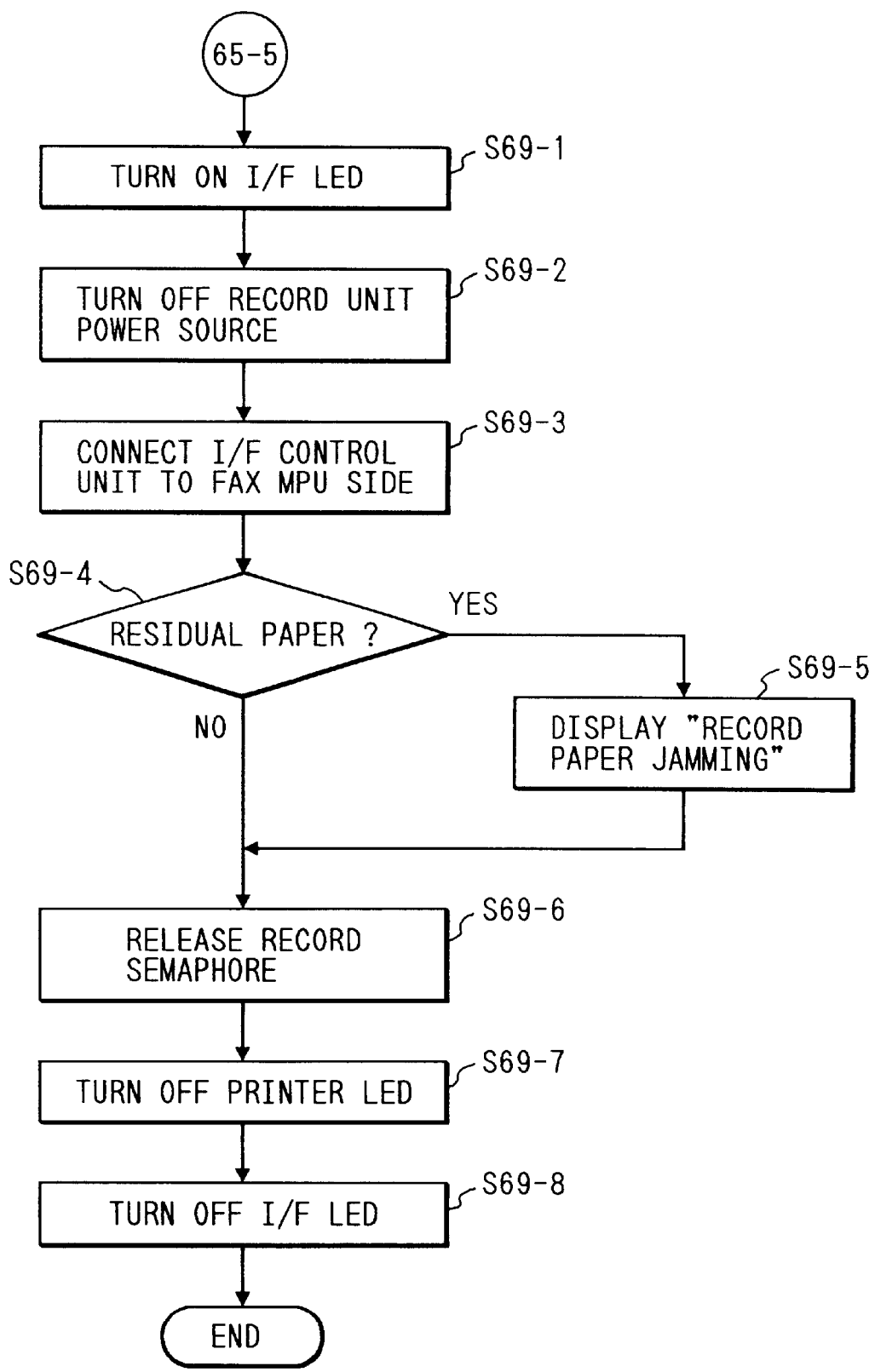
FIG. 69 is a flow chart showing a command set switching process.

In the following there will be explained the sequence branched from the step S65-3 and starting from the step S69-1, with reference to FIG. 69.

The step S69-1 turns on the interface LED, thus indicating that the operation is in progress. During the turn-on state of the interface LED, the key input to the facsimile apparatus inhibited. A step S69-2 turns off the soft power supply of the printer unit 2. A step S69-3 shifts the connection of the interface control unit 108, from [information processing terminal 109—printer unit 2] to [information processing terminal 109—facsimile MPU 101] and [facsimile MPU 101—printer unit 2]. Then a step S69-4 discriminates the presence of the sheet remaining in the apparatus, by the PE sensor 206, and, if absent, the sequence proceeds to a step S69-6, but, if present, a step S69-5 provides display for sheet jamming and the sequence proceeds to a step S69-6. The step S69-6 releases the recording semaphore acquired in the step S65-4, then a step S69-7 turns off the printer LED (not shown) provided on the operation panel 112 for indicating the command set designated by the information processing terminal 109, and a step S69-8 turns off the interface LED thereby indicating the end of the SWITCH COMMAND SET process, whereupon the key input to the facsimile apparatus is permitted.

Figure 70:
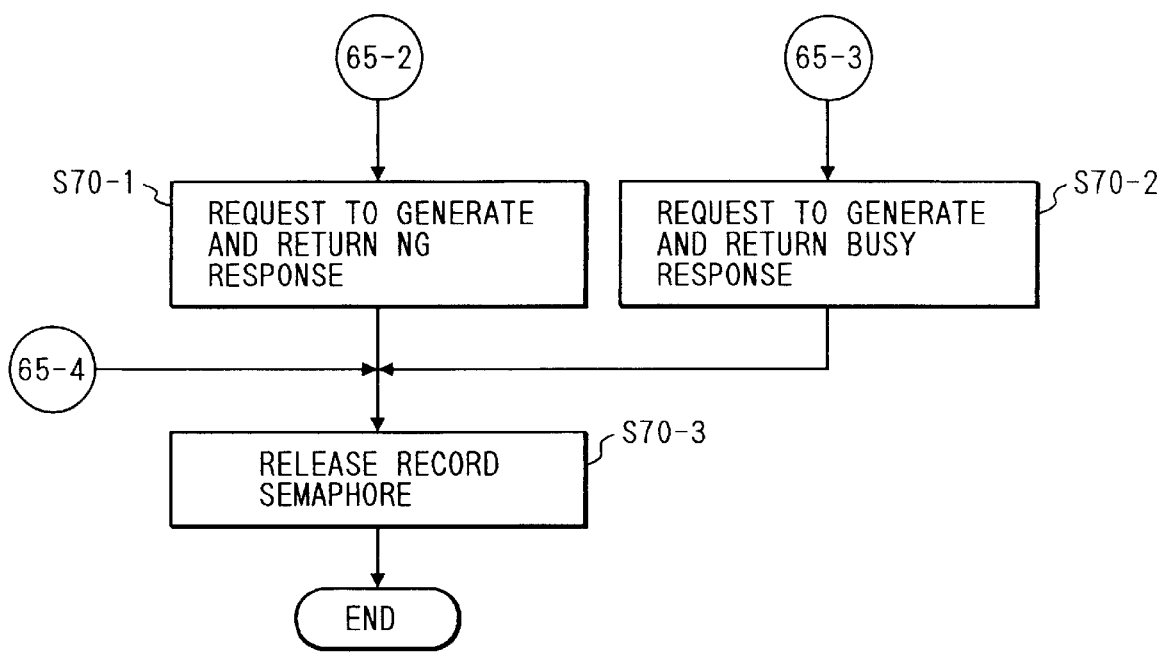
FIG. 70 is a flow chart showing the details of a post process in FIG. 65.

Now the abnormality process will be explained with reference to FIG. 70.

In case of an NG status, a step S70-1 generates an NG response to the interface control task and requests thereto return of the information of the error termination to the information processing terminal 109. In case of a BUSY status, a step S70-2 generates a BUSY response to the interface control task and requests thereto return of the information of the error termination to the information processing terminal 109. The transmission is executed by the interface control task. Then a step S70-3 releases the recording semaphore, and the abnormality process is terminated. The release of the recording semaphore is not executed if it has not been acquired.

Figure 71B:
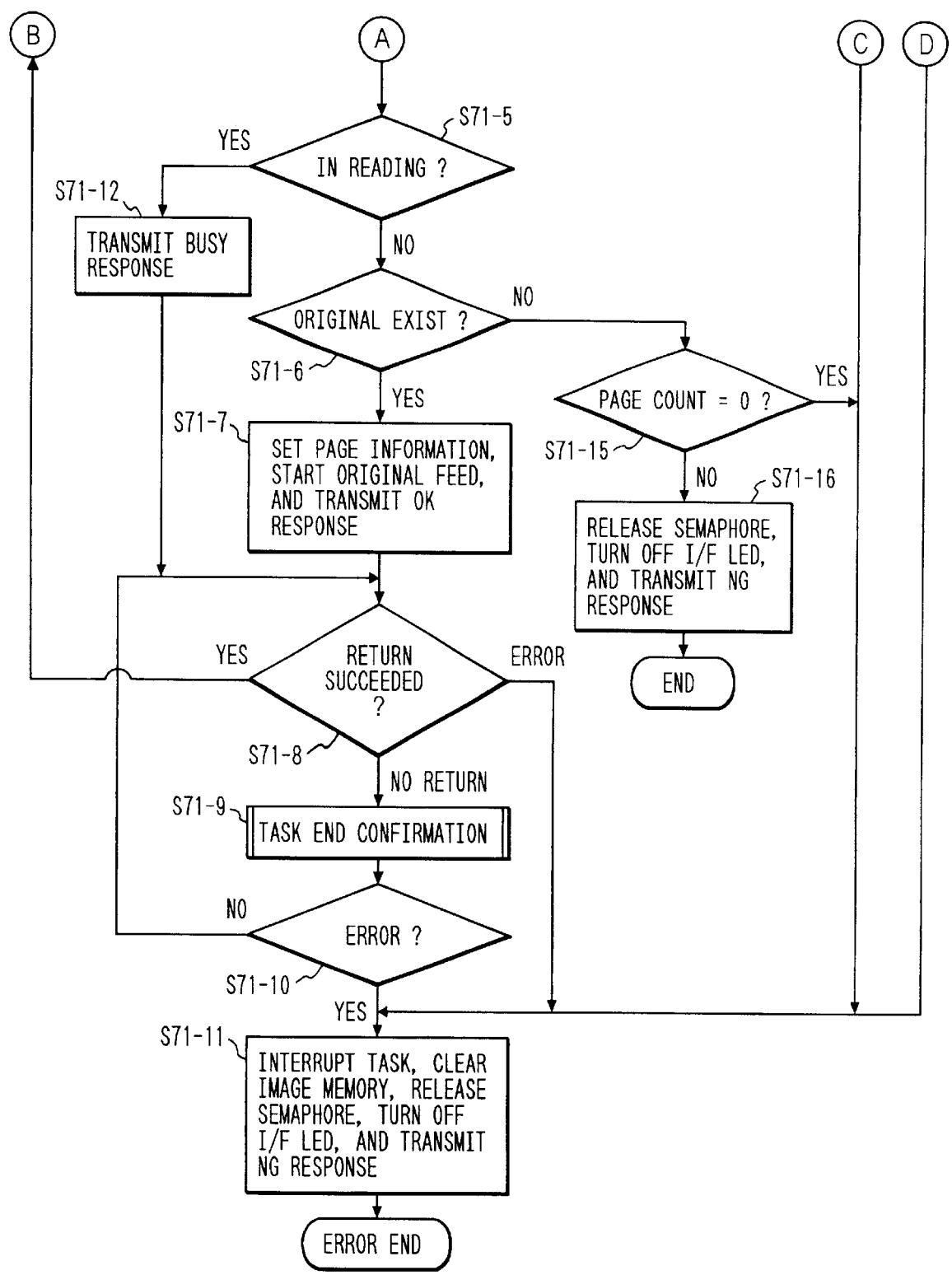
FIG. 71, composed of FIGS. 71A and 71B, is a flow chart showing a facsimile storage scan process.
Figure 72:
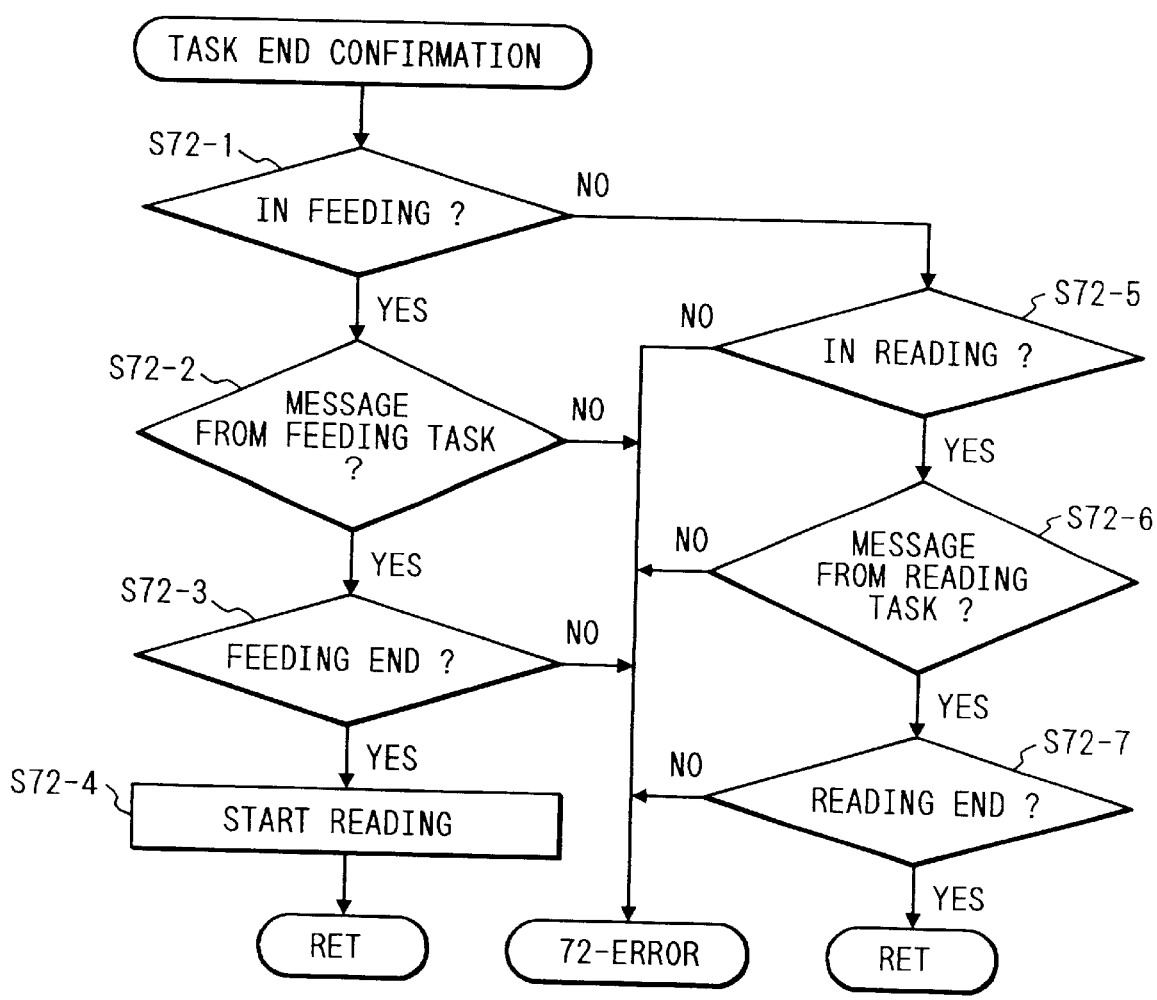
FIG. 72 is a flow chart showing the details of a task end confirmation process in FIGS. 71A and 71B.

19. Facsimile Accumulation Scan (SCAN TO FAX) Process:

FIGS. 71A, 71B and 72 are flow charts showing the facsimile accumulation scan (SCAN TO FAX) process for storing the image data, read by the reading unit 105, in the image memory area of the RAM 103.

A step S71-1 checks whether the command is proper, then acquires the reading semaphore, reading motor semaphore and latest image file ID, secures the image memory area, clears the page counter, turns on the interface LED on the operation panel 112 and transmits an OK response to the I/F control task.

In case of improper command, non acquisition of the reading semaphore or reading motor semaphore, or non-securing of the image memory area, a step S71-2 identifies an error and the sequence proceeds to a step S71-11 to effect an error process.

If the OK response is normally transmitted to the I/F control task, a step S71-3 awaits a message, indicating the completion of response transmission, from the I/F control task, and the sequence proceeds to a step S71-11 or S71-4 respectively if error is present or absent.

The step S71-4 awaits a next command from the I/F control task, and a message from the feed task and the reading task.

If a next command is received from the I/F control task, a step S71-5 checks whether the preceding page is in the course of feeding or reading, and, if the reading unit 105 is in operation, a step S71-12 transmits a BUSY response to the I/F control task and the sequence proceeds to a step S71-8.

If the reading unit 105 is not in operation, a step S71-6 checks whether the original to be read is present in the reading unit 105.

If present, a step S71-7 effects increment of the page counter, sets the page information (sub-scanning resolution, reading mode and reading density) from the I/F control task for each page, then activates the feed task for original feeding, and transmits an OK response to the I/F control task.

Thereafter a step S71-8 awaits a message, indicating the completion of response transmission, from the I/F control task, and the sequence proceeds to a step S71-11 in case of an error, but, if the transmission is completed without error, the sequence proceeds to a step S71-4 to await a next command from the I/F control task. If the transmission is not completed, a step S71-9 confirms the end of the feed task and the reading task.

Then a step S71-10 confirms the presence of an error in the feed task and the reading task, and the sequence proceeds to a step S71-11 or S71-8 respectively if the error is present or absent.

If a message is received from the feed task or the reading task in the step S71-4, a step S71-13 confirms the end of the feed task and the reading task.

A step S71-14 confirms whether an error has been generated in the feed task and the reading task, and the sequence proceeds to a step S71-11 in case of an error such a feed error or an image memory overflow, but to a step S71-4 in the absence of the error.

If the step S71-6 identifies that the original to be read is not present in the reading unit 105, a step S71-15 confirms whether the page counter is 0.

The sequence proceeds to a step S71-11 if the page counter is 0, but, in case the page counter is not 0, a step S71-16 releases the reading semaphore and the reading motor semaphore, turns off the interface LED on the operation panel 112 and transmits an NG response to the I/F control task, and the process is terminated.

The step S71-11 executes an error process by interrupting the feed task and the reading task, releasing the image memory area, the reading semaphore and the reading motor semaphore, turning off the interface LED on the operation panel 112 and transmitting an NG response to the I/F control task, and the process is terminated.

A step S72-1 confirms whether the reading unit 105 is currently in the feeding operation, and, if in the feeding operation, the sequence proceeds to a step S72-2 to confirm whether a message has been received from the feed task.

If so, a step S72-3 confirms whether the message from the feed task is a feed end message, and, if so, a step S72-4 activates the reading task in order to start reading of the original present in the reading unit 105.

If the step S72-1 identifies that the reading unit 105 is currently not in the feeding operation, a step S72-5 confirms whether the reading unit 105 is currently in the reading operation, and, if so, a step S72-6 confirms whether it is a message from the reading task.

If it is a message from the reading task, a step S72-7 confirms whether the message from the reading task is a reading end message, and, if so, the process is terminated normally.

However the process is terminated by an error process if the step S72-2 identifies that the message has not been from the feed task, if the step S72-3 identifies that the message from the feed task is not a feed end message, if the step S72-5 identifies that the reading unit 105 is currently not in the reading operation, if the step S72-6 identifies that the message has not been received from the reading task, or if the step S72-7 identifies that the message from the reading task is not a reading end message.

In the reading task, the RAW image data, read from the reading unit 105, are converted into the RL data in the RL-RAW converter 106, then the RL data are stored in an encoding buffer in the RAM 103 and subjected to MMR encoding, and the MMR encoded data are stored in the image memory area secured in the step S71-1 in the image memory of the RAM 103.

In this operation, the communication buffer in the RAM 103 is not used.

In the above-explained process, the process is interrupted if the interface is not rendered capable of transmission within a predetermined time, and there can thus be provided a facsimile apparatus improved in the convenience of use, utilizing a parallel interface capable of high-speed data transfer.

Also the image data are immediately deleted from the memory in case of an error in the course of accumulation of image data in the memory under the instruction from the information processing terminal 109. This enables effective utilization of memory, thereby reducing the cost of the apparatus.

Also the limitation in the combinations of the operations by the instruction from the information processing terminal 109, those from the operation panel 112 and those of the facsimile apparatus itself allows to simplify the control of the entire facsimile apparatus, thereby reducing the cost thereof.

Also providing of the display that the apparatus is not in a usable state allows to obtain a facsimile apparatus of improved convenience of use.

20. Original Transmission (SEND DOC) Process:

FIG. 73 is a flow chart of the original transmission (SEND DOC) process.

A step S73-1 checks whether the command is proper, then acquires the reading motor semaphore and the communication semaphore, feeds the original present in the reading unit 105, also acquires the latest image file ID, secures an image memory area in the RAM 103, sets the telephone number data from the I/F control task, turns on the interface LED on the operation panel 112, and transmits an OK response to the I/F control task.

If the command is improper, if the reading motor semaphore or the communication semaphore cannot be acquired, or if the image memory area cannot be secured, a step S73-2 identifies an error and a step S73-11 executes an error process.

If the OK response is transmitted in normal manner to the I/F control task, a step S73-3 awaits a message, indicating the completion response transmission, from the I/F control task, and the sequence proceeds to a step S73-11 or S73-4 respectively if an error is present or absent.

The step S73-4 awaits a next command from the I/F control task, and, if the command is improper, the sequence proceeds to a step S73-11 to effect an error process.

If a next command is received from the I/F control task, a step S73-5 sets the page information (sub scanning resolution, reading mode, reading density) from the I/F control task, for the first page, in the original mode LED etc. on the operation panel 112, and transmits an OK response to the I/F control task.

After said OK response transmission, a step S73-6 awaits a message, indicating completion of the response transmission, from the I/F control task, and, in case of an error, the sequence proceeds to a step S73-11, but, in case of completion of the transmission without error, to a step S73-7 to await a next command from the I/F control task.

If a next command is received from the I/F control task, a step S73-8 sets the file ID information to the I/F control task, and transmits an OK response to the I/F control task.

If the command is improper, the sequence proceeds to a step S73-11 to effect an error process.

If the OK response is transmitted in normal manner to the I/F control task, a step S73-9 awaits a message, indicating completion of the response transmission, from the I/F control task, and the sequence proceeds to a step S73-11 or S73-10 respectively if an error is present or absent.

The step S73-10 turns off the interface LED on the operation panel 112 and releases the communication semaphore and the reading motor semaphore, and the process is terminated normally.

The step S73-11 effects an error process by interrupting the feed task, releasing the image memory area, turning off the interface LED on the operation panel 112, releasing the communication semaphore and the reading motor semaphore and transmitting an NG response to the I/F control task, and the process is terminated.

When the interface LED on the operation panel 112 is turned off and the communication semaphore and the reading motor semaphore are released, the communication task is activated in the stand-by state, by the image memory area set in the step S73-1.

After the activation of the communication task, operations same as those in the ordinary original transmission are executed, based on the original reading mode information, indicated by the original mode LED etc. on the operation panel 112.

A change in the original reading mode for the second or subsequent pages is not conducted from the information processing terminal 109 but, as in the ordinary original transmission, by a user operation on the operation panel 112.

As explained in the foregoing, the present invention allows to distinguish the communication management information of the communication instructed from the operation panel 112 and that of the communication instructed from the information processing terminal 109.

It is also possible to identify whether the communication management information has been issued in the communication management report of the facsimile main unit and whether it has been transmitted to the information processing terminal 109.

Also effective utilization of the memory is made possible by common use of the buffer for temporarily storing the image data and the buffer for temporarily storing the communication management information.

The present invention has been explained by a preferred embodiment thereof, but the present invention is by no means limited to such embodiment and is subject to various modifications within the scope and spirit of the appended claims.

What is claimed is:

1. An image communication apparatus comprising:

a line controller, arranged to effect the transmission and reception of image data through a telephone line;

an interfacer arranged to effect the transmission and reception of information with an information processing terminal;

a first instruction acceptor, arranged to accept an instruction for transmission by said line controller from the information processing terminal;

an operator, arranged to accept the entry of a manual instruction;

a second instruction acceptor, arranged to accept an instruction for transmission by said line controller from said operator;

a memory, arranged to store communication management information indicating a result of data communication by said line controller;

an outputter, arranged to output an image based on input data; and a controller, arranged to control at least said first instruction acceptor, said second instruction acceptor, said memory and said outputter, wherein said controller is adapted to store the communication management information according to the instruction accepted by said first instruction acceptor and the communication management information according to the second instruction accepted by said second instruction acceptor in said memory, respectively, in a mutually distinguishable manner, and wherein said controller selectively outputs the communication management information either to the information processing terminal via said interfacer or to said outputter, and wherein said controller outputs the communication management information in the form of a list encompassing the plurality of communications to said outputter, and outputs the communication management information for each of the plurality of communications separately to the information processing terminal through said interfacer.

2. An image communication apparatus according to claim 1, wherein said communication management information is information on the partner of communication, result of communication etc.

3. An image communication apparatus according to claim 1, wherein each of said first and second instruction acceptors is adapted to accept an instruction for the output of said communication management information.

4. An image communication apparatus according to claim 3, wherein, in case an instruction for output of said communication management information is accepted by said first instruction acceptor, said output is so conducted that the communication management information relating to the instruction accepted by said first instruction acceptor and that relating to the instruction accepted by said second management information relating to the instruction accepted by said first instruction acceptor and that relating to the instruction accepted by said second instruction acceptor are mutually distinguishable.

5. An image communication apparatus according to claim 1, wherein said controller is adapted to effect control so as to separately store the communication management information outputted according to the instruction accepted by said first instruction acceptor and that outputted according to the instruction accepted by said second instruction acceptor.

6. An image communication apparatus comprising:

a line controller, arranged to effect the transmission and reception of image data through a telephone line;

an interfacer, arranged to effect the transmission and reception of information with an information processing terminal;

a first instruction acceptor, arranged to accept a first instruction, from the information processing terminal, for output of the communication management information;

an operator, arranged to accept the entry of a manual instruction;

a second instruction acceptor, arranged to accept a second instruction from said operator, for output of the communication management information;

an outputter, arranged to output the communication management information according to the first or second instruction accepted by said first or second instruction acceptor, respectively; and a controller, arranged to control at least said memory said first instruction and said second instruction acceptor, wherein said controller is adapted to store, in correlation with the outputting of the communication management information, information indicating the first instruction accepted by said first instruction and the second instruction accepted by said second instruction acceptor in said memory such that the first and second instructions can be distinguished from each other, and wherein, in case the first instruction for output of the communication management information is accepted by said first instruction acceptor, said output is so conducted that previously outputted communication management information and newly outputted communication management information are mutually distinguishable.

7. An image communication apparatus according to claim 6, wherein said outputter includes first output means for output to said information processing terminal through said interfacer, and a second outputter, arranged to output to a recorder.

8. An image communication apparatus according to claim 6, wherein said controller is adapted to separately store execution of the instruction accepted by said first instruction acceptor and that accepted by said second instruction acceptor.

9. An image communication apparatus comprising:

a line control controller, arranged to effect the transmission and reception of image data through a telephone line;

an interfacer, arranged to effect the transmission and reception of information with an information processing terminal;

a memory arranged to store communication management information relating to image communication;

an instruction receiver, arranged to receive an instruction, from said information processing terminal, for output of said communication management information;

an outputter, arranged to output said communication management information through said interfacer according to the instruction accepted by said instruction receiver;

a state detector, arranged to detect a predetermined state; and a controller, arranged to limit the execution of the instruction received by said instruction in case of detection of the predetermined state by said state detector.

10. An image communication apparatus according to claim 9, wherein a buffer for temporarily storing the image transmitted or received by said line controller and a buffer for temporarily storing the communication management information transmitted or received by said interfacer are used in common.

11. An apparatus according to claim 9, further comprising an outputter, arranged to output communication management information relating to data communication by said line controller to the information processing terminal through said interfacer according to the instruction accepted by said instruction receiver.

12. An image communication apparatus comprising:

a line controller, arranged to effect transmission and reception of image data through a telephone line;

a first instruction receiver, arranged to receive an instruction, from an information processing terminal, for output of communication management information;

a operator, arranged to accept the entry of a manual instruction;

a second instruction receiver for receiving an instruction from said operator;

an interfacer, arranged to effect the transmission or reception of information with said information processing terminal; and a controller, arranged to limit, during execution of the instruction received by said first instruction receiver, the communication by said line controller and the execution of the instruction received by said second instruction receiver.

13. An image communication apparatus according to claim 12, further comprising an informer, arranged to inform that, during the execution of the instruction received by said first instruction receiver, the instruction received by said second instruction receiver cannot be executed.

14. A data communication apparatus comprising:
   a line controller, arranged to effect the transmission and reception of data through a line;
   a memory arranged to store communication management information relating to data communication by said line controller;
   an outputter, arranged to output the communication management information stored in said memory; and
   a controller, arranged to control outputter said output means such that communication management information which has been outputted at least once and communication management information which is newly outputted can be outputted distinguishably.

15. An apparatus according to claim 14, further comprising an interfacer, arranged to effect the transmission and reception of data with an information processing terminal, and
   wherein said outputter outputs the communication management information to the information processing terminal through said interface.

16. An apparatus according to claim 14, wherein the communication management information includes information relating to whether or not transmission by said line controller has normally terminated.

17. A data communication apparatus comprising:
   a line controller, arranged to effect the transmission and reception of data through a line;
   an interfacer, arranged to effect the transmission or reception of data with an information processing terminal;
   an instruction receiver, arranged to receive an instruction which is used for communicating predetermined data with the information processing terminal through said interfacer; and
   a controller, arranged to limit, during execution of communication with the information processing terminal based on the instruction received by said instruction receiver, the communication by said line controller.

18. An apparatus according to claim 17, wherein said instruction receiver receives the instruction from the information processing terminal through said interfacer.

19. A control method for an image communication apparatus comprising:
   a line control step for effecting transmission and reception of image data through a telephone line;
   an interface step for effecting transmission and reception of information with an information processing terminal;
   a first instruction accepting step for accepting an instruction for transmission in the line control step from the information processing terminal;
   a second instruction accepting step for accepting, from an operation part of said image communication apparatus, an instruction for transmission in the line control step;
   a storing step for storing communication management information indicating a result of image communication in the line control step,
   wherein said storing step is adapted to store the communication management information according to the instruction accepted in the first instruction accepting step and the communication management information according to the instruction accepted in the second instruction accepting step, respectively, in a mutually distinguishable manner; and
   a selective output step for selectively outputting the communication management information either to the information processing terminal or to a different outputter provided for outputting an image based on input data, said selective output step outputting the communication management information in the form of a list encompassing the plurality of communications to said outputter, and outputting the communication management information for each of the plurality of communications separately to the information processing terminal in said interface step.

20. A control method for an image communication apparatus comprising:
   a line control step for effecting transmission and reception of image data through a telephone line;
   an interface step for effecting transmission and reception of information with an information processing terminal;
   a storing step for storing communication management information relating to image communication;
   a first instruction accepting step for accepting a first instruction, from the information processing terminal, for output of the communication management information;
   a second instruction accepting step for accepting a second instruction, from an operation part of said image communication apparatus, for output of the communication management information; and
   an output step for output of the communication management information according to the first or second instruction accepted in the first or second instruction accepting step, respectively,
   wherein said storing step is adapted to store the communication management information outputted according to the first instruction accepted in the first instruction accepting step and the communication management information outputted according to the second instruction accepted in the second instruction accepting step, such that the first and second instructions can be distinguished from each other, and
   wherein, in case the first instruction for output of the communication management information is accepted in said first instruction accepting step, said output is so conducted that previously outputted communication management information and newly outputted communication management information are mutually distinguishable.

21. A control method for an image communication apparatus comprising:
   a line control step for effecting transmission and reception of image data through a telephone line;
   an interface step for effecting transmission and reception of information with an information processing terminal;
   an instruction receiving step for receiving an instruction, from the information processing terminal, for communicating predetermined data with the information processing terminal in the interface step;

an output step for output of the communication management information through said interface step according to the instruction accepted in said instruction receiving step;

a state detection step for detecting whether or not a process based on a manual instruction entered from an operation part of said image communication apparatus is being executed; and a limiting step for limiting execution of the communication with the information processing terminal based on the instruction received in the instruction receiving step in a case where it has been detected in said state detection step that the process based on the manual instruction entered from the operation part is being executed.

22. A control method for an image communication apparatus comprising:

a line control step for effecting transmission and reception of image data through a telephone line;

an interface step for effecting transmission or reception of information with an information processing terminal;

a first instruction receiving step for receiving an instruction, from the information processing terminal, for communicating predetermined data with the information processing terminal in the interface step;

a second instruction receiving step for receiving a manual instruction from operation means, the operation means being for entering the manual instruction; and a limiting step for limiting, during execution of the communication with the information terminal based on the instruction received in the first instruction receiving step, execution of the instruction received in the second instruction receiving step.

23. A control method for a data communication apparatus, said method comprising:

a communicating step for communication data through a line;

a management step of managing communication management information relating to the communicated data in said communicating step;

an outputting step of outputting the communication management information managed in said management step; and a controlling step of performing control such that communication management information which has been outputted at least once and communication management information which is newly outputted can be outputted distinguishably.

24. A control method for a data communication apparatus connecting to an information processing terminal, comprising:

a communicating step of communicating data through a line;

an instruction receiving step of receiving an instruction which is used for communicating predetermined data with the information processing terminal; and a controlling step of limiting communication which is performed through the line in said communicating step, as long as communication with the information processing terminal is being executed based on the instruction received in said instruction receiving step.

25. A computer readable program stored in a storage medium, comprising:

a transmission step of transmitting data through a line by a data communication apparatus;

an interface step of effecting transmission and reception between the data communication apparatus and an information processing terminal connected to the data communication apparatus;

a first instruction input step of inputting an instruction for transmission in the transmission step from the information processing terminal;

a second instruction input step of inputting an instruction for transmission in the transmission step from an operation part of the data communication apparatus;

a storing step of storing communication management information relating to data communication in said transmission step to a memory;

a controlling step of performing control such that the communication management information according to the instruction inputted in said first instruction input step and the communication management information according to the second instruction inputted in said second instruction input step, respectively, are stored in the memory in a mutually distinguishable manner; and a selective output step for selectively outputting the communication management information either to the information processing terminal or to a different outputter provided for outputting an image based on input data, said selective output step outputting the communication management information in the form of a list encompassing the plurality of communications to said outputter, and outputting the communication management information for each of the plurality of communications separately to the information processing terminal in said interface step.

26. A computer readable program stored in a storage medium, comprising:

a communication step of communicating data through a line by a data communication apparatus;

an interface step of effecting transmission and reception between the data communication apparatus and an information processing terminal connected to the data communication apparatus;

a storing step of storing communication management information relating to data communication in said communication step to a memory;

an output step of outputting the communication management information relating to the data communication in said communication step stored in the memory;

a first instruction input step of inputting an instruction for output in said output step from the information processing terminal;

a second instruction input step of inputting an instruction for output in said output step from an operation part of the data communication apparatus; and a controlling step of performing control such that information representing the instruction in said first instruction input step and information representing the instruction in said second instruction input step are distinguishably stored in the memory in correlation with the communication management information outputted in said output step, and wherein, in case the first instruction for output of the communication management information is accepted in said first instruction accepting step, said output is so conducted that previously outputted communication management information and newly outputted communication management information are mutually distinguishable.

27. A computer readable program stored in a storage medium, comprising:
- a communication step of communicating data through a line by a data communication apparatus;
- an interface step of effecting transmission and reception between the data communication apparatus and an information processing terminal connected to the data communication apparatus;
- an instruction input step of inputting an instruction, from the information processing terminal, for performing predetermined data communication between the data communication apparatus and the information processing terminal;
- a detection step of detecting whether or not a process based on a manual instruction entered from an operation part of the data communication apparatus is being executed; and
- a control step of limiting the execution of the communication between the data communication apparatus and the information processing terminal in a case where it has been detected in said detection step that the process based on the manual instruction entered from the operation part of the data communication apparatus is being executed.

28. A computer readable program stored in a storage medium, comprising:
- a communication step of communicating data through a line by a data communication apparatus;
- an interface step of effecting transmission and reception between the data communication apparatus and an information processing terminal connected to the data communication apparatus;
- a first instruction input step of inputting an instruction for communicating predetermined data between the data communication apparatus and the information processing terminal;
- a second instruction input step of inputting an instruction from an operation part of the data communication apparatus; and
- a control step of limiting execution of the instruction in said second instruction input step, as long as the communication is being executed between the data comunication apparatus and the information processing terminal on the basis of the instruction in said first instruction input step.

29. A computer readable program stored in a storage medium, comprising:
- a communication step of communicating data through a line by a data communication apparatus;
- a management step of managing communication management information relating to communicated data in said communication step;
- an outputting step of outputting the communication management information managed in said management step; and
- a control step of performing control such that communication management information which has been outputted at least once in said outputting step and communication management information which is newly outputted can be distinguishably outputted.

30. A computer readable program stored in a storage medium, comprising:
- a communication step of communicating data through a line by a data communication apparatus;
- an interface step of effecting transmission and reception between the data communication apparatus and an information processing terminal connected to the data communication apparatus;
- an instruction input step of inputting an instruction for communicating predetermined data between the data communication apparatus and the information processing terminal; and
- a control step of limiting communication in said communication step, as long as communication is being executed between the data communication apparatus and the information processing terminal on the basis of the instruction inputted in said instruction input step.

31. A control method for controlling a data processing system, the data processing system comprising an information processing terminal and a data communication apparatus having an operation unit and provided for effecting data communication with a remote data communication device via a telephone line and for effecting data communication with the information processing terminal, said method comprising the steps of:
- storing communication management information relating to communication by the data communication apparatus via the telephone line with the remote data communication device;
- determining whether the communication management information stored by said storing step relates to a first type of data communication responsive to an operation of the operation unit or to a second type of data communication responsive to an instruction from the information processing terminal; and
- outputting the communication management information from the data communication apparatus to the information processing terminal,
- wherein said storing step stores the communication management information so as to distinguish between the first and second types of data communication in accordance with determination results of said determining step.

32. A method according to claim 31, wherein the data communication apparatus includes a memory and said storing step stores the communication management into the memory.

33. A method according to claim 31, wherein the data communication apparatus includes a printer, said method further comprising a second output step of outputting the communication management information to the printer to be printed in a manner distinguishing the determination results.

34. A computer readable program stored in a storage medium for performing a control method for controlling a data processing system, the data processing system comprising an information processing terminal and a data communication apparatus having an operation unit and provided for effecting data communication with a remote data communication device via a telephone line and for effecting data communication with the information processing terminal, said method comprising the steps of:
- storing communication management information relating to communication by the data communication apparatus via the telephone line with the remote data communication device;
- determining whether the communication management information stored by said storing step relates to a first type of data communication responsive to an operation of the operation unit or to a second type of data communication responsive to an instruction from the information processing terminal; and outputting the communication management information from the data communication apparatus to the information processing terminal, wherein said storing step stores the communication management information so as to distinguish between the first and second types of data communication in accordance with determination results of said determining step.

35. A data communication apparatus comprising:

an operator, arranged to accept the entry of a manual instruction;

an interfacer, arranged to connect to an information processing terminal;

a communicator, arranged to effect data communication based upon the manual instruction entered via the operator or a command sent from the information processing terminal through said interfacer;

a memory, arranged to store communication management information relating the communication effected by said communicator;

an outputter, arranged to output the communication management information stored by said memory; and a controller, arranged to control said output such that the communication management information which has been outputted at least once and the communication management information which is newly outputted can be outputted distinguishably.

36. An apparatus according to claim 35, wherein said controller further controls said interfacer such that the communication management information is outputted to the information processing terminal.

37. An apparatus according to claim 35, wherein the communication management information includes information relating to whether or not communication by said communicator has properly terminated.

38. A control method for a data communication apparatus comprising:

an operation step for accepting the entry of a manual instruction;

an interface step for connecting to an information processing terminal;

a communication step for effecting data communication based upon the manual instruction entered in the operation step or based upon a command sent from the information processing terminal during the interface step;

a storing step for storing communication management information relating the communication effected in the communication step to a memory;

an outputting step for outputting the communication management information stored in the storing step; and a control step for controlling said output such that the communication management information which has been outputted at least once and the communication management information which is newly outputted can be outputted in a mutually distinguishable manner.

39. A computer readable program stored in a storage medium, comprising:

an operation step of accepting the entry of a manual instruction;

an interface step of connecting to an information processing terminal;

a communication step of effecting data communication based upon the manual instruction entered in the operation step or based upon a command sent from the information processing terminal during the interface step;

a storing step of storing communication management information relating the communication effected in the communication step to a memory;

an outputting step of outputting the communication management information stored in the storing step; and a control step of controlling said output such that the communication management information which has been outputted at least once and the communication management information which is newly outputted can be outputted in a mutually distinguishable manner.

* * * * *

UNITED STATES PATENT AND TRADEMARK OFFICE
CERTIFICATE OF CORRECTION

PATENT NO. : 6,266,162 B1
DATED : July 24, 2001
INVENTOR(S) : Koji Okamura et al.

It is certified that error appears in the above-identified patent and that said Letters Patent is hereby corrected as shown below:

Title page,
Item [56] References Cited, FOREIGN PATENT DOCUMENTS "4367153" should read -- 4-367153 --.

Column 8,
Line 14, "followings:" should read -- following: --.

Column 14,
Line 37, "terminated. In" should read -- terminated. ¶ In --.

Column 16,
Line 36, "(GET ACTIVITY ID)," should read -- (GET ACTIVITY INFO), --.

Column 23,
Line 65, "red" should read -- end --.

Column 29,
Line 12, "comnation" should read -- combination --.

Column 32,
Line 63, "esits" should read -- exists --.

Column 34,
Line 53, "109." should read -- 109. ¶ Then --.
Line 57, "of" should read -- on --.

Column 40,
Line 11, "$temp_{13}$ mode" should read -- temp__mode --.

Column 45,
Line 25, "109. A step" should read -- 109. ¶ A step --.

UNITED STATES PATENT AND TRADEMARK OFFICE
CERTIFICATE OF CORRECTION

PATENT NO.    : 6,266,162 B1
DATED         : July 24, 2001
INVENTOR(S)   : Koji Okamura et al.

It is certified that error appears in the above-identified patent and that said Letters Patent is hereby corrected as shown below:

<u>Column 55,</u>
Line 14, "strep" should read -- step --.
Line 41, "(S631)," should read -- (S63-1), --.

<u>Column 63,</u>
Lines 32 and 33 should be deleted.
Line 34, "instruction accepted by said second" should be deleted.
Line 47, "terminal;" should read -- terminal; ¶ a memory arranged to store communication management information relating to image communication; --.

Signed and Sealed this

Twenty-sixth Day of February, 2002

Attest:

Attesting Officer

JAMES E. ROGAN
*Director of the United States Patent and Trademark Office*